United States Patent
Nix

(10) Patent No.: US 8,305,980 B1
(45) Date of Patent: *Nov. 6, 2012

(54) EFFICIENT HANDOVER OF MEDIA COMMUNICATIONS IN HETEROGENEOUS IP NETWORKS USING HANDOVER PROCEDURE RULES AND MEDIA HANDOVER RELAYS

(76) Inventor: John A. Nix, Evanston, IL (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/557,627

(22) Filed: Sep. 11, 2009

Related U.S. Application Data

(60) Provisional application No. 61/096,557, filed on Sep. 12, 2008.

(51) Int. Cl.
*H04W 4/00* (2009.01)
(52) U.S. Cl. .................. 370/329; 370/330; 370/331
(58) Field of Classification Search .................. 370/329, 370/330, 331
See application file for complete search history.

(56) References Cited

U.S. PATENT DOCUMENTS

| | | | | |
|---|---|---|---|---|
| 7,869,808 | B2* | 1/2011 | Kojima | 455/437 |
| 7,929,477 | B2* | 4/2011 | Feng et al. | 370/315 |
| 2004/0005893 | A1* | 1/2004 | Isobe et al. | 455/436 |
| 2005/0128979 | A1* | 6/2005 | Wu et al. | 370/331 |
| 2006/0072542 | A1* | 4/2006 | Sinnreich et al. | 370/351 |
| 2007/0070948 | A1* | 3/2007 | Kezys et al. | 370/331 |
| 2007/0117564 | A1* | 5/2007 | Reynolds | 455/436 |
| 2008/0069065 | A1* | 3/2008 | Wu et al. | 370/340 |
| 2009/0285175 | A1 | 11/2009 | Nix | |
| 2009/0303962 | A1* | 12/2009 | Jokikyyny et al. | 370/331 |
| 2011/0122812 | A1* | 5/2011 | Jeong et al. | 370/328 |

FOREIGN PATENT DOCUMENTS

EP 1 811 741 A1 7/2007

OTHER PUBLICATIONS

Y. Rekhter et al, Address Allocation for Private Internets, Internet Engineering Task Force—Request for Comments: 1918, Feb. 1996, pp. 1-9.
J. Rosenberg et al, SIP: Session Initiation Protocol, Internet Engineering Task Force—Request for Comments: 3261, Jun. 2002, pp. 1-264.

(Continued)

*Primary Examiner* — Farah Faroul
(74) *Attorney, Agent, or Firm* — Smith Risley; Steven P. Wigmore

(57) ABSTRACT

Methods and systems are provided for efficient handover of a media session between heterogeneous Internet Protocol (IP) networks. A mobile device with Internet access can operate a software program to communicate with a corresponding node. The corresponding node may access the Internet through a firewall which may include Network Address Translation (NAT)-routing functionality. The mobile device establishes a media session with a corresponding node via the transmission of a first media stream and receipt of a second media stream, and a media-control channel can optionally be implemented. The mobile device can acquire Internet access through a second IP address, and packets routed between the second IP address and the Internet may traverse a firewall. The mobile device can evaluate a set of network parameters at the second IP address from a stored Local Area Network (LAN) profile.

28 Claims, 23 Drawing Sheets

OTHER PUBLICATIONS

J. Rosenberg et al, STUN—Simple Traversal of User Datagram Protocol (UDP) Through Network Address Translators (NATs), Internet Engineering Task Force—Request for Comments: 3489, Mar. 2003, pp. 1-44.

H. Schulzrinne et al, RTP: A Transport Protocol for Real-Time Applications, Internet Engineering Task Force—Request for Comments: 3550, Jul. 2003, pp. 1-104.

C. Perkins, IP Mobility Support for IPv4, Internet Engineering Task Force—Request for Comments: 3344, Aug. 2002, pp. 1-99.

H. Izumikawa et al, SIP-based Bicasting for Seamless Handover between Heterogeneous Networks, Internet Engineering Task Force—SIPPING Working Group Draft, Feb. 2008, pp. 1-23.

Nilanjan Banerjee, Seamless SIP-Based Mobility for Multimedia Applications, IEEE Network, Mar./Apr. 2006, pp. 6-13.

Jin-Woo Jung et al, Performance Evaluation of Two Layered Mobility Management Using Mobile IP and Session Initiation Protocol, IEEE Global Telecommunications Conference—2003, Dec. 1-5, 2003 pp. 1190-1194.

Taekyoung Kwon, Network Address Translation (NAT), Seoul National University Movement Research Lab—Computer Game Course (4190.420), Fall 2006, pp. 1-60.

Rong-Hong Jan and Wen-Yueh Chiu, An Approach for Seamless Handoff Among Mobile WLAN/GPRS Integrated Networks, Computer Communications 29, Apr. 2005, pp. 32-41.

H. Tschofenig and G. Bajko, Mobile IP Interactive Connectivity Establishment (M-ICE), Internet Engineering Task Force—MIP6 Draft, Feb. 2008, pp. 1-25.

S. Salsano et al, A Solution for Vertical Handover of Multimedia Sessions Using SIP, Internet Engineering Task Force—SIPPING Working Group Draft, Aug. 27, 2007, pp. 1-24.

S. Niccolini et al, Requirements for Vertical Handover of Multimedia Sessions Using SIP, Internet Engineering Task Force—SIPPING Working Group Draft, Aug. 27, 2007, pp. 1-15.

Ling-Jyh Chen et al, Universal Seamless Handoff Architecture in Wireless Overlay Networks, UCLA Computer Science Department Technical Report CSD-TR No. 040012, 2004, pp. 1-4.

Rajiv Chakravorty et al, Performance Issues with Vertical Handovers—Experiences from GPRS Cellular and WLAN Hotspots Integration, Proceedings of the Second IEEE Annual Conference on Pervasive Computing and Communications, Mar. 14-17, 2004, pp. 155-164.

A. Dutta et al, Dynamic Buffering Control Scheme for Mobile Handoff, IEEE 17th International Symposium on Personal, Indoor and Mobile Radio Communications, Sep. 2006, pp. 1-11.

F. Chahbour et al, Fast Handoff for Hierarchical Mobile SIP Networks, Proceedings of World Academy of Science, Engineering and Technology, vol. 5 Apr. 2005, pp. 34-37.

P. Srisuresh et al, State of Peer-to-Peer (P2P) Communication Across Network Address Translators (NATs), Internet Engineering Task Force—Request for Comments: 5128, Mar. 2008, pp. 1-32.

Motorola, Technical White Paper: Long Term Evolution: A Technical Overview, 2007.

Hesham Soliman (Ed.), Mobile IPv6 Support for Dual Stack Hosts and Routers (DSMIPv6), Internet Engineering Task Force—MIP6 Working Group, Nov. 2007, pp. 1-29.

D. Johnson et al, Mobility Support in IPv6, Internet Engineering Task Force—Request for Comments: 3775, Jun. 2004, pp. 1-112.

C. Perkins et al, Mobile IPv4 Challenge/Response Extensions (Revised), Internet Engineering Task Force—Request for Comments: 4721, Jan. 2007, pp. 1-26.

Latvakoski et al, Vertical Handover During a VoIP Call in Hybrid Mobile Ad Hoc Networks, IEEE Wireless Telecommunications Symposium, Apr. 24-26, 2008, pp. 38-45.

Florian Evers and Jochen Seitz, REACH: A Roaming-Enabled Architecture for Multi-Layer Capturing, IEEE Communications Society WCNC 2008 Proceedings, 2008, 2699-2704.

Pasi Eronen, TCP Wake-Up: Reducing Keep-Alive Traffic in Mobile IPv4 and IPsec NAT Traversal, Nokia Research Center NRC-TR-2008-002, Jan. 31, 2008, pp. 1-10.

S. Sharma et al, OmniCon: A Mobile IP-based Vertical Handoff System for Wireless LAN and GPRS Links, Computer Science Department, Stony Brook University, Unknown Date, pp. 1-10.

EventHelix, IMS Conference Call Flow Diagrams, http://www.eventhelix.com/ims/conference/ims-conference-call-processor.pdf, May 18, 2008.

J. Rosenberg, Interactive Connectivity Establishment (ICE): A Protocol for Network Address Translator (NAT) Traversal for Offer/Answer Protocols, Internet Engineering Task Force—MMUSIC Working Group, Oct. 29, 2007, pp. 1-110.

J. Rosenberg et al, Session Traversal Utilities for (NAT) (STUN), Internet Engineering Task Force—BEHAVE Working Group, Jul. 28, 2008, pp. 1-56.

H. Schulzrinne and E.Wedlund, Application-Layer Mobility Using SIP, ACM SIGMOBILE Mobile Computing and Communications Review, Jul. 2000, pp. 47-57.

V. Gupta, IEEE 802.21 Overview of Standard for Media Independent Handover Services, IEEE 802 Plenary, San Diego, Tuesday, Jul. 18, 2006, pp. 1-65.

Wikipedia, Network Address Translation, http://en.wikipedia.org/w/index.php?title=Network_address_translation&oldid=233597215, Aug. 22, 2008, pp. 1-6.

W. Jiang and H. Schulzrinne, Comparisons of FEC and Codec Robustness on VOIP Quality and Bandwidth Efficiency, submitted to World Scientific on Jun. 5, 2002. pp. 1-12.

Guest Blogger, WiFi/WiMAX Heterogeneous Seamless Handover, Intel Research, http://blogs.intel.com/research/2008/02/wifi_wimax_handover.php, Feb. 2008.

D. Wing, Symmetric RTP / RTP Control Protocol (RTCP), Internet Engineering Task Force—Request for Comments: 4961, Jul. 2007, pp. 1-6.

* cited by examiner

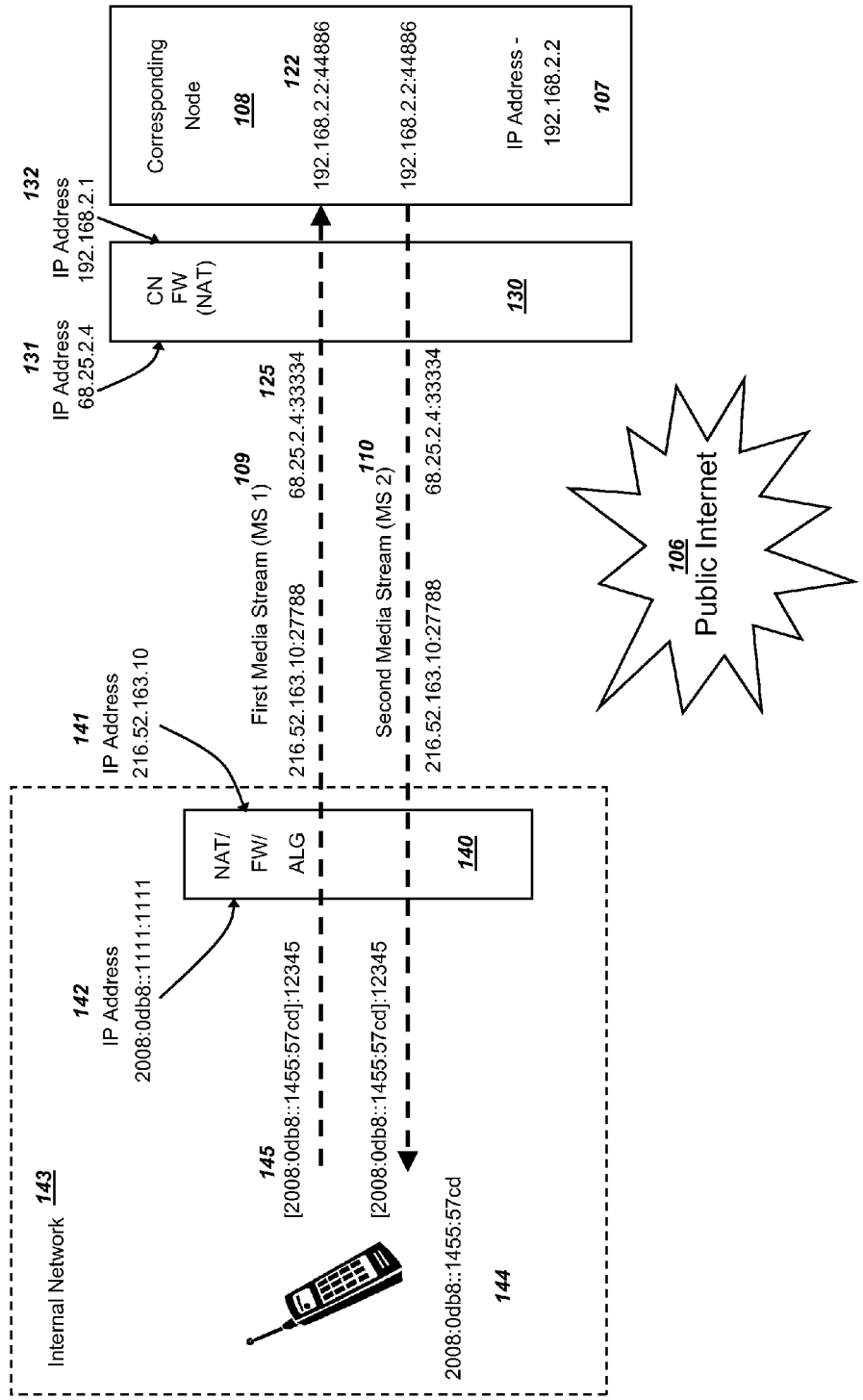

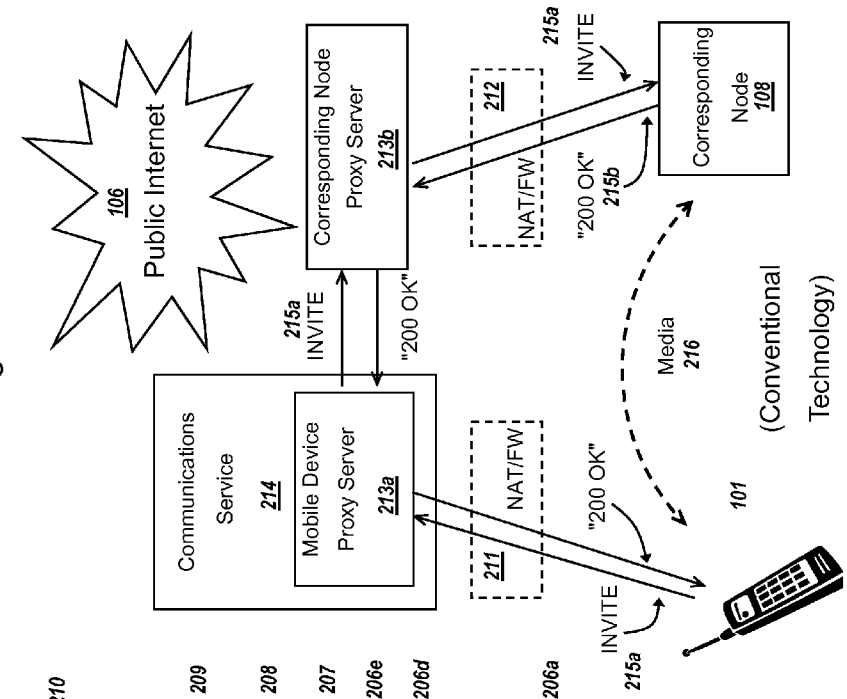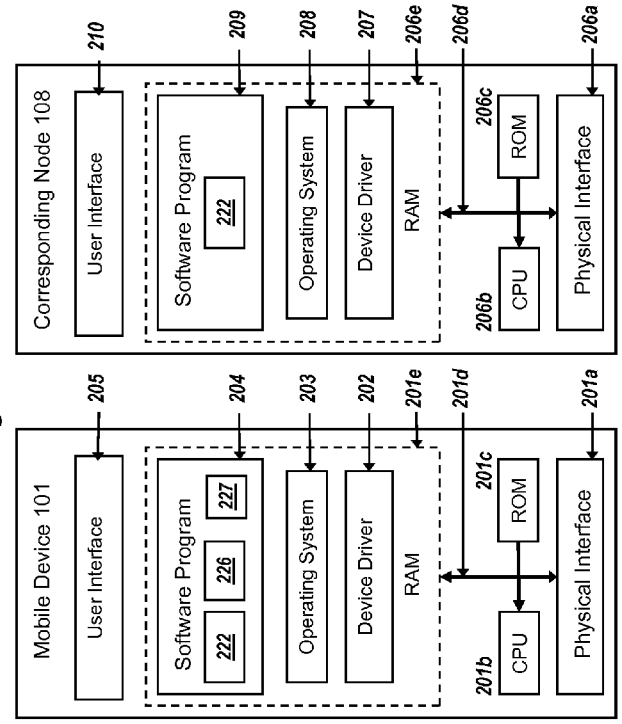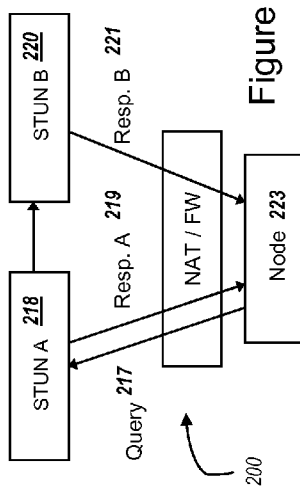

Figure 2d

Network Handover Rules — 225

CN FW Type

| AN FW Type | Public (Null) | Full Cone NAT | Partial Cone (NAT or FW) | PR Cone NAT or Symmetric FW | Symmetric NAT | Unknown or Other |
|---|---|---|---|---|---|---|
| Public (Null) | A | A | B | B | C | Relay |
| Full Cone | A | A | B | B | C | Relay |
| Partial Cone | A | A | B | B | C | Relay |
| PR Cone NAT or Symmetric FW | A | A | B | B | Relay | Relay |
| Symmetric NAT | A | Relay | D | Relay | Relay | Relay |
| Unknown or Other or Specific Remote Ports Required | Relay | Relay | Relay | Relay | Relay | Relay |

Figure 2e

LAN Profile 226

Network Parameters 224

| 224a Network | 224b FW Type | 224c Identity Token | 224d Media Transport Protocols Supported | 224e IP Versions Supported | 224f Allowed Remote UDP Ports | 224g Allowed Remote TCP Ports | 224h Connection Steup Delay (sec.) | 224i Network Quality (1-10 scale) |
|---|---|---|---|---|---|---|---|---|
| Office | Symmetric NAT | "Go2Call WLAN 11" | TCP | IPv4 | None | 80, 443 | 2.4 | 8.7 |
| Bank | Symmetric NAT | "Chase Orrington" | TCP | IPv4 | 4569 | 80, 443 | 6.1 | 4.0 |
| Sprint WAN | Symmetric FW | "Sprint Chicago N." | TCP, UDP | IPv4, IPv6 | All | All | 4.5 | 8.0 |
| Home Wifi | PRC NAT | "Home Wifi" | TCP, UDP | IPv4 | >5000 | All | 2.0 | 5.0 |
| Coffee Shop | Null | "Starbucks_0123" | TCP, UDP, SCTP | IPv6 | All | All | 3.3 | 6.8 |
| Neighbor | Other | "Bob&Sue" | TCP, UDP | IPv4 | All | All | 1.3 | 9.5 |
| Primus UMTS | PRC NAT | "206-01-12345-XXXXX" | TCP, UDP | IPv4 | All | All | 5.5 | 4.4 |
| Home LAN | PRC NAT | A3:07:2E:F6:FA:99 | SCTP | IPv4 | None | None | 2.2 | 0.0 |

Figure 2f

CN Software Handover Database 233

| CN Software Version 234 | Corresponding Node Handover Function 229 |
|---|---|
| Go2Call SIP 1.0.1 | Restricted |
| Go2Call SIP 1.4.4 | Basic |
| Go2Call SIP 2.2.1 | Standard |
| Asterisk 1.2.8 | Restricted |
| Asterisk 1.4.20 | Basic |
| RTC/2.0 | Basic |
| RTC/1.0 | Restricted |
| Cisco-SIPGateway/IOS-12.x | Restricted |
| Yahoo Voice, 1 | No Handover |
| Talk.v64E5E09B2C | Basic |
| Skype 3.1.1 | Advanced |

Figure 2g

Handover Procedure Rules 227

Handover Parameters 228

| CN Handover Function 229 | Handover Time 230 | CN FW Type 231 | Handover Procedure 232 |
|---|---|---|---|
| Basic | immediate (t <= 1 sec.) | PRC or symmetric FW | Relay B |
| Basic | soon (1 < t < 5 sec.) | PRC or symmetric FW | Relay C |
| Basic | projected (t >= 5 sec) | PRC or symmetric FW | Relay C |
| Restricted | immediate (t <= 1 sec.) | PRC or symmetric FW | Relay D |
| Restricted | soon (1 < t < 5 sec.) | PRC or symmetric FW | Wait |
| Restricted | projected (t >= 5 sec) | PRC or symmetric FW | Wait |
| Standard | immediate (t <= 1 sec.) | PRC or symmetric FW | Relay A |
| Standard | soon (1 < t < 5 sec.) | PRC or symmetric FW | Relay A |
| Standard | projected (t >= 5 sec) | PRC or symmetric FW | Relay C |
| Basic | immediate (t <= 1 sec.) | Symmetric NAT | Relay B |
| Basic | soon (1 < t < 5 sec.) | Symmetric NAT | Relay C |
| Basic | projected (t >= 5 sec) | Symmetric NAT | Relay C |
| Restricted | immediate (t <= 1 sec.) | Symmetric NAT | Relay D |
| Restricted | soon (1 < t < 5 sec.) | Symmetric NAT | Wait |
| Restricted | projected (t >= 5 sec) | Symmetric NAT | Wait |
| Standard | immediate (t <= 1 sec.) | Symmetric NAT | Relay B |
| Standard | soon (1 < t < 5 sec.) | Symmetric NAT | Relay C |
| Standard | projected (t >= 5 sec) | Symmetric NAT | Relay C |
| Basic | Any | Unknown or Other | Relay B |
| Restricted | immediate (t <= 1 sec.) | Unknown or Other | Relay D |
| Restricted | soon (1 < t < 5 sec.) | Unknown or Other | Wait |
| Restricted | projected (t >= 5 sec) | Unknown or Other | Wait |
| Standard | Any | Unknown or Other | Relay B |
| No Handover | Any | Any | None |

Figure 2h

Handover Procedure Rules 227

| Calculated Handover Time | CN FW Type | Handover Procedure |
|---|---|---|
| immediate (t <= 1 sec.) | PRC, symmetric FW | Relay X |
| soon (1 < t < 5 sec.) | PRC, symmetric FW | Relay X |
| projected (t >= 5 sec) | PRC, symmetric FW | Relay Y |
| immediate (t <= 1 sec.) | Symmetric NAT | Relay W |
| soon (1 < t < 5 sec.) | Symmetric NAT | Relay Z |
| projected (t >= 5 sec) | Symmetric NAT | Relay Z |
| Any | Unknown or Other | Relay Z |

Figure 2i

Handover Procedure Rules 227

Handover Parameters 228

| 234 Quality of First Media Session (MOS) | 235 Initial Network SNR | 236 Initial Network SNR Trend | 237 AN SNR | 238 AN SNR Trend | 239 MD Battery Life Remaining | 229 Corresponding Node Handover Function | 241 Time t | 224i Network Quality (1-10 scale) | 242 AN FW Type | 231 CN FW Type | 232 Handover Procedure |
|---|---|---|---|---|---|---|---|---|---|---|---|
| 3.6 | 11 dBm | -0.10 dBm/s | 11 dBm | 0.32 dBm/s | 50% | Basic | 1.2 | 5.1 | Full Cone | Sym. NAT | C |
| 3.2 | 6 dBm | -0.15 dBm/s | 16 dBm | 0.05 dBm/s | 75% | Standard | 0.4 | 8.2 | Sym. FW | Partial Cone | B-2 |
| 4 | 15 dBm | 0.00 dBm/s | 10 dBm | 0.01 dBm/s | 20% | Restricted | 5.2 | 7.7 | Full Cone | Unknown | Wait |
| 3.8 | 12 dBm | 0.03 dBm/s | 5 dBm | -0.04 dBm/s | 90% | Restricted | Unknown | Unknown | Unknown | Sym. FW | Wait |
| 2.8 | 4 dBm | -0.12 dBm/s | 9 dBm | 0.12 dBm/s | 10% | Unknown | Unknown | Unknown | Unknown | Sym. FW | Relay A |
| 3.3 | 7 dBm | -0.21 dBm/s | 7 dBm | 0.02 dBm/s | 66% | No Handover | 2.4 | 9.9 | Public | Public | No handover |
| 3.5 | 5 dBm | -0.15 dBm/s | 10 dBm | 0.15 dBm/s | 15% | Standard | 0.4 | 8.2 | Sym. FW | Public | A-1 |
| 3.5 | 5 dBm | -0.15 dBm/s | 10 dBm | 0.15 dBm/s | 15% | Basic | 0.4 | 8.2 | Sym. FW | Public | A-2 |
| 3.5 | 5 dBm | -0.15 dBm/s | 10 dBm | 0.15 dBm/s | 15% | Basic | 0.4 | 0.0 | Sym. FW | Public | No handover |
| 3.4 | 8 dBm | -0.12 dBm/s | 9 dBm | 0.12 dBm/s | 50% | Standard | 0.1 | 6.4 | Sym. NAT | PRC | Relay B |
| 3.4 | 8 dBm | -0.12 dBm/s | 9 dBm | 0.12 dBm/s | 50% | Standard | 2.5 | 6.4 | Sym. NAT | PRC | Relay C |
| 3.4 | 8 dBm | -0.12 dBm/s | 9 dBm | 0.12 dBm/s | 50% | Standard | 4.5 | 6.4 | Unknown | Other | Relay D |
| 3.4 | 8 dBm | -0.12 dBm/s | 9 dBm | 0.12 dBm/s | 50% | Standard | 4.5 | 6.4 | Any | Q | Relay XX |
| 3.2 | 6 dBm | -0.15 dBm/s | 16 dBm | 0.05 dBm/s | 75% | Standard | 0.0 | 8.2 | Sym. NAT | Partial Cone | D |

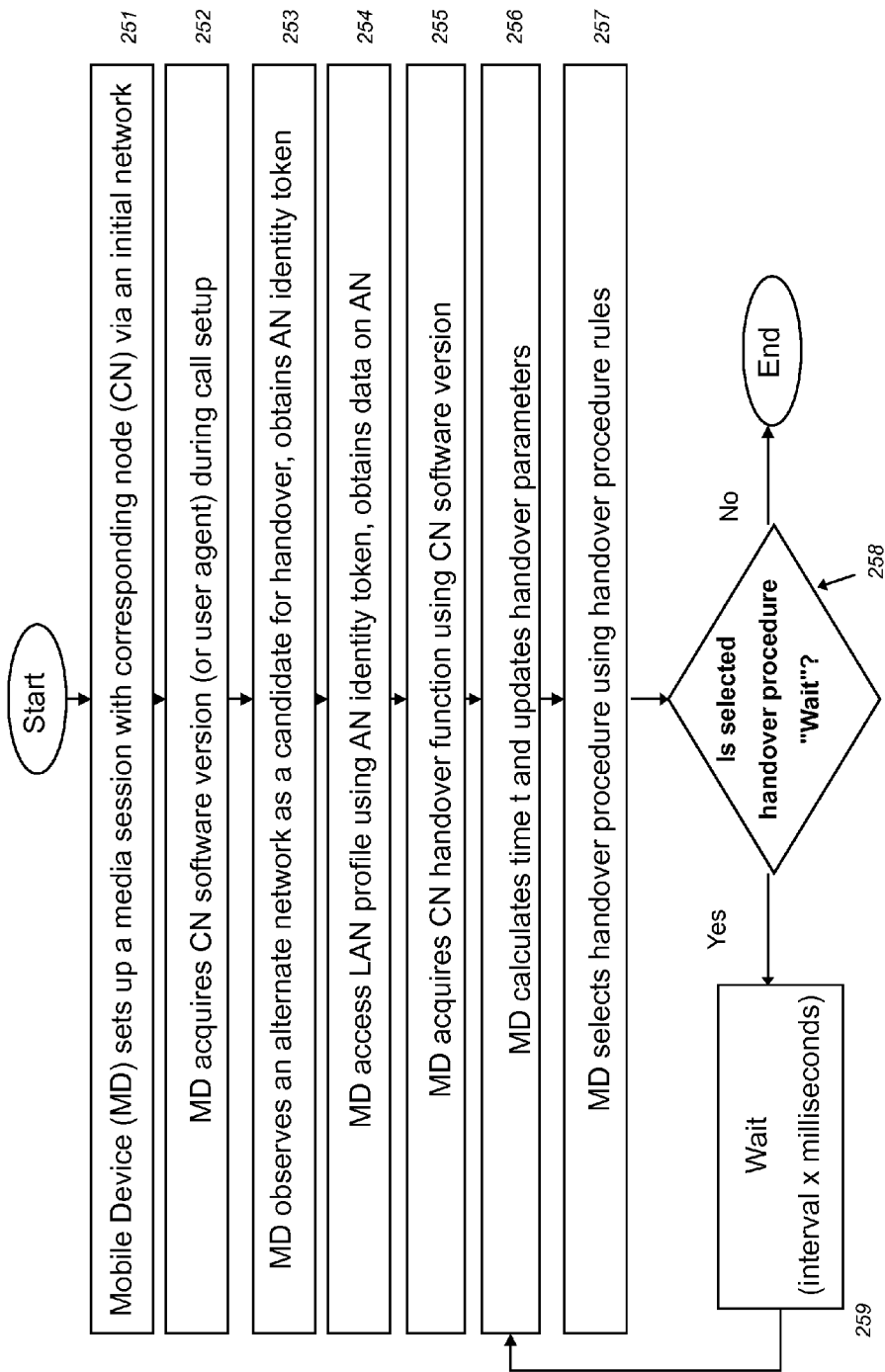

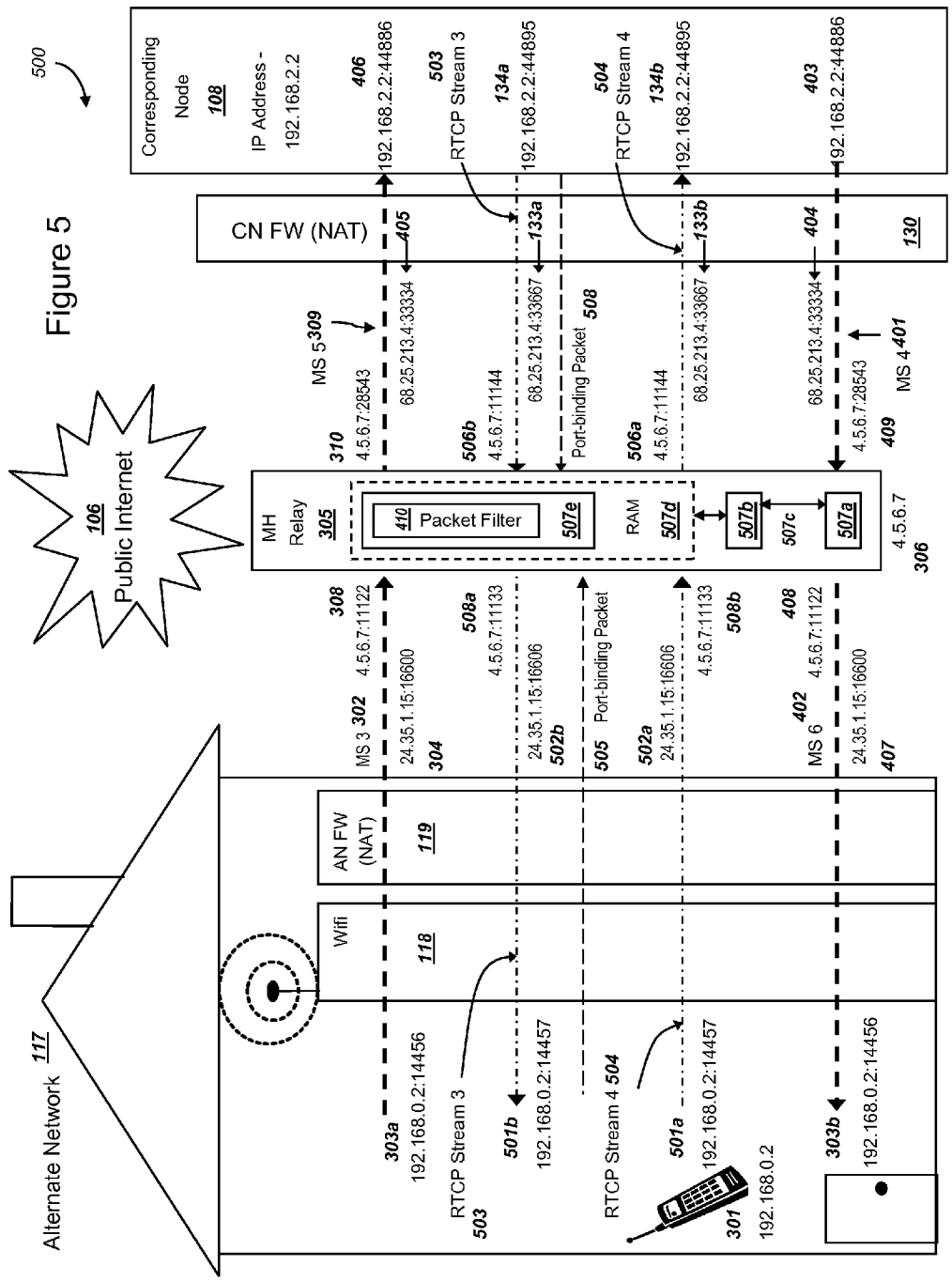

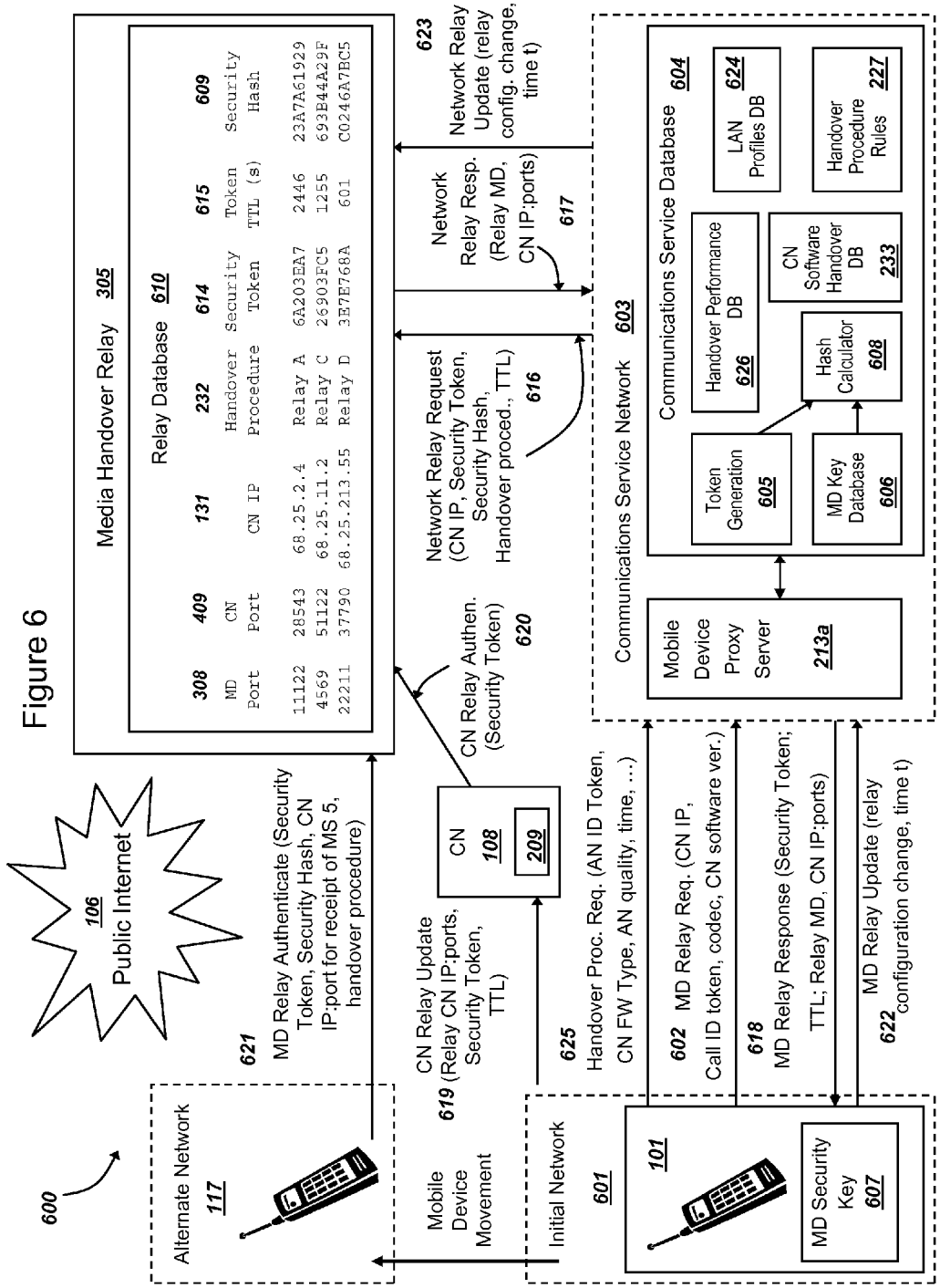

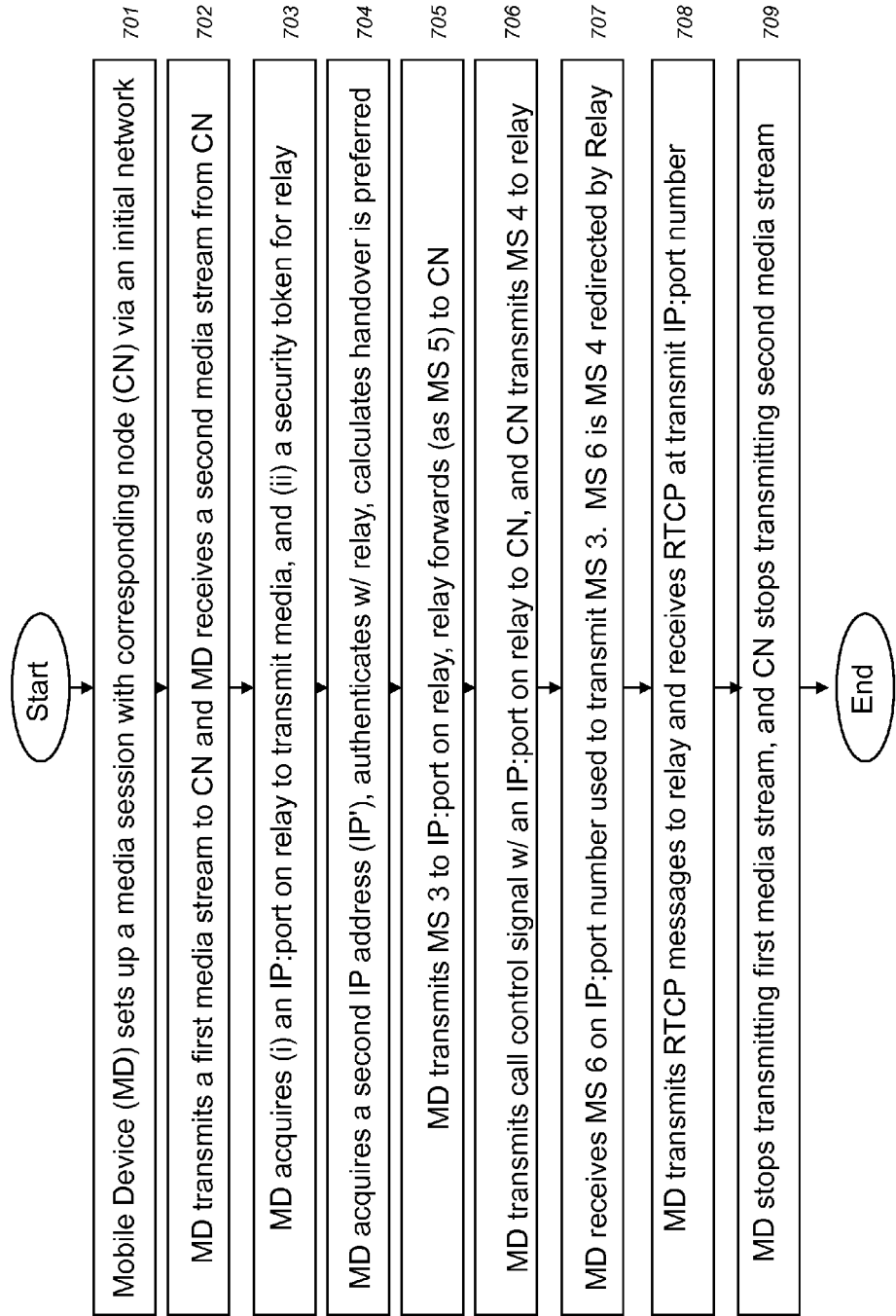

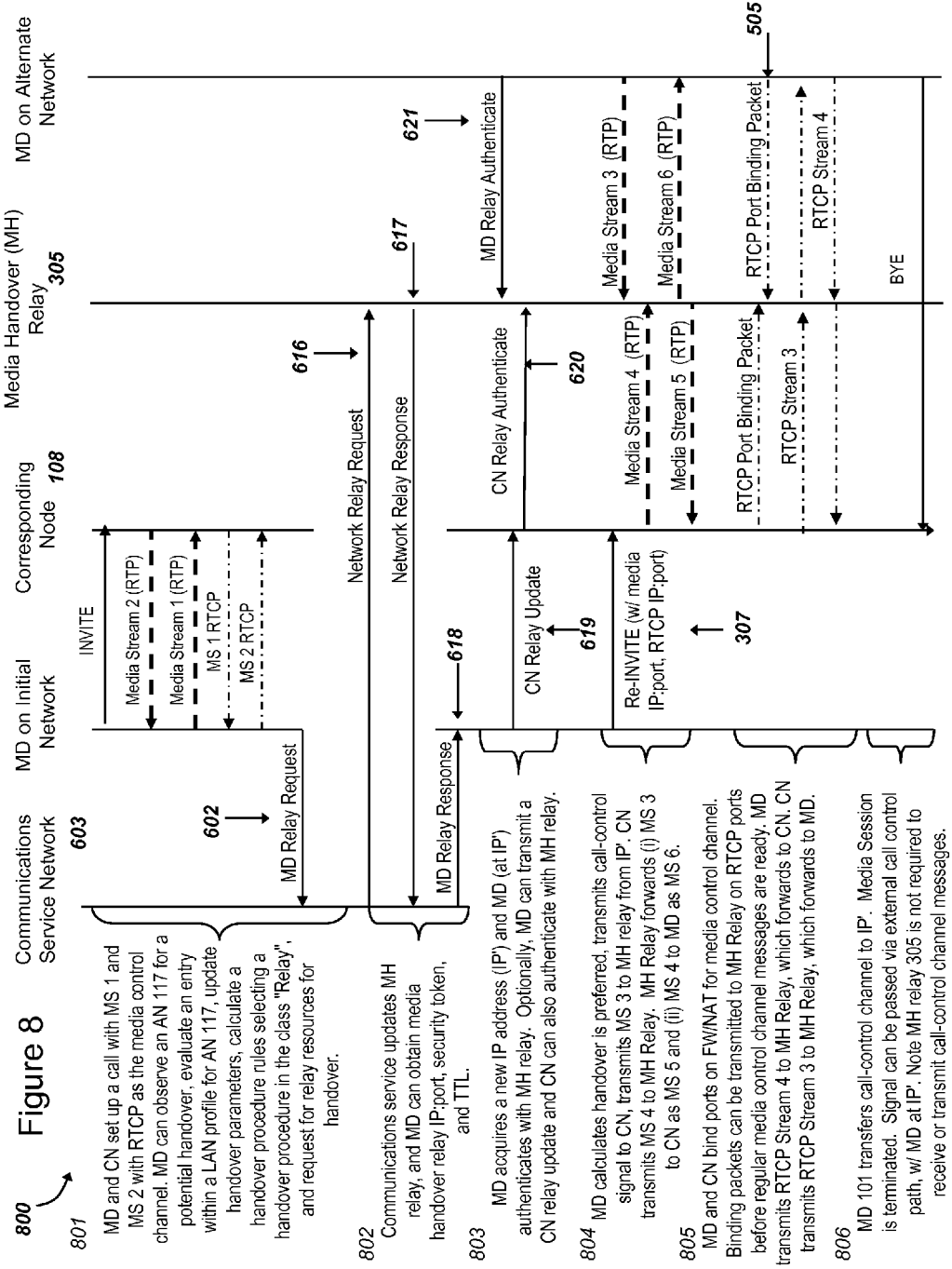

Figure 9

Relay Database 610

| Field | Num | Value | Field | Num | Value |
|---|---|---|---|---|---|
| Media Handover Relay ID | 901 | Go2Call_MHR_123 | MS 3 SSID | 911 | 15492A04 |
| MD Identity Token - TMSI | 902 | 6A203EA7 | MS 4 SSID | 912 | B23A990F |
| Call ID | 903 | 0014832745 | MS 3 frames/packet | 913 | 1 |
| MD Port (receive) | 308 | 11122 | MS 4 frames/packet | 914 | 1 |
| CN Port (receive) | 409 | 28543 | MS 3 DSCP Value: | 915 | 011010 |
| CN IP address | 131 | 68.25.2.4 | MS 4 DSCP Value: | 916 | 011010 |
| Handover Procedure | 232 | Relay A | MS 3 UDP Checksum | 917 | 00000 |
| Security Token | 614 | 6A203EA7 | MS 4 UDP Checksum | 918 | A3D3 |
| Token TTL | 615 | 2446 | MD authentication port | 919 | 11122 |
| Security Hash | 609 | 23A7A61929 | MD auth. transport | 920 | UDP |
| MD auth. retries | 904 | 5 | RTCP 3 Port (receive) | 506b | 11144 |
| Time t | 241 | 4.3 | RTCP 4 Port (receive) | 507b | 11133 |
| CN IP:port (receive) | 405 | 68.25.1.4:33334 | CN RTCP transmit port | 133a | 33667 |
| MS 3 codec | 905 | AMR-WB | CN security token | 921 | C0246A7B |
| MS 4 codec | 906 | AMR-WB | CN security hash | 922 | 693B44A29F |
| MS 5 FEC | 907 | (2,1) - Reed Solomon | CN token TTL | 923 | 7200 |
| MS 6 FEC | 908 | (2,1) - Reed Solomon | CN authen. retries | 924 | 4 |
| MS 3 sequence No. | 909 | E0BE | Media 5,6 DSCP Value: | 925 | 011010 |
| MS 4 sequence No. | 910 | 633A | CN Media Cipher Key | 926 | 9763A41A4E |
|  |  |  | MD Media Cipher Key | 927 | 5FE09ACFAA |

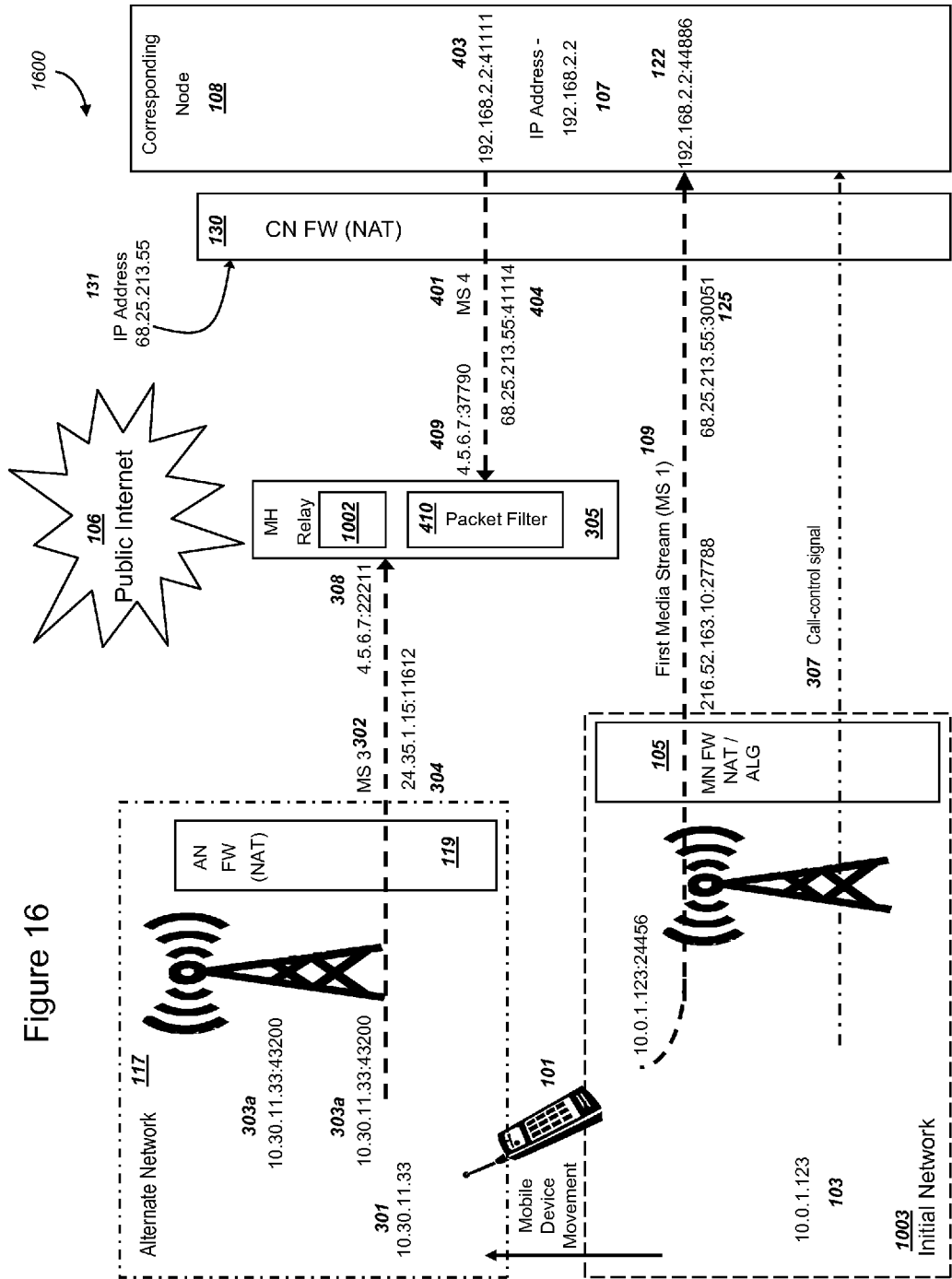

EFFICIENT HANDOVER OF MEDIA COMMUNICATIONS IN HETEROGENEOUS IP NETWORKS USING HANDOVER PROCEDURE RULES AND MEDIA HANDOVER RELAYS

PRIORITY CLAIM AND CROSS-REFERENCE TO RELATED APPLICATIONS

This application claims priority under 35 U.S.C. §119(e) to U.S. Provisional Patent Application Ser. No. 61/096,557, filed on Sep. 12, 2008 in the name of John Nix, entitled, "Efficient Handover of Media Communications in Heterogeneous IP Networks using Handover Procedure Rules and Media Handover Relays," the entire contents of which are hereby incorporated by reference. The subject matter of this application is also related to (A) the subject matter of U.S. patent application Ser. No. 12/557,617, filed Sep. 11, 2009 in the name of John A. Nix, entitled "Efficient Handover of Media Communications in Heterogeneous IP Networks using Handover Procedure Rules and Media Handover Relays," and (B) U.S. patent application Ser. No. 12/557,636, filed Sep. 11, 2009 in the name of John A. Nix, entitled "Efficient Handover of Media Communications in Heterogeneous IP Networks using Handover Procedure Rules and Media Handover Relays." The contents of these applications are hereby incorporated by reference in their entirety.

The subject matter of this application is also related to (C) the subject matter of U.S. patent application Ser. No. 12/163,472, filed Jun. 27, 2008 in the name of John Nix, entitled "Efficient Handover of Media Communications in Heterogeneous IP Networks using LAN Profiles and Network Handover Rules," and (D) the subject matter of U.S. patent application Ser. No. 12/120,940 filed May 15, 2008 in the name of John Nix, entitled "Efficient Handover of Media Communications in Heterogeneous IP Networks." The contents of these applications are hereby incorporated by reference in their entirety.

BACKGROUND

1. Technical Field

The present methods and systems relate to media communications such as voice or video over packet-switched networks and, more particularly, to efficient methods and systems for handover of active media sessions when mobile devices move between heterogeneous Internet Protocol (IP) networks.

2. Description of Related Art

The use of public packet-switched networks for voice and video communications is expected to continue to rapidly grow. "Internet telephony" is one example of packet-switched telephony. In packet-switched telephony, a packet-switched network such as the Internet serves as a transportation medium for packets carrying data for voice, video, or other media such as music. Voice-over-Internet-Protocol (VoIP) is one example of a collection of standards and protocols used to support voice or video communications over packet-switched networks such as the Internet. Others have been developed as well, including proprietary protocols such as Skype®. A common Internet telephony scheme involves a computer or other device that is capable of connecting to the Internet, transmitting voice or video to a second device such as a gateway, another mobile device, or another computer.

A long-term, planned evolution of existing mobile networks worldwide is to migrate the underlying mobile network protocols and systems from a traditional circuit-switched architecture for voice services to a packet switched architecture that is based on IP standards. Prominent examples include the 3GPP (3rd Generation Partnership Project) consortium's announced "Long-Term Evolution" (LTE) standards as well as the Institute of Electrical and Electronic Engineers' (IEEE) mobile WiMax standards (802.16 or 802.20) and subsequent versions. Although these standards continue to evolve, a common expected feature is that the underlying networks will remain packet switched and based on IP standards such as IPv4 and IPv6.

With these next-generation networks, voice, video, or other media is transmitted over the IP network with access to the public Internet provided by the mobile operator or wireless Internet Service Provider (ISP). Media sessions such as voice calls can be managed by protocols such as the Session Initiation Protocol (SIP) or Extensible Messaging and Presence Protocol (XMPP), and these protocols generally operate at the application layer of the Open Systems Interconnection (OSI) stack. The IP Multimedia Subsystem (IMS) as specified by 3GPP is another example of next-generation mobile-network technology that implements voice calls and media sessions via application-layer software.

Numerous benefits may be realized through the use of packet-switched telephony based on IP standards for mobile networks. First, mobile operators would like to provide access data services such as web-browsing, e-mail, or video through the mobile device, and these services are frequently provided through standard Internet protocols such as Hyper-text Transfer Protocol (HTTP) for web browsing, Simple Mail Transfer Protocol (SMTP) for e-mail, or Real-Time Streaming Protocol (RTSP) for video. Thus, mobile network operators may efficiently support many data services through the deployment of an IP network and by assigning IP addresses to mobile devices. With an efficient IP network, the traditional circuit-switched network becomes redundant, and the mobile operator can lower costs and simplify operations by managing a single IP network instead of both an IP network and a circuit-switched network.

Further, voice services worldwide are migrating to IP networks, and the International Telecommunications Union (ITU) projected that nearly 50% of all international phone calls were carried by VoIP in 2007. As the corresponding endpoints for telephone calls or media sessions are increasingly located on IP networks, the most efficient method for connecting calls should be to keep the call control and media on the Internet when possible, as opposed to (i) transferring calls to a circuit-switched network such as the traditional Public Switched Telephone Network (PSTN) and then (ii) transferring the call back to the Internet in order to reach another endpoint that is also connected to the Internet. Also, keeping the VoIP telephone calls from mobile devices natively on the Internet can reduce costs, since traditional per-minute charges for connecting phone calls with the legacy PSTN can be bypassed.

Although the implementation of an underlying IP network for all mobile services provides the significant benefits noted above, several important new challenges are created. An important class of problems relates to handover of active media sessions such as voice calls when the mobile device moves through the mobile network or between different networks. A significant focus of the various wireless Wide Area Network (WAN) standards such as 802.16e and 802.20 pertains to keeping an IP address bound to the mobile device or Media Access Control (MAC) address, even if the mobile device changes base stations due to movement such as driving in a car.

Traditional VoIP protocols such as SIP, Extensible Messaging and Presence Protocol (XMPP), H.323, Media Gateway Control Protocol (MCGP), or Inter-Asterisk Exchange (IAX2), as well as current implementations of proprietary protocols such as Skype®, were originally designed when almost all devices with IP addresses could reasonably be expected to keep the same IP address for the duration of a media session. Further, active sessions in many applications that implement transmission control protocol (TCP) were also not designed for the IP address to change during the session, such as Secure Shell (SSH) or File Transfer Protocol (FTP). Consequently, mobile operators and users may prefer for the IP address of the mobile device to not change during active sessions, and next generation mobile networks using protocols such as mobile WiMax and LTE are generally designed to minimize the change of IP addresses assigned to a given device.

For voice services, changing the IP address during an active call can result in noticeable gaps or delay in the audio for both sides, especially when the IP address is changed as the subscriber moves between completely different networks, such as from a macro-cellular WiMax network to a WiFi (802.11) network in a building. Such a change in IP addresses for the mobile device could be a likely scenario when the subscriber walks into an office building from the street, for example, where a superior connection to the Internet is provided through a local WiFi connection instead of a wide area WiMax connection.

What is needed in the art are techniques for seamless handover of an active telephone call when a mobile device's preferred IP address for communication changes, such that potential gaps or distortion of audio are minimized, in order to efficiently maintain communication with a corresponding node. What is also needed in the art is the avoidance of a disconnected call upon an IP address change, which would require the user to place a second call to continue the conversation. When the Internet connectivity for the example WiFi network is provided by an ISP that is a different entity from the mobile operator, the two subnets of the public Internet are commonly referred to as "heterogeneous" networks in that they may be separately-managed subnets of the public Internet.

Under the above-referenced scenario of handing over an active media session such as a voice call when a mobile device acquires a new, preferred IP address for communication, a need in the art exists to solve the significant class of problems introduced by various types of firewalls and/or Network Address Translation (NAT) routers with port translation that may operate between a mobile device and a corresponding node (such as a gateway, a packet-based telephone, a personal computer, another mobile device, a session border controller, some other endpoint, etc.). A need exists in the art to solve the problems for handover created by port translation, firewalls which may block either inbound or outbound packets, and application layer gateways (ALGs) that may either alter addresses and/or ports within the body of packets or block packets. The handover of an active call between heterogeneous networks is also referred to as "vertical handover". For example a server, managed by the mobile operator and located between the mobile network and the public Internet, may both (i) perform NAT routing functions with port translation and (ii) operate as a firewall to filter incoming packets from the Internet destined to a mobile device.

The corresponding node may also be behind (i.e. be situated on the other side of the public Internet from) a NAT router or firewall, or possibly multiple levels of NAT routers and firewalls. Many NAT routers translate ports in addition to translating IP addresses, thereby allowing multiple hosts within an internal network to share a single public IP address. In order to reduce the potential gaps or delays in the audio during transfer of an existing media session to a new IP address, a need exists to handover an active media session by properly addressing the complexities of intermediate devices that either (i) alter the IP packets transmitted and received by either a mobile device or a corresponding node or (ii) drop packets that do not match pre-determined firewall rules.

There is a need in the art to address the scenario in which the target network for handover of an active media session and the corresponding node are both behind NAT routers (or "NATs" for short) for firewalls. The use of NATs is expected to increase significantly as the number of broadband connections worldwide increases while (i) the available pool of public IPv4 addresses remains fixed and (ii) the transition from IPv4 to IPv6 proceeds relatively slowly. For example, the CTO of NTT America estimated that there were only 2,000 consumers in Japan accessing the Internet via IPv6 connections, approximately five years after the introduction of IPv6 services by NTT in Japan (Network World, Mar. 31, 2008). IMS Research projected that the number of fixed broadband connections globally will grow from 150 million in 2005 to over 400 million by 2009. There is also a need in the art for vertical handovers to support Internet standards that are actually widely deployed on common consumer and business NAT routers and firewalls, such as utilizing handover techniques primarily through User Datagram Protocol (UDP) or TCP standards.

Although applications such as VoIP or web browsing operating on a mobile device may prefer to keep the same IP address active during a session under normal circumstances, there are many instances when routing the packets through a new or different IP address on the mobile device (MD) may be preferred in order to provide the superior service to the subscriber. A mobile device that provides services through Internet protocols will generally prefer a link-layer connection that provides higher signal-to-noise ratios, lower power requirements, lower costs for the IP connectivity, and/or other benefits. A mobile device may have access to multiple wireless WAN networks, such as two or more of the planned 4G wireless networks from AT&T®, Verizon®, and Sprint®. A handover of an active media session between the wireless WAN networks may be preferred as a mobile device moves across a geographical region, and a need exists in the art to support the handover of active media sessions in an efficient manner even though the preferred IP address for communicating changes. Further, when the mobile device is in the proximity of an 802.11 access point or similar wireless LAN, connecting to the Internet through the 802.11 access point instead of the macro-cellular network may be preferred and the underlying IP address for the mobile device would likely be different than the IP address provided by a wide area network.

In addition, WiFi technology is currently widely deployed, and the number of access points globally is expected to continue to increase. For example, the market research firm In-Stat estimated that 213 million Wi-Fi chipsets were shipped out worldwide in 2006, representing a 32% growth rate over 2005. When a subscriber places a telephone call on a mobile device that connects to the Internet through WiFi, such as at the subscriber's home or office, and then the subscriber moves out of WiFi range by leaving the premises, and the macro-cellular network begins providing IP connectivity, the underlying or locally assigned IP address the mobile device uses to receive packets will likely change. There could also likely be a period of time when both the IP address from the WiFi network and the IP address from the wireless wide area network (WAN) are available and active.

Similarly, superior connectivity to the mobile device may be delivered by changing from the macro-cellular network to WiFi. For example, if a macro-cellular LTE network is provided through the 700 Mhz frequency bands auctioned by the FCC in 2008, the macro-cellular network signal may be degraded by building walls, and an improved connection for the device could be obtained by switching the IP connectivity for the mobile device from the macro-cellular network to WiFi when a subscriber walks inside a building with WiFi access. In some instances, the quality of the macro-cellular connection could degrade to the point where it is unusable while WiFi connectivity is strong, such as if the subscriber moves into the basement of a building in close proximity to a WiFi base station. In this example scenario, there exists a need in the art to change the IP address that the mobile device utilizes for communicating with a corresponding node as rapidly as possible through minimizing requirements for call-control signaling, as the preferred routing of both inbound and outbound packets is changed from the macro network to WiFi.

There may be a period of time when both IP addresses are simultaneously active and available to applications on the mobile device, and a need exists in the art to (i) support "make before break" handover, while (ii) simultaneously addressing the significant need existing in the art to address the complexities of NAT routers and/or firewalls that may be located in front of either or both endpoints during handover of a media session. There exists a need in the art to support handover between WiFi and macro-cellular networks that implement VoIP for telephone calls in order to provide significant benefits to the mobile operator and subscriber through increased network coverage. There is also a need in the art for efficient handover techniques that will reduce the potential for dropped media packets or increased jitter in a manner that requires minimal additional servers or processes for the mobile network or communications service provider to manage. A need exists in the art to perform the handover in a rapid manner. Although handover between a WiFi and macro-cellular network is illustrated above as one example of vertical handover, many other examples are available as well, and vertical handover may generally refer to a scenario where the locally assigned IP address on a mobile device changes for the preferred routing of IP packets.

A need exists in the art for the vertical handover to be managed at the application layer of the OSI stack. Next-generation mobile networks generally assume voice services are transmitted through VoIP and managed at the application layer. This network architecture provides significant opportunities for companies managed independently of the mobile network operators, such as Skype®, Google®, Yahoo®, or Truphone® to provide voice, video, or other media services. These and similar companies may offer end users a communications service. The communications service could be delivered through software programs operating on a mobile device and may have access to the Internet via the mobile operator's data network.

However, the software programs may not have control over low-level functions such as managing the MAC address, associating the mobile device with a particular base station, or similar control over physical and data-link layer connections. What is needed in the art are efficient methods and systems to support active call handover for communications services, as the mobile device moves between heterogeneous IP networks. There exists a need in the art for software programs to (i) detect new IP addresses becoming available on the mobile device and (ii) monitor the quality of the links to decide that a handover is desirable, and (iii) execute the handover as efficiently as possible while simultaneously supporting NATs or firewalls that may operate between the mobile device and a corresponding node. Thus, there exists a need in the art for seamless handover to be managed via software operating as an application on the mobile device.

In addition, a need exists in the art to, in the event of handover, adequately support media-control protocols, such as the Real-Time Control Protocol (RTCP) or Secure Real-Time Control Protocol (SRTCP), that may operate on a separate port than that used for media. Media-control protocols can be helpful for monitoring quality and reporting back to the originating device of a media stream about the attributes of media received at another node. A need exists to provide feedback to a node through media-control channels, allowing the node to, for example, introduce additional channel coding in the media if excessive bit errors are observed on the receiving side. A need exists in the art to support handover of media-control channels in the presence of NAT routers and/or firewalls between the mobile device and the corresponding node. A need exists in the art to efficiently handover media-control messages from a receiving device to a transmitting device in order to quickly evaluate quality of media received during handover and determine if the handover is successful or complete.

Further, a need exists in the art to provide a more efficient handover of media than is provided by alternative techniques such as Mobile IP (IETF RFC 3775 and 4721, which are hereby incorporated herein by reference). Notable limitations of Mobile IP include the complexity and cost of managing servers such as Home Agents for media sessions, implementing virtual Network Interface Cards (NICs) on a mobile device, significant additional time and steps to establish a secure connection to the Home Agent from a foreign network (relative to the desired time to implement handover), and multiple other requirements and signaling overhead as specified in the Mobile IP standards. For example, published laboratory measurements in a controlled environment suggest an example time of up to 3 seconds for the time required to handover from a 3G data network to a WiFi network, in addition to dropping voice packets during the handover ("Vertical Handover During a VoIP Call in Hybrid Mobile Ad Hoc Networks", Latvakoski et al, IEEE Wireless Telecommunications Symposium, 24-26 Apr. 2008, pg: 38-45). And other needs exist in the art as well, as the list recited above is not meant to be exhaustive but rather illustrative.

SUMMARY

Methods and systems are provided for handover of active media sessions such as telephone calls as a mobile device moves between heterogeneous IP networks. An objective of the invention is to address the challenges noted above for vertical handover of a media session with a mobile device, while also providing desirable results such as reducing complexity and increasing speed and/or efficiency, among other benefits.

A first exemplary embodiment may take the form of methods and systems for handover of an active media session between a mobile device and a corresponding node. The mobile device may initially establish a media session via a first IP address, and subsequently observe an alternate network through a physical interface which may be preferred for communication. The first media session consists of a first media stream transmitted from the mobile device to the corresponding node and a second media stream transmitted from the corresponding node to the mobile device. The alternate network can provide a second IP address and provide connectivity to the public Internet via a first firewall which may also include NAT-routing functionality. The corresponding node may have an IP address with a connection to the public Internet provided through a second firewall. The mobile device or a communications service managing media sessions can utilize a LAN profile and a handover procedure rules to select an efficient handover procedure that utilizes a media handover relay. The use of a media handover relay can efficiently address numerous possible constraints for conducting handover, including (i) firewalls restricting inbound or outbound packets, (ii) limited software capabilities for a corresponding node and/or a mobile device for conducting a handover, (iii) conversion between Internet routing protocols such as IPv4 and IPv6, (iv) timing constraints where one node can transmit and/or receive media before another node, or (v) possibly reducing the number of steps and complexity of conducting a handover compared to handover procedures that do not utilize a media handover relay.

Upon evaluating that a handover may be preferred, possibly before acquiring a new IP address, a mobile device can transmit a message to a communications service in order to request resources from a media handover relay. The communications service can update a media handover relay and respond with two IP:port numbers (e.g. combination of an IP address and a port number) associated with a media handover relay. A first IP:port number may be designated for receipt of media from the mobile device and a second IP:port number may be designated for receipt of media from the corresponding node. A mobile device can utilize a handover-predicting jitter buffer, where the size of the jitter buffer window is increased before handover. After acquiring a new IP address, a mobile device can authenticate with the media handover relay from the second IP address, which can also include information for a media handover relay to conduct handover such as a third IP:port number a corresponding node utilizes to receive media in the first media session. A media handover relay can preferably utilize a packet filter in order to increase security of the relay. The mobile device can begin transmitting a third media stream to the first IP:port number associated with the media handover relay, and the relay can buffer media received from the mobile device until media is also received from the corresponding node. The mobile device can start transmitting the third media stream before the mobile device stops transmitting the first media stream, representing a "make before break" handover.

Concurrently with transmitting the third media stream, the mobile device can transmit a call-control signal to the corresponding node. The call-control signal can preferably be transmitted as a non-media packet or information within a stream of media transmitted according to User Datagram Protocol (UDP). Alternatively, the call-control signal could be transmitted via a call-control channel, such as the channel utilized to set up the first media session, if the corresponding node does not support the receipt of a call-control signal within a stream of UDP datagrams containing media. The call-control signal preferably also includes the second IP:port number on a media handover relay for the corresponding node to transmit media to. Upon receipt of the call-control signal, the corresponding node can begin transmitting a fourth media stream to the second IP:port number contained in the call-control signal. The fourth media stream can preferably be transmitted using the same IP:port number for transmission of the second media stream and receipt of the first media stream. The corresponding node may transmit the fourth media stream before stopping the transmission of the second media stream, representing a "make before break" handover.

Upon receipt of media packets by a media handover relay, a relay packet filter may confirm the packets are "conforming media" in order to enhance security, since the corresponding node may not have the functionality to authenticate with a media handover relay. A media handover relay can observe the source IP:port for packets received in the fourth media stream. The media handover relay can subsequently transmit media packets received in the third media stream to the source IP:port observed for the fourth media stream. The media handover relay can also transmit media from the third media stream previously temporarily recorded within a relay buffer. Media transmitted from the media handover relay to the corresponding node can constitute a fifth media stream. In addition, a media handover relay can transmit media received in the fourth media stream to the source IP:port observed in the third media stream received from the mobile device at the alternate network, which can constitute a sixth media stream. The media handover relay can also implement forward error correction in media transmitted to either or both nodes, such as transmitting duplicate copies of media packets received. After transmitting the fifth and sixth media streams, a media handover relay can also receive associated media-control-channel messages and forward them as well. The media handover relay can operate on media and media-control packets and does not need to operate within a call-control channel. Upon successfully conducting handover utilizing a media handover relay, a mobile device can also subsequently conduct a second handover to another network utilizing the media handover relay, such as if the mobile device moves between multiple networks during an active media session.

A second exemplary embodiment may take the form of methods and systems for handover of an active media session between a mobile device and a corresponding node. A first media session can consist of a first media stream transmitted from the mobile device to the corresponding node and a second media stream transmitted from the corresponding node to the mobile device. An alternate network can provide a second IP address and provide connectivity to the public Internet via a first firewall which may include NAT-routing functionality. The corresponding node may have an IP address with a connection to the public Internet provided through a second firewall. The mobile device or a communications service may evaluate that handover to the alternate network using a media handover relay is preferred, by calculating a handover a handover procedure rules.

Upon evaluating that a handover may be preferred and after acquiring an IP address associated with the alternate network, the mobile device can begin transmitting a third media stream to an IP:port number associated with the media handover relay, and the media handover relay may record media received from the mobile device in a media relay buffer until media is also received from the corresponding node. The mobile device can transmit the third media stream before stopping the transmission of the first media stream, representing a "make before break" handover. The mobile device or a communications service can also inform a media handover relay of an IP:port number associated with the corresponding node, representing the IP:port on an external firewall or NAT router where the corresponding node receives the first media stream. Concurrently with transmitting the third media stream, the mobile device can transmit a call-control signal to the corresponding node. The call-control signal preferably also includes an IP:port number on the media handover relay for the corresponding node to use as the destination IP:port for media packets transmitted in a fourth media stream.

A media handover relay can receive the third media stream and transmit the media in a fifth media stream to the IP:port number associated with the corresponding node, representing the IP:port on an external firewall or NAT router where the corresponding node receives the first media stream. Note that the media handover relay may not have received packets from the corresponding node, and the IP:port number utilized as the destination IP:port number in the fifth media stream may represent a "best guess" of the appropriate IP:port number to utilize, since the corresponding node may be associated with a firewall with potential NAT-routing functionality. The appropriate IP:port on the external interface of a firewall for a corresponding node to receive media may not be confirmed or even established by a firewall with NAT-routing functionality, if the corresponding node has not transmitted a packet to the media handover relay. With the uncertainty of the appropriate IP:port number on a corresponding node's firewall, the "best guess" may represent an efficient handover procedure given the constraints.

The corresponding node can receive the call-control signal and also utilize a handover-predicting jitter buffer, such that the jitter buffer window is increased, preferably gradually, after receipt of a call-control signal. In addition, a mobile device and/or a communications service may transmit multiple call-control signals to a corresponding node. The corresponding node can transmit a fourth media stream to the media handover relay, where the fourth media stream can represent a duplicate copy of media transmitted in the second media stream to the mobile device located on an initial network. The fourth media stream can preferably be transmitted (i) using the same IP:port number for transmission of the second media stream and receipt of the first media stream and also (ii) using a destination IP:port number the media handover relay utilizes as the source IP:port for transmission of the fifth media stream. The source IP:port the media handover relay utilizes for transmission of the fifth media stream can be transmitted to the corresponding node in a call-control signal. In this manner, if a firewall with NAT routing functionality associated with the corresponding node maintains consistent internal and external port bindings for actively used ports (such as not being a symmetric NAT router), then the "best guess" of the appropriate destination IP:port number the media handover relay utilizes in the fifth media stream can be correct. The first packet transmitted by the corresponding node in the fourth media stream can open and bind a NAT router for the corresponding node to receive the fifth media stream, providing an efficient method and system to conduct handover.

When the media handover relay receives a packet in the fourth media stream, the media handover relay can observe the source IP:port in packets received. If the source IP:port is equal to the destination IP:port the media handover relay utilizes for packets transmitted in the fifth media stream, the media handover relay can evaluate the "best guess" was correct and the corresponding node properly receives the fifth media stream. If the source IP:port for packets received in the fourth media stream is not equal to the destination IP:port in the fifth media stream, the media handover relay can evaluate the "best guess" was not correct. The media handover relay can subsequently change the destination IP:port for packets transmitted in the fifth media stream to the source IP:port for packets received in the fourth media stream. In this manner, a corresponding node can then begin to receive packets in the fifth media stream, by receiving packets on a local IP:port utilized to transmit the fourth media stream. The corresponding node can thus receive media packets from the media handover relay even though a firewall with NAT-routing functionality changes external port numbers when a corresponding node utilizes the same internal IP:port number for transmitting the first media stream, receiving the second media stream, and transmitting the fourth media stream.

Upon changing the destination IP:port in the fifth media stream (e.g. if the "best guess" was incorrect), the media handover relay can also concurrently transmit media in the third media stream from the mobile device which has been recorded in a relay media buffer. The corresponding node can utilize the increased jitter buffer size in a handover-predicting jitter buffer to recover received media that was previously recorded in a relay media buffer. In addition, upon receiving the fourth media stream, a media handover relay can begin transmitting a sixth media stream to the mobile device, where the destination IP:port number in the sixth media stream is equal to the source IP:port number in the third media stream. The media handover relay can utilize the same local IP:port number to receive the third media stream and transmit the sixth media stream. The mobile device can preferably utilize the same IP:port number to both transmit the third media stream and receive the sixth media stream. Further, the mobile device can also utilize a handover-predicting jitter buffer, such that a jitter buffer window may be increased upon transmission of the third media stream and decreased after receipt of the sixth media stream. The mobile device and the corresponding node may also transmit and receive media-control-channel messages through the media handover relay upon receipt of the new media streams.

A third exemplary embodiment may take the form of methods and systems for handover of an active media session between a mobile device and a corresponding node. A first media session can consist of a first media stream transmitted from the mobile device to the corresponding node and a second media stream transmitted from the corresponding node to the mobile device. An alternate network can provide a second IP address and provide connectivity to the public Internet via a first firewall which may include NAT-routing functionality. The corresponding node may have an IP address with a connection to the public Internet provided through a second firewall. The mobile device or a communications service may evaluate that handover to the alternate network using a media handover relay is preferred, possibly by calculating a handover procedure using a handover procedure rules. The evaluation that (i) handover is preferred and also (ii) selecting a handover procedure using a media handover relay can be made before a mobile device can transmit or receive packets through the alternate network (including before the mobile device has acquired an IP address at the alternate network).

Upon evaluating that a handover may be preferred and before acquiring an IP address associated with the alternate network, the mobile device can transmit a call-control signal to the corresponding node, where the call-control signal contains an IP:port number for a corresponding node to utilize as the destination IP:port number for packets transmitted in a fourth media stream to a media handover relay. The mobile device can utilize a handover-predicting jitter buffer, such that a jitter buffer size window is increased, preferably gradually, upon transmission of the call-control signal, or also at another time before receiving media from the media handover relay. The mobile device can conduct steps to connect with the alternate network, such as completing authentication and obtaining an IP address via techniques such as Dynamic Host Configuration Protocol (DHCP) or similar methods. Upon receipt of a call-control signal, the corresponding node can begin transmitting the fourth media stream, preferably before stopping the transmission of the second media stream. The media handover relay (i) can utilize a relay packet filter to reject packets that do not contain conforming media and accept packets in the fourth media stream and (ii) record received media in a relay media buffer.

The mobile device can complete steps to connect to the alternate network and acquire a new IP address within the alternate network. The mobile device can transmit to a media handover relay (i) an authentication request and (ii) a third media stream which can also contain media transmitted in the first media stream. The mobile device can start transmitting the third media stream before stopping the transmission of the first media stream. The media handover relay can receive packets in the third media stream and transmit to the source IP:port observed for packets in the third media stream (i) media from the fourth media stream recorded in the relay media buffer and (ii) media received in the fourth media stream from the corresponding node. Packets transmitted from the media handover relay to the mobile device can constitute a sixth media stream. The media handover relay can utilize the same IP:port number to receive the third media stream and transmit the sixth media stream. The mobile device can utilize the same IP:port number to transmit the third media stream and receive the sixth media stream. In this manner, media packets between the mobile device and a media handover relay can more readily traverse a firewall associated with the alternate network. Packets within the sixth media stream which had previously been recorded in a relay buffer can be received within the window of a handover-predicting jitter buffer operating on the mobile device in order to enhance the quality of media played out to an end user during handover. After receipt of the sixth media stream, the window of a handover-predicting jitter buffer can be decreased to a standard value.

After receipt of packets in the third media stream, the media handover relay can begin transmitting a fifth media stream to the corresponding node. The media handover relay can utilize the same IP:port number for receiving the fourth media stream and transmitting the fifth media stream. The corresponding node can utilize the same IP:port number for transmitting the fourth media stream and receiving the fifth media stream. In this manner, media packets between the corresponding node and a media handover relay can more readily traverse a firewall associated with the corresponding node. In this third exemplary embodiment where the corresponding node can transmit a fourth media stream while the mobile device connects to the alternate network, the corresponding node can transmit and receive packets with a media handover relay utilizing an IP:port number that is different than transmitting and/or receiving media packets in the first media session. By utilizing the systems and methods within this third exemplary embodiment, a mobile device can more rapidly receive packets from a corresponding node via an alternate network than by waiting until after a new IP address is acquired to start handover procedures. The media handover relay may also transmit media packets by applying forward error correction techniques such as duplicating media packets transmitted. The mobile device and the corresponding node may also transmit and receive media-control-channel messages through the media handover relay upon receipt of the new media streams.

A fourth exemplary embodiment may take the form of methods and systems for handover when (i) a mobile device can acquire a second, new IP address with connection to the public Internet provided through a first firewall and (ii) a corresponding node can have an IP address with a connection to the public Internet provided through a second firewall. In accordance with this third exemplary embodiment, an active media session initially takes the form of a first media stream that is sent from the mobile device via a first IP address to the corresponding node and a second media stream that is sent from the corresponding node to the mobile device at the first IP address.

When the mobile device detects that an alternate network is available as a potential candidate for handover of the media session, the mobile device can access a LAN profile to evaluate (i) the presence and type of firewall or NAT and/or (ii) a set of network parameters associated with the alternate network. The LAN profile can include information pertaining to the various networks the mobile device has previously visited (and/or include provisioned data), and may be identified by tokens such as a Service Set Identifier (SSID), other identifiers in carrier signals transmitted by base stations, or geographical information such as GPS positioning, among many options. Ethernet MAC addresses within the alternate network may also be utilized as identification tokens.

The LAN profile can include a type of firewall or NAT associated with the alternate network, such as null, full cone, partial cone, port-restricted cone, symmetric NAT, symmetric firewall, other, or unknown. A null value for the type of firewall can represent that a firewall is not present on the alternate network (which provides the second IP address), indicating that the alternate network provides a publicly routable IP address. If no first firewall is present at the alternate network, the LAN profile may note that the network provides a publicly routable IP address. If no information regarding the alternate network is contained within a local LAN profile, the mobile device could query a communications service database in order to obtain information regarding the alternate network acquired from a different mobile device, which may have recorded data for the alternate network within a different LAN profile. LAN profiles across a plurality of mobile devices may be stored centrally within a LAN profiles database associated with a communications service managing media sessions for the mobile device.

In addition, the LAN profile may note that a firewall is present with or without network address translation. For example, if IPv6 addresses are used on the alternate network, a firewall may also be present in order to maintain security and handle unsolicited or unauthorized inbound datagrams. The packet-filtering rules for a firewall may be equivalent to the packet-filtering rules for a NAT, but without port translation. A LAN profile can have data useful for handover in addition to, or instead of, a firewall type, such as ports allowed or blocked, transport protocols allowed, routing protocols allowed (i.e. IPv4 or IPv6), and also recorded measures of network quality. Together, the data regarding a network can constitute a set of network parameters. A LAN profile may save time in selecting an efficient handover procedure using a handover procedure rules, since (i) the mobile device should not need to probe the first firewall or network every time the mobile device connects to the alternate network, and (ii) a type of firewall associated with a particular alternate network is unlikely to frequently change, and ports or protocols allowed are also unlikely to frequently change. Note that a LAN profile may also contain data regarding a wide area wireless network such as a network managed by a mobile network operator.

The mobile device can acquire a second IP address associated with the alternate network. If the mobile device does not have an entry in a LAN profile for the alternate network, the mobile device can evaluate the first firewall and network using techniques such as STUN, in addition to scanning for open ports and/or transport protocols, and record the results in a LAN profile for future use. Network probing packets could confirm desired ports for media and call-control are also allowed within the alternate network. When establishing the first and second media streams, the mobile device can obtain information regarding the presence and type of a second firewall associated with the corresponding node. With knowledge of the types for the first and second firewalls, in conjunction with network parameters within a LAN profile, the mobile device can select an efficient handover procedure using a set of handover procedure rules, which can specify handover procedures to be used according to a set of handover parameters. Handover parameters may also include information on an estimated time until handover, handover capabilities of the corresponding node, power consumption and energy remaining for a mobile device, and network quality measures for the alternate network and/or an initial network. The set of handover parameters may also include the types of firewalls at either node. In this manner, the mobile device can select a highly efficient handover procedure given numerous various constraints.

As one example within this fourth exemplary embodiment, a handover procedure rules may specify a handover procedure "Relay B" with exemplary handover parameters of (i) either the first or second firewall associated with a corresponding node has a type of "unknown", (ii) the time until handover (e.g. the start of transmission of new media streams) is three seconds, and (iii) the corresponding node has basic functionality for conducting handover. A second procedure, "A" (which may not require a media handover relay) could be selected by a handover procedure rules with exemplary handover parameters of (i) a first firewall associated with the alternate network is a port-restricted cone NAT router and a second firewall associated with the corresponding node is "null" (e.g. not present), (ii) the time remaining until handover is 1.2 seconds, and (iii) the corresponding node has basic functionality for conducting handover. Other combinations of handover parameters and selected handover procedures may be utilized as well within a handover procedure rules, as one benefit of handover procedure rules is to allow a mobile device to increase the efficiency of handover procedures depending on a set of handover parameters. In general, one purpose of handover procedure rules can be to assist a mobile device in taking those but only those handover steps that are necessary given the firewall type/situation at the network to which it is handing over and also the firewall type/situation at the corresponding node.

In this fourth exemplary embodiment, the mobile device can transmit a third media stream from the second IP address to either (i) the corresponding node or (ii) a media handover relay, depending upon the selected handover procedure. The corresponding node can transmit a fourth media stream to either (i) the mobile device at the second IP address, or (ii) a media handover relay, also depending upon the selected handover procedure, using procedures specified in the handover procedure rules. The first and third media streams, as well as the second and fourth media streams, can initially be transmitted concurrently, representing a "make before break" handover. A media-control channel can also be implemented in order to provide both nodes feedback on the quality of media received. After the mobile device successfully receives at the second IP address media transmitted in the fourth media (possibly re-transmitted via a media handover relay), the corresponding node can cease transmission of the second media stream. Also, after successful receipt of the third media stream at the corresponding node (possibly re-transmitted via a media handover relay), the mobile device can cease transmission of the first media stream, in order to complete the handover. Both the mobile device and the corresponding node may utilize a handover-predicting jitter buffer in order to reduce the number of packets that may be dropped during handover.

In exemplary preferred embodiments, the media session and handover can be managed through a software program operating on the mobile device, and the software program can also be managed by a communications service. The software program may be downloaded and installed on the mobile device. A user may access a communications service that supports media on a mobile device, such as voice calls to telephone numbers, generally free "peer-to-peer" calling to other devices with Internet access, or video services. The communications service may be provided to a user via an agreement, such as a service contract or a click-though agreement on a web page or form.

A software program operating at the corresponding node can be compatible with a software program on the mobile device. For example, both the mobile device and corresponding node can operate compatible software such as Skype®, GoogleTalk®, compatible SIP clients, or similar software. The software operating at the mobile device and the corresponding node may initially communicate call control through one or several proxy servers in order to establish the first media session (generally taking the form of a first media stream and a second media stream). A software routine may monitor the quality of network connections for the mobile device and predict that a different network connection, possibly with a different local IP address, will be superior for communication in the future.

The presently disclosed methods and systems, among other aspects, may involve selecting handover procedures based on a set of handover parameters. The set of handover parameters preferably includes data on at least one of (a) a network to which the device is handing over (i.e. the network on which a new, preferred IP address is obtained) and (b) the network associated with a corresponding node. The data within a set of handover parameters also preferably includes at least one of (i) a firewall type associated with either a mobile device or a corresponding node, (ii) data regarding the capabilities of a corresponding node relevant for handover, and (iii) a calculated time to complete handover, and (iv) network quality for the mobile device through either the initial or alternate network. A mobile device can access a local area network (LAN) profile, which records information regarding the network to which the device is handing over. A LAN profile allows a mobile device to more rapidly acquire data on the network to which the device is handing over compared to scanning or probing the network after acquiring an IP address. Data within a LAN profile can be included within a set of handover parameters. A handover procedure may be selected according to a handover procedure rules using a set of handover parameters. The selected handover procedure can include the use of a media handover relay in order to efficiently conduct handover, and handover procedures without the use of a media handover relay can be selected as well.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1c is a graphical illustration of an exemplary system, where a mobile device accesses a network with an IPv6 address, and a NAT router converts between IPv6 addresses and IPv4 addresses for communication with other IPv4 servers, hosts, or NAT routers, in accordance with exemplary embodiments;

FIG. 2a is a graphical illustration of software and hardware components for a mobile device and a corresponding node, in accordance with exemplary embodiments;

FIG. 2b is a graphical illustration of an exemplary call-control channel between a mobile device and a corresponding node, in accordance with exemplary embodiments;

FIG. 2c is a graphical illustration of an exemplary system, where a node can evaluate the presence and type of firewall or NAT-router functionality, in accordance with exemplary embodiments;

FIG. 2d is a simplified tabular summary of network handover rules for a mobile device, based upon the type of firewall at an alternate network and a corresponding node, in accordance with exemplary embodiments;

FIG. 2e is a simplified tabular summary of a local area network (LAN) profile including a set of network parameters, in accordance with exemplary embodiments;

FIG. 2f is a simplified tabular summary of a corresponding node software handover database, in accordance with exemplary embodiments;

FIG. 2g is a simplified tabular summary of a handover procedure rules, including a set of handover parameters, to select a handover procedure in accordance with exemplary embodiments;

FIG. 2h is a simplified tabular summary of a handover procedure rules, including a set of handover parameters, to select a handover procedure, in accordance with exemplary embodiments;

FIG. 2i is a simplified tabular summary of a handover procedure rules, including a set of handover parameters, to select a handover procedure, in accordance with exemplary embodiments;

FIG. 2j is a simplified flowchart for a mobile device to select a handover procedure using handover procedure rules, in accordance with exemplary embodiments;

FIG. 5 is a graphical illustration of an exemplary system, where a media handover relay transmits and receives media and media-control-channel messages with a mobile device and a corresponding node upon completion of a handover, in accordance with exemplary embodiments;

FIG. 6 is a graphical illustration of an exemplary system, where a communications service configures a mobile device and a media handover relay for handover, and where a mobile device authenticates with a media handover relay, in accordance with exemplary embodiments;

FIG. 7 is a simplified flowchart for a mobile device to conduct exemplary handover procedures with a media handover relay, in accordance with exemplary embodiments;

FIG. 8 is a simplified message flow diagram illustrating exemplary handover call-control messages, media flow, and media-control-channel messages between a mobile device, a corresponding node, and a media handover relay, in accordance with exemplary embodiments;

FIG. 9 is simplified tabular summary illustrating exemplary data within a relay database, in accordance with exemplary embodiments;

FIG. 16 is a graphical illustration of an exemplary system, where a mobile device utilizes a media handover relay to conduct handover, where a corresponding node operates software with restricted functionality, and where the corresponding node conducts a "break before make" handover, in accordance with exemplary embodiments.

DETAILED DESCRIPTION OF EXEMPLARY EMBODIMENTS OF THE INVENTION

FIG. 1a

Figure 1A:
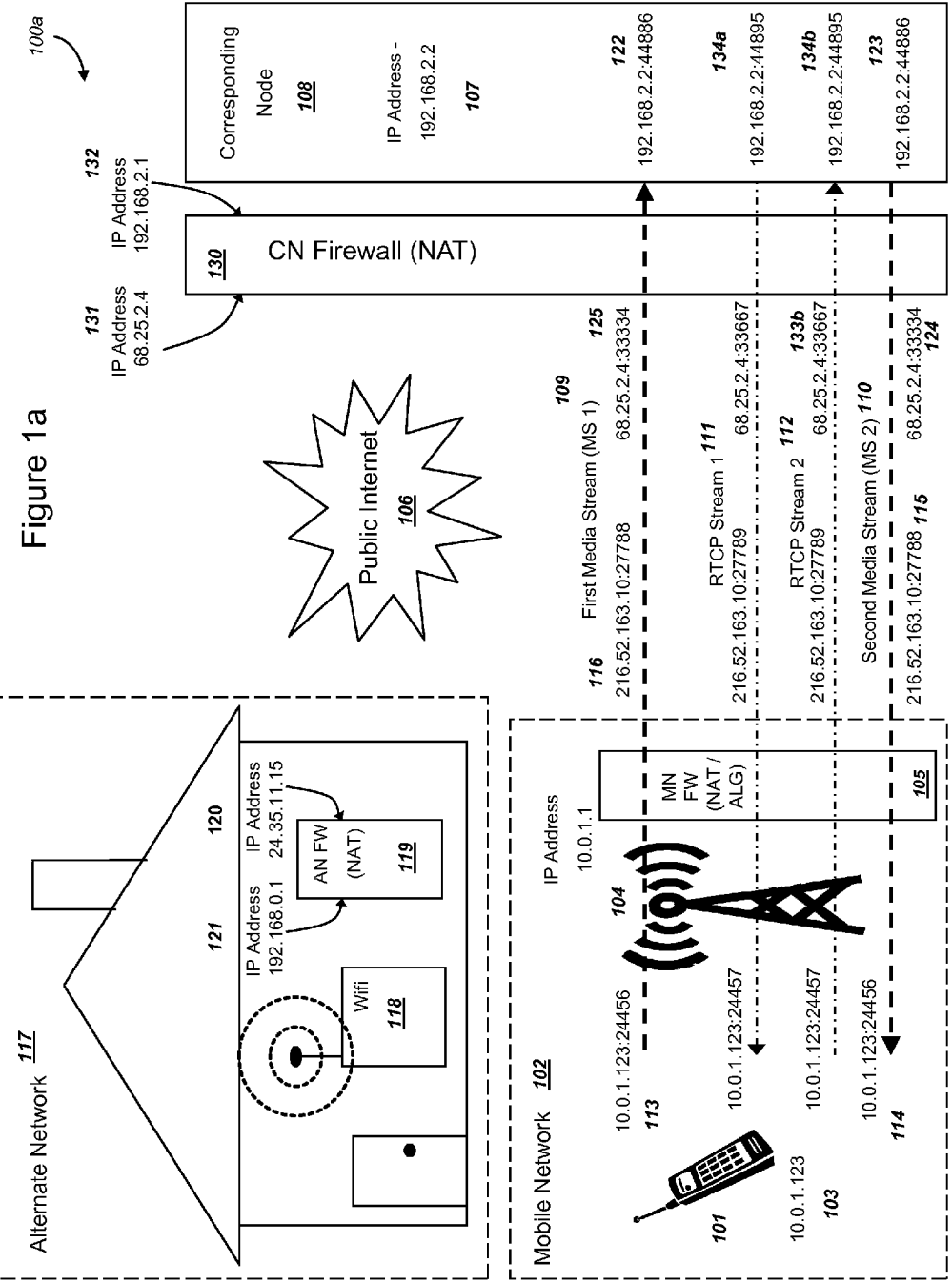
FIG. 1a is a graphical illustration of an exemplary system, where media is transmitted and received by a mobile device and a corresponding node before handover, and where the corresponding node communicates through a firewall with NAT routing functionality, in accordance with exemplary embodiments.

FIG. 1a is a graphical illustration of an exemplary system, where media is transmitted and received by a mobile device and a corresponding node before handover, and where the corresponding node communicates through a firewall with NAT routing functionality, in accordance with exemplary embodiments. The system 100 includes a mobile device (MD) 101 operating within a mobile network (MN) 102. MD 101 preferably is associated with an IP address 103 and can communicate through radio-frequency spectrum and may implement Internet protocols. Although an IPv4 address is shown for MD 101, the MN 102 could implement IPv6, or combinations of IPv4 and IPv6, such as if a mobile device or network operator implements a "dual stack". In addition, other packet-switched addressing and routing technologies may be implemented. FIG. 1*a* illustrates Internet Protocol addresses at the network layer of the OSI stack, and many different technologies could be utilized at lower levels of the physical and data-link layers.

Generally, the handover techniques described herein can be independent of the network technologies utilized at the physical and data-link layers, so long as the underlying network provides access to the Public Internet 106. As examples, mobile technologies such as mobile WiMax, LTE, W-CDMA, UMTS, or GPRS could be used within a mobile network, Ethernet at the corresponding node 108, and WiFi within the alternate network 117, as illustrated in FIG. 1A. Other variations or combinations of lower-level networking technologies are possible as well without varying from the scope of the invention. Thus, one potential value of the handover procedures described herein is that software can manage the handover by operating primarily at the network and application layers of the OSI stack, allowing the software to function independently of a network operator or underlying networking technologies (similar to a traditional VoIP phone functioning independently of an ISP providing Internet connectivity). In addition, a network operator can benefit from the handover systems and methods depicted and described herein, Many methods are available for associating an IP address 103 with MD 101. For example, a particular MAC address assigned to hardware within MD 101 can be temporarily assigned an IP address through methods such as Dynamic Host Configuration Protocol (DHCP) for a wireless wide area network (WAN). Alternatively, MD 101 can be associated with an IP address via a Packet Data Protocol (PDP) Context Activation for General Packet Radio Service (GPRS) networks and subsequent standards. Other standards-based methods for MD 101 to acquire an IP address are available as well. The specific IP address numbers and port numbers shown in FIG. 1*a* and subsequent figures are for illustration purposes, and other IP addresses or port numbers could be implemented on each appropriate element.

MD 101 may have a software program operating on the device to manage voice, video, or other streaming communications, and the software program may interface with a user for entering telephone numbers, names, e-mail addresses, or other user IDs with which a user may wish to communicate. The software program may be embedded within the device, such as included within the MD 101 operating system or chip set, or may be a separate application downloaded and installed by the end user. MD 101 may be a mobile phone handset, a laptop computer, a personal digital assistant (PDA), a tracking device associated with a physical object such as a vehicle, or similar devices that operate software programs and may communicate within radio-frequency spectrum. Actions performed by MD 101, such as (i) acquiring IP addresses, (ii) establishing media sessions, and (iii) similar functionality, may be implemented in software operating on MD 101. In addition, MD 101 may have several software programs operating on the device to manage media communications. The software could consist of a software program that is downloaded or installed on MD 101 and may be managed by a communications service. In general, a software program as recited herein may refer to one program, or to more than one program operating cooperatively, perhaps in conjunction with either local or remote software, operating systems, firmware, and/or hardware.

The mobile network 102 can provide service to the MD 101 as the user moves within a wide geographical region, such as throughout a city or state. The user may sign up for a communications service that provides services over the Internet, such as paid calling to telephone numbers, free calling to other users on the same or an affiliated communications service, streaming music and video, or discounted calling to telephone numbers through the display of advertisements on the mobile device's screen, among many other examples. The communications service may be provided by a different company than a company operating the mobile network, analogous to using Skype®, Google Talk®, or MSN Messenger®, or Vonage® through a fixed broadband connection provided by an ISP. Alternatively, the communications service may be offered by the mobile network operator, similar to traditional mobile voice and data services when a user signs up with communications services such as Verizon®, T-Mobile®, or AT&T Mobility®.

In addition, the communications service may be a service provided by a mobile virtual network operator (MVNO), which may purchase services on a wholesale basis from a mobile network operator and sell services under their own brand; an example of this type of communications service would be with Helio®, which is currently associated with the AT&T® network. In order to access a communications service, a user could either agree to a contract or click on a form to accept a user agreement. The communications service may also have branding information displayed to the user, such as having a logo displayed on a handset screen or printed on the device. The communications service may include software that operates on the mobile device, or a software program that can be downloaded to the mobile device, or configuration parameters for software operating on a mobile device to authenticate and register the mobile device with the communications service.

Base Station 104 can connect MD 101 to MN 102 via radio communications. Although a single base station is shown, MD 101 may communicate with multiple base stations either simultaneously or in sequence. MN 102 may implement a firewall with NAT router functionality associated with the mobile network, such as MN FW 105, to connect to the public Internet 106. NAT routing functionality is not required for MN FW 105, and MD 101 could be assigned a publicly routable IP address and MN FW 105 may filter packets without translating addresses/ports in this case. The MN FW 105 may support multiple functions including (i) providing a private network internal to the mobile operator via NAT routing as illustrated in FIG. 1*a*, (ii) acting as a firewall between mobile devices and the public Internet for enhanced security within the MN 102, (iii) converting packets between IPv4 and IPv6 (not shown), and/or (iv) operating as an application-layer gateway (ALG). The application-layer-gateway functionality may be useful for managing communication between mobile devices within MN 102 and external hosts, such as managing ports or call control in SIP-based VoIP calls from mobile devices within MN 102 to external SIP-compatible hosts or devices with connectivity through the public Internet 106.

The firewall functionality of MN FW 105 could be of many possible types, including a symmetric firewall, a network-layer firewall that filters inbound packets according to predetermined rules, an application-layer firewall, or a NAT router, as examples. The various types of NAT functionality shown in FIG. 1a and throughout the present application may also translate port numbers, which is also known in the art as "NATP", but may frequently be referred to simply as "NAT". If IPv6 is implemented on MN 102, then MN FW 105 may not implement NAT routing and simply filter packets for enhanced security. If IPv6 is implemented within MN 102, MN FW 105 can also translate to IPv4 packets for communication with IPv4 hosts or other IPv4 clients with connectivity through the public Internet 106. MN FW 105 may optionally be omitted, or may be located elsewhere on the Internet, or firewall functionality could be implemented directly within MD 101.

The MN 102 could also implement packet header compression and compress the IP, UDP, and RTP headers in media packets. IP address 103 and similar addresses within MN 102 are illustrated without header compression. MN 102 in FIG. 1a is a simplified representation, and MN 102 may contain multiple servers and elements such as base station controllers, routers, NAT routers, authentication servers, and gateways, among other elements. In addition, a plurality of mobile devices may access the Internet via MN 102.

MD 101 can communicate with a corresponding node (CN) 108 through the public Internet 106. CN 108 may be another mobile device, an IP phone such as a Polycom SoundPoint 501 IP phone, an analog telephone adapter such as a Linksys PAP2, a gateway to the Public Switched Telephone Network (PSTN) such as a Cisco AS-5400XM, a personal computer running a software program for voice or video communications, a server providing features such as voice mail, a server transmitting streaming video such as a television broadcast, or any other device capable of implementing Internet protocols and communicating media with MD 101. CN 108 is preferably an endpoint where media is encoded and decoded and that also implements a codec, some additional example endpoints being (i) a mobile device that converts the digital audio transmitted by MD 101 to an analog form for comprehension by a second user, (ii) a camera connected to the Internet that transmits video, or (iii) a server where voice or video is stored for later playback. CN 108 could also be an endpoint for communication with MD 101 where media is not encoded and decoded, but rather transferred to a different network or re-routed on the Internet such as with a session border controller or a "back-to-back user agent" (B2BUA). One example of a session border controller is a NET-NET server manufactured by Acme Packet. Further, CN 108 could be a multi-service IP-IP gateway that can convert signaling protocols and/or media codecs. CN 108 may also be a computing device running a software program implementing the same protocols as MD 101 to provide "peer-to-peer" communications such as Skype®, Google Talk®, Yahoo Instant Messenger®, MSN Instant Messenger®, AOL Instant Messenger®, or similar programs. CN 108 and MD 101 may implement different protocols, if a server (not shown) between them performs proper translation.

The corresponding node 108 may have a private IP address (CN IP) 107. Private IP addresses are generally not routable on the public Internet 106; examples of private IP addresses can be found in IETF RFC 1918 (which is hereby incorporated herein by reference). The corresponding node 108 may be connected to the public Internet 106 via a corresponding node firewall (CN FW) 130. CN FW 130 is illustrated in FIG. 1a as a NAT router, which may be able to map private internal IP addresses to public IP addresses. A NAT router may be considered a type of firewall, since inbound packets from the Public Internet 106 may be filtered or dropped by the NAT before being received by CN 108. A private IP address for the corresponding node 108 is not required, and CN IP 107 may also be publicly routable in order to utilize the efficient handover techniques described herein. If CN IP 107 is publicly routable, then CN FW 130 may filter packets without address-translation functionality, and the packet filtering rules of CN FW 130 can increase the complexity of handover of an existing media session or individual media stream. A software program operating at CN 108 may determine the type of firewall for CN FW 130 is (i.e. if it is a NAT router or a firewall without network address translation functionality) through standard techniques such as Simple Traversal of UDP through NATs (STUN, IETF RFC 3489, which is hereby incorporated herein by reference) or similar methods such as sending a probing packet to a server on the public Internet 106 and analyzing a response or multiple responses to the probe. However, CN 108 may also have restricted functionality in order to utilize the efficient handover procedures described herein, and CN 108 may not have (i) information pertaining to the presence or type of firewall for CN FW 130 or (ii) STUN or similar network probing capabilities, CN FW 130 as illustrated in FIG. 1a may be a NAT router, such as a partial cone, port-restricted cone, symmetric, or full cone NAT. Additional types of NAT routers are possible as well such as a Universal Plug and Play NAT (UPnP) or other types of NATs that may become commercially widespread in the future. Some examples of common types of NAT routers and an explanation of the different types of functionality may be found in IETF RFC 3489, and other examples are available as well. In accordance with the present invention, if a network, network element, or IP address is not associated with a firewall, its firewall type can be specified as "null". A "null" type for a firewall may also correspond to an IP address that is publicly routable without an intermediate server or software process filtering either inbound or outbound packets between the Public Internet 106 and a node, which is a possibility identified in IETF RFC 3489.

As illustrated in system 100a, MD 101 and CN 108 have established a media session, and the media session could be a telephone call, a video call with or without voice, a conference call where CN 108 mixes media, or streaming music from an Internet radio station, as examples. The media session may be implemented through standards-based protocols such as SIP, IAX2, MGCP, XMPP, or similar standards. The media session may also be implemented through protocols managed by third parties such as Skype®, Cisco's Skinny®, or other protocols capable of establishing media communication between endpoints or nodes having Internet connectivity.

The media session may consist of a first media stream 109 (MS 1) transmitted from MD 101 to CN 108 and a second media stream 110 (MS 2) received by MD 101 and transmitted from CN 108. A media stream may constitute a series of packets containing digitized media that are transmitted from a sending node to a receiving node. A media stream may be differentiated from another media stream as described herein by observing the source IP:port (i.e. IP address and port number) and destination IP:port within packet headers for packets contained in the media stream, as the packets traverse the Public Internet 106. For example, in system 100a illustrated in FIG. 1a, a packet contained in MS 1 109 on the public Internet 106 may (i) have the IP address 216.52.163.10 as the source IP address and 27788 as the source port number and (ii) have the IP address 68.25.2.4 as the destination IP address and 33334 as the destination port number. A packet with a different source IP address, source port, destination IP address, or destination port could be considered as belonging to a different media stream.

MS 1 109 and MS 2 110 may consist of voice that has been digitized or compressed with a codec such as AMR (adaptive multi-rate), GSM-EFR (Global System for Mobile Communications Enhanced Full Rate), iLBC (Internet Low Bandwidth Codec), VMR (Variable Multi Rate), G.711, or some other codec, and the media may be encapsulated within packets formatted according to the User Datagram Protocol (UDP), Transmission Control Protocol (TCP), or similar or subsequent standards. The media streams MS 1 109 and MS 2 110 could also consist of video that has been digitized with a video codec such as MPEG, H.264, VC-1, or some other video codec, or a combination of voice and video, and also be transmitted within UDP or TCP datagrams. If the media is transmitted according to UDP, the UDP header checksums may preferably be disabled, since mobile device codecs, such as GSM-EFR or AMR, may be designed to be bit-error robust. Bit errors can likely be introduced through the transmission of packets via radio-frequency spectrum, and an entire packet should preferably not be dropped resulting from a bit error in the transmitted media.

MS 1 and MS 2 may be transmitted according to the Real-time Transport Protocol (RTP), Secure Real-time Transport Protocol (SRTP) or other methods that properly sequence the media for playback at the receiving end. RTP, SRTP, or similar media encapsulation and sequencing techniques may in turn also be encapsulated within UDP datagrams. Although the transmission of media via UDP may be preferred, other protocols could be implemented as well, such as without RTP headers and within TCP datagrams. Note that TCP could be required for the media if a NAT router or firewall along the media path blocks UDP packets for example.

The media session consisting of MS 1 and MS 2 illustrated in System 100*a* may optionally include a feedback mechanism to each node to indicate the quality of the media stream at each receiving end, by using a media-control protocol. Real-time Transport Control Protocol (RTCP) stream 1 (111) consists of packets periodically sent from CN 108 to MD 101 in order to provide information such as round-trip delay, packet loss, bit errors, and/or jitter for media received in MS 1 109. An example message in the media-control channel could be an RTCP or an SRTCP receiver report. Feedback on the quality of the media transmitted can be useful for improved management of mobile-IP links, which naturally incur bit errors and packet loss as the mobile subscriber moves into areas with lower-quality coverage from base stations. Although the feedback mechanism illustrated in FIG. 1*a* and subsequent figures is labeled "RTCP stream", the feedback mechanism could be a generic media-control channel and other protocols besides RTCP could be implemented, including proprietary techniques. In addition, the feedback mechanism could optionally include information packets inserted within a media stream. For example, a quality report for MS 1 109 could be inserted within the stream of packets transmitted within MS 2 110 and in this case a separate IP:port would not be required in order to utilize a media-control channel.

Based on the feedback within RTCP stream 1 111, MD 101 may make adjustments such as (i) implementing or adjusting forward-error-correction (FEC) techniques, (ii) changing the codec for transmission of MS 1, (iii) changing the channel-coding parameters for an adaptive codec such as AMR, (iv) increasing transmission power levels, (v) search for a different base station 104 to communicate with, (vi) search for or connect with an alternate network 117 to handover the media session, or combinations of the above and similar adjustments in order to reduce errors and improve quality at the receiving node. Similar adjustments to media transmitted in MS 2 110 by CN 108 could be made based on feedback via RTCP stream 2 112. Some examples of feedback mechanisms other than RTCP include Secure Real-time Transport Control Protocol (SRTCP), RR JITTER or RR LOSS messages within the IAX2 protocol, and proprietary methods.

The media-control protocol to provide feedback can also be implemented logically within MS 1 and MS 2, such that feedback messages are inserted within the media stream, which is the case with IAX2 RR JITTER and RR LOSS messages. SRTCP is associated with SRTP, which allows encryption of the media for transmission through the public Internet 106, thereby maintaining confidentiality as the media passes through routers and hops on the public Internet 106 that are not under the control of either a mobile subscriber on MN 102, or under the control of the user at the corresponding node 108.

The feedback mechanism illustrated in system 100*a* may also be implemented through "out of band" signaling transmitted in a call-control channel. A call-control channel, such as the channel to establish the media session in FIG. 1*a*, is not illustrated and will be discussed in more detail in FIG. 2*b*. "Out of band" signaling via a call-control channel could be transmitted using SIP NOTIFY messages if a version of the SIP protocol is implemented, as one example. Other options exist for transmitting media-control messages between the nodes. The feedback mechanism illustrated as RTCP stream 1 111 and RTCP stream 2 112 is not required for useful communication between MD 101 and CN 108, but may be helpful for managing quality of the media and also managing handovers.

MD 101 preferably transmits and receives media through the use of specific ports. In the exemplary system illustrated in System 100*a*, IP:port 113 is used by MD 101 for transmitting media and IP:port 114 is used by MD 101 for receiving media. Using the same port number for IP:ports 113 and 114 may help simplify potential NAT-traversal and/or firewall-traversal issues. As illustrated in FIG. 1*a*, IP:ports 113 and 114 may be the same port number, although they could be different port numbers. In addition, although IP:ports 113 and 114 are shown as IPv4 addresses and ports, they could also be IPv6 addresses and ports, or comply with similar packet-switched addressing schemes. If the MN FW 105 functions as an application layer gateway (ALG), with a version of the SIP protocol managing media sessions for example, the MN FW 105 may make adjustments to the Session Description Protocol (SDP) messages within call-setup requests, to properly inform the CN 108 of the public IP:ports on the MN FW 105 external interface for sending or receiving the media streams.

For the example media session illustrated in System 100*a*, according to a version of the SIP protocol with RTP media, the ALG functionality of MN FW 105 can map packets (a) between IP:port 113 and IP:port 116 and (b) between IP:port 114 and IP:port 115. Insertion of IP:ports 115 and 116 into the body of the SDP messages transmitted by MN FW 105 may be useful if the MD 101 belongs to a private IP network (i.e. has an IP address that is not publicly routable), as shown by mobile device IP address 103 (10.0.1.123), which is among the IP addresses that are reserved for private networks according to IETF RFC 1918.

If a software program on the MD 101 is operating a protocol that is not understood by an application layer gateway operating on MN FW 105, such as with a proprietary protocol or with encrypted packets, as examples, the above-described port translation within the body of session-description messages at MN FW 105 may not be possible by application layer gateway functionality operating on MN FW 105. In this case, IP:ports 113 and 114 may preferably use the same port number and IP:ports 115 and 116 may also preferably use the same port number, as illustrated in FIG. 1*a*.

CN FW 130 may route packets between the Public Internet 106 and the corresponding node 108. If CN FW 130 includes NAT functionality as illustrated in FIG. 1*a*, CN FW 130 may have an external interface corresponding to a public IP address 131 and an internal interface corresponding to the internal network IP address 132. Although a single firewall with NAT router functionality is illustrated in FIG. 1*a* for CN FW 130, multiple firewalls each with or without NAT router functionality may operate between a node and the Public Internet 106. In this case, the multiple firewalls may be considered a single logical firewall for the purposes of implementing the efficient handover techniques described herein. Multiple levels of firewalls may also be referred to as "nested firewalls" or "nested NATs", if the firewalls implement NAT routing functionality. IP:port 125 on CN FW 130 can receive media transmitted by MD 101 in MS 1 109, and CN FW 130 can route the incoming packets to destination IP:port 122 on CN 108, including changing the destination IP:port number on a received packet to IP:port 122. If CN FW 130 operates as a firewall without network address translation, then it would be possible that IP addresses and port numbers would not be translated, and in that case IP:port number 122 could be the same as IP:port number 125, IP:port number 133*b* could be the same as IP:port number 134*b*, and IP:port number 123 could be the same as IP:port number 124.

For clarification in FIG. 1*a* and subsequent illustrations with IP:port numbers, an IP:port such as IP:port 125 is illustrated as being the destination IP:port in datagrams such as media packets in MS 1 109, and IP:port 124 is the source IP:port for datagrams in MS 2 110, as packets traverse the public Internet 106. Thus, although IP:ports 125 and 124 are illustrated in FIG. 1*a* as having the same IP:port number (68.25.2.4:33334), the two entities are different because one may represent 68.25.2.4:33334 as a source IP:port (i.e. IP:port 124), and the other may represent 68.25.2.4:33334 as a destination IP:port (i.e. IP:port 125). Similarly, language used herein specifying "IP:port X could can be the same as IP:port Y" allows for the number allocated to IP:port X to be the same number allocated to IP:port Y, without requiring IP:port X and IP:port Y to be the same physical or logical entity. For example, although IP:port number 123 may be the same as IP:port number 122, IP:port 122 can represent the receive port at a corresponding node, while IP:port 123 (with the same IP:port number) can represent a transmit port at a corresponding node. Further, descriptions such as "acquiring IP:port X" can refer to acquiring the IP:port number, "transmitting IP:port" can refer to transmitting the IP:port number, etc.

If CN FW 130 operates as a NAT, CN 108 may use IP:port 123 to transmit media to MD 101 in MS 2 110, and CN FW 130 can translate packets destined for MN FW 105 with (a) a source IP:port of 123 on the internal interface to (b) a source IP:port of 124 on the external interface. IP:port 122 and IP:port 123 are illustrated as having the same port number, and IP:port 125 and IP:port 124 are also illustrated as having the same port number, although different ports could be used as well. For example, if a version of the SIP protocol was used and CN FW 130 contained a SIP application layer gateway (ALG) function, then implementing separate ports for the transmission and receipt of media could be supported, since the ALG could manage the mapping of ports and substitution of port numbers within SDP messages. If a proprietary or encrypted protocol is implemented for communication between MD 101 and CN 108 across CN FW 130, or ALG functionality is not available, then utilizing the same IP:port 122 and IP:port 123 numbers on CN 108 may be preferred for the transmission and receipt of media packets in order to simplify the traversal of NATs and/or firewalls.

Note that, as used herein, one or more IP addresses or IP-address-and-port pairs (i.e. IP:ports) being "associated with" an entity (e.g. a mobile device or a corresponding node) does not necessarily mean that these IP addresses and/or IP:ports are located at (i.e. assigned to) the entity itself. Rather, the "associated with" language also contemplates an arrangement where the entity is behind a NAT router and/or an application layer gateway and/or firewall and/or session border controller, which alone or in combination would function to associate these IP addresses and/or IP:ports with the entity. For example, IP:port 125 can be considered associated with CN 108 (as the receive IP:port on the external interface of CN FW 130, which maps to IP:port 122 on CN 108) and IP:port 122 can be considered assigned to CN 108 (the IP:port CN 108 can control, by selecting the receive port number, for example). If CN FW 130 has a firewall type "null" or CN 108 has a publicly routable IP address, then IP:port number 125 can be the same number as IP:port 122.

A user operating, owning, or having access to MD 101 may also have access to an alternate network (AN) 117 which can provide connectivity to the Public Internet 106. AN 117 may include a separate wireless network, such as a WiFi access point 118 using IEEE 802.11 or similar standards. The WiFi access point 118 may obtain Internet connectivity through an alternate network firewall (AN FW) 119 having a broadband connection from an Internet Service Provider (ISP) via fixed lines such as digital subscriber line (DSL), cable, fixed wireless, fiber optic cables, etc. The ISP may be an entirely separate entity from the operator of MN 102. AN FW 119 may be a NAT router, a firewall that filters incoming and/or outgoing packets, or a combination of a NAT router and a firewall. Although illustrated as a wireless LAN in FIG. 1*a*, AN 117 could also be a wireless WAN such as a network provided by a different mobile operator than the mobile operator providing services through MN 102, or also AN 117 can generally be another network where a mobile device can obtain an IP address for transmitting and receiving packets through the public Internet 106. AN 117 may provide superior network connectivity to the MD 101 when the MD is within proximity of AN 117. The superior network connectivity would likely take the form of various combinations of higher signal-to-noise ratios (SNRs) via stronger signals, lower power requirements, lower costs for bandwidth, less packet loss, lower delay, fewer bit errors, greater overall bandwidth, less jitter, enhanced security, and/or other benefits.

Since AN 117 likely belongs to a different subnet of the public Internet 106 than does MN 102, a different publicly routable IP address may well be associated with MD 101 when MD 101 connects to AN 117. For example, the ISP serving AN 117 could provide connectivity to the public Internet 106 through a class B or class C IPv4 address range that is different from the IPv4 address range belonging to MN 102. In addition, the IP address range associated with AN 117 may likely be different than the IP address range associated with MN 102 if IPv6 addresses are utilized. Further, the routing of packets from CN 108 to MD 101 will change when MD 101 is receiving those packets via AN 117, since the destination of packets on the public Internet 106 would be through the alternate-network public IP address 120 associated with AN 117.

As stated above, AN 117 may have AN FW 119 that converts packets containing internal, private IP addresses within the AN 117 to using addresses routable on the public Internet 106, if AN FW 119 implements NAT routing functionality.

AN FW 119 can be the default gateway within AN 117, with an example default gateway IP address 121 shown as 192.168.0.1. The AN FW 119 may be integrated with the WiFi router 118, and/or with a DSL modem or cable modem, or may reside within the data centers operated by an ISP. Note that multiple levels of firewalls and NAT routers may exist between MD 101 and the public Internet 106, as opposed to the single AN FW 119 that is illustrated in system 100a. In this case, the multiple firewalls, some possibly with NAT routing functionality, may be considered a single logical firewall for the purposes of implementing the efficient handover techniques described herein. In some embodiments, AN FW 119 may either (i) not be present or (ii) perform as a firewall without NAT functionality, in which case IP addresses assigned within AN 117 may be considered publicly routable in order to utilize the efficient handover techniques described herein. In addition, IPv6 or other packet switched IP addressing schemes could be utilized instead of the IPv4 addressing illustrated for AN 117 in FIG. 1a.

Although the wireless network within AN 117 is illustrated as WiFi, the local IP connectivity could be provided using various wireless technologies such as Bluetooth, infrared, Ultra Wideband, a femtocell, and/or similar local-area-networking technologies. In addition, the AN 117 IP connectivity could be directly provided by a wired connection, such as when the mobile subscriber plugs an Ethernet cable or Universal Serial Bus (USB) directly into MD 101, if MD 101 is a laptop computer, for example.

And although the alternate network 117 is illustrated as being roughly coextensive with a residence, AN 117 may be instead be situated as roughly coextensive with an office building, a commercial establishment such as a coffee shop that provides WiFi access, a municipal WiFi hotspot, a location with wireless access to the Internet via "white space" spectrum, a university campus, and/or other physical locations where IP connectivity separate from MN 102 is available to MD 101. In addition, AN 117 could be a separate wireless network provided by a different mobile network operator, among many other possibilities. Further, although MD 101 is illustrated as communicating with a single corresponding node 108 in System 100a, MD 101 may communicate multiple media streams simultaneously with multiple corresponding nodes, which could be the case in a three-way call or a conference call, as examples. AN 117 and MN 102 would commonly be and herein are referred to as "heterogeneous" networks, and the transfer of a media session involving MD 101 between MN 102 and AN 117 would commonly be and herein is referred to as a "vertical handover".

FIG. 1b

Figure 1B:
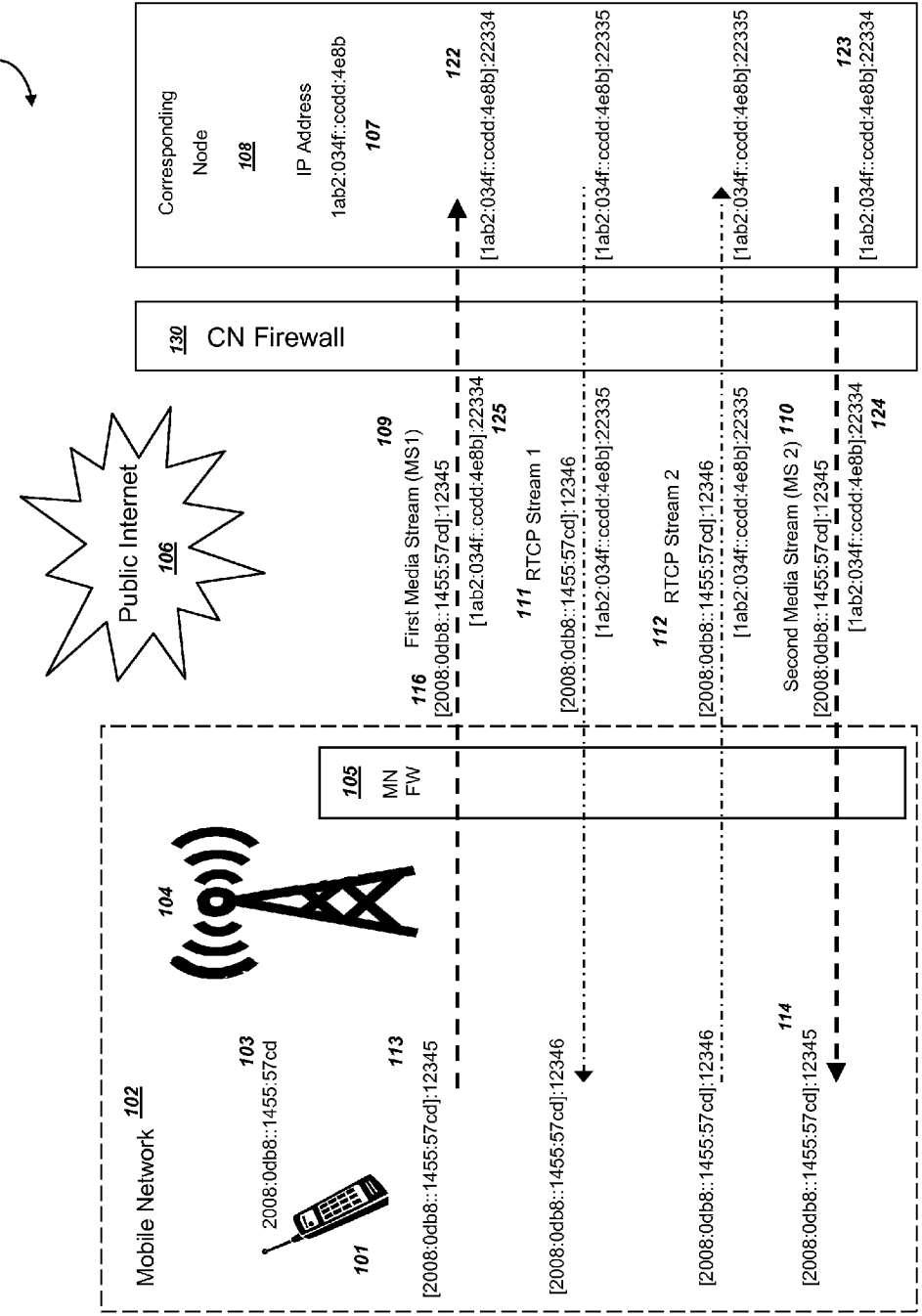
FIG. 1b is a graphical illustration of an exemplary system, where media is transmitted and received by a mobile device and a corresponding node before handover, and where the corresponding node communicates through a firewall, and where IPv6 is utilized in accordance with exemplary embodiments.

FIG. 1b is a graphical illustration of an exemplary system, where media is transmitted and received by a mobile device and a corresponding node before handover, and where the corresponding node communicates through a firewall, and where IPv6 is utilized in accordance with exemplary embodiments. Although IPv4 addresses are illustrated in FIG. 1a above, a mobile device and a corresponding node can utilize IPv6 addresses for a media session, as illustrated in FIG. 1b. If IPv6 is implemented on MD 101 and CN 108, and also supported by the networks providing Internet access to the nodes, MN FW 105 and CN FW 130 may filter packets without performing network address translation. Although not illustrated in FIG. 1b, MN FW 105 and CN FW 130 may also perform network address translation with IPv6 addresses, and network address translation with IPv6 addresses may generally not be preferred since the address space is designed to be sufficiently large to provide all endpoints a publicly routable address. Network address translation with IPv6 addresses may be preferred with some networks, such as networks that require increased security, where addresses that are assigned to individual nodes within an internal network are not publicly shared and the IPv6 addresses could be translated at a firewall such as a NAT router, which can be CN FW 130. Either MN FW 105 or CN FW 130 may also optionally be omitted, with the result that any validly constructed packet on the Public Internet 106 could be received by either MD 101 or CN 108, respectively. In this case, the firewall type could be considered "null". Alternatively, MD 101 or CN 108 may locally operate a firewall within each device, and as one example a software program operating on a mobile device could function as a firewall.

With IPv6 addresses and MN FW 105 operating without NAT functionality, MD 101 can transmit MS 1 109 using IP:port 113, and in this case IP:port number 116 on the external interface of MN FW 105 can be equal to IP:port number 113, as illustrated in FIG. 1b. Similarly, with IPv6 addresses and CN FW 130 operating without NAT functionality, CN 108 can transmit MS 2 110 using IP:port 123, and in this case IP:port number 124 on the external interface of CN FW 130 can be equal to IP:port number 123. If a media-control channel is implemented such as RTCP Stream 1 111 and RTCP Stream 2 112, MN FW 105 and CN FW 130 may also not translate the source and destination addresses and ports, for packets traversing each firewall as illustrated in FIG. 1b. A media-control channel could also be implemented directly within the stream of packets on the same port numbers as MS 1 109 and MS 2 110. MD 101 is shown in FIG. 1b as utilizing the same IP:port number for IP:port 113 and IP:port 114, although a different port number could be utilized for the transmission and receipt of media packets. Similarly, CN 108 is shown as utilizing the same IP:port number for IP:port 122 and IP:port 123, although a different port number could also be utilized for the transmission and receipt of media packets. Implementing the same IP:port number for the receipt and transmission of media can simplify potential firewall traversal issues, since the number of ports required to be opened and remain opened during a media session can be reduced. For example, if IP:port number 122 and 123 are different and CN FW 130 operates as a symmetric firewall (without NAT functionality), CN 108 may need to take steps to keep IP:port 125 open because a timeout parameter on CN FW 130 could close IP:port 125 inadvertently to inbound UDP packets. By CN 108 transmitting media packets from IP:port 122 (where IP:port numbers 122 and 123 are equal), IP:port 125 on CN FW 130 should remain open for inbound UDP packets.

Although CN FW 130 is illustrated as operating without network address translation functionality in FIG. 1b, the packet filtering rules on the firewall CN FW 130 can increase the complexity of handover of an active media session from MN 102 to AN 117 illustrated in FIG. 1a. As one example, CN FW 130 may operate as a symmetric firewall, such that any packet with a remote second source IP address and port that is different from IP:port 116 and received at IP:port 125 would be dropped by CN FW 130, unless CN 108 performs certain actions such as first transmitting a packet to the remote second IP address and port, using the local port on CN 108 that will also receive packets from the second IP address and port. Symmetric firewall functionality is also described in IETF RFC 3489. In addition, if MD 101 and CN 108 belong to the same subnet, such as both nodes belonging to the same mobile network, CN FW 130 may filter packets between CN 108 and the public Internet 106, and CN FW 130 may not filter packets from MD 101 on MN 102 (or implement less restrictive packet filtering rules). Thus, CN FW 130 could implement more restrictive packet filtering rules for MD 101 at AN 117 than for MD 101 at MN 102. An example would be if CN 108 is a gateway to the circuit-switched PSTN or other border element such as a session border controller, and the gateway is managed by MN 102. Efficient handover procedures may be required to address the complexities of firewalls that can operate between MD 101 and CN 108, and an efficient handover procedure may include the use of a media handover relay.

FIG. 1c

FIG. 1c is a graphical illustration of an exemplary system, where a mobile device accesses a network with an IPv6 address, and a NAT router converts between IPv6 addresses and IPv4 addresses for communication with other IPv4 servers, hosts, or NAT routers, in accordance with exemplary embodiments. The Public Internet 106 could support both IPv4 and IPv6 addresses. The migration from IPv4 to IPv6 has been progressing relatively slowly since the introduction of IPv6 more than 8 years ago, the two packet-switched network-addressing schemes are expected to co-exist on the Public Internet 106 for the foreseeable future.

FIG. 1c illustrates that the various NAT functions described in the present invention may apply when a router, firewall, or border element such as NAT 140 converts packets between an IPv6 network and an IPv4 network. NAT 140 can convert the packet headers between the two different addressing schemes, in addition to implementing packet filtering rules such as with partial-cone, port-restricted cone, or symmetric NAT routers. Although NAT 140 is illustrated with IPv6 on the internal interface and IPv4 on the external interface, NAT 140 could also support IPv4 on the internal interface and IPv6 on the external interface. NAT functionality may be used in order to translate the addresses, and port numbers may be translated as well. NAT functionality with port translation may be referred to as "NATP", although NAT functionality with port translation is also referred to as simply "NAT" in the present invention. The various firewalls illustrated throughout the present invention, such as MN FW 105, AN FW 119, and/or CN FW 130, may function as a NAT 140 as illustrated in FIG. 1c in order to convert IP addresses between two different routing protocol standards.

NAT 140 can have an external IPv4 address illustrated as IP address 141 in FIG. 1c and an internal IPv6 address such as IP address 142. NAT 140 could also filter packets for firewall purposes, such as preventing unauthorized hosts on the Public Internet 106 from accessing internal addresses or nodes, such as MD 101. Although illustrated as routing a first media stream 109 and a second media stream 110 within the Initial Network 143, NAT 140 may be located at within the mobile network 102, the alternate network 117, or other locations accessible via the public Internet 106, among other possibilities.

NAT 140 may also function as an application layer gateway, to translate ports and IP addresses within the body of packets, such as within SDP messages, in order to properly handle address and port conversion for the proper routing of call control and/or media. For example, NAT 140 may function as a SIP application layer gateway, in addition to optionally translating IP addresses. MD 101 may have an IPv6 IP address 144 within Internal Network 143, and may transmit packets to hosts with IPv4 addresses such as IP address 131 on a CN FW 130, for example. MD 101 could implement IPv6 addresses and ports such as IP:port 145 as the source IP:port for packets transmitted. NAT 140 may also function as an outbound proxy with an IP address 142, such that MD 101 routes call-control messages such as a SIP INVITE to NAT 140 at IP address 142. If NAT 140 functions as an outbound proxy, media streams such as MS 1 109 and MS 2 110 can be routed through the outbound proxy in order to establish communication between MD 101 and CN 108 at IP address 107, since MD 101 and CN 108 may not otherwise be able to initially transmit packets directly between each other. NAT 140 can also route call-control messages in protocols such as SIP from proxy servers or corresponding nodes on the public Internet 106 back to MD 101. Other VoIP protocols may be used as well.

FIG. 2a

FIG. 2a is a graphical illustration of software and hardware components for a mobile device and a corresponding node, in accordance with exemplary embodiments. FIG. 2a is illustrated to include common components within a MD 101 or CN 108. MD 101 and CN 108 may consist of multiple components in order to provide services such as voice or video calls to a user. The physical interface 201a of MD 101 may provide radio-frequency communications with networks including a MN 102 via standards such as GSM, UMTS, mobile WiMax, CDMA, LTE, and/or other mobile-network technologies. The physical interface 201a may also provide connectivity to local networks such as 802.11 WLAN, Bluetooth, or possibly wired connections such as Ethernet, when those networks are available to MD 101, among other possibilities.

The physical interface 201a can include associated hardware to provide the connections such as radio-frequency (RF) chipsets, a power amplifier, an antenna, cable connectors, etc. If CN 108 is also a mobile device, such as another mobile handset on MN 102 or another wireless network providing Internet connectivity, the physical interface 206a can be similar to the physical interface 201a and support radio-frequency communication with a transceiver station associated with a base station similar to base station 104 connecting to a mobile network. If CN 108 is a personal computer, server, or gateway, or other generally stationary device, the physical interface 206a may be a wired interface connecting to Ethernet and similar LAN technologies. And other possibilities exist as well, without departing from the invention. The physical interfaces 201a and 206a could also include microphones and speakers for audio, or a camera for video.

Device drivers 202 and 207 can communicate with the physical interfaces 201a and 206a, respectively, providing hardware access to higher-level functions on MD 101 and CN 108. Device drivers may also be embedded into hardware or combined with the physical interfaces. MD 101 and CN 108 may preferably include an operating system 203 and 208 to manage device drivers 202 and 207, respectively. The operating systems can also manage other resources such as memory and may support multiple software programs operating on MD 101 or CN 108 at the same time. The operating systems 203 and 208 can include Internet protocol stacks such as a UDP stack, TCP stack, RTP stack, etc., and the operating systems 203 and 208 may include voice and/or video codecs. Voice or video codecs could instead be integrated with the device driver 202 or 207, embedded into hardware, or included in software programs. An example operating system 203 for MD 101 includes Linux, Windows® Mobile, Symbian®, or Palm® OS.

A software program 204 or 209 may be an application programmed in a language such as C or C++ and could provide functionality to the subscriber such as a VoIP client, a video client, instant messaging, e-mail, or web-browsing capabilities. Many of the logical steps for operation of MD 101 can be performed in software by various combinations of device driver 202, operating system 203, and software program 204. When MD 101 is described as performing various actions such as acquiring a new IP address, monitoring a port, transmitting a packet or media stream, or similar tasks, specifying that MD 101 performs an action can refer to (i) software, hardware, and/or firmware operating within MD 101 performing the action, or also (ii) software, hardware, and/or firmware operating with MD 101 in conjunction with software, hardware, and/or firmware operating on external servers for performing the action.

The software program 204 or 209 may also contain a handover-predicting jitter buffer 222, which may increase the jitter-buffer size before handover and decrease the jitter-buffer size after handover. The handover-predicting jitter buffer could alternatively be included in operating systems 203 or 208, or device drivers 202 or 207, among other possibilities. Example functionality of a handover-predicting jitter buffer is further described in FIG. 8a of U.S. patent application Ser. No. 12/120,940, filed May 15, 2008 in the name of John Nix, the contents of which are hereby incorporated by reference in their entirety. There could be situations where a standard jitter buffer size (i.e. not a handover predicting jitter buffer 222) increases before handover and then decreases after handover, such as if the jitter for received media increases before handover and then decreases after handover. The presence of a handover-predicting jitter buffer may be indicated by (i) an increase of the jitter buffer size independently of the jitter of received media before handover, and also (ii) a decrease in the jitter buffer size independently of the jitter of received media after handover. For example, if the jitter in MS 2 110 remains constant (or potentially even decreases or remains relatively constant), but a jitter buffer processing MS 2 110 increases in size before handover, such as when MD 101 (i) evaluates handover may be preferred or (ii) transmits a call-control signal to initiate handover, the increasing size of the jitter buffer window can indicate the presence of a handover-predicting jitter buffer 222. The presence of a handover-predicting jitter buffer 222 (as opposed to a standard jitter buffer) could be further confirmed by a decrease in the jitter buffer size after handover, even though the jitter in received media remains relatively constant or increases after handover.

When CN 108 is described as performing various actions such as monitoring a port, transmitting a packet or media stream, or similar tasks, specifying that CN 108 performs an action can refer to (i) software, hardware, and/or firmware operating within CN 108 performing the action, or also (ii) software, hardware, and/or firmware operating with CN 108 in conjunction with software, hardware, and/or firmware operating on external servers for performing the action. Note that MD 101 and CN 108 may also include user interfaces 205 and 210, respectively, each of which may include one or more devices for receiving inputs and/or one or more devices for conveying outputs. For many example media sessions between MD 101 and CN 108, the physical interfaces, device drivers, operating systems, and user interfaces may be different, such as if MD 101 is a mobile handset and CN 108 is a gateway to the PSTN. However, the software programs 204 and 209, operating on MD 101 and CN 108, respectively, could be of the same type, such as a Skype® client on MD 101 and another Skype® client on CN 108. Other example compatible software programs operating on both MD 101 and CN 108 could include SIP clients, IAX2 clients (or IAX2 host or equivalent Asterisk® server for CN 108), or "peer-to-peer" clients such as GoogleTalk®. Software program 204 may also include or access a handover procedure rules 227 described in FIG. 2g through 2i below, where a handover procedure rules 227 can select a handover procedure according to handover parameters. In addition, a software program 204 may include or access a LAN profile 226, as depicted and described in connection with FIG. 2e below.

The handover procedure rules 227 could be periodically updated by a communications service 214 when (i) handover procedures are adjusted or changed, and/or (ii) the parameters used to select a handover procedure are changed. For example, a software program 204 could be downloaded, installed, and/or configured on a mobile device upon activation of a service for a user (or possibly upon manufacturing or distribution of the mobile device), and a communications service 214 providing media services to a user through a software program 204 may prefer to update a handover procedure rules 227 after the software program 204 has been initially downloaded, installed, and/or configured. Data to update a handover procedure rules 227 could be obtained by (i) a software program 204 querying a server for new or additional data to update a handover procedure rules 227, and/or (ii) a communications service "pushing" down data to update a handover procedure rules 227. The data to update a handover rules 227 could be stored and/or transmitted as a file. Although handover rules 227 is illustrated as being implemented in a software program 204, handover rules 227 could also be implemented in operating system 203.

The device drivers 202 or 207, operating systems 203 or 208, and software programs 204 or 209 could optionally be combined into an integrated system for managing MD 101's or CN 108's functionality, respectively. In addition, the operating systems 203 or 208, and software programs 204 or 209, may be combined respectively within the same device. Although a single physical interface, device-driver set, operating system, software program, and user interface are illustrated in FIG. 2a for each device, MD 101 and CN 108 each may contain multiple physical interfaces, device drivers, operating systems, software programs, and/or user interfaces. And other arrangements could be used as well, without departing from the invention.

Mobile device 101 may be a computing device that includes computer components for the purposes of conducting media sessions such as telephone calls, or sending and receiving email, performing web-browsing, text messaging, etc. Mobile device 101 may include a central processing unit (CPU) 201b, a random access memory (RAM) 201e, and a system bus 201d that couples various system components including the random access memory 201e to the processing unit 201b. The system bus 123 may be any of several types of bus structures including a memory bus or memory controller, a peripheral bus, and a local bus using any of a variety of bus architectures including a data bus. Note that the computer components illustrated for the mobile device in FIG. 2a may be selected in order to minimize power consumption and thereby maximize battery life.

Mobile device 101 may include a read-only memory (ROM) 201c which can contain a boot loader program. Although ROM 201c is illustrated as "read-only memory", ROM 201c could comprise flash memory, erasable-programmable memory (EPROM) or other long-term memory storage chipsets or physical units. If data can be written to ROM 201c, a primary difference between ROM 201c and RAM 201e may be that reading and writing operations to ROM 201c (such as if ROM 201c is flash memory) can be slower whereas reading and writing operations to RAM 201e may be faster, which may be required for conducting a media session. For example, software program 204, operating system 203, or device driver 202 could be stored in ROM 201c when the mobile device is powered off, and moved into RAM 201e when the mobile device is powered on. In addition, RAM 201e can function as flash memory, such that software program 204, operating system 203, or device driver 202 remain resident in random access memory even when the mobile device 101 is powered off. Note that ROM 201c could be optionally omitted or included in a memory unit within CPU 201b (not shown).

Although the exemplary environment described herein employs ROM 201c and RAM 201e, it should be appreciated by those skilled in the art that other types of computer readable media which can store data that is accessible by a mobile device 101, such as memory cards, local miniaturized hard disks, and the like, may also be used in the exemplary operating environment without departing from the scope of the invention. The memory and associated hardware illustrated in FIG. 2a provide nonvolatile storage of computer-executable instructions, data structures, program modules, software program 204, and other data for computer or mobile device 101. Note the mobile device 101 may include a physical data connection at the physical interface 201a such as a miniaturized universal serial bus adapter, firewire, optical, or other another port and the computer executable instructions such as software program 204, operating system 203, or device driver 202 can be initially loaded into memory such as ROM 201c or RAM 201e through the physical interface 201a before mobile device 101 is given to an end user. In addition, the computer executable instructions such as software program 204, operating system 203 or device driver 202 could be transferred wirelessly to mobile device 101. In either case (wired or wireless transfer of computer executable instructions), the computer executable instructions such as software program 204, operating system 203, or device driver 202 could be stored remotely on a disk drive or optical disk (both not shown).

A number of program modules may be stored RAM 201e, ROM 201c, or possibly within CPU 201b, including an operating system 203, device driver 202, a web browser (not shown), and related software. Program modules include routines, sub-routines, programs, objects, components, data structures, etc., which perform particular tasks or implement particular abstract data types. Aspects of the present invention may be implemented in the form of a software program 204 which is executed by the mobile device 101 in order to provide media sessions such as telephone calls or essentially real-time video during a video conference. In addition, the software program 204 can include routines, sub-routines, and similar components to support a vertical handover of the media session utilizing the techniques described in the present invention. Further, the software program 204 can perform the various actions described in the present invention for the mobile device through instructions the software program 204 provides to the CPU 201b.

A user may enter commands and information into mobile device 101 through a user interface 205, such as a keypad, keyboard (possibly miniaturized for a mobile phone form-factor), and a pointing device. Pointing devices may include a trackball, an electronic pen, or a touch screen. A user interface 205 may also include a display (not shown) such as a mobile device screen. A display may also be connected to system bus 201d via an interface. The display can comprise any type of display devices such as a liquid crystal display (LCD), a plasma display, and an organic light-emitting diode (OLED) display. User interface 205 may also include a camera (not shown) connected to or integrated with mobile device 101 through a physical interface 201a, and the camera can comprise a video camera for the mobile device 101 to conduct a media session that includes video. The camera (not shown) can be a CCD (charge-coupled device) camera, a CMOS (complementary metal-oxide-semiconductor) camera, or a similar device to collect video input.

The mobile device 101, comprising a computer, may operate in a networked environment using logical connections to one or more remote computers, such as the mobile device proxy server (server) 213a illustrated in FIG. 2b. Server 213a can also function as a general purpose server to provide files, programs, disk storage, remote memory, and other resources to mobile device 101 usually through a wireless connection. Additional remote computers with which mobile device 101 communicates may include another mobile device, a personal computer, a server, a client, a router, a network PC, a peer device, or other common network node. The server 213a or a remote computer typically includes many of the elements described above relative to the mobile device 101, including a CPU, memory, and physical interfaces. It will be appreciated that the network connections shown throughout the present invention are exemplary and other means of establishing a wireless or wired communications link may be used between mobile devices, computers, servers, corresponding nodes, media handover relays, and similar computers.

The software program 204 operating within mobile device 101 illustrated in FIG. 2a can provide computer executable instructions to hardware such as CPU 201b through a system bus 201d in order to conduct a media session and also perform handover. The software program 204 can enable the mobile device 101 to transmit the first media stream 109 by recording data such as a media frame, a destination IP:port number, a packet or media header value, etc. in memory such as RAM 201e, and the data can be subsequently read by the operating system 203 or the device driver 202. The software program 204 or operating system 203 can include steps to process the data recorded in memory such as encoding audio received through a physical interface 201a such as a microphone, encrypting media, selecting a destination address, etc. The mobile device can use the physical interface 201a such as a radio to transmit the data in a media stream such as MS 1 109 to a base station 104. The steps within this paragraph may also describe the steps a software program 204 or an operating system 203 can perform in order to send a media stream. For those skilled in the art, other steps are possible as well for a software program 204 or operating system 203 to send a media stream without departing from the scope of the present invention.

Conversely, the physical interface 201a can use a radio to receive data from a base station 104. The received data can include information for a received media stream such as MS 2 110 and may comprise a media frame, a source IP:port number, a packet or media header value, etc. The operating system 203 or device driver 202 can record the received data in memory such as RAM 201e, and the software program 204 or operating system 203 may access the memory in order to process the media stream and render media to a user. Processing the received media stream could include decoding the media with a codec, decrypting ciphered media, using a jitter buffer, or similar transformations of the received data. The steps within this paragraph may also describe the steps a software program 204 or an operating system 203 can perform in order to receive a media stream. For those skilled in the art, other steps are possible as well for a software program 204 or operating system 203 to receive a media stream without departing from the scope of the present invention.

Moreover, those skilled in the art will appreciate that the present invention may be implemented in other computer system configurations, including hand-held devices, net-books, portable computers, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices. In addition, the terms "mobile node" or "mobile station" can be used to refer to mobile device 101 or its functional capabilities such as conducting a media session and performing handover. Further, the terms "mobile node" or "mobile station" can be used to refer to the software program 204 when software program 204 provides functional capabilities such as conducting a media session and providing computer executable instructions to hardware for performing handover.

As noted in FIG. 2a and elsewhere herein, the corresponding node 108 may be another mobile device (or equivalently another mobile station or mobile node), a personal computer, a server, or a gateway to another network, such as a gateway to the PSTN. The illustrated components for the corresponding node 108 in FIG. 2a such as a central processing unit (CPU) 206b, a random access memory (RAM) 206e, a system bus 206d, a ROM 206c, an operating system 208, and a software program 209 can provide functions equivalent to the central processing unit (CPU) 201b, RAM 201e, system bus 201d, ROM 201c, an operating system 204, and a software program 204 described above.

The corresponding node may also include a user interface 210 similar to user interface 205 such as a display (not shown) which could also comprise any type of display devices such as a liquid crystal display (LCD), a plasma display, and an organic light-emitting diode (OLED) display, or a cathode ray tube (CRT) display if the corresponding node 108 is a personal computer or a server. A display for the corresponding node 108 may optionally be omitted if the corresponding node 108 is a server, a gateway, or similar device. A user may enter commands and information into corresponding node 108 through a user interface 210, such as a keypad, keyboard (possibly miniaturized for a mobile phone form-factor), and a pointing device. Pointing devices may include a trackball, an electronic pen, or a touch screen.

User interface 210 may also include a camera (not shown) connected to or integrated with corresponding node 108 through a physical interface 206a, and the camera can comprise a video camera for the corresponding node 108 to conduct a media session that includes video. The camera (not shown) can be a CCD (charge-coupled device) camera, a CMOS (complementary metal-oxide-semiconductor) camera, or a similar device to collect video input. In addition, the corresponding node 108 may store computer executable instructions such as software program 209 on a disk drive (not shown), such as if the corresponding node 108 is a device which generally is not mobile while in operation such as a personal computer, a server, or a gateway. The software program 209 can conduct a media session with another node and may be downloaded and installed on the corresponding node 108. Alternatively, if the corresponding node 108 is another mobile device similar to mobile device 101, the software program 209 may be pre-installed on the corresponding node 108 before a user begins operating the device. As noted previously and elsewhere herein, software program 204 and software program 209 can preferably interoperate with each other in order to conduct a media session.

The software program 209 operating within corresponding node 108 illustrated in FIG. 2a can provide computer executable instructions to hardware such as CPU 206b through a system bus 206d in order to conduct a media session and also support a handover. The software program 209 can enable the corresponding node 108 to transmit the second media stream 110 by recording data such as a media frame, a destination IP:port number, a packet or media header value, etc. in memory such as RAM 206e, and the data can be subsequently read by the operating system 208 or the device driver 207. The software program 209 or operating system 208 can include steps to process the data recorded in memory such as encoding audio received through a physical interface 206a such as a microphone, encrypting media, selecting a destination address, etc. The corresponding node 108 can use the physical interface 206a such as a radio or a wired connection to transmit the data in a media stream such as MS 2 110. The steps within this paragraph may also describe the steps a software program 209 or an operating system 208 can perform in order to send a media stream. For those skilled in the art, other steps are possible as well for a software program 209 or operating system 208 to send a media stream without departing from the scope of the present invention.

Conversely, the physical interface 206a can receive data from a local area network or a base station 104. The received data can include information for a received media stream such as MS 1 109 and may comprise a media frame, a source IP:port number, a packet or media header value, etc. The operating system 208 or device driver 207 can record the received data in memory such as RAM 206e, and the software program 209 or operating system 208 may access the memory in order to process the media stream and render media to a user such as through a physical interface 206a which could include a speaker. Processing the received media stream could include decoding the media with a codec, decrypting ciphered media, using a jitter buffer, or similar transformations of the received data. The steps within this paragraph may also describe the steps a software program 209 or an operating system 208 can perform in order to receive a media stream. For those skilled in the art, other steps are possible as well for a software program 209 or operating system 208 to receive a media stream without departing from the scope of the present invention.

FIG. 2b

FIG. 2b is a graphical illustration of an exemplary call-control channel between a mobile device and a corresponding node, in accordance with exemplary embodiments. FIG. 2b is illustrated according to common techniques implemented for call-control channels according to conventional technology. The call-control channel of FIG. 2b can be used to establish a media session between two endpoints or nodes with Internet connectivity, even though the two endpoints may not have the ability to initially directly communicate due to the presence of firewalls or NATs, illustrated by FW 211 and FW 212. Either FW 211 or FW 212 may optionally be omitted by an ISP or an end user, or both FW 211 and 212 may be omitted, although firewalls or firewalls with NAT router functionality may be commonly deployed.

The endpoints MD 101 and CN 108 may each register with a proxy server 213a or 213b, respectively. The registration process generally opens external port bindings on FWs 211 and 212 for communication from the Public Internet 106 to MD 101 and CN 108, respectively. The open external port bindings on FWs 211 and 212 may be kept open by periodic messages sent by MD 101 and CN 108 to their respective proxy servers, and the proxy servers may send messages such as call requests through an opened port on a FW or series of FWs between the proxy server and a node. The proxy servers could also be referred to as "supernodes" according to the Skype protocol, Asterisk servers according to the IAX2 protocol, SIP proxies according to variations within the SIP protocol, or Gatekeepers according to the H.323 protocol, as examples. Note that either FW 211 or FW 212 may be a firewall without network-address-translation functionality, and the periodic registration process with a proxy server may be required in order to keep the external port on the firewall open and bound, in order to receive in-bound call requests.

A proxy server 213a may be managed by a communications service 214. Communications service 214 could be an operating entity or business that provides media services such as voice telephone or mobile phone calls to end users. For example, a communications service 214 may be responsible for routing inbound calls from either the Public Internet 106 or possibly the PSTN to MD 101. In addition, communications service 214 may provide configuration instructions to a software program 204 in order for the software program to properly connect to a network of servers that may also be managed by a communications service 214. The configuration instructions could include a security key utilized when MD 101 resisters with proxy 213a, possibly through the generation of a hash message digest from using the security key plus other information such as a nonce or password, as one example. Further, end users or subscribers of services may sign or accept an agreement in order to obtain services from a communications service 214 or an affiliate of a communications service 214. Current examples of a communications service 214 include Skype®, Google Talk®, Yahoo Messenger®, and many others are possible as well. A communications service 214 may also distribute a software program 204 to mobile devices or end users. A communications service 214 or an affiliate of communications service 214 may also display branding information to end-users through a user interface 205. In addition, a mobile network operator such as MN 102 can also be a communications service 214.

A call request 215a can be generated by MD 101 when an end user keys in a telephone number and presses "dial", or when an end user clicks on an icon or name within a buddy list, as examples. The call request may be formatted according to a protocol that is capable of establishing media sessions through the Internet, such as SIP, XMPP, IAX2, H.323, MGCP, Skype®, or similar methods. Call request 215a is illustrated as formatted according to a version of the SIP protocol. The call request may be encapsulated in packets according to a transport protocol such as TCP, UDP, TLS (Transport Layer Security), SSL (Secure Socket Layer), or similar methods that are commonly supported on the Internet and also by firewalls and NAT routers.

MD proxy server 213a can process the call request by locating the appropriate proxy server for CN 108 via methods such as the Domain Name System (DNS) or a distributed hash table (DHT), as examples. Although not shown in FIG. 2b, there may be additional layers of proxy servers, such as a gateway proxy, wherein the MD proxy server 213a passes call requests up to a gateway proxy, and the gateway proxy then locates and passes the call request to a gateway proxy for the corresponding node's network. In addition, with a large network of hundreds of thousands of nodes or more, a network can consist of a plurality of distributed proxy servers. Further, each proxy server can support a plurality of nodes. And other variations are possible as well, such as a node registering with more than one proxy server.

When the call request 215a illustrated as a SIP INVITE message reaches the corresponding node proxy 213b, the corresponding node proxy 213b may locate, and then forward the call request to the corresponding node 108. The call request 215a may typically include information useful for setting up the media session 216, such as a desired codec and the appropriate public IP address and port for CN 108 to transmit media to, perhaps representing an IP:port on an external interface of FW 211, if it is present. CN 108 may respond to the call request with a message that includes the appropriate public IP:port for MD 101 to transmit media to, illustrated in FIG. 2b according to a version of the SIP protocol with "200 OK" 215b. Other call-control messages may also be passed between the nodes and proxy servers, such as TRYING and 180 PROCEEDING, as examples. Through these and similar methods, MD 101 and CN 108 can establish media sessions and communicate call-control information. For example, after the first media session 216 is established, MD 101 could transmit a SIP re-INVITE or another call-control signal (not shown), which could be transmitted and processed similarly to call request 215a.

Once the initial call request and response between MD 101 and CN 108 has been processed, the endpoints may also then communicate further call control directly between them, since a communication channel has been established. For example, call-control messages could be inserted directly within the media streams consisting of media session 216. Alternatively, a call-control channel may be transferred from the exemplary proxy servers in FIG. 2b to between MD 101 and CN 108 (similar to the preferred communication of media, but on a separate port). Note however, that many exemplary communications services 214, including mobile network operators, may prefer to remain within the flow of call-control messages via an MD proxy 213a in order to manage services such as deliver features, track calls, provide billing, or also for law-enforcement support purposes. Thus, even after the setup of a media session 216, call-control messages may continue to flow through a MD proxy 213a, but this continued flow of call-control messages through a MD proxy 213a is not required to utilize the efficient handover procedures described herein. After an initial call request is processed by the endpoints, further call-control messages may be processed, such as SIP Re-Invite, SIP UPDATE, SIP REFER, or similar transfer messages or methods in other protocols, a SIP BYE or similar "hang up" messages in other protocols to terminate the media session. Other call-control messages may add features such as establishing a conference with a third endpoint (not shown).

A media session 216 may consist of a first and second media stream, as illustrated in FIG. 1a, and the media may preferably not flow through proxy servers 213a and 213b, or other servers processing call control such as gateway proxy servers (not shown). The transfer of a media stream to a new IP address can be processed and changed separately from a call-control channel such as the one illustrated in FIG. 2b. By separately processing the transfer of media and call-control the destination or receive IP:ports for media transmitted between nodes can be changed while the IP addresses receiving call-control messages transmitted by the nodes, such as exemplary proxy servers 213a and 213b can remain unchanged.

Although a single protocol (i.e. SIP) is illustrated in FIG. 2b, the two endpoints may not necessarily use the same call-control protocol. For example, MD 101 may implement a version of the XMPP protocol, whereas CN 108 may implement a version of the SIP protocol. Proxy server 213a or 213b may translate the protocol in order to establish communication between the endpoints, or the translation may occur on a third server within the call-control flow. If the two endpoints implement different call-control protocols, preferably they can communicate according to the same codec.

FIG. 2c

FIG. 2c is a graphical illustration of an exemplary system, where a node can evaluate the presence and type of firewall or NAT-router functionality, in accordance with exemplary embodiments. FIG. 2c is illustrated according to common techniques implemented according to conventional technology. In system 200, a node 223 with an IP address can probe servers on the public Internet 106 to determine the type of NAT or firewall that may connect the node to the public Internet (i.e. the type of NAT or firewall "in front" of the node). The node 223 may send a packet such as a query 217 to a first server 218, illustrated as STUN A (where STUN stands for "Simple Traversal of UDP through NAT," IETF RFC 3489), which may then respond to the source IP address and port that the first server 218 observed as transmitting the query.

The response 219 can contain the source port and IP address that STUN A server 218 observed in the query transmitted by the node 223. The server 218 can also then forward the query 217 to a second server, illustrated as STUN B 220 and also transmit the observed source IP:port for query 217 to STUN B 220. The second server can then also forward a response 221 back to the source port and IP address for the original query 217 transmitted by the node 223 to STUN A 218. The node 223 can monitor the port on which it transmitted the query 217, in order to obtain responses from the servers. If two responses 219 and 221 are received, one each from the first and second servers 218 and 220, and the source IP address of the query 217 packet received by the servers is different than the IP address of the node, the node may determine the NAT type is a full cone, for example. If only one response 219 is received, and the source IP address observed by the server is the same as the IP address of the node, the node may determine the NAT type is "null", but a firewall is present. If only one response is received by the node from the first server, and the source IP address of the query packet received by the servers is different than the IP address of the node, the node may determine the NAT type is either (i) symmetric, (ii) port-restricted cone, or (iii) partial cone.

Further queries from the node 223 also could further resolve the NAT or firewall type. Other, similar, techniques besides STUN can be used by a node to determine the NAT-router type. Although a single NAT is shown between the node 223 and the servers 218 and 220, multiple NATs or firewalls may exist between the node 223 and the servers. In this case, the multiple NATs or firewalls can be evaluated as a single logical firewall, and the aggregate function can have a firewall type. The aggregate firewall type could be used to identify a type for the firewall. Example descriptions of the common types of NAT routers can also be found in IETF RFC 3489, section 5. In the present invention, a NAT router type of "null" corresponds to having a publicly routable IP address, which is one possible network environment described in IETF RFC 3489.

The firewall probing techniques illustrated in FIG. 2c and utilized herein to identify a firewall type may preferably test (i) multiple local ports to a single remote (i.e destination) port, (ii) a single local port to multiple remote ports, and (iii) multiple local ports to multiple remote ports. As described in FIG. 2d below, if the function of a NAT router is not consistent, then the NAT router may be assigned either (i) a type associated with the most restrictive function observed or (ii) a type "other". In addition, if a firewall performs NAT routing and functions as more than one type of NAT, then the most restrictive observed behavior of the NAT router should be used to categorize the firewall/NAT for the handover purposes herein. Additional descriptions on the types of NAT routers and categorizing them are described in FIG. 2d below and elsewhere herein. One way a firewall could exhibit more than one type of NAT-routing functionality is if the same internal port is used to communicate with two external hosts, and in this case it could be possible that a first port binding could function as one type of NAT and the second port binding could function as a second type of NAT. According to a preferred exemplary embodiment for utilizing the efficient handover techniques described herein, a STUN evaluation of a NAT may preferably evaluate a type of NAT by testing the same internal port to two external hosts concurrently (such as sending a query 217 from the same internal port to both STUN A and STUN B servers concurrently). The most restrictive NAT behavior observed on either port mapping can preferably be used to categorize the type of firewall or NAT.

FIG. 2d

FIG. 2d is a simplified tabular summary of network handover rules for a mobile device, based upon the type of firewall at an alternate network and a corresponding node, in accordance with exemplary embodiments. What constitutes an optimal or at least highly efficient handover method between a mobile device and a corresponding node may depend upon the network environment and the one or more types of firewall operating between the two nodes.

For example, if the corresponding node routes packets through a firewall that functions as a partial cone NAT and the mobile device routes packets through a firewall that functions as a port-restricted cone NAT on the alternate network, then the mobile device may select one network handover procedure, denoted procedure "B" in FIG. 2d. In contrast, if both the alternate FW 119 and the corresponding node FW 130 illustrated in FIG. 1a are symmetric NAT routers, then a different network handover procedure may be selected, illustrated as "relay" in FIG. 2d. If both firewalls routers are symmetric NAT routers, then procedure "B" may not be possible.

Some common types of firewalls are listed in FIG. 2d, such as full cone NAT, partial cone NAT, port-restricted cone NAT or symmetric firewall, symmetric NAT, and "unknown or other". The heading "public" or "null" can indicate the node has a publicly routable IP address, and a firewall may not be present (or at least does not filter packets for the purposes of conducting a handover). The primary categories of firewalls illustrated in FIG. 2d represent the categories in IETF RFC 3489, and network handover rules 225 is not illustrated to be a complete list of all types of firewalls, although it may include the general types of firewalls and NATs that are currently most commonly deployed. Also, (i) the presence or type of firewall associated with a node may not be known, or (ii) the packet filtering rules and/or port translation rules may not be known to either MD 101, CN 108, or a communications service managing a media session for MD 101, and subsequently the firewall type could be identified in a network handover rules 225 as "unknown". If a firewall is observed, and the packet filtering or network translation rules do not apply to identified categories of firewalls in a network handover rules 225, the firewall type can be identified as "other".

Note further that a full cone NAT router or firewall generally refers to a NAT router or firewall where any host using any source port can send a packet to an IP:port of a node behind the full cone NAT router or firewall, once the node has transmitted an outbound packet from the IP:port. A partial cone NAT router or firewall generally refers to a NAT router or firewall where a host that has previously received a packet from a node behind the partial cone NAT or firewall can use any source port to send a packet to the node, but packets from other hosts on the Internet may be blocked. The term "partial cone NAT" used herein can also correspond to the variation "restricted cone" described in IETF RFC 3489. Another term for a "partial cone NAT" used in the art include "address restricted cone NAT". A port-restricted cone NAT router or firewall generally refers to a NAT router or firewall where a host must communicate with the node behind the port-restricted cone NAT or firewall using the same port where a packet from the node had previously been received. A symmetric firewall can use the same packet filtering rules as a symmetric NAT router, except that network address and/or port translation may not be utilized by the symmetric firewall (i.e. the corresponding node behind the symmetric firewall may have a publicly routable IP address, and an IP:port number on the internal interface of a symmetric firewall can match the IP:port number on the external interface of a symmetric firewall).

For purposes of implementing an efficient handover procedure as described herein, a symmetric firewall can function similarly to a port-restricted cone NAT router (by keeping the IP:port numbers on the external and internal interfaces the same), and consequently handover procedures for a port-restricted cone NAT router and a symmetric firewall can be grouped together, as illustrated in FIG. 2d. Other possibilities exist as well within the scope of the present invention. A symmetric NAT router can generally refers to a NAT router where a unique IP:port on the external interface of the symmetric NAT will be opened and uniquely associated with an IP:port on an external host, even if the same source port is implemented by a node for communication with other external hosts. Further descriptions of these types of common NAT routers and firewalls may also be found in in the "Network address translation" entry within Wikipedia as of Aug. 24, 2008, which is also herein incorporated by reference.

In addition, for the purposes of utilizing efficient handover procedures described herein, the type "symmetric NAT" can also include a NAT router that does not consistently bind internal and external port numbers for actively used ports. As one example, if (i) a node uses a local port to transmit a first packet to a first remote host, (ii) uses the same local port to transmit a second packet to a second remote host (while the port binding is still active to the first remote host), and (iii) the NAT utilizes different external source port numbers for the first and second packet, then the firewall may be categorized as a "symmetric NAT" for the purposes herein. The above example also describes a case where port bindings are not consistently maintained.

Note that it could be possible for a firewall that is a NAT router to perform network address translation functions according to more than one type, although this may represent a minority fraction of NAT routers for the purposes of selecting an efficient handover procedure. With an exemplary "multi-type" NAT router, a first binding between a first internal port and an external port to a first remote host port may function as a port-restricted cone NAT router, and a second binding between the first internal port and an external port to a second remote host port may function as a symmetric NAT router. Other possibilities for variation in NAT functionality may exist as well, and generally the variations may combine functions of the five primary identified categories of NATs (e.g. null, full-cone, partial cone, port-restricted cone, and symmetric). In this case and for the purposes of efficient handover procedures described herein, a NAT router that is observed to function according to more than one type can be assigned a type according to the most restrictive type observed, where the order of restriction from lowest to highest is (i) null, (ii) full cone, (iii) partial cone, (iv) port-restricted cone, and (v) symmetric. Thus, the exemplary "multi-type" NAT router described above could be assigned a NAT router type of symmetric NAT in order to select an efficient handover procedure. Alternatively, if the behavior or function of a NAT cannot be readily or consistently discerned from network probing techniques such as STUN, the NAT router may also be assigned an "other" type.

In addition, the function of a firewall with NAT routing capabilities may generally be grouped into the types illustrated in FIG. 2d. As described above, it is possible for a firewall to exhibit different types of NAT routing functionality. The allocation of a firewall to an illustrated type may reflect the firewall's most common NAT routing functionality or behavior as opposed to requiring the firewall to function according to an allocated type 100% of the time, in order to utilize the efficient handover techniques described herein.

The type "Specific Remote Ports Required" as the type for AN FW 119 may apply if the firewall restricts connections to specific remote ports such as outbound traffic from AN 117 can only use specific port numbers as the destination port for traffic transmitted (e.g. restricted to TCP port 80 for HTTP). "Specific Remote Ports Required" can supersede the other types, such that if AN FW 130 functions as a port-restricted cone NAT but also restricts internal access to specific ports on remote hosts, then the AN firewall type would be "Specific Remote Ports Required" as opposed to "PR Cone NAT", as illustrated in FIG. 2d. If CN FW 130 is a NAT router, then a relay would likely be required if MD 101 must transmit to specific remote ports through AN FW 119, since CN 108 would not likely be able to specify the receive port number on CN FW 130.

Network handover rules 225 could also specify handover procedures according to other categories or types of firewalls in addition to the types illustrated in FIG. 2d. The handover procedures for other types of firewalls could include (i) the identified handover procedures "A" through "D" and "relay" (described below) or (ii) different handover procedures, which could be applied for the other categories of firewalls. For example, some firewalls implement Universal Plug and Play (UPnP) with NAT functionality, which may be considered another form of firewall and may also optionally be included in a set of network handover rules 225. A different handover procedure accounting for the function of the UPnP firewall/NAT (or generally a different type of firewall than those listed in FIG. 2d), such as a different procedure "X", could be specified in a network handover rules 225. In addition one of the handover procedures identified in a network handover rules 225 in FIG. 2d could also be utilized with additional or different types of firewalls, such as a UPnP NAT router.

Although the handover procedures A, B, C, D, and "relay" are illustrated according to the various combinations of firewall types, other handover procedures and combinations of firewall types could be implemented in a set of network handover rules 225 as well, although they may be less optimal. For example, a "relay" could potentially be used in other handover cases illustrated in FIG. 2d, such as if AN FW 119 is a symmetric NAT and CN FW 130 is a full-cone NAT. However, utilizing the "relay" in this instance may require additional steps and take additional time as compared with method "A" denoted in FIG. 2d. If the type of firewall for AN FW 119 and/or CN FW 130 is unknown, then "relay" may be considered efficient and utilized in a network handover rules 225.

The "Network Handover Rules" illustrated in FIG. 2d could be stored within memory on the mobile device, accessed via a software program 204 or operating system 203, or downloaded by the mobile device from a central server. A set of network handover rules 225 could also be logically programmed into software operating on MD 101 or a computer communicating with MD 101, such as a server on the mobile network assisting MD 101 with handover. MD 101 or a communications service managing services for MD 101 (such as MD proxy server 213*a*) may implement the network handover rules 225 to select handover procedures depending only on a first firewall associated with the alternate network, depending only on a second firewall associated with the corresponding node, or depending on both the first and second firewalls.

Examples of the handover procedures A, B, C, and "relay" can be found within the present invention and related applications. In summary, "A" may be the handover procedure depicted and described in connection with FIGS. 3-5 of U.S. patent application Ser. No. 12/120,940, filed May 15, 2008 in the name of John Nix, entitled "Efficient Handover of Media Communications in Heterogeneous IP Networks," (the contents of which are hereby incorporated by reference in their entirety) while "B" may be the handover procedure depicted and described in connection with FIGS. 3-5 of U.S. patent application Ser. No. 12/163,472, filed Jun. 27, 2008 in the name of John Nix, the contents of which are hereby incorporated by reference in their entirety. Furthermore, "C" may be the handover procedure depicted and described in connection with FIGS. 9-11 of U.S. patent application Ser. No. 12/163,472 (the contents of which are hereby incorporated by reference in their entirety), while "relay" may be the handover procedure depicted and described in connection with FIGS. 12 through 14 of the present application.

Handover procedure "D" may be based primarily on handover procedure "A", with two additional steps. In handover procedure "D", MD 101 can first obtain an IP address on the external interface of AN FW 130 via STUN (such as IP address 120). CN 108 can then transmit a packet from IP:port 123 to IP address 120 (transmitting to any destination port). MD 101 can then follow the steps in handover procedure "A".

Each of the denoted handover procedures in FIG. 2*d* may also be considered a class of handover procedures, and variations within the class are possible. Variations for "relay" may include the handover procedures depicted and described in connection with FIGS. 3-5, FIGS. 10-11, FIGS. 12-14, or FIGS. 15-16 of the present invention, and additional variations are possible without departing from the scope of the present invention. A preferred, or at least a highly efficient, variation within a class of handover procedures, such as the variations illustrated in the previous sentence for "relay", may depend on parameters in addition to a firewall type, as described FIGS. 2*g* and 2*i* and elsewhere below.

Variations on the above-referenced techniques or handover procedures could also be used in order support efficient handover of media communications, and different procedures could be used in network handover rules 225 as well. For example, although "relay" is illustrated as preferred for some combinations of types of alternate-network and corresponding-node firewalls in FIG. 2*d*, new techniques could be introduced that attempt to either (i) guess the port number used on a distant NAT router or firewall, or (ii) query a firewall directly to obtain the external port bindings, and these query results could be transmitted to the other node in order to facilitate handover. These new techniques for handover could be utilized by MD 101 or communications service managing MD 101 in substitution for the "relay" or other handover techniques denoted in network handover rules 225.

Further, the identified handover procedures according to firewall types in the exemplary network handover rules 225 are illustrated based upon preferred functionality currently available in VoIP clients. More advanced or future functionality in VoIP clients, including software that can operate on a mobile device or corresponding node, may change a specific handover procedure associated with particular type of firewall for AN FW 119 and/or CN FW 130 (for those currently identified such as "A", "B", "C", etc.), but a network handover rules 225 can still be useful to specify an efficient handover procedure according to the types of firewalls for AN FW 119 and/or CN FW 130.

One benefit of implementing network handover rules in accordance with the presently disclosed methods and systems is that efficient handover procedures can be rapidly and dynamically selected, depending on the firewall and/or network environment, by MD 101, a software program 204, a communications service 214, or other combinations of software and hardware. Other handover procedures besides those referenced in FIG. 2*d* could be used in connection with a set of network handover rules 225 without departing from the scope of the present invention. Network handover rules 225 are additionally depicted and described in connection with FIG. 2*g* of U.S. patent application Ser. No. 12/163,472, filed Jun. 27, 2008 in the name of John Nix (also referred to as "U.S. patent application Ser. No. 12/163,472" below—the contents of which are hereby incorporated by reference in their entirety). Network handover rules 225 may be also be valuable for handover during a multi-party call, such as if MD 101 communicates concurrently with more than one corresponding node 108 during a conference call. Each corresponding node 108 could connect to the Internet via a different type of NAT or firewall, and in order to rapidly and efficiently handover the multiple media sessions, MD 101 can select a handover procedure according to a set of network handover rules 225 for each corresponding node 108.

A handover procedure identified in a network handover rules 225 may be either (i) a handover procedure or (ii) a class of handover procedures. For example, the handover procedure "Relay" can represent a class of handover procedures where a mobile device utilizes a relay conduct handover, and a handover procedure within the class can be variations such as "Relay A", "Relay B", etc. Likewise, handover procedure "A" in a network handover rules 225 can represent a class of handover procedures, where variations could be "A-1", "A-2", etc. A specific handover procedure within the class (i.e. one of the variations) could be determined according to parameters in addition to an AN FW 119 and/or CN FW 130 firewall type, such estimated time remaining until the start of handover or capabilities of the corresponding node, as examples. Other parameters could be utilized as well to determine a specific handover procedure within the class, such as power requirements, signal-to-noise ratios, a mobile device software version, or other conditions that may affect the efficiency of handover.

Utilizing parameters in addition to a firewall type, to select a handover procedure within a class of handover procedures can increase the efficiency of the handover (i.e. reduce time to conduct handover, reduce packet loss, or otherwise improve media quality). A method of selecting a handover procedure within a handover procedure class, such as a class "Relay" in a network handover rules 225, will be described in additional detail in FIG. 2*g* below. Alternatively, a handover procedure "Relay" in a network handover rules 225 can represent a specific handover procedure (i.e. not a class), where the handover procedure is independent of other parameters besides the firewall types illustrated in FIG. 2*d*. For example, a mobile device could use the same relay handover procedure for all cases where "Relay" is specified in a network handover rules 225, such as using the relay handover procedure in FIGS. 12-14 herein, although utilizing the same relay handover for all cases where "Relay" is specified in a network handover rules 225 may not maximize efficiency.

FIG. 2e

FIG. 2e is a simplified tabular summary of a local area network (LAN) profile including a set of network parameters, in accordance with exemplary embodiments. In order to facilitate handover procedures upon detecting the presence of alternate network 117, MD 101—or a communications service 214 managing or supporting a media session on MD 101—may rapidly (i) evaluate the firewall type of AN FW 119 associated with AN 117 and/or (ii) additional network parameters for AN 117 that may be useful for selecting an efficient handover procedure. For example, an optimal or efficient handover procedure may depend upon the presence and type of firewall associated with either node, as illustrated in FIG. 2d. However, evaluating the presence and type of firewalls requires valuable time that may slow down the handover process, which could cause undesirable gaps in the audio of the media session to occur, for instance. The specific steps within a handover procedure (or similarly class of handover procedures) identified within a network handover rules 225 may be further optimized based upon the network characteristics for (i) the alternate network a mobile device may handover a media session with a corresponding node and/or (ii) the network on which a corresponding node operates. As one example, if both AN FW 119 and CN FW 130 may be symmetric NAT routers, and thus a relay may be preferred as identified in a network handover rules 225, the efficient steps to conduct the handover using a relay may depend upon additional parameters associated with either AN 117 or CN 108. Additional parameters, especially those which are unlikely to frequently change and possibly in addition to a firewall type for AN FW 119, could be stored within a LAN profile 226.

One example is the significant time required (relative to the handover speed desired) to determine if a firewall interferes with media transmission via UDP. Many secure corporate wireless LANs could implement a firewall with either (i) symmetric NAT router functionality or (ii) symmetric firewall functionality, and the corporate firewall may also restrict access to remote hosts to TCP packets on port 80 or 443. Other exemplary alternate networks may also restrict the types of packets allowed through a firewall, such as allowing only certain types of transport protocols. Although UDP may generally be preferred, and could be the default transport protocol for the transmission of media through a network, if only TCP is supported through AN FW 119, then the a mobile device should utilize TCP for call-control and media through AN 117 during handover. Blocked UDP ports could create error conditions in a potential handover and/or interfere with the transmission of media streams, and evaluating that UDP may be blocked at AN FW 119 may take several seconds. Evaluating that UDP is blocked, or that only certain UDP ports are allowed, may require network scanning techniques that are extensive (relative to desired handover speed). In addition, if only certain remote TCP or UDP ports are allowed (such as TCP port 80 for HTTP or UDP port 53 for DNS), the use of a relay may be required if CN FW 130 is a NAT router (since CN 108 may not be able to specify the receive port on the external interface of CN FW 130).

Instead of probing AN FW 119 each time the network is visited and potentially delaying handover, MD 101 or the communications service may prefer to store—in a LAN profile 226—information regarding the network environment (e.g. firewall type, protocols supported, and ports allowed) for an alternate network 117 that MD 101 had previously accessed and evaluated, in order to improve the efficiency of the handover process. Preferably during an idle state or before attempting handover, MD 101 could obtain the information in a LAN profile 226 from scanning the network by testing different protocols and ports to see which are supported by the network. For example, information in a LAN profile 226 could be gathered the first time MD 101 connects to AN 117, which may also be during an idle state before MD 101 is engaged in a media session such as an active telephone call. If there is no entry in a LAN profile 226 for an AN 117, with or without MD 101 engaged in a media session with a CN 108, MD 101 could probe AN 117 using techniques such as STUN, possibly including scans for open ports or allowed protocols, and the acquired data can be recorded in a LAN profile 226. If MD 101 is engaged in a media session such as the one illustrated in FIG. 1a, MD 101 could subsequently conduct handover utilizing the acquired data. In addition, a LAN profile 226 is not required to perform a handover, although a selected handover procedure may be less efficient or in fact may fail (e.g. when a "default" handover procedure using a relay is selected with media as UDP, where UDP packets are blocked by a firewall).

An exemplary LAN profile 226 is illustrated in FIG. 2e. LAN profile 226 is illustrated according to a tabular summary, but other formats are possible as well, such as a database with multiple separate tables. A LAN profile may specify a firewall type 224b as full cone NAT, partial cone NAT, port restricted cone NAT, symmetric NAT, symmetric FW, or null (which may mean publicly routable and without a firewall or NAT). A firewall type 224b may also consist of other types of firewalls than those depicted in FIG. 2d, or the exemplary firewall types grouped into different categories (i.e. "public", "non-symmetric", and "symmetric"). Other types of firewalls than those illustrated in firewall type 224b could also be a UPnP NAT router or new or different types of firewalls as they are developed and/or commonly deployed.

A LAN profile 226 can provide significant advantages in speeding a handover process. First, a user may frequently move between MN 102 and the same locations such as a home residence or his or her office, potentially several times a day and commonly several times a week or month. If these example locations of a home and office provide IP connectivity to which a media session could preferably be handed over, the underlying firewall behavior and network characteristics, such as protocols supported and ports allowed, may unlikely change on a frequent basis. For example, an ISP providing Internet connectivity to AN 117 may install a DSL modem integrated with the WiFi access point 118, which may also include an integrated AN FW 119. In this case, if the AN FW 119 is initially evaluated to behave as a full cone NAT router within the user's home, for example, MD 101 can reasonably assume during subsequent movement into AN 117 within the user's home that AN FW 119 continues to behave as a full cone NAT router. MD 101 could periodically scan the network and update a LAN profile 226 when MD 101 is not actively engaged in a media session (i.e. in "idle mode"), such as once a day or once a week, in order to evaluate if data recorded in a LAN profile 226 has changed, such as if a firewall type has changed or if different ports or protocols are allowed or blocked, after the first entry for the network was recorded in a LAN profile 226. An entry for a LAN profile 226, corresponding to a network which could be AN 117 or MN 102, could also be updated with results obtained from MD 101 scanning the network in "idle" mode.

A LAN profile 226 may also contain entries regarding a wireless WAN, such as MN 102 illustrated in FIG. 1a. Thus, the entries within a LAN profile may not be limited to only "local area networks", but could also include information pertaining to wide area networks visited by MD 101. For example, a mobile network may route packets through a firewall MN FW 105 possibly with NAT functionality (as illustrated in FIG. 1a), and properties such as a firewall type 224b associated with the mobile network could also be stored within a LAN profile 226. Entries for a wireless WAN from a mobile network operator may be grouped together, such that a single entry within a LAN profile 226 may represent a set of locations. For example, MD 101 may access dozens of base transceiver stations (BTS) associated with a MN 102 within a specific geographical region such as a state, which could also correspond to a Location Area Identification (LAI) within the Cell Global Identifications (CGI) transmitted by the BTS is the region as one example. Instead of scanning or probing the network and recording results in a LAN profile 226 each time a different BTS is accessed, MD 101 could group multiple BTS into an entry within a LAN profile 226.

In the exemplary LAN profile 226 illustrated in FIG. 2e, the multiple BTS in a network 224a "Primus UMTS" may be identified by the LAI "206-01-12345-XXXXX", and the exemplary single entry in a LAN profile 226 could represent any BTS within the LAI. Similarly, the exemplary network "Office" in FIG. 2e could have multiple WiFi access points within the network, possibly identified with the same or similar SSIDs, and an entry in a LAN profile 226 for the network could represent a set of WiFi access points associated with the same network, which may reasonably be expected to have the same firewall type 224b, ports allowed, etc. Further, a LAN profile 226 may contain a single entry for one alternate network 117, as opposed to a plurality of entries. And other possibilities exist as well, without departing from the invention.

In addition to the columns or data fields illustrated in a LAN profile 226 in FIG. 2e, a LAN profile 226 could contain information regarding the firewall or NAT port binding timeouts, as illustrated in a LAN profile 226 in U.S. patent application Ser. No. 12/163,472, the contents of which are hereby incorporated by reference in their entirety. Measured port-binding timeouts could be utilized to calculate the period at which a mobile device transmits a port-binding packet in order to keep an external NAT port open and bound for the receipt of call-control messages or media. Port-binding timeouts could be measured by probing a firewall with techniques such as STUN (where response A 219 is incrementally delayed until it is not longer received). For example, if the port-binding timeout for TCP is measured to be an interval, such as an exemplary 600 seconds, MD 101 could adjust the period at which a TCP port-binding packet is transmitted to a MD proxy server 213a to be a shorter duration than the measured interval, such as an exemplary 570 seconds. In this manner, MD 101 can keep TCP port-bindings active for a call-control channel such as the exemplary call-control channel illustrated in FIG. 2b, while conserving battery life by reducing the frequency of transmitted port-binding packets to a minimum acceptable value.

In other words, MD 101 can set the period transmission of TCP port-binding packets in a call-control channel to be approximately equal to, but less than, a measured TCP port-binding timeout on a MN FW 105. The port-binding packet to maintain TCP port bindings on MN FW 105 (or also AN FW 119) could be transmitted as a SIP REGISTER request, or similar requests in other call-control protocols (according to the call-control protocol implemented in the call-control channel). Other formats of a port-binding packet to maintain TCP port bindings are possible as well. In general, utilizing TCP for the transmission of call-control messages may be preferred over UDP, since TCP port bindings are generally maintained for a longer duration than UDP port bindings. Consequently, data within a LAN profile 226 for either AN FW 119 or MN FW 105 port-binding timeouts may be utilized by MD 101 to set an efficient interval for transmitting port-binding packets to a MD proxy server 213b. In this manner, battery life on MD 101 can be conserved.

MD 101 can rapidly evaluate the presence and type of firewall for a firewall type 224b by obtaining an identifier or identity token 224c for an alternate network 117, and then querying for firewall type in a table or database such as LAN profile 224 illustrated in FIG. 2e. The process of querying for a firewall type 224b in a table can be performed in a few milliseconds or less, whereas conducting the full set of steps outlined in the STUN standards or similar firewall evaluation techniques (including tests to evaluate ports or transport protocols allowed) may take several seconds or longer. In addition, a firewall type 224b is not required within a LAN profile 226, such that it could be omitted or have an entry similar to "unknown", and other data within a LAN profile 226 can be useful for MD 101 to efficiently conduct handovers. Once a firewall type 224b and/or other data for AN 117 within a LAN profile 226 acquired, a preferred handover procedure can subsequently be selected using a handover procedure rules 227 described below in FIGS. 2g through 2i. Note that use of handover procedure rules 227 are not required in order to achieve the benefits of using a LAN profile such as LAN profile 226, nor is use of a LAN profile required in order to achieve the benefits of using handover procedure rules. Significant benefits may be achieved, however, from use of both in combination.

A LAN profile 226 can contain parameters to (i) identify the alternate network and (ii) provide information useful for handover, such as protocols and/or ports allowed. The identity token 224c illustrated in FIG. 2e could represent a service set identifier (SSID) for a WiFi access point, a MAC address for a wired or wireless Ethernet network such as associated with a switch or router, a network or cell-site identifier broadcast by a base transceiver station in a WiMax, LTE, or CDMA network (such as a cell global identification number), geographical coordinates if MD 101 supports Global Positioning System (GPS) or similar location positioning functionality, or similar tokens to identify a network or location. Preferably, an identity token 224c illustrated in a LAN profile 226 can be uniquely associated with a network. If an SSID is not unique within a LAN profile 226, or across multiple LAN profiles 226 stored within a central server, a LAN profile 226 could include multiple identity tokens 224c, such as first for an SSID and a second for additional identification of the access point, such as Ethernet MAC address, geographical positioning coordinates, closest observed macrocellular BTS, etc. Thus, a plurality of identity tokens 224c could be utilized to uniquely identify a network 224a within a LAN profile 226.

Such identity tokens could be useful for evaluating the presence and type of firewall even before an IP address is assigned to MD 101, since LAN profile 226 can also contain a firewall type 224b. For example, if a user approaches the location "Office" in the exemplary LAN profile 226 in FIG. 2e, and MD 101 can observe the SSID "Go2Call_WLAN 11". Before authentication and/or connection methods such as DHCP are complete, MD 101 can identify that the network will provide IP connectivity via a symmetric NAT router, even before (i) an IP address is assigned, (ii) IP packets can be transmitted via the alternate network, and/or (iii) NAT-probing and/or network evaluation techniques could be conducted by MD 101 (e.g. by a software program operating on MD 101).

A LAN profile 226 could also provide other information useful for handover, such as the media transport protocol supported by the NAT or firewall, illustrated by the media transport protocols supported 224d field in FIG. 2e. UDP transport for media may be most commonly supported and preferred, but other transport protocols are possible (and may be required). Some firewalls block UDP traffic or remote UDP ports, and consequently media may need to be transmitted either (i) to a specific port number or (ii) as TCP (possibly only to certain TCP port numbers). If a relay is utilized to conduct handover, then a LAN profile 226 can also assist with the selection of an efficient media transport protocol upon handover. An AN 117 such as the exemplary location "Coffee Shop" in FIG. 2e may support SCTP (streaming control transmission protocol), which could be preferred to communicate with a relay, even if the network for CN 108 does not support SCTP. A relay could convert between SCTP with AN 117 and UDP to the corresponding node.

A LAN profile 226 may also include additional parameters, such as an Internet Protocol version supported 224e at the alternate network, or other parameters useful for either handover or simply for establishing a media session may be included as well. If the mobile device utilizes a relay during handover, a relay could support changes in the protocols that may be required or preferred when MD 101 communicates through AN 117. As one example, if the corresponding node does not support IPv6 and the mobile device implements a "dual stack", then IPv4 could be selected for the media session illustrated in FIG. 1a. If a AN 117 network implements only IPv6, then also a relay may be required to conduct the handover. The relay may need to communicate with MD 101 via AN 117 using IPv6 (and the relay could communicate with CN 108 using IPv4).

A LAN profile 226 could contain information regarding remote UDP and/or TCP ports that are either opened or blocked, also illustrated in FIG. 2e in an allowed remote UDP ports 224f and an allowed remote TCP ports 224g. TCP and/or UDP ports that are observed to be either open or blocked may also be recorded in a database within a LAN profile 226, as another alternative to recording the ports in the tabular summary illustrated in FIG. 2e. By recording information regarding specific ports allowed, MD 101 may (i) avoid attempting to transmit packets on ports that were previously observed to be blocked and/or (ii) select ports that are expected to be open. Specifying a particular remote port (i.e. receive IP:port) may likely require a relay if the corresponding node connects to the Internet via a NAT router. In addition, data could also be recorded in a LAN profile 226 regarding local ports or source ports that may be allowed or blocked.

Recording data on open and/or blocked ports in a LAN profile 226 could further speed and increase the efficiency of a handover procedure. For example, if only certain ports are allowed within an AN 117, MD 101 would not have to repeat a port-scanning procedure or send multiple probing packets in order to guess or find open ports each time MD 101 accesses the Internet via AN 117. As illustrated in entry for the "Bank" location in FIG. 2e, a network may allow only packets to be transmitted to specific UDP or TCP remote ports, such as UDP port 4569 which could correspond to the preferred port associated with the IAX2 protocol. Determining that only specific UDP or TCP ports are allowed after MD 101 has initiated a handover (via network scanning and probing techniques) could significantly interfere and delay handover or attempts to establish new media streams at an alternate network 117.

In other words, MD 101 may need to know that only remote UDP port 4569 is allowed in the exemplary "Bank" network 224a location in order to efficiently conduct handover, since transmitting media streams or call control to other ports may be blocked. Determining the ports are blocked may require valuable time if MD 101 attempts to conduct handover to the "Bank" location, and thus a LAN profile 226 can increase efficiency (by informing MD 101 of the proper port and protocol to utilize). For the exemplary "Bank" location, a mobile device could specify UDP as the media transport protocol and remote port 4569 as the destination port number in UDP packets transmitted through AN 117 during handover. Further, if (i) only specified remote ports are allowed for either TCP or UDP packets, and (ii) the corresponding node connects to the public Internet 106 via a firewall with NAT routing functionality, then a relay may likely be required for handover since the corresponding node may not be able to specify the receive IP:port on the firewall (which could be a NAT).

A LAN profile 226 can be updated as MD 101 moves to new locations where IP connectivity is provided and MD 101 can measure and record a network parameters 224, which can consist of an exemplary illustrated firewall type 224b, identity token 224c, media transport protocol 224d, etc. A LAN profile may be stored within MD 101, or periodically transmitted between MD 101 and a central server within MN 102, a communications service 214, or other server locations on the public Internet 106, and may generally be stored remotely. Likewise, MD 101 could (i) periodically download a LAN profile 226 or (ii) query a remote database that contains data measured and recorded about a particular alternate network from another mobile device, among other options. For example, a first mobile device associated with a communications service 214 may (i) connect with a first alternate network and (ii) record data within a network parameters 224, such as a firewall type, ports open, a identity token, etc. within a first LAN profile 226 associated with the first mobile device. The first mobile device may transmit the corresponding entry within the first LAN profile 226 to a communications service 214, which could store the data in a database. MD 101 as illustrated in FIG. 1a could represent a second mobile device, and could query the communications service 214 to obtain the entry within the first LAN profile 226 (or a subset thereof). Thus, MD 101 could obtain data within a network parameters 224 for an alternate network without previously (i) connecting to the network and/or (ii) probing or scanning the network to obtain data within a network parameters 224 for the alternate network, which could be AN 117. The data could be useful in selecting and executing an efficient handover procedure. FIG. 6 below further describes storing and accessing a plurality of LAN profiles for a plurality of mobile devices stored within a LAN profiles database 624.

In addition, a LAN profile 226 may be associated with either a mobile device or a subscriber/end user. For example, an end user may repeatedly visit the same networks, but could change the specific hardware utilized for a mobile device. By associating a LAN profile 226 with an end user, a LAN profile 226 stored within a mobile device could be updated by a communications service 214 according to the end user accessing the mobile device. In this example of associating a LAN profile 226 with an end user, the LAN profile 226 could also be associated with a SIM card (Subscriber Identity Module) or a login ID or similar subscriber identity token. A LAN profile 226 could also be stored within a SIM card, in order to facilitate ease of mobility for the data set from one mobile device to the next.

A LAN profile 226 may also contain data for the connection setup delay 224h for MD 101 to access AN 117. Connection setup delay 224h can be calculated as the duration between (a) when MD 101 first transmits a message or signal to AN 117 such as access point 118 and (b) when MD 101 can transmit and receive IP packets with the public Internet 106 via AN 117. The connection setup delay 224*h* could be calculated in several possible ways, including a running average of the duration required for MD 101 to access AN 117. MD 101 could update connection setup delay 224*h* upon connecting to AN 117. Connection setup delay 224*h* within a LAN profile 226 can be utilized by MD 101 or a communications service 214 in evaluating an efficient handover procedure, as described in FIG. 2*g* below. A selected handover procedure could depend on the time required to access the alternate network, in order to increase efficiency. As one example, if an expected shorter duration is required to access AN 117 then MD 101 could utilize one handover procedure, and if an expected longer duration is required to access AN 117 then MD 101 could utilize a different handover procedure. Although not shown in FIG. 2*e*, a measure of variation in connection setup delay 224*h* could be included in a LAN profile 226 as well.

A LAN profile 226 may also contain a data for network quality 224*i*, which is illustrated as a number in the range of one to ten, but other numbers or values could be utilized as well. MD 101 could measure the quality of a network such as AN 117 when connected. Network quality 224*i* could be a value calculated as an aggregate value that accounts for multiple network quality parameters such as packet loss, bit errors, bandwidth available, jitter, and/or delay as examples. Alternatively, the individual measures for each quality parameter could be stored in a LAN profile 226. Network quality 224*i* could also alternatively be a calculated or measured value for a listening Mean Opinion Score (MOS), and other measures for evaluating the quality of a network could be recorded as well. A data set including a calculated or measured value of quality through AN 117 could be recorded in a LAN profile 226 as network quality 224*i* (as an alternative to the exemplary aggregated value in FIG. 2*e*). The data set could then be input into further calculations to evaluate the quality of AN 117, and may be useful for conducting efficient handovers, as described below, including in FIG. 2*i*.

Network quality 224*i* values could be utilized in (i) evaluating or calculating if handover is preferred, (ii) selecting a particular handover procedure, or (iii) selecting a AN 117 to be a target network for handover. For example, if MD 101 can handover an active media session to more than one AN 117, an AN 117 with a higher network quality 224*i* value could be selected as the target network for handover. In addition, FIG. 15 of U.S. patent application Ser. No. 12/163,472 (the contents of which are hereby incorporated by reference in their entirety) illustrates the steps a mobile device or communications service could implement to calculate if handover is preferred. At step 1503 of FIG. 15 of U.S. patent application Ser. No. 12/163,472 (the contents of which are hereby incorporated by reference in their entirety), MD 101 could observe an AN 117 through a physical interface 201*a*, but may not be able to transmit or receive packets through an IP address associated with AN 117 (such as if MD 101 has not completed authentication, authorization, DHCP, and/or similar steps to be able to transmit and receive packets from AN 117). MD 101 or a communications service could utilize a network quality 224*i* value at step 1503 of FIG. 15 of U.S. patent application Ser. No. 12/163,472 (the contents of which are hereby incorporated by reference in their entirety) to calculate if handover is preferred.

Similarly, MD 101 could utilize an LAN profile 226 to evaluate that handover is not preferred, based upon data within a network parameters 224. As one example, the network 224*a* "Home LAN" identified in a LAN profile 226 may provide an IP address and may provide a desirable connection at the physical or data-link layers, such as a high signal-to-noise ratio, but may also have a highly restrictive firewall for AN FW 119. The highly restrictive firewall could block both UDP and TCP packets, as illustrated, and consequently an exemplary network quality value 224*i* could be "0.0". Subsequently MD 101 could avoid attempting a handover using the low value for network quality 224*i*. Note that network quality 224*i* may be a more comprehensive measure of quality than physical and/or data-link measures of quality that may be commonly utilized by mobile devices or mobile networks for conducting handover in 2G and 3G networks, since network quality 224*i* can include a measure of quality for packets transmitted and received through the public Internet 106.

Although network quality 224*i* is illustrated as an aggregate value in a LAN profile 226, separate network quality values 224*i* could be recorded in a LAN profile 226 for both the uplink and downlink directions, and individual data points as opposed to an aggregated measure could be recorded in a network quality 224*i*. Network quality 224*i* could be utilized to select source coding (i.e. a codec) and/or channel coding (i.e. forward error correction) for MD 101 to efficiently implement in a media session through AN 117, possibly even before MD 101 can transmit or receive packets through AN 117. A network quality 224*i* recorded in a LAN profile 226 could be used in other ways to efficiently (i) evaluate if handover is preferred, and/or (ii) establish a new media session through AN 117, as some are included herein for illustration and not for limitation.

Figure 13:
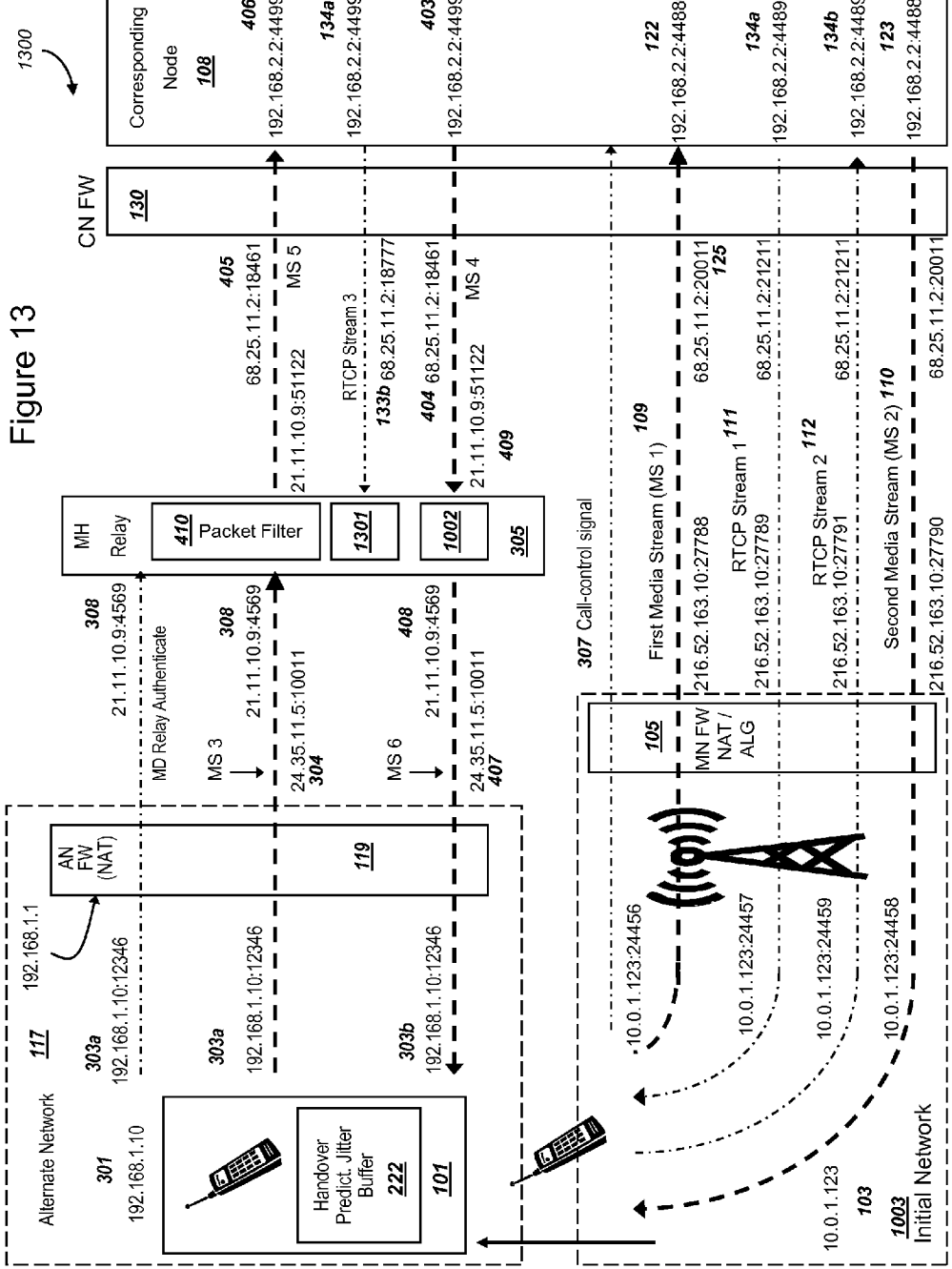
FIG. 13 is a graphical illustration of an exemplary system, where a mobile device utilizes a media handover relay to conduct handover, and where a media handover relay receives media from a corresponding node before receiving media from the mobile device, in accordance with exemplary embodiments.

A LAN profile 226 described in FIGS. 13 and 2*e* of U.S. patent application Ser. No. 12/163,472 (the contents of which are hereby incorporated by reference in their entirety) may be considered similar to a LAN profile 226 described herein, and could also be a subset or a superset of a LAN profile 226 described herein. A LAN profile 226 described herein and the network handover rules 225 described herein (i.e. FIG. 2*d* of the present invention) can be used with the steps to conduct handover identified in FIG. 13 of U.S. patent application Ser. No. 12/163,472, the contents of which are hereby incorporated by reference in their entirety. For example, at Step 1303 in FIG. 13 of FIG. 13 of U.S. patent application Ser. No. 12/163,472 (the contents of which are hereby incorporated by reference in their entirety), MD 101 could observe an AN 117 becomes available on a physical interface 201*a* before acquiring an IP address associated with AN 117. An identity token 224*c* for AN 117 may not be recognized or stored in a LAN profile 226, and consequently MD 101 may evaluate the AN FW 119 type to be "unknown". In addition, an identity token 224*c* could be recognized and a type for AN FW 119 could be "other". By applying network handover rules 225 as illustrated in FIG. 2*d* of the present invention, MD 101 could evaluate a handover procedure "relay" is appropriate, or most efficient, for conducting handover at an alternate network.

Although not illustrated in FIG. 2*e*, a LAN profile 226 could also contain data regarding authentication with an alternate network that can increase efficiency of handover. A field such as "authentication successful" in a LAN profile 226 could record if MD 101 was previously able to successfully connect with AN 117 given a set of authentication tokens. MD 101 may separately store authentication data, such as a user ID and password or access key, in order to authenticate and gain access to an AN 117, or the authentication data could also optionally be included within a LAN profile 226. However, even if authentication data is stored within a LAN profile 226 or elsewhere within memory of MD 101, an "authentication successful" field within a LAN profile 226 may be helpful for conducting handover. For example, if MD 101 was not able to previously successfully authenticate with an AN 117 (such as not being able to transmit and receive packets with the Public Internet 106), an "authentication successful" field within a LAN profile 226 can record that authentication failed. Recording data that authentication failed can be useful for MD 101 to conduct an efficient handover, because if authentication is expected to fail, then MD 101 could bypass AN 117 and not attempt to handover a first media session. In addition, although not illustrated in FIG. 2e, a LAN profile 226 may contain data on application-layer gateway or application-layer firewall functionality associated with a network 224a.

Further, a LAN profile 226 could also contain a measure of the energy consumed and/or mobile device power levels utilized in order to communicate with a network 224a. As described below in FIG. 2i, by recording power levels associated with a potential alternate network 117 in a LAN profile 226, MD 101 may include the data in evaluating or calculating an efficient handover procedure. For example, one handover procedure may require higher power levels than another, and calculations to select and efficient handover procedure may include mobile device power and/or energy data within a LAN profile 226

FIG. 2f

FIG. 2f is a simplified tabular summary of a corresponding node software handover database, in accordance with exemplary embodiments. MD 101 may communicate with many different types of corresponding nodes, including possibly other mobile devices, session border controllers, gateways to the PSTN, IP phones, Asterisk® servers, voice mail servers, analog telephone adapters, instant messaging or "PC-to-PC" VoIP clients, and other possibilities exist as well. Different corresponding nodes may very likely have different software programs 209 or different versions of the software programs for conducting a media session with MD 101. A software program 209 may have a version number or equivalently a user agent. The software version number or user agent may be transmitted to MD 101 during the setup of the first media session, such as the session illustrated in FIG. 1a, via a call request or a response to a call request. MD 101 or a communications service 214 may utilize a corresponding node software handover database 233 (CN software handover database) in order to record data on the handover capabilities or functions of a corresponding node. In other words, MD 101 may communicate with a plurality of different types of corresponding nodes with different software capabilities and possible functions during handover, and querying a CN software handover database 233 can allow MD 101 to quickly evaluate the handover capabilities of a CN 108. The capabilities of CN 108 can be useful for the selection of an efficient handover procedure.

A corresponding node handover function 229 (CN handover function) may account for the capabilities of the corresponding node 108, illustrated in FIG. 2f according to types of "restricted", "basic", and "standard", "advanced", and "no handover". A type associated with a corresponding node can indicate a class of the capabilities or functions of a corresponding node when a mobile device conducts handover. Different software programs 209 may have different abilities to process a call-control signal for handover, bi-cast media, monitor the same port for two media streams, redirect a media-control channel, and other functionality relevant to efficiently conduct a handover may also vary according to a version of a software program 209 or operating system 208 operating on a corresponding node. In order to efficiently conduct handover, MD 101 can preferably (i) acquire data on CN 108's handover capabilities and (ii) account for those capabilities when selecting a handover procedure and/or conducting handover. Other types or categories besides the five exemplary types depicted in FIG. 2f are possible as well.

MD 101 or a communications service 214 can acquire data on the capabilities of CN 108 during the setup of a first media session illustrated in FIG. 1a. For example, if a version of the SIP protocol is implemented, a SIP INVITE may include the user agent of a node, where the user agent can represent a software version or software version number. A user agent or software version can be transmitted in the setup of media sessions in other protocols as well. Further, if CN 108 operates the same or compatible software program 209 as MD 101, or CN 108 subscribes to the same communications service 214, then MD 101 could acquire data pertaining to the capabilities of the corresponding node by querying a communications service 214 or potentially the corresponding node. Using a software version number associated with CN 108, a mobile device or communications service can determine CN 108's capabilities relevant for conducting handover, and the capabilities can be recorded in a CN handover function 229.

As one example, an exemplary SIP user agent "Go2Call SIP 2.2.1" may indicate CN 108 has standard capabilities and can belong to the "standard" type within a CN handover function 229. As another example, an exemplary SIP user agent "Asterisk 1.2.8" may indicate CN 108 has restricted capabilities and belong to the "restricted" type within a CN handover function 229. Although categorized data is illustrated in FIG. 2f for a CN handover function 229, in general a CN handover function 229 may contain data about the functions of a CN 108 relevant to handover, including data other than the exemplary types illustrated in FIG. 2f. As another example, the capabilities or functions of a corresponding node could be included within an "allowed" and/or "denied" header field, which may be used to record a CN handover function 229. Further, MD 101 could query CN 108 with a version of the SIP OPTIONS request, where CN 108 could respond with handover functionality, which may include either a CN handover function 229 or data that may be used to calculate a CN handover function 229.

CN software handover database 233 illustrates an association between corresponding node software versions (CN software version) 234 and a CN handover function 229. MD 101 can query CN software handover database 233 with an observed CN software version 234 (such as a user agent in a SIP message) in order to obtain a CN handover function 229 for CN 108. Additional data regarding a corresponding node's capabilities may also optionally be recorded within a CN software handover database 233, such as a plurality of CN handover functions 229. Other CN handover functions 229 that may be associated with a CN software version 234 could include that software version's capability to support (i) changing codec upon a handover, (ii) implementing forward error correction, (iii) keeping the same local IP:port number for transmitting and receiving media upon handover, or (iv) transmitting the media concurrently for a call to two separate IP addresses, as examples. CN software handover database 233 could be stored locally within the memory of MD 101, or located on a server managed by a communications service and queried by MD 101, preferably queried upon setup of the first media session illustrated in FIG. 1a.

A CN software handover database 233 could also optionally include a type of call-control signal for MD 101 to transmit to CN 108 in order for CN 108 to properly conduct handover, according to the CN software version 234 associated with CN 108 (not shown). For example, if CN 108 is a SIP user agent, CN 108 could potentially conduct handover upon receipt of a different message or call-control signal 307 than a SIP Re-INVITE, such as a SIP REFER message, and other possibilities exist as well in both SIP and other protocols. Further, new messages may be added to various VoIP call-control protocols to support handover. MD 101 can select a preferred or efficient message or call-control signal (such as call-control signal 307 described in FIG. 3 below), according to the CN 108's CN software version 234.

The capabilities of a corresponding node may affect the selection of an efficient handover procedure, and a CN handover function 229 in FIG. 2f is illustrated according to five types, "restricted", "basic", and "standard", "advanced", and "no handover". The first three types may be identified by CN 108's response upon processing a call-control message such as a SIP re-INVITE with Session Description Protocol (SDP) information (or a similar request in another protocol) to signal MD 101 requests CN 108 to communicate with MD 101 at a new IP address. In general, a corresponding node may belong to the type "restricted" if (i) the corresponding node cannot transmit media (for the same call) to two different IP addresses, and (ii) the corresponding node utilizes a new IP:port number for transmitting and receiving media upon processing the call-control request. CN 108 may belong to the type "basic" if (i) the corresponding node can transmit media (for the same call) to two different IP addresses concurrently, and (ii) CN 108 utilizes a new IP:port number for transmitting and receiving media upon processing the call-control request.

CN 108 may belong to the type "standard" if (i) the corresponding node can transmit media (for the same call) to two different IP addresses concurrently, and (ii) CN 108 utilizes the same IP:port number for transmitting and receiving media both before and after processing the call-control request. CN 108 may belong to the type "advanced" if (i) the corresponding node can process a call-control signal inserted within a media stream, and (ii) also has the capabilities of the "standard" category. The benefits in terms of speed of conducting handover by inserting a call-control signal within a stream of media packets will be described in FIG. 3 and subsequent figures below. A corresponding node may preferably belong to the "advanced" type in order to conduct handover. Additional or other types or categories could be utilized in a CN handover function 229 without departing from the scope of the invention. As another example, the illustrated categories in FIG. 2f could be omitted, and different categories substituted such as "X", "Y", "Z", or other designations that allow corresponding nodes to be grouped into functionality or capability, wherein the groupings can be designed to assist a mobile device in selecting an efficient handover procedure.

If the capabilities of the corresponding node are unknown, such as if a user agent or software version (i) is not present during the setup of a first media session illustrated in FIG. 1a or (ii) the software version for CN 108 in FIG. 1a does not have an entry for a CN software version 234 in a CN software handover database 233, then the exemplary CN handover function 229 may be evaluated as the type "restricted" (i.e. conservatively assume CN 108 has restricted functionality in order to reduce the probability of errors or lost packets when MD 101 selects a handover procedure). A CN software version 234 may also be assigned a type or CN handover function 229 of "no handover", which could be the type for a CN 108 that cannot properly process a call-control signal to redirect an active media session to a new IP address (i.e. to AN 117). In this case, if CN 108 has the type "no handover" or a similar designation, then MD 101 may prefer to not conduct handover and can bypass remaining steps herein to conduct handover. MD 101 could take other steps such as increasing transmit power levels or channel coding in order to attempt to maintain quality of a first media session, if CN 108 has a type "no handover" or similar designation.

FIG. 2g

FIG. 2g is a simplified tabular summary of a handover procedure rules, including a set of handover parameters, to select a handover procedure, in accordance with exemplary embodiments. As described in FIG. 2d, a network handover rules 225 can specify a class of handover procedures such as "Relay", such as if AN FW 119 functions as a symmetric NAT router and CN FW 130 functions as a port-restricted cone NAT router. Handover procedures within the class could consist of "Relay A", "Relay B", or similar variations. Although handover procedure rules 227 illustrates the selection of a handover procedure within the class "Relay", a handover procedure rules 227 can also select any handover procedure.

Handover procedures such as "relay", "A", "B", etc, possibly representing a class of handover procedures, can consist of a series of steps such as a mobile device (i) acquiring an new IP address, (ii) obtaining an external IP:port number on AN FW 119 via a probing packet (in the case of identified handover procedures "B" and "C" in FIG. 2d), (iii) transmitting a call-control signal, and/or (iv) transmitting a new media stream from the new IP address, and also additional steps to conduct handover. An efficient sequence or timing of steps, as well as adjustments to the steps, can be variable according to parameters in addition to a firewall type. In order to efficiently select a handover procedure accounting for these parameters, possibly in addition to a firewall type, a mobile device or a communications service can access a handover procedure rules 227. In other words, a handover procedure rules 227 can increase the efficiency of a handover, by including data in addition to, or possibly instead of, a firewall type when selecting a handover procedure 232. The data for selecting a handover procedure could be included within a set of handover parameters 228. A set of handover parameters 228 may also preferrably include a firewall type.

One variation of a handover procedure (e.g. "Relay A") within a class of handover procedures (e.g. "Relay") may be more efficient for conducting handover than a different variation within the class of handover procedures (e.g. "Relay B"), depending on the conditions recorded in a set of handover parameters 228. A handover procedure rules 227 illustrated in FIG. 2g can specify a handover procedure according to set of handover parameters 228 that may include a type of firewall for AN FW 119 and/or CN FW 130 although FIG. 2g illustrates handover parameters 228 with only a type for CN FW 130. For the exemplary handover procedure rules 227, an efficient handover procedure 232 can be selected by including data regarding (i) the capabilities of the corresponding node, (ii) a calculated time handover time, and also (iii) a firewall type for CN FW 130. A set of handover parameters 228 can include additional data useful for a MD 101 to select an efficient handover procedure, and further descriptions of additional exemplary data to include within a set of handover parameters 228 are described in FIG. 2j below. The language "set of handover parameters" may be considered equivalent to "handover parameters" as described herein.

A handover procedure "relay", such as the procedure illustrated in a network handover rules 225, may have several possible variations. The variations can depend on a different sequence of steps or different timing of steps, but a variation in a handover procedure can belong to a class of handover procedures since the primary steps could be taken for all handover procedures in the class. For example, all handover procedures which utilize a relay could belong to a "relay" class of handover procedures, and the class could be selected in a network handover rules 225. As a second example, the class of handover procedures "A", such as depicted and described in FIGS. 3-5 of U.S. patent application Ser. No.

12/120,940 (the contents of which are hereby incorporated by reference in their entirety), could represent the set of handover procedures where the corresponding node receives a media stream from the mobile device at AN 117 without requiring CN 108 to transmit a packet to AN FW 119. As a third example, the class of handover procedures "B", such as depicted and described in FIGS. 3-5 of U.S. patent application Ser. No. 12/163,472 (the contents of which are hereby incorporated by reference in their entirety), could represent the set of handover procedures where the corresponding node (i) receives a media stream from the mobile device at AN 117 only after CN 108 transmits a packet to AN FW 119 and (ii) CN FW 130 is not a symmetric NAT router (or similar router that does not maintain consistent internal and external port bindings for actively used ports).

Figure 10:
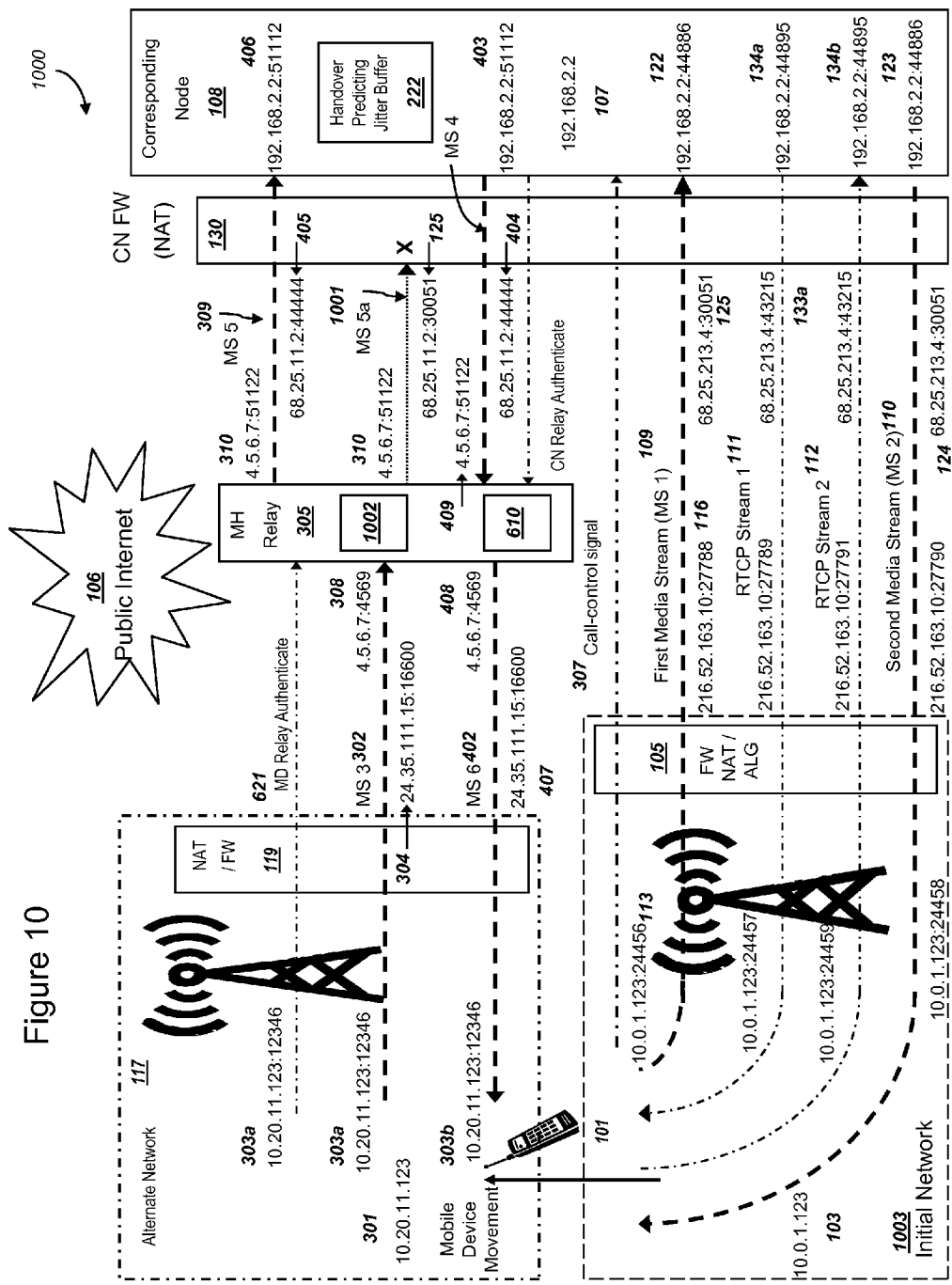
FIG. 10 is a graphical illustration of an exemplary system, where a mobile device utilizes a media handover relay to conduct handover of a media session, and where a transmit port on the external interface of a firewall associated with the corresponding node changes during handover, in accordance with exemplary embodiments.
Figure 11:
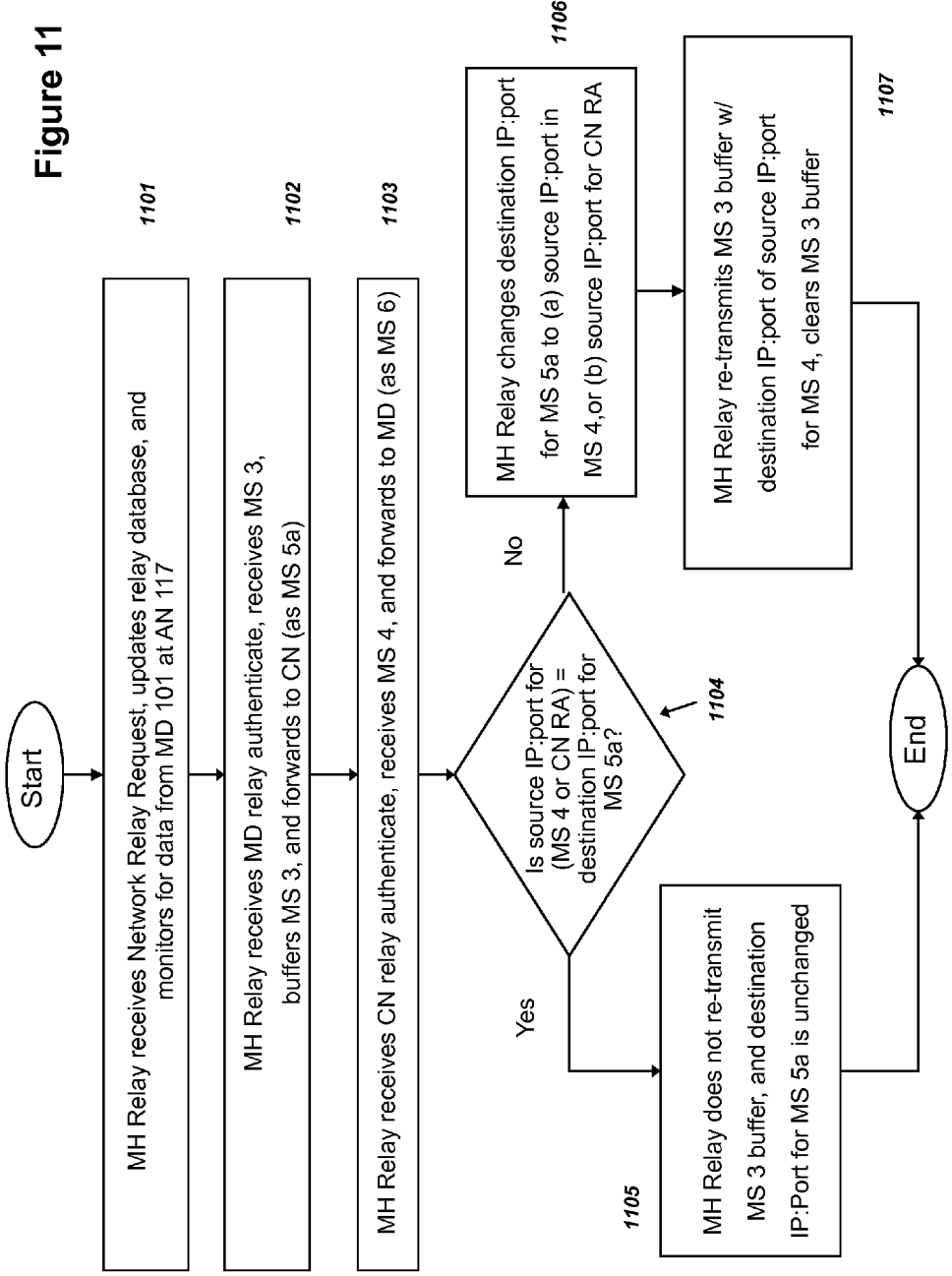
FIG. 11 is a simplified flowchart for exemplary handover procedures using a media handover relay, where a media handover relay estimates a destination port for media transmitted to a corresponding node, in accordance with exemplary embodiments.

As a fourth example, the class of handover procedures "C", such as depicted and described in FIGS. 9-11 of U.S. patent application Ser. No. 12/163,472 (the contents of which are hereby incorporated by reference in their entirety), could represent the set of handover procedures where the corresponding node (i) receives a media stream from the mobile device at AN 117 only after CN 108 transmits a packet to AN FW 119 and (ii) CN FW 130 is a symmetric NAT router. Although a handover procedure rules 227 is illustrated according to selecting a procedure in the class of handover procedures "relay", a handover procedure rules 227 may also be implemented for other classes of handover procedures such as "A", "B", "C" and "D". In addition, handover procedures such as "A", "B", "C" and "D" may represent a specific procedure. The above descriptions of possible classes of handover procedures are included herein for illustration and not for limitation. Other possibilities exist as well without departing from the scope of the present invention.

An efficient handover procedure 232, possibly belonging to a class of handover procedures, may be selected using a handover procedure rules 227 according to a set handover parameters 228. In addition, a handover procedure 232 is not required to belong to a class of handover procedures, and possibly could be uniquely implemented for a given set of handover parameters 228. Although a handover procedure rules 227 in FIG. 2g illustrates the selection of a handover procedure 232 within the class "relay", a handover procedure rules 227 can specify any handover procedure. Variations in a selected handover procedure 232 within a class "relay" are depicted in a network handover rules 227 in FIG. 2g in order to illustrate that exemplary handover procedures utilizing a relay described herein may be applied according to changes in a set of network parameters 228.

A handover procedure rules 227 can select a handover procedure 232 according to a set of handover parameters 228. A handover procedure 232 can specify the steps a mobile device can perform (possibly in conjunction with corresponding node and/or other servers such as a media handover relay) in order to efficiently or functionally conduct a handover, given conditions that may affect handover (i.e. a firewall type, time to handover, corresponding node capabilities, and additional variables are possible as well), which can be represented as handover parameters 228. The present invention includes several exemplary embodiments of handover procedures that can utilize a relay, including "Relay A" through "Relay D". The handover procedure "Wait" can indicate that MD 101 may preferably wait until initiating handover procedures, and could subsequently select a handover procedure at a later time, such as 200 ms or 1000 ms later as two exemplary values. Alternatively, a handover procedure could also be associated with "Wait", such that MD 101 can begin the handover procedure after waiting a period of time (i.e. a handover procedure rules 227 would only need to be queried once). One example of why MD 101 may prefer to wait is (i) if the corresponding node has "restricted functionality" where CN 108 cannot transmit two media streams concurrently, and (ii) if MD 101 is not prepared to receive media from AN 117 (such as not having an IP address at AN 117). In this case, the start of handover may preferably be delayed in order to minimize the potential loss of media packets during handover. The potential condition where CN 108 has "restricted functionality", and an appropriate handover procedure, is further described in FIG. 15 and FIG. 16 below, also associated with handover procedure "Relay D".

Exemplary "relay" handover procedures for a selected handover procedure 232 are depicted and described in various figures within the present invention. Handover procedure "Relay A" can be depicted and described in FIGS. 3-5 of the present invention, "Relay B" can be depicted and described in FIGS. 10-11, "Relay C" can be depicted and described in FIGS. 12-14, and "Relay D" can be depicted and described in FIGS. 15-16. FIG. 2g is illustrated to demonstrate the benefits of increased efficiency when selecting a handover procedure 232 from several possible variations of handover procedures using handover procedure rules 227. The efficiency of a selected handover procedure 232 may be higher compared to utilizing the same or equivalent handover procedure in all circumstances. Different allocations of the exemplary handover procedures 232 to a given set of handover parameters 228 than those illustrated in FIG. 2g are possible. Further, entirely different handover procedures or handover parameters may be utilized in order to obtain the benefits of a handover procedure rules 227. A handover procedure which minimizes packet loss and/or distortion of media played out for an end user can be one measure of the efficiency of a handover procedure.

Although a handover procedure rules 227 is illustrated in FIG. 2g according to a tabular summary in order to select a handover procedure 232, a handover procedure rules 227 may also be implemented as a function or calculation, where data from a set of handover parameters 228 is input into the function or calculation and a selected handover procedure 232 is output from the function or calculation. The various handover procedures that could be selected within a handover procedure rules 227 could also represent software subroutines or modules. The correct software subroutine or module to select (or branch to within a larger software program such as a software program 204) could be determined by performing calculations using handover parameters 228. Additional variations of a handover procedure rules 227 are possible, without departing from the scope of the present invention.

A set of handover parameters 228 can include data input into the selection of a handover procedure, where the data is preferably both relevant for handover and also generally available to MD 101, or a communications service 214 associated with MD 101. In the exemplary handover procedure rules 227 illustrated in FIG. 2g, a set of handover parameters 228 can include (i) a corresponding node handover function 229, (ii) a handover time 230, and (iii) a corresponding node firewall type 231. Additional or different data in a set of handover parameters 228 may be included as well. Although handover parameters 228 are illustrated in FIG. 2g according to grouped values (i.e. "t<=1 sec" for an entry in handover time 230), essentially continuous values may be also be implemented, such as number of milliseconds until a calculated or estimated start of handover.

A set of handover parameters 228 can include a handover time 230. A handover procedure 232 selected by a handover procedure rules 227 may have different variations in the timing of steps to conduct handover, and a selected handover procedure 232 may also depend upon a calculated time until MD 101 can begin transmitting and receiving packets at AN 117, which may also be the time at which MD 101 is assigned an IP address at AN 117. Consequently, after observing AN 117 at a physical interface 201*a*, an optimal, or at least highly efficient, handover procedure may based, in part, on a time variable, "time t". Time t in a handover time 230 within a handover procedure rules 227 is depicted as categorized into "immediate (t<=1)" seconds, "soon (1<t<5)" seconds, and "projected (t>=5" seconds. Other categories of time intervals, or decision rules to select a handover procedure based upon time t are possible as well, without departing from the scope of the present invention. In addition, if handover procedure rules 227 are implemented via a function, as opposed to the depicted tabular form in FIG. 2*g*, to select a handover procedure 232, then an essentially continuous value for time t (such as milliseconds, as one example) could be input into the function to select a handover procedure 232. A time t variable, or possible data within a handover time 230, could take many formats, and one purpose of a handover time 230 as depicted in FIG. 2*g* is to illustrate the selection of an efficient handover procedure can depend on time.

If MD 101 has not acquired an IP address at AN 117, time t could represent an estimated or calculated time remaining until MD 101 can acquire an IP address and begin transmitting and receiving packets through AN 117. Time t can initially represent the time required between (i) when a mobile device transmits a signal to a candidate AN 117 on a physical interface 201*a* and (ii) when the mobile device is projected to complete steps to connect to AN 117 (such as authentication, DHCP, and/or similar steps). Before connecting to AN 117, MD 101 can (i) observe an identity token 224*c* for AN 117 such as a SSID or a CGI, and (ii) qualify that AN 117 is viable for handover, such as ensuring physical or data-link layer quality parameters are sufficient. Upon observing a qualified AN 117, could access a LAN profile 226 to obtain a connection setup delay 224*h* value as an estimate of the time required to connect. A LAN profile 226 could also contain a value for variation in setup delay, such as a standard deviation of connection setup delay 224*h* (not shown). MD 101 may calculate an initial value for time t based upon the recorded connection setup delay 224*h* for the network 224*a* associated with identity token 224*c*. For example, an initial value for time t could be the connection setup delay 224*h* plus two standard deviations (if variation is also recorded in a LAN profile 226), and other calculations for an initial estimate of time t are possible as well. After MD 101 observes (i) a viable AN 117 and (ii) time t is initially estimated, time t can be periodically updated (e.g. decreased) until a handover procedure 232 has been selected.

If MD 101 has already acquired an IP address at AN 117, time t could represent the time remaining until handover is preferred. As depicted and described in FIG. 15 of U.S. patent application Ser. No. 12/163,472 (the contents of which are hereby incorporated by reference in their entirety), a mobile device can monitor the quality of an initial network where a media session with CN 108 could be established, which could be through MN 102, and also measure the quality of an alternate network. As described in Step 1504 of FIG. 15 of U.S. patent application Ser. No. 12/163,472 (the contents of which are hereby incorporated by reference in their entirety), a mobile device can (i) extrapolate the trends in performance of the two networks and (ii) can predict AN 117 will be preferred in the future based on the trends in quality. The point at which AN 117 may be predicted to be preferred can also be the calculated time t. After time t is initially calculated, time t could also be periodically updated, such as decreased as time transpires, or adjusted based on changes in extrapolated values or trends for quality of the initial network and/or alternate network.

Time t may be utilized to select an efficient handover procedure 232, because an efficient handover procedure may depend on the time remaining until handover, as illustrated in FIG. 2*g*. For example, CN FW 130 could be of the port-restricted cone type, CN 108's software version could be the "basic" type, and an exemplary value of six seconds could remain (i.e. time t>5 sec.) until handover is predicted to be preferred. In this case, a handover time 230 could be "projected", and as described in the two previous paragraphs, time t with a value of more than five seconds could be (i) the calculated time remaining to acquire a new IP address and/or ability to transmit packets with the public Internet 106 or (ii) when the extrapolated trends in quality predict AN 117 may be preferred. In this example, an optimal, or at least highly efficient, handover procedure could be "Relay C", as designated in FIG. 2*g*. An exemplary handover procedure for "Relay C" is described in FIGS. 12-14 below. However, for this same example of selecting an efficient handover procedure 232, if an exemplary value of less than one second remains until handover is predicted to be preferred, then handover procedure "Relay B" may be preferred (instead of "Relay C", which could have been preferred if there was more time remaining).

Continuing with an analysis of the exemplary selection of an efficient handover procedure 232 described in the above paragraph, "Relay B" could be preferred for multiple reasons with limited time (e.g. t<1 seconds) until handover, possibly including (i) reducing the probability that media packets transmitted from CN 108 could be dropped under the constraints of limited time (e.g. t<1) to conduct handover, or (ii) reducing the probability that media packets transmitted from MD 101 at MN 102 and/or AN 117 could be dropped, or (iii) a preference for media handover relay 305 to receive media from MD 101 before CN 108 for security purposes. Other reasons for a handover procedure "Relay B" to be more efficient given the conditions (e.g. data within a set of handover parameters 228) are possible as well. Likewise, "Relay C" could be preferred for multiple reasons with greater time (e.g. t>=5 seconds) until handover, possibly including (i) CN 108 can more quickly transmit media to a relay while MD 101 completes steps to connect with AN 117, and (ii) reduced probability of dropping media packets either before or after MD 101 transmits a call-control signal to signal CN 108 to begin transmitting a new media stream, and (iii) the processing of a call-control signal by CN 108 may not interfere with a first media session illustrated in FIG. 1*a*. Other reasons for a handover procedure "Relay C" to be more efficient given the conditions (e.g. data within a set of handover parameters 228) are possible as well. Note the capabilities of CN 108, represented by CN handover function 229 in conjunction with a handover time 230 and a CN FW 130 type can affect the selection of an efficient handover procedure 232.

As another example where time t may affect the selection an efficient handover procedure 232, CN 108 may be evaluated to have "restricted" functionality. As described previously, "restricted" functionality can indicate that CN 108 does not have the capability to transmit two media streams (for the same call) concurrently. In this case where time t equals six seconds and CN FW 130 is a port-restricted cone NAT router, and as illustrated in an exemplary handover procedure rules 227 illustrated in FIG. 2*g*, MD 101 may prefer to wait until initiating handover, and the initiation of handover in this case could be the transmission of a call-control signal to signal CN 108 to begin transmitting media to and receiving media from a new IP address. One reason waiting may be preferred could be that MD 101 may not be able to transmit and receive packets from AN 117 at the point in time (or for a remaining estimated time t) when a handover procedure rules 227 is evaluated. If MD 101 selected an exemplary handover procedure 232 such as "Relay A" instead of "Wait", and MD 101 begins executing steps to conduct handover such as transmitting a call-control signal to CN 108, a higher number of media packets transmitted from CN 108 could be dropped during the handover, since MD 101 may not be able to receive packets until an estimated remaining time t. In this example where CN 108 has restricted functionality given the exemplary set of handover parameters 228, MD 101 may prefer to wait until selecting a handover procedure 232 and also initiating handover.

If "Wait" is selected in a handover procedure rules 227, or similarly a handover procedure 232 is not selected or calculated to be unspecified or uncertain, MD 101 may subsequently periodically query a handover procedure rules 227 in order to later select a handover procedure. Similarly, MD 101 could perform a calculation to select a handover procedure 232 given a set of handover parameters 228, and if a handover procedure 232 is not selected (e.g. output from the calculation), then MD 101 could subsequently perform a second calculation at a later time to select a handover procedure 232. MD 101 can also periodically perform a calculation, such as evaluating a handover procedure rules 227, until a handover procedure 232 is selected. Although not illustrated in FIG. 2g, but illustrated in FIG. 2i below, data within a set of handover parameters 228, in addition to handover time 230, could vary as a function of time t, and consequently an efficient handover procedure 232 for a given set of handover parameters 228 could also vary with time t. A relatively current (or most recently calculated) time t could be utilized in order to evaluate a handover time 230, and time t could be updated before MD 101 evaluates a handover procedure rules 227.

Time t is described above as possibly being (i) the estimated or calculated time remaining before MD 101 can begin transmitting or receiving packets at AN 117 (such as the estimated time remaining before acquiring an IP address, if MD 101 is not already connected to AN 117), or (ii) a projected time in the future where AN 117 may be preferred for communication based on trends in network quality (which can be after MD 101 may transmit and receive packets at AN 117). Time t can also be a calculated or estimated time remaining until (i) a time at which MD 101 transmits a call-control signal to signal CN 108 to begin transmitting a new media stream (such as call-control signal 307 described in FIG. 3 below), (ii) a time for the start of transmission of a new media stream by MD 101 at AN 117 (such as a third media stream MS 302 described in FIG. 3 below), (iii) a time for the receipt of a STUN response 219, (iv) a time for the transmission of a MD 101 authentication request with a relay (which could be a MD relay authenticate 621 message described in FIG. 6 below), and other similar measures of time t are possible as well without departing from the scope of the present invention. Further, MD 101 could calculate multiple, different values for time t, such as a first time t for the estimated time remaining until a STUN response 219 is received and a second time t for the estimated time remaining until MD 101 transmits a call-control signal. Thus, a plurality of values for time t could be included in the selection of a handover procedure 232 using a handover procedure rules 227.

A handover procedure rules 227 could be stored within memory on the mobile device, accessed via a software program 204 or operating system 203, or downloaded by the mobile device from a server. A set of handover procedure rules 227 could also be logically programmed into software operating on MD 101 or a computer communicating with MD 101, such as a server on a communications service 214 assisting MD 101 with handover. MD 101 could also query a server, and the server could select a handover procedure 232 from a handover procedure rules 227, and the server could subsequently provide a response to MD 101 with a selected handover procedure 232.

Note that the selection of a handover procedure 232 from a handover procedure rules 227 can be made either (i) independently from or (ii) in conjunction with a calculation or evaluation to determine if handover is preferred. MD 101 could also select a handover procedure 232 either before or after handover is evaluated to be preferred. For example time t could be initially estimated as a time in the future when handover is predicted to be preferred, such as an exemplary 5 seconds into the future, but it could be possible that a change in network quality at AN 117 or MN 102 in the interim exemplary 5 seconds results in handover not being preferred, and subsequently MD 101 may not conduct a selected handover procedure 232 at that time. In addition, the selection of a handover procedure 232 could be performed in conjunction with a calculation to either (i) start handover (i.e. starting the steps within a handover procedure 232 as soon as it is selected) or (ii) evaluate if handover is preferred, since an exemplary handover procedure 232 can be to "wait". In addition, a handover procedure "None" could be selected, if a handover procedure rules 227 calculates that handover may not be possible, given data within a set of handover parameters 228, such as if a CN handover function 229 has a value of "no handover" or other similar possible restrictions that may prevent handover.

FIG. 2h

FIG. 2h is a simplified tabular summary of a handover procedure rules, including a set of handover parameters, to select a handover procedure, in accordance with exemplary embodiments. Other variations of a set of handover parameters 228 are possible within a handover procedure rules 227 than those illustrated in FIG. 2g in order to efficiently select a handover procedure 232. Although the exemplary handover procedure rules 227 illustrated in FIG. 2g include a handover time 230, a handover time 230 may optionally be omitted, and the selection of a handover procedure 232 could be performed according to a CN FW 130 type and also a CN handover function 229, according to one embodiment. Alternatively, a set of handover parameters 228 may include a handover time 230 and a firewall type for CN FW 130, but exclude CN handover function 229, and this embodiment is illustrated for the handover procedure rules in FIG. 2h. For example, a set of efficient handover procedures could be developed and programmed to be independent (or largely independent) of the capabilities of corresponding nodes, as shown in FIG. 2h. The exemplary handover procedures in FIG. 2h are "Relay W" through "Relay Z", which may belong to a "relay" class of handover procedures through the use of a relay to conduct handover. The exemplary handover procedures "Relay W" through "Relay Z" may be different than "Relay A" through "Relay D" illustrated in FIG. 2g above.

Other variations of a handover procedure rules 227 than those illustrated in FIG. 2g and FIG. 2h are possible as well, and the allocation of handover procedures 232 to different variations of a set of handover parameters 228 is illustrative of the benefits of using a handover procedure rules 227 in order to select an efficient handover procedure 232. Further, although both FIG. 2g and FIG. 2h illustrate handover procedures that utilize a relay (e.g. belong to a relay class of handover procedures), handover procedure rules 227 may also be utilized to select any handover procedure, including those that do not belong to the relay class. Handover procedures which do not belong to the relay class could belong to a class consisting of handover procedures "A", "B", "C", and "D" as described above, and other variations of either handover procedures or classes of handover procedures are possible as well.

FIG. 2*i*

FIG. 2*i* is a simplified tabular summary of a handover procedure rules, including a set of handover parameters, to select a handover procedure, in accordance with exemplary embodiments. As described in FIG. 2*g* above, a handover procedure rules 227 can select a handover procedure 232 using data input through a set of handover parameters 228. FIG. 2*g* depicted a set of handover parameters 228 with 3 variables: CN handover function 229, handover time 230, and CN FW type 231, and the variables were also illustrated as primarily discrete (e.g. "immediate" for time, or a type for a CN handover function 229 and firewall type). As illustrated in FIG. 2*i*, a set of handover parameters 228 can have more than three variables, and some variables could be essentially continuous, while other variables can be discrete. Further, some variables can be functions of time (or at least expected to vary with time), in addition to time t 241. Variables that can depend on time within a handover procedure rules 227 could be updated or measured before MD 101 or a communication service 214 evaluates a handover procedure rules 227 to select a handover procedure 232.

Although a handover procedure rules 227 in FIG. 2*i* is illustrated according to a tabular summary, handover procedure rules 227 could be implemented in software as a function or calculation, where the data within a set of handover parameters 228 is input into the function or calculation, and a selected handover procedure 232 is output from the function or calculation. If the handover procedure "Wait" is selected for a first calculation, or otherwise a handover procedure 232 cannot be determined or selected given the handover parameters 228, MD 101 could (i) wait a period of time, such as an exemplary 250 ms although other intervals are possible, (ii) obtain new data for a set of handover parameters 228 (for those which may vary with time, such as a SNRs), and then (iii) evaluate a handover procedure rules 227 in a second calculation.

Handover procedure rules 227 is illustrated with multiple variables within a set of handover parameters 228 in FIG. 2*i*. The multiple exemplary variables can demonstrate the selection of a handover procedure 232 may depend on handover parameters in addition to a type of firewall for AN FW 119 and/or CN FW 130, which is illustrated in a network handover rules 225. Note that if information pertaining to the function of a firewall is not available (such as STUN procedures have not been complete, or no entry is available within a LAN profile 226), then the firewall type can be "unknown", as also illustrated in a network handover rules 225 in FIG. 2*d*. Variables or data within a set of handover parameters 228 can include a quality of first media session 234, an initial network SNR (IN SNR) 235 (which could be associated with MN 102), an initial network SNR (IN SNR) trend 236, an alternate network (AN) SNR 237, and alternate network (AN) SNR trend 238, mobile device battery life remaining 239, a CN handover function 229, time t 241, AN network quality 224*i*, an AN FW type 242, and a CN FW type 231. Although not shown, handover parameters could also include a value for a reference power level transmitted by either the MN 102 or AN 117. Other variables or data within a set of handover parameters 228 could be included as well, and some may be omitted.

The exemplary variables within a set of handover parameters 228 are included herein for illustration and not for limitation. Note that use of handover procedure rules such as handover procedure rules 227 are not required in order to achieve the benefits of using a LAN profile such as LAN profile 226, nor is use of a LAN profile required in order to achieve the benefits of using handover procedure rules. Significant benefits may be achieved, however, from use of both in combination.

A quality of first media session 234 can represent the quality of media transmitted and received with CN 108 via a first media session such as an exemplary media session illustrated in FIG. 1*a*, and optionally two separate values could be utilized, that is one measure of quality in each of the transmit and receive directions. Data from a media-control channel such as RTCP Stream 1 111 could be utilized to calculate quality of first media session 234. Quality of first media session 234 is depicted according to an estimated mean opinion score, but other measures of quality are possible as well. A quality of first media session 234 can affect a selected handover procedure, since if the quality is high, MD 101 may be more likely to wait, or if the quality is low then MD 101 may be more likely to select a handover procedure 232, even if the selected handover procedure could result in some lost media packets during handover. Note that quality of first media session 234 represents an "end-to-end" measure of quality including both channel coding and signal coding, whereas other measures of quality depicted in FIG. 2*i* may represent a local data-link quality (such as SNR) in IN SNR 235, or a network level quality (i.e. packet loss and/or delay) in network quality 224*i*. Although not shown in FIG. 2*i*, a set of handover parameters 228 could also include a variable or measure for a trend in the end-to-end quality between MD 101 and CN 108 in the first media session (such as change in MOS vs. time), and also optionally a trend in quality for each direction (i.e. transmit and receive).

An initial network SNR 235 can represent a measure for the signal-to-noise ratio measured to base station 104 in MN 102, and initial network SNR trend 236 could be an observed trend in the SNR. Even though a software program 204 may generally operate at the application layer of the OSI stack, software program 204 which conducts a media session with CN 108 could periodically query an operating system 203 or a device driver 202 in order to obtain measures and trends in SNRs through a physical interface 201*a*. SNR and trends in SNR may affect a selected handover procedure 232, since a projection of SNR may be used to estimate future time values such as (i) when packet loss or delay due to bit errors on an initial network may reach an unacceptable threshold and/or (ii) when the physical and data-link layers of an alternate network may be of acceptable quality. As one example, if the SNR on the initial network is low and falling sufficiently rapidly, a handover procedure rules may select a handover procedure without waiting, possibly including a handover procedure that is less optimal than if additional time would be available.

In another example as depicted and described in connection with FIG. 6 and FIG. 8 below, an exemplary first handover procedure 232 "Relay A-1" may optionally include a CN relay update request 619. Using an IN SNR 235 and IN SNR trend 236 for the initial network, a handover procedure rules 227 could select a first handover procedure 232 that includes an optional handover step, such as the transmission of an CN relay update request 619, if sufficient time is expected to be available based on IN SNR 235 and IN SNR trend 236. In contrast, a handover procedure rules 227 could select a second exemplary handover procedure 232 "Relay A-2" that excludes the optional handover step, if insufficient time is expected to be available based on IN SNR 235 and IN SNR trend 236. Other examples of the level and trends in SNR through the initial network affecting the selection of an efficient handover procedure 232 are possible as well, and the example above and depicted in FIG. 2i is intended to be illustrative.

A handover parameters 228 within a handover procedure rules 227 may also include a alternate network (AN) SNR 237 value as well as an AN SNR trend 238. MD 101 could acquire AN SNR 237 and AN SNR trend 238 using similar techniques similar to acquiring IN SNR 235 described above. AN SNR 237 and AN SNR trend 238 can provide input into a handover procedure rules 227 regarding the physical and data-link layer quality through the exemplary access point 118 (or equivalently a base station) associated with an alternate network. Network quality 224i could include network-level quality such as packet loss, bandwidth available, jitter, and/or delay, which may also describe quality measures through the public Internet 106 and above the local physical and/or data-link layers. AN SNR 237 and AN SNR trend 238 can be used to select an efficient level of channel coding (such as forward error correction) and source coding (such as codec) for the transmission of a call-control signal or a media stream through the alternate network, and settings for a preferred codec or level of channel coding could be included within a handover procedure 232.

AN SNR 237 and AN SNR trend 238 can be important for MD 101, possibly in conjunction with network quality 224i, to estimate the quality of a connection through AN 117 when MD 101 can expect to transmit and receive packets through AN 117. The quality of the connection through AN 117 can be used to select an efficient handover procedure. For example, if the quality through AN 117 is expected to initially be poor upon acquiring an IP address at AN 117, a handover procedure rules 227 could output the exemplary value "wait", and a handover procedure rules 227 at a later point in time could select a handover procedure 232 to conduct handover. Alternatively, if the quality with the initial network is sufficiently poor or decreasing sufficiently rapidly, a handover procedure rules 227 could select a handover procedure that utilizes a media handover relay, wherein the media handover relay transmits media received from CN 108 with forward error correction in order to compensate for the expected initial poor quality at AN 117 upon MD 101's acquisition of an IP address. Thus, AN SNR 237 and AN SNR trend 238, in conjunction with other handover parameters 228, can be utilized by a handover procedure rules 227 to select an efficient procedure 232.

A set of handover parameters 228 may also include an estimate of remaining energy available for a mobile device, illustrated in the form of MD battery life remaining 239. Other measures of mobile device energy resources available or energy consumption trends are possible as well, such as recording the expected energy available in joules. If the battery life remaining is low then transmitting with a lower bandwidth codec upon handover may be preferred, and other examples of power or energy available affecting the selection of an efficient handover procedures are possible, in conjunction with other handover parameters 228. As one example, the capabilities of a corresponding node to change codec upon handover may be included in a corresponding node handover function 229. If the corresponding node can support a change in codec upon handover, (such as a lower bandwidth codec preferred by MD 101 possibly due to a low value for MD battery life remaining 239), then a first handover procedure 232 may be preferred, illustrated as the selected handover procedure "A-1" within FIG. 2i. If the corresponding node cannot support a change in codec upon handover, such as having a "basic" CN handover function 229, then a second handover procedure 232 may be preferred, illustrated as the selected handover procedure "A-2" within FIG. 2i. A handover procedure 232 can specify a codec selection and also possibly a level of forward error correction upon handover, and thus the selection of an efficient handover procedure 232 may depend upon the MD battery life remaining 239, possibly in conjunction with other variables in a set of handover parameters 228.

Although not illustrated in FIG. 2i, a handover parameters 228 could also optionally include values for energy used to transmit with the initial network and/or the alternate network. The values for energy used could be either measured or calculated. As one example, MD 101 could record in a handover parameters 228 that communicating with an initial network consumes an exemplary average of 200 mW, while communicating with an alternate network may be calculated to consume an exemplary average of 50 mW. In addition, a MD battery life remaining 239 could be formatted according to a measure of remaining energy available, such as milliamp-hours remaining Such power consumption and energy available data within a set of handover parameters 228 can be useful for a handover procedure rules 227 to select a handover procedure 232.

As described in FIG. 2g above, a corresponding node handover function 229 can also affect the selection of an efficient handover procedure, particularly in association with a time t, and time t may represent the time remaining until MD 101 can acquire an IP address at AN 117, as one example. Time t was also described in FIG. 2g, and depicted in FIG. 2g as a categorized value, but could also be input into a handover procedure rules 227 as a relatively continuous value as shown in FIG. 2i. By including a CN handover function 229 and a time t 241 within a set of handover parameters 228, possibly including the additional variables shown in FIG. 2i, a more efficient handover procedure 232 can be selected, since additional variables in conjunction with CN handover function 229 and time t can affect the quality of media and speed of conducting steps during a handover. The exemplary selected handover procedures 232 "Relay B" and "Relay C" illustrated in FIG. 2j can demonstrate that an efficient handover procedure may depend primarily on the time remaining until handover for a given set of values within a handover parameters 228. Network quality 224i was depicted and described in a LAN profile 226, representing network-layer quality such as bandwidth available, packet loss, jitter, and/or delay for packets transmitted and received with the Public Internet 106 and is illustrated as an aggregate value. An AN 117 may be highly preferred for handover due to physical and data-link quality characteristics on a local wireless connection, for example, but network quality 224i could be sufficiently poor, such as the example of "0.0" in for the exemplary network 224a "Home LAN" in a LAN profile 226 illustrated in FIG. 2e. In this case of AN 117 providing a high quality connection at the physical or data-link layer, but poor quality for packet routing through the public Internet 106 (including possibly all packets being dropped), the selected handover procedure 232 in a handover procedure rules 227 could be "no handover", as illustrated in FIG. 2i.

AN FW type 242 and CN FW type 231 can correspond to a firewall type for AN FW 119 and CN FW 130, respectively, and are depicted and described in association with FIG. 2d, FIG. 2e, and elsewhere herein. Also, as described previously, AN FW type 242 and CN FW type 231 may likely affect the selection of an efficient handover procedure 232. Further, a firewall type, such as a type for CN FW 130, can affect the selection of a handover procedure 232 in conjunction with other variables in a set of handover parameters 228, as illustrated in FIG. 2g through 2i. If data to categorize a firewall type is not available, the firewall type can be included in a set of handover parameters as "unknown", and a handover selection rules 227 can also be calculated with the "unknown" value for a firewall type. As illustrated in FIG. 2d, the selected handover procedure with a firewall type "unknown" could belong to a "relay" class. A variation of procedures within the class, such as a specific handover procedure 232 such as "Relay A", "Relay B", etc. could also be selected by a handover procedure rules 227 with a firewall type as "unknown".

Similarly, and also as illustrated in FIG. 2d, if data to categorize a firewall type is available, but the firewall does not conform to a standard or defined type within a AN FW type 242 or a CN FW type 231, the firewall type could be denoted as "other", and a handover procedure rules 227 subsequently calculated, as illustrated in the selected handover procedure 232 "Relay D" in FIG. 2i. A new type of firewall, such as a firewall type "Q" could be added to the current standard types described in FIG. 2d, possibly to account for the specific functions of a firewall with an "other" type. A communications service 214 managing or configuring the software program 204 could revised or modify a handover procedures 227 in order to select an efficient handover procedure 232 according to the new firewall type "Q", possibly in conjunction with additional variables in a set of handover parameters 228. In addition, a new or different handover procedure 232, in addition to the handover procedures using a media handover relay illustrated herein, and the selected handover procedure 232 in this case of a firewall type "Q", could be the exemplary handover procedure "Relay XX" as illustrated in FIG. 2i.

Note that network handover rules 225 can be a subset of handover procedure rules 227. In other words if data in addition to AN FW 119 and/or CN FW 130 firewall types are considered in the selection of an efficient handover procedure (such as the illustrated variables within a set of handover parameters 228 in FIGS. 2g, 2h, and 2i), then a handover procedure rules 227 may be utilized. If no handover parameters 228 are available or included in a handover procedure rules 227, other than a type or types of firewall, then a network handover rules 225 may be utilized to select a handover procedure 232. In this case, without using data in addition to at least a firewall type, handover procedure rules 227 and network handover rules may be considered functionally equivalent. Thus, a network handover rules 225 may be considered a subset of a handover procedure rules 227. In addition, other variables than those depicted in FIG. 2i could be included in a set handover parameters 228 and also some depicted variables may be omitted without departing from the scope of the present invention.

The output of a handover procedure rules 227 could be steps within a handover procedure, as opposed to a complete handover procedure 232. In other words, a handover procedure rules 227 does not have to select either (i) a complete handover procedure or (ii) "wait" (or similar delays), but rather could select (i) a step or (ii) a group of steps to conduct handover. If a handover procedure rules does not select a handover procedure with one query or calculation, a handover procedure rules 227 could be queried or calculated multiple times, and separate queries or calculations could provide a separate step or group of steps for a mobile device to conduct handover. However, an aggregate result of querying a handover procedure rules 227 multiple times for separate steps may be to either (i) select a handover procedure or (ii) similarly, conduct a handover using the steps. The selected handover procedure 233 in this case can be viewed as the aggregate of the separate steps, and the selected handover procedure 232 can be determined by observing the steps a MD 101, a CN 108, and/or supporting servers may utilize to complete a handover from an initial network, such as the exemplary MN 102, to an alternate network. Similarly, a handover procedure rules 227 could select steps within a handover procedure 232 where only media transmitted in one direction is handed over to an alternate network, while media transmitted in the other direction remains on the initial network, and other possibilities exist as well. In other words, the selection of a handover procedure 232 could be divided into steps, such that each media stream is separately handed over.

One potential benefit of multiple queries or calculations and selecting multiple steps is the aggregated handover procedure selected could potentially be more efficient, such as considering the conditions of a set handover parameters 228 or other variables between steps. If a handover procedure rules 227 is queried multiple times and selects individual handover steps, a handover procedure rules 227 may preferably be locally calculated with a mobile device (i.e. not calculated on a remote server). One reason may be that multiple queries may need to be evaluated relatively quickly (compared to the desired time of conducting a handover), and if MD 101 must communicate with a server, over possibly a noisy and deteriorating data link such as MN 102, then multiple queries to a remotely calculated handover procedure rules 227 may not be efficient.

A handover procedure rules 227 may also select a handover procedure after a mobile device is connected to an alternate network and also if the projected time to initiate handover is immediately (e.g. time t=0). As illustrated by the exemplary selected handover procedure 232 "D" within the handover procedure rules 227 in FIG. 2i, time t could be equal to zero and a handover procedure rules may also select a procedure. This could be the case if the quality of wireless networks are changing rapidly or if MD 101 can already transmit and receive packets through the alternate network, and other examples are possible as well.

FIG. 2j

FIG. 2j is a simplified flowchart for a mobile device to select a handover procedure using handover procedure rules, in accordance with exemplary embodiments. In FIG. 2j and other flow charts describing the present invention, the processes and operations of the handover method described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein. The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer-implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel with other steps without departing from the scope and spirit of the present invention. In some instances, certain steps can be deleted or not performed without departing from the invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 2j illustrates exemplary steps where MD 101 can utilize in conjunction (i) a LAN profile 226, (ii) a CN software handover database 233, and (iii) a handover procedure rules 227 in order to select an efficient handover procedure 232. At Step 251, MD 101 can establish a media session with CN 108, such as the exemplary media session depicted in FIG. 1a. Call-control messages could be passed through a call-control channel such as illustrated in FIG. 2b. Using the receipt of call-control messages, such the receipt of a SIP INVITE or an IAX2 NEW message (or equivalently a "proceeding" or similar message), at Step 252 MD 101 can preferably observe or acquire a software version of CN 108, representing a type of software program 209 operating at CN 108. The software version or user agent operating on CN 108 can be stored in memory on MD 101 as a CN software version 234. If MD 101 does not acquire CN software version 234 during setup of the first media session illustrated in FIG. 1a, MD 101 could transmit a query to CN 108, and CN 108 could respond with a CN software version 234 or possibly with its corresponding node handover function 229. If a CN software version 234 is not available, MD 101 could assign a value of "unknown" or "other" to CN software version 234 for CN 108.

At Step 253, MD 101 may observe an AN 117 through a physical interface 201a. MD 101 may also qualify AN 117 as a candidate network for a possible handover of the first media session, such that physical or data-link layer quality metrics are sufficient. Note that at Step 253, MD 101 may not have determined or evaluated that handover to AN 117 is preferred, but rather observed an AN 117 is available. Also at Step 253, MD 101 can obtain an identity token 224c for AN 117, such as a SSID for a WiFi network or a Cell Global Identification for a wireless wide area network or similar network identifiers. MD 101 could perform Step 253 before Step 251 and/or Step 252, or concurrently with Step 251 or Step 252.

At Step 254, MD 101 can access a LAN profile 226 in order to obtain data for the identified alternate network, and MD 101 may utilize the data in preparation for a potential handover. The LAN profile 226 could be stored locally with MD 101 or remotely with a communications service 214. MD 101 could also access a database of a plurality of LAN profiles 226 stored by communications service 214 to obtain information gathered from a different mobile device (such as if MD 101 had not visited AN 117 before). As described in FIG. 2e, a LAN profile 226 can preferably include data on a firewall type for AN 117, as well as other parameters such as media transport protocols and/or ports allowed. MD 101 could also verify that a previous authentication attempt with an AN 117 was successful within an "authentication successful" field within a LAN profile 226 (not shown). Data within a LAN profile 226 could be included in calculations to determine if handover is preferred. As one example, if a prior authentication failed or the network quality 224i is sufficiently poor, then an attempted handover can be avoided. If no entry is available either within either a local or remote LAN profile 226 (or a remote database of a plurality of LAN profiles), MD 101 could record the network parameters 224 for AN 117 such as a firewall type 242 as "unknown" or a similar value.

At Step 255, MD 101 can acquire a CN handover function 229 for CN software version 234, using a CN software handover database 233. As one example, if a version of the SIP protocol is implemented and MD 101 observes the user agent "RTC/2.0" within SIP messages, MD 101 could evaluate that CN 108 has "basic" handover capabilities, which MD 101 can subsequently utilize for selecting an efficient handover procedure. MD 101 can update data within a set of handover parameters 228 with data obtained from querying either a CN software handover database 233 or a LAN profile 226. Although illustrated as after Step 254, Step 255 could be performed before Step 253. In addition, a CN handover function 229 may optionally be omitted from a handover procedure rules 227, as illustrated in FIG. 2h, and in this case Step 255 may optionally be omitted.

At Step 256, MD 101 can calculate a value for time, which could be assigned a variable "t". Time t 241 could initially be the time estimated to be required to connect to AN 117, which could be connection setup delay 224h (plus possibly a factor to account for variation or a "safety" factor). Time t 241 could subsequently be updated if the process to select a handover procedure returns to Step 256 (i.e. the initial time t is reduced by the time transpired since the initial time t was calculated). MD 101 could also update values for handover parameters 228 at Step 256, such as calculating the current or most recent SNRs or other quality metrics or other variables within a set of handover parameters that may vary with time. As noted previously, quality metrics such as SNRs and SNR trends will likely vary with time as the quality of MD 101's connection to various networks changes, possibly due to movement. Updating the values for handover parameters 228 at Step 256 can assist with the selection of a handover procedure 232, since the data input into a handover procedure rules 227 can preferably be current, or at least as "fresh" as possible.

At Step 257, MD 101 can select a handover procedure 232 using a handover procedure rules 227, as described in FIGS. 2g, 2h, and 2i above. If a handover procedure is selected, MD 101 may then begin taking the steps to conduct handover as soon as feasible, and as one example, if handover procedure "Relay A" is selected then MD 101 could begin taking the steps illustrated in FIGS. 3-5 below possibly before an IP address at AN 117 can be acquired. At Step 258, if an exemplary handover procedure "wait" is selected, or otherwise the output of a handover procedure rules 227 is indeterminate, then MD 101 could wait for a specified period of time at Step 259, such as an exemplary 200 or 500 milliseconds. Note that the output of a handover procedure rules 227 could also specify the time interval to wait, such as the duration of "X" illustrated in FIG. 2j. If handover parameters 228 are changing relatively rapidly with time then X may be a smaller interval, such as an exemplary 100 ms, and if handover parameters 228 are changing relatively slowly with time, then X may be a larger interval, such as an exemplary 1000 ms. Also, as time t 241 becomes closer to zero and a handover procedure 232 has not been selected, then the time interval X may also be smaller. After waiting at Step 259, MD 101 can return to Step 256 and continue with the steps illustrated to select a handover procedure.

FIG. 3

Figure 3:
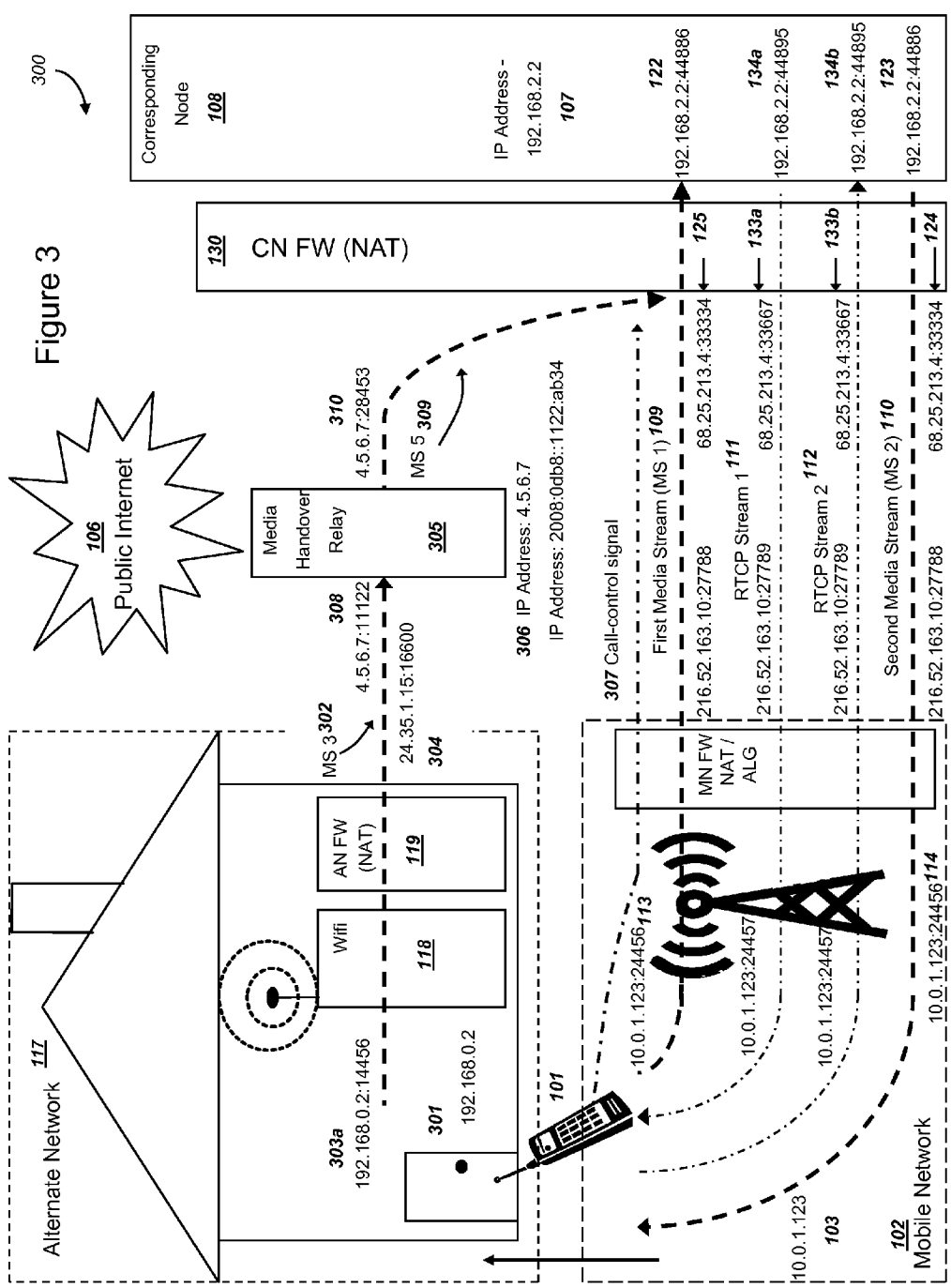
FIG. 3 is a graphical illustration of an exemplary system, where a mobile device acquires a second IP address associated with a firewall and begins transmitting media from the second IP address to a media handover relay during handover, in accordance with exemplary embodiments.

FIG. 3 is a graphical illustration of an exemplary system, where a mobile device acquires a second IP address associated with a firewall and begins transmitting media from the second IP address to a media handover relay during handover, in accordance with exemplary embodiments. Since MD 101 can be a mobile device operated by a user or subscriber that changes location, the subscriber may move within range of alternate network 117 that also provides Internet access (in addition to MN 102 providing Internet access), as illustrated by system 300 in FIG. 3.

In order to obtain connectivity to the Internet through the alternate network 117, the mobile device 101 can acquire an IP address 301 that is provided by a local area network within alternate network 117. Alternate network 117 could also be a wide area network, such as a mobile network from a different mobile operator that also provides Internet connectivity. Although IPv4 addresses are shown within AN 117, IPv6 or similar packet-switching addressing schemes could be implemented. IP address 301 may be acquired by various methods such as DHCP, and MD 101 should have sufficient computing power to associate with multiple IP addresses simultaneously. A software program 204 operating on MD 101 can observe that IP address 301 becomes available via periodic queries to an operating system 203 or a device driver 202, as examples.

IP address 301 can be considered assigned to MD 101 when a software program 204, operating system 203, or device driver 202 can send or receive packets using IP address 301. Under many scenarios, IP 103 and IP 301 can be available simultaneously to a software program 204 operating on MD 101, such as when MD 101 is within range of more than one network. The software program 204 may be a component of a communications service 214, such as a program downloaded and installed on MD 101. MD 101 may measure the quality of the two network connections, which can include measurements at the physical, data-link, and network levels. Quality can be measured according to several parameters, including power levels, signal-to-noise ratios, bit errors, packet loss, delay, and jitter. Quality may also be measured on both the uplink and downlink, for transmitting and receiving data.

MD 101 can include a software routine to determine that handover of the media session from IP 103 to IP 301 is preferred. A software routine operating within MD 101 may determine that IP 301 is preferred for communication due to a combination of increased signal-to-noise ratios, reduced packet loss, reduced bit errors, reduced power consumption, reduced delay, reduced jitter, reduced costs for bandwidth, increased stability of network quality, increased bandwidth available for communication, and/or one or more other network characteristics according to which AN 117 would provide a superior connection to that provided by MN 102. The software routine to determine handover may be operating in conjunction with software program 204, operating system 203, or device driver 202, among other possibilities, and may also function as a subroutine within a larger software program, and the software routine or subroutine could operate as a handover procedure rules 227. The software routine may also include logic or functions performed externally to MD 101, such as monitoring the quality of the network connection from a server or base station 104 within MN 102 or a server accessible through the public Internet 106. A software routine to evaluate that handover of the media session from IP 103 to IP 301 is preferred could also be calculated (i) on a server within a communications service 214 and/or (ii) separately from a software routine to select a handover procedure.

MD 101 (e.g. using a software routine that determines when handover is preferred, which could include a handover procedure rules 227) may also predict that IP 301 may become preferred for communication, based on monitoring and comparing the relative quality of communication through AN 117 and MN 102. For example, even though the network connection providing IP 301 may initially have a relatively weak signal compared to the network connection providing IP 103, with corresponding higher bit errors, higher packet loss, and/or greater delay on the network providing IP 301, MD 101 can monitor the network providing IP 301 as MD 101 approaches the example AN 117 illustrated as including a WiFi access point 118 in system 300. MD 101 could also calculate that handover is preferred before acquiring IP 301 (i.e. before completing steps such as authentication with AN 117 or DHCP), if physical or link-layer quality parameters provide sufficient quality, such as the SNR or bit errors within a beacon signal transmitted within AN 117. In this case, where MD 101 may calculate handover is preferred, MD 101 may preferably first verify a network quality 224i associated with an AN 117, possibly recorded in a LAN profile 226, meets or exceeds a threshold value. As described in FIG. 2d, data within a network quality 224i can include network-level (e.g. of the OSI stack) quality for data transmitted to and/or received from the public Internet 106. Note that this network-level quality may not be readily available to an MD 101 through means other than a LAN profile 226 if MD 101 has not yet acquired IP 301. If the network connection or IP connectivity between MD 101 and WiFi access point 118 improves at a sufficient rate, MD 101 may predict that IP 301 will become preferred over IP 103 and, consequently, MD 101 may initiate handover before communication via IP 301 is superior to IP 103, or possibly even before IP 301 is acquired. For example, MD 101 can transmit a call-control signal for CN 108 to begin taking steps to conduct handover before IP 301 is acquired (as described in FIGS. 12-14 below). Conversely, MD 101 may observe that communication through IP 103 is degrading at a sufficient rate that communication through IP 301 will likely become preferred, even though the quality of communication via IP 301 is relatively static or improving only slowly. Again, in this instance of degrading quality for communication via IP 103, MD 101 may calculate that IP 301 will become preferred and MD 101 may also initiate handover even though IP 103 is superior to IP 301 when MD 101 starts handover procedures. And other possibilities exist as well.

Further, a software program 204 operating on MD 101 or a communications service 214 could simply determine that establishing a duplicate media path via IP 301 may be desirable regardless of the trends in quality, due to the benefits of transmitting media through two independent and/or redundant communications channels, which can increase the quality received at the corresponding node and/or mobile device. Once MD 101 may calculate (i) that IP 301 is preferred for communication or (ii) AN 117 may become preferred for communication, or (iii) that establishing a second media channel via AN 117 is preferred, MD 101 could initiate handover procedures that will be both rapid and also reduce the probability that a user will notice gaps, delays, or distortion in the media during the handover process. Likewise, efficient handover procedures can reduce the impact on media received at CN 108. Further, MD 101 may also automatically establish a duplicate media path when the quality of the network through IP 301 has increased to reach minimum thresholds, or the performance of either MN 102 or AN 117 is greater or less than specified parameters. And many other handover triggers could be used instead or in addition, as some are included herein for illustration and not for limitation.

As stated, a duplicate media path can provide superior quality, and trends in quality may not be predictable. Thus, the techniques described in the present invention could be implemented for the purposes of rapidly establishing a duplicate media channel, with or without the intent of terminating the first media session, which includes MS 1 109 and MS 2 110. In addition, a handover could be preferred in order to obtain increased quality, reduced power, reduced interference, or other benefits from simply establishing a duplicate media channel through a IP network other than MN 102.

MD 101 or a communication service 214 managing MD 101 may determine that a handover is preferred due to the benefits of using AN 117. Upon evaluating than handover is preferred, MD 101 may calculate an efficient handover procedure in order to conduct the handover. MD 101 could acquire information regarding AN 117 and/or AN FW 130 through a LAN profile 226 or through probing AN FW 130 via techniques such as STUN. If sufficient information regarding AN FW 130 is not available at the time handover procedures are selected, the AN FW 130 type could be "unknown". Further, probing or analysis of AN FW 130 could be inconclusive, which could occur if AN FW 130 does not either (i) match standard patterns of function or (ii) match pre-determined firewall types, and AN FW 130 type could be "other". MD 101 could select a handover procedure according to a handover procedure rules 227, which could specify a handover procedure "Relay A" for many types of firewalls and network conditions, as illustrated in FIG. 2g. Alternatively, MD 101 or a communications service 214 managing a software program 204 operating on MD 101 could bypass a handover procedure rules 227 and consistently utilize the same handover procedure with a media handover relay upon handover, without considering the types of firewalls for AN FW 119 and/or CN FW 130. Consistently utilizing a media handover relay 305 for handover should be functional, but may not be preferred since a "relay" procedure could likely not be the most efficient handover procedure for all types of firewalls for AN FW 119 and/or CN FW 130. Less efficient handover procedures could increase the probability of delays, distortions, or gaps in the audio for a user at either the mobile device or the corresponding node, or both.

In order to select an efficient handover procedure in a handover procedure rules 227, which could utilize a media handover relay 305, MD 101 could acquire information regarding CN FW 130, such as its firewall type or functionality to classify CN FW 130 according to a firewall type in a set of handover parameters 228. MD 101 acquire information regarding CN FW 130 from many methods, including (i) conducting Interactive Connectivity Establishment (ICE) or similar procedures when establishing the first media session, (ii) observing if the IP addresses and ports within fields of received SIP and/or SDP messages match the actual ports used for media transmission in MS 2 110 or MS 1 109, and/or (iii) determining if the CN 108 user agent or software version belongs a media gateway or session border controllers, which would likely have public IP addresses. In addition, MD 101 will likely have a call-control channel—such as that illustrated in FIG. 2b—implemented in order to set up MS 1 109 and MS 2 110, and MD 101 could query CN 108 through the call-control channel, requesting that CN 108 provide an assessment of its NAT environment. MD 101 could also query CN 108 directly by inserting a non-media "FW query" packet within MS 1 and monitor for a response in a non-media "FW response" packet in MS 2, or send similar messages through a media-control channel such as RTCP Stream 1 111.

CN 108 may also have a LAN profile 226, if CN 108 is also a mobile device, and the network providing CN 108 the IP address 107 could have an entry in a LAN profile 226. CN 108 could provide MD 108 with a firewall type for CN FW 130 based upon an entry in a LAN profile 226 for the network associated with CN 108. In summary, there are many methods available for MD 101 to evaluate a firewall type for CN FW 130 and implement in a handover procedure rules 227. If no useful information regarding CN FW 130 is available or if CN FW 130 does not match a set of pre-determined types, a CN FW 130 type could be "unknown" or "other", respectively.

Although MD 101 may prefer to handover the first media session from MN 102 to AN 117, transmitting packets directly from MD 101 at IP 301 to CN 108 at IP 107 (or equivalently transmitting packets from MD 101 at IP 301 to a proper IP:port on the external interface of CN FW 130) may either (i) not be readily feasible or (ii) require additional and time-consuming steps due to the presence of either AN FW 119 or CN FW 130. For example, if firewalls AN FW 119 and CN FW 130 are both symmetric NAT routers as described in IETF RFC 3489, the direct transmission of UDP datagrams from IP 301 to IP 107 is generally not feasible without attempting to "guess" port numbers implemented on the external interface of a symmetric NAT router. Similarly, if (i) either one of AN FW 119 and CN FW 130 is a port-restricted cone NAT router and (ii) the other firewall is a symmetric NAT router, then routing packets directly between the nodes may again not be readily feasible due to the requirement to guess port numbers implemented on the symmetric NAT router. Firewalls AN FW 119 and CN FW 130 may also be other types, such as firewalls without NAT functionality but with packet filtering rules, partial cone NAT routers, full-cone NAT routers, "null" type (i.e. not present), or possibly "other" or "unknown".

The various combinations of possible NAT and firewall logic at either AN FW 119 or CN FW 130 or both AN FW 119 and CN FW 130 may interfere with the transmission of packets from MD 101 at IP 301 to CN 108 at IP 107. The use of media handover relay 305 with a public IP address 306 can simplify the handover of the first media session from MN 102 to AN 117, or enable handover if otherwise the transmission of media between MD 101 at AN 117 and CN 108 would not be readily feasible (such as if one firewall is a symmetric NAT and the other is a port-restricted cone NAT or symmetric firewall, as illustrated in network handover rules 225). Note that as described herein, a media handover relay 305 may also be referred to as a "MH relay" or also a "relay". In general, media handover relay 305 can preferably receive and transmit media and media-control-channel messages, and does not need to receive or transmit messages within a call-control channel such as illustrated in FIG. 2b. In other words, call-control messages between the nodes could traverse a call-control channel both before and after handover without passing through a media handover relay 305. It is possible that a call-control channel could be transferred to pass through a media handover relay 305 after handover, but preferably the media streams routing through a media handover relay 305 and associated with a media session would be first transmitted and received by a media handover relay 305 before a call-control channel is transferred to pass through media handover relay 305.

Either before or after acquiring IP 301, MD 101 can evaluate the IP address 306 of a media handover relay 305. Media handover relay 305 can preferably have a publicly routable IP address 306 and can be a server or similar computing device, session border controller, back-to-back user agent ("B2BUA"), or software program capable of transmitting and receiving packets with MD 101 and CN 108. Although illustrated as a single element in FIG. 3, media handover relay 305 can be a distributed set of servers or software programs, and a separate computer or software program can receive or transmit packets with either MD 101 or CN 108. If media handover relay 305 is a distributed collection of servers, then a first server can communicate with MD 101 and a second server can communicate with CN 108, and the first and second servers can transmit media between each other. Media handover relay 305 may also utilize a "dual stack" and connect to both IPv4 and IPv6 networks, in order to communicate with nodes that may utilize either routing protocols. For example, the routing protocol utilized by MD 101 at AN 117 (either IPv4 or IPv6) may not be known until MD 101 until acquires IP 301, and media handover relay 305 may preferably support both routing protocols. Further, media handover relay 305 may also preferably support the conversion of routing protocols, such that if IPv6 is utilized by AN 117 and IPv4 is used by CN 108 then media handover relay 305 can translate between the two protocols, and other examples of routing protocol translation are possible as well. In this case, media handover relay may function similar to a NAT 140 illustrated in FIG. 1c.

Many methods are available for MD 101 to acquire IP address 306 and an associated port, such as (i) querying a MN 102 or a communications service 214 managing media sessions for MD 101, either before or after (a) establishment of the first media session with CN 108 consisting of MS 1 109 and MS 110, or (b) observing AN 117 at a physical interface 201a. Additional methods of determining IP address 306 and an associated port of media handover relay 305 are available as well, including those described in FIG. 6 below. For example, MD 101 could query (i) a MD proxy server 213a for IP address 306 and a port number or a DNS name for media handover relay 305 or (ii) another server associated with MN 102 or a communications service 214 associated with a software program 204. Through similar methods, MD 101 could acquire IP:port 308 associated with media handover relay 305 for the receipt of media packets transmitted by MD 101 from IP 301 at AN 117. In addition, IP:port 308 could be either dynamically or statically assigned. Additional exemplary configuration steps for MD 101 to efficiently obtain data for the setup of a media session with a media handover relay 305 are illustrated in FIG. 6 below.

According to system 300, MD 101 may preferably begin transmitting a third media stream (MS 3) 302 from IP 301 to media handover relay 305 with a destination IP:port for the transmitted media packets of IP:port 308, once MD 101 can determine that (i) handover is preferred or (ii) communicating with CN 108 via AN 117 is desirable. MD 101 can—and preferably does—begin transmitting the third media stream 302 before MD 101 stops transmitting the first media stream 109. MD 101 and media handover relay 305 may optionally implement steps to secure the communication of MS 3 302, such that media handover relay 305 can accept and process packets in MS 3 302 if MD 101 has been properly authenticated. Exemplary steps to secure the communication between MD 101 and media handover relay 305 are also described in FIG. 6 below. MD 101 can also communicate an IP:port 125 associated with CN 108 to media handover relay 305, representing the IP:port MD 101 transmits packets to in MS 1 109. Media handover relay 305 can utilize IP:port 125 in order to initially attempt to forward packets received in MS 3 302 to CN 108, via a fifth media stream MS 5 309 described below.

As stated, MD 101 preferably performs a "make before break" handover, such that MS 1 109 and MS 3 302 are transmitted concurrently and include substantially the same media, although a "make before break" handover is not required. Equivalent media packets transmitted by MD 101 in both MS 1 109 and MS 3 302 may also contain equal sequence numbers. A node such as MD 101 or CN 108 may transmit two packets for each codec frame (i) from a different source IP:port and/or (ii) to a different destination IP:port, and each packet can be considered to belong to a separate media stream. MD 101 may transmit packets for MS 3 302 from IP 301 via IP:port 303a. The AN FW 119, if present, may convert the source IP:port in the packets transmitted by MD 101 in MS 3 302 from IP:port 303a (i.e. 192.168.0.2:14456) on its internal interface to IP:port 304 (i.e. 24.35.111.15:16600) on its external interface. Consequently, media handover relay 305 can observe the source IP:port of (i.e. for packets received in connection with) MS 3 302 as received at media handover relay 305 as IP:port 304. If AN FW 119 is a firewall without network address translation functionality, such as a symmetric firewall, then IP:port 303a and IP:port 304 could have the same number.

"Transmitting concurrently" may refer to operating a software routine within MD 101 with sufficient speed such that both IP:port 113 and IP:port 303a each transmit a media packet on a sufficiently short time scale, such as with less than an exemplary 200 milliseconds between the time when IP:port 113 transmits a media packet and IP:port 303a transmits a media packet comprising substantially the same media. Thus, although IP:port 113 and IP:port 303a may transmit at separate points in time on the timescale of a computing device's operating system, which may be on the order of microseconds for example, MS 3 302 and MS 1 109 are effectively duplicate media streams transmitted via separate subnets of the Public Internet 106. Note that the copies of media in MS 1 and MS 3 could be—but do not have to be—identical.

Upon receiving MS 3 302 from MD 101, and authentication of MD 101 if security steps are optionally implemented such as the authentication steps described in FIG. 6 below, media handover relay 305 can begin transmitting a fifth media stream (MS 5) 309 to CN 108 with a destination of IP:port 125. (Note: the "fourth media stream" as transmitted by CN 108 will be described in below, and the nomenclature describing a "fourth media stream" as transmitted by CN 108 is described herein for consistency with related patent applications such as U.S. patent application Ser. No. 12/163,472, the contents of which are hereby incorporated by reference in their entirety). The fifth media stream, MS 5 309, can represent essentially the same media media handover relay 305 receives in MS 3 302, and media handover relay 305 can function to redirect packets received from MD 101 to CN 108 primarily by transforming the IP packet headers.

Media handover relay 305 could also optionally enhance MS 5 309 by transcoding the media or implementing forward error correction such as increasing channel coding or sending the media received in MS 3 302 redundantly in MS 5 309. Exemplary forward error correction techniques that media handover relay 305 may apply to media in MS 5 309 (using media input from MS 3 302) are outlined in "Comparisons of FEC and Codec Robustness on VoIP Quality and Bandwidth Efficiency" by Wenya Jiang and Henning Schulzrinne submitted to World Scientific on Jun. 2, 2002, which is herein incorporated by reference. For example, MD 101 at IP 301 may have reduced channel coding or not sent duplicate media in order to conserve power, while media handover relay 305 may have sufficient power and computational resources to add channel coding or transmit duplicate or redundant media in MS 5 309 to CN 108. Media handover relay 305 can implement IP:port 310 as the source IP:port for packets transmitted in MS 5 309. Although IP:port 310 is illustrated as using the a different number than IP:port 308, the same IP:port number as IP:port 308 could be implemented for IP:port number 310.

Transmitting MS 5 309 from media handover relay 305 at IP 306 to IP:port number 125 can provide multiple benefits. If CN FW 130 is a NAT router of any standard type except a symmetric NAT router as described in IETF RFC 3489, IP:port 125 has already been opened on CN FW 130 and bound to IP:port 122 on CN 108 as a port for the receipt of media packets in MS 1 109. Consequently, additional or different destination IP:ports on CN FW 130 for the receipt of media at CN 108 do not need to be opened and negotiated with media handover relay 305 via one or more call-control messages or similar signaling techniques. Determining port mappings on CN FW 130 or transmitting call-control messages to communicate the port mappings on CN FW 130 may take additional time to both process on the nodes as well as traverse the public Internet, thereby speeding the handover process by using IP:port 125 as the destination port number for media packets in MS 5 302.

If CN FW 130 is a port-restricted cone, partial cone NAT router, or a firewall that is not a symmetric NAT router, MS 5 309 may not initially be received by CN 108 until CN 108 performs additional actions to properly open and bind ports on CN FW 130. For example, if CN FW 130 behaves as a standard port-restricted cone NAT router or a symmetric firewall, CN FW 130 may drop inbound packets on IP:port 125 in MS 5 309 if CN 108 had not previously transmitted an outbound packet from IP:port 122 to IP:port 310. Alternatively, if CN FW 130 behaves as a standard partial cone NAT router or address-restricted NAT router, CN FW 130 may drop inbound packets on IP:port 125 in MS 5 309 if CN 108 had not previously send a packet from IP:port 122 to the IP address of media handover relay 305, illustrated in FIG. 3 as IP address 306. Further, If CN FW 130 is a full cone NAT router, packets received at IP:port 125 can automatically be forwarded to CN 108 at IP:port 122 without CN 108 transmitting any packets to media handover relay 305. If CN FW 130 is omitted, or equivalently has a type of "null", IP:port number 125 can equal IP:port number 122, and media handover relay 305 can transmit packets directly to CN 108 at IP:port 122.

CN FW 130 may also function as a firewall and not translate addresses, but implement packet-filtering rules that are analogous to a packet filtering with port-restricted cone or partial cone NAT routers as described in IETF RFC 3489. For example, even if CN FW 130 does not translate addresses or ports, an inbound packet from media handover relay 305 may not be allowed to pass through CN FW 130 until a packet from CN 108 has been transmitted first to the IP address 306 of media handover relay 305, which would be similar to the filtering rules on a partial cone NAT, for example. If CN FW 130 is a firewall without network address translation or port translation functionality, IP:port number 125 and IP:port number 122 could be the same.

Upon evaluating that either (i) handover of the first media session is preferred, or (ii) establishing a new, redundant media session via AN 117 is preferred, MD 101 may then communicate a call-control signal 307 to CN 108 to request the establishment of a new media session via media handover relay 305. Call-control signal 307 could traverse a call-control channel used to initially establish MS 1 and MS 2, which may be similar to the system illustrated in FIG. 2*b*. A call-control signal 307 could be a SIP Re-INVITE, SIP UPDATE, or SIP REFER message if a version of the SIP protocol is used according to IETF RFC 3261, and similar call-control messages in other protocols could be implemented as well. A call-control signal 307 could also be one of the above SIP messages or another SIP message in either (i) subsequent versions of IETF RFC 3261 or possibly (ii) an extension to the protocol as currently defined in IETF RFC 3261. For example, a call-control signal 307 could be a new SIP message such as a SIP HANDOVER. And many other embodiments of a call-control signal 307 could be used instead or in addition, as some are included herein for illustration and not for limitation.

A SIP message such as Re-INVITE, UPDATE, or REFER could include Session Description Protocol (SDP) information such as a port number which can preferably be an IP:port for media handover relay 305 to receive media (an can preferably be equal to IP:port number 310). A call-control signal transmitted as an XMPP message could also contain a request formatted according to SDP or other data, and SDP is described in IETF RFC 4566. In order to increase efficiency, the call-control message may preferably be transmitted as a single packet to CN 108, and CN 108 can begin taking steps to implement a new media stream without any additional signaling other than receipt of the single packet representing call-control signal 307. For example, and as described below in FIG. 4, CN 108 can preferably begin transmitting a new media stream upon receipt of a packet representing call-control signal 307. Alternatively, a call-control signal 307 could be a packet inserted within either MS 1 109 or RTCP Stream 2 112. If a call-control signal 307 is transmitted as a packet inserted in MS 1 109 or RTCP Stream 2 112, MD 101 can insert a call-control signal or packet within the UDP packet stream of MS 1 109 or RTCP Stream 2 112, respectively.

If a call-control signal 307 is (i) inserted within MS 1 109 or RTCP Stream 2 112 and (ii) can be properly processed by CN 108, receiving call-control signal 307 may require CN 108 to monitor IP:port 122 or IP:port 134b for call control, in addition to media or media control, respectively. Note that transmitting a call-control signal 307 as a packet within MS 1 109 or RTCP Stream 2 112 may be preferred, since it may be faster than transmitting a call-control message through a call-control channel such as that illustrated in FIG. 2b. Call-control signal 307 could also be transmitted as a change in UDP checksum values for media packets transmitted by MD 101 within MS 1 109, as depicted and described in connection with FIG. 3 of U.S. patent application Ser. No. 12/120,940, the contents of which are hereby incorporated by reference in their entirety. The appropriate or efficient format and/or transmission method of a call-control signal 307 can be selected from a CN software handover database 233, using the CN software version 234, as described in FIG. 2f above. In addition, the format or method of a call-control signal 307 could be specified according to an allow field within a SIP message, such as allow field as defined by section 20.5 of IETF RFC 3261.

The mixing of (i) media or a media-control channel and (ii) call control on the same port may not be commonly supported within current versions of standard protocols such as such as SIP, XMPP, MGCP, or H.323. However, the standards could be modified or implementations of the standards could be extended to allow the transmission of a call-control message within media streams or media-control channels, thus speeding and simplifying a handover process. The mixing of media and a handover call-control signal 307 within the same pair of UDP or TCP ports may be more readily implemented with (i) a proprietary protocol such as Skype® or (ii) IAX2-capable clients and hosts, or (iii) similar protocols can support mixing of call-control messages and media within the same stream of UDP or TCP packets (e.g. on the same transmit and receive port numbers as media). Transmitting and receiving media via UDP may generally be preferred.

A call-control signal 307 may preferably contain IP:port number 310 media handover relay 305 implements as the source IP:port for MS 5 309. IP:port number 310 may be acquired by MD 101 via a MD relay response 618 or similar message as described in FIG. 6 below. A call-control signal 307 could be sent by MD 101 through IP 103 or IP 301, although IP 103 is likely preferred since a call-control channel with CN 108 was previously set up through IP 103 in order to establish the media session illustrated in system 100a. A call-control signal 307 could be transmitted to the mobile device (MD) proxy 213a using the IP 301 as the source address of the call-control signal 307. A hash function of a password or identity token or similar security mechanism would be preferred to authenticate the call-control signal 307 if it is transmitted from IP 301 to MD proxy 213a, to reduce the time-consuming process (relative to handover) of (i) establishing registration or second call-control channel 2b from a new IP address such as IP 301 for MD 101 and then (ii) transmitting call control messages through the second call-control channel in order to conduct handover. For example, if a SIP REFER message in IETF RFC 3515 is used to signal handover (or a SIP REFER with appropriate extensions to the RFC is utilized), MD 101 may first be required to register from IP 301 with MD proxy 213a before a SIP REFER could be processed by CN 108 as transmitted by MD 101 at IP 301.

In addition, a call-control signal 307 to signal handover or establishment of a duplicate media session via AN 117 could also be transmitted by a communications service 214 managing media sessions for MD 101, such as a communications service network 603 illustrated in FIG. 6 below. Assuming IP 103 retains a sufficient quality network connection, sending call control such as call-control signal 307 through IP 103 may be faster than attempting to set up a new call-control channel via IP 301, and then processing the call-control signal 307 via IP 301. Further, call-control signal 307 could be transmitted as a series of messages as opposed to a single message or packet, possibly including responses from CN 108. The aggregate function of a series of messages from MD 101 to CN 108 signaling handover could be a call-control signal 307 as described herein. In addition, an MD 101 may transmit a call-control signal 307 to a media handover relay 305 and/or a communications service 214. A media handover relay 305 or a communications service 214 could process a call-control signal 307 to initiate handover with CN 108, such as possibly forwarding a call-control signal 307 to CN 108.

If CN FW 130 is a full cone NAT router or optionally omitted (i.e. of the "null" type), for example, CN 108 may preferably (i) begin receiving MS 5 309 at IP:port 122 without requiring any call-control signal or message and (ii) begin processing both MS 1 109 and MS 5 309 which could represent essentially duplicate media streams. If CN FW 130 is a full cone NAT or optionally omitted, CN 108 can observe the source IP:port for packets received in MS 5 309 as IP:port 310, without requiring additional ports or port bindings to be opened on CN FW 130. If CN FW 130 is not a full cone NAT or "null", CN 108 may need to transmit a packet to media handover relay 305 in order to begin receiving MS 5 309, which will be described in FIG. 4 below.

Figure 4:
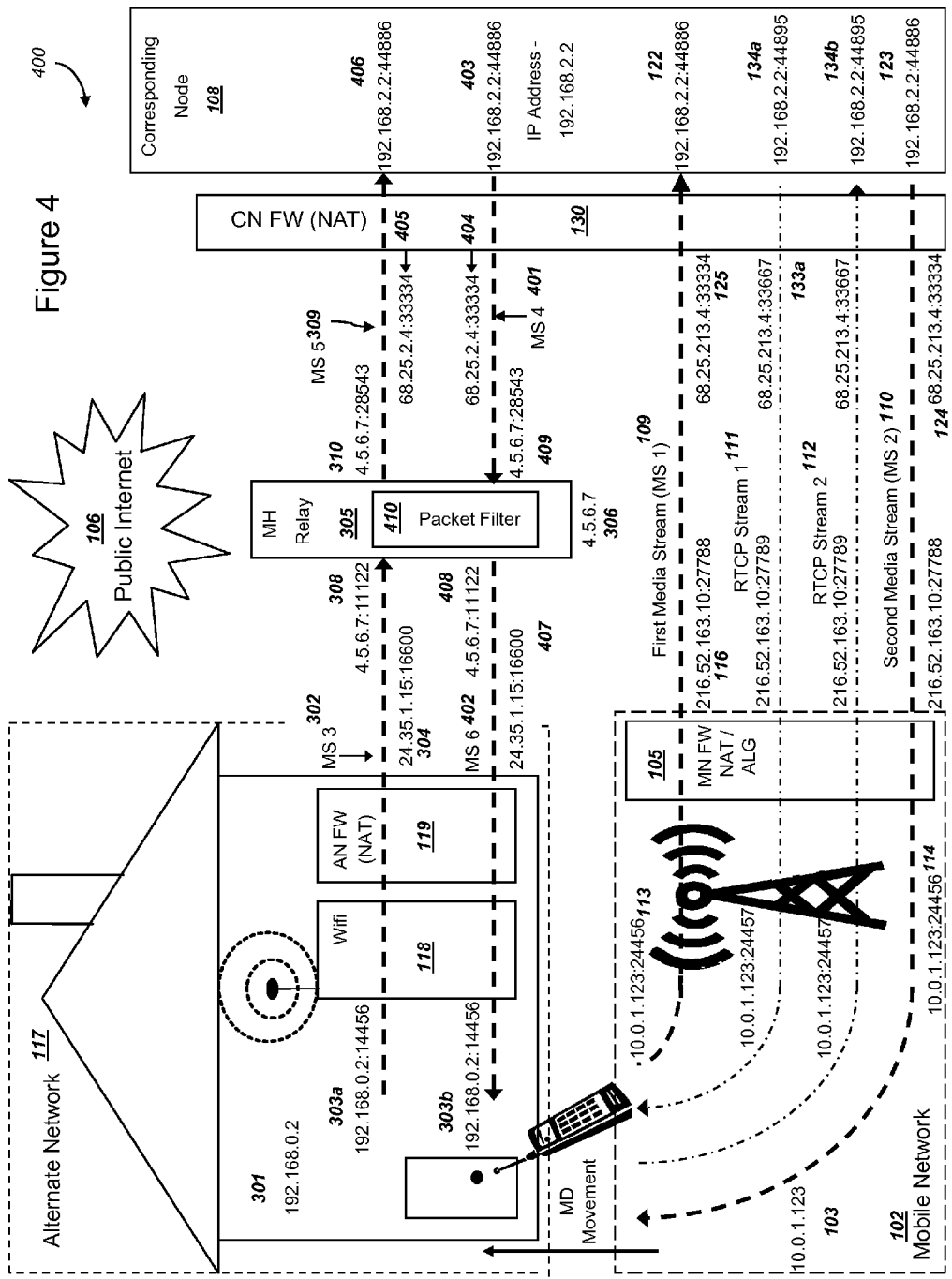
FIG. 4 is a graphical illustration of an exemplary system, where a mobile device and a corresponding node transmit and receive media with a media handover relay during handover, in accordance with exemplary embodiments.

Although MD 101 is illustrated as communicating a first media session before handover with a single corresponding node 108 in system 300, MD 101 may communicate with multiple corresponding nodes 108 simultaneously before handover such as with a three-way call or a conference call, and the handover procedure illustrated in system 300 utilizing a media handover relay 305 may be applied with multiple corresponding nodes concurrently. The handover procedure illustrated in system 300 and associated FIGS. 4 and 5 is one possible method for implementing the procedure "Relay" as denoted in the network handover rules 225 illustrated in FIG. 2d. In addition, the handover procedure illustrated in system 300 and associated FIGS. 4 and 5 can be the "Relay A" handover procedure within a class of handover procedures "Relay", illustrated in a handover procedure rules 227 in FIG. 2g above.

Mobile device movement is illustrated in FIG. 3 and related subsequent figures as one possible reason MD 101 may prefer to handover a first media session from an initial network, such as mobile network 102, to an alternate network 117. The illustrated movement can correspond to increasing signal strength (i.e. higher signal-to-noise ratios, lower transmitting power requirements, fewer bit errors, etc.) from AN 117 and decreasing signal strength from MN 102. The physical movement of MD 101 may be a primary cause for changes in preferred networks, but actual physical movement of MD 101 is not required in order to utilize the efficient handover techniques illustrated herein. For example, MD 101 could be relatively stationary, but the underlying signal strength from various networks could be changing such that handover from one network to the next is preferred.

FIG. 4

FIG. 4 is a graphical illustration of an exemplary system, where a mobile device and a corresponding node transmit and receive media with a media handover relay during handover, in accordance with exemplary embodiments. According to a preferred exemplary embodiment, once CN 108 receives either (i) a call-control signal 307 or (ii) redundant media at a receive IP:port 122 from two different source IP addresses, CN 108 preferably begins transmitting a fourth media stream (MS 4) 401 to media handover relay 305 at IP address 306, representing essentially a duplicate copy of MS 2 110. Media handover relay 305 can receive MS 4 401 and forward the packets or media received in MS 4 401 to MD 101 via a sixth media stream (MS 6) 402.

FIG. 4 is illustrated as CN FW 130 functioning as a NAT router that is not a symmetric NAT, where transmit IP:port numbers 403 and 123 within the internal network at the corresponding node, shown as IP:port 192.168.2.2:44886, can consistently map to IP:port numbers 404 and 124, shown as IP:port 68.25.2.4:33334 on the external interface. IP:port number 403 may be opened and bound to IP:port number 404 by the transmission of a packet from IP:port number 123 if (i) CN FW 130 is not a symmetric NAT router or another type of router that does not consistently maintain bindings between internal and external ports, and (ii) IP:port numbers 123 and 403 are the same number. By utilizing IP:port number 406 as the receive IP:port and setting IP:port number 406 equal to IP:port number 403, packets received at IP:port 405 can be forwarded to IP:port 406. In addition, IP:ports 403 and 406 can then preferably be the same IP:port number, as illustrated in FIG. 4. For clarity in FIG. 4 and related subsequent drawings, the receive IP:port on CN FW 130 for MS 5 309 is illustrated in FIG. 4 as IP:port 405, and IP:port number 405 can equal IP:port number 125. Thus, although FIG. 3 illustrates MS 5 309 transmitting MS 5 309 to IP:port 125, MS 5 309 can be considered to be transmitted to an IP:port number that equals IP:port number 125, which is IP:port 405 in FIG. 4 and subsequent drawing. Note that IP:port number 405 may not equal IP:port number 125 if CN FW 130 is a symmetric NAT router as illustrated in a later exemplary system in FIG. 10 below.

CN 108 can utilize IP:port 409 as the destination IP:port for packets transmitted in MS 4 401, and IP:port number 409 can preferably be equal to IP:port number 310, as illustrated in FIG. 4. IP:port number 409 (representing the destination IP:port number 409 for CN 108 to utilize in MS 4 401) could have been communicated to CN 108 via a call-control signal 307 or specified when the first media session consisting of MS 1 109 and MS 2 110 was established. Further, if CN FW 130 is the type "null" or full-cone NAT, CN 108 can observe the source IP:port 310 in media packets received before a call-control signal is received, and subsequently transmit MS 4 401 to IP:port 409 before receiving a call-control signal, possible transmitted through a call-control channel illustrated in FIG. 2b. Using IP:port 409 equal to IP:port 310 for the destination IP:port in MS 4 401 may be preferable in order to simplify potential firewall or NAT traversal issues through CN FW 130. For example, if different port number are utilized to transmit MS 4 401 and receive MS 5 309 (i.e. different port numbers for IP:port 403 and IP:port 406, respectively), then packet filtering rules or NAT bindings on CN FW 130 for inbound packets could timeout and inbound packets in MS 5 309 could be dropped, if an outbound packet is not periodically transmitted from IP:port 406 to IP:port 310. CN 108 can implement IP:port 403 as the source IP:port for packets transmitted in MS 4 401, and IP:port number 403 could be equal to IP:port number 123, since IP:port 123 may have already been mapped to IP:port 124 on CN FW 130 if CN FW 130 functions as a NAT router that is not symmetric. If IP:port number 403 equals IP:port number 123, then IP:port number 124 can be equal to IP:port number 404 as illustrated in FIG. 4, which would likely be the case if CN FW 130 is a standard full cone, partial cone, or port-restricted cone NAT router, since an IP:port within the internal network of these types of NAT routers can remain bound to the external IP:port on the NAT router for the duration the binding is active.

According to common implementations of partial cone or port-restricted cone NAT routers or firewalls without NAT functionality, but with equivalent packet-filtering rules, as soon a CN 108 transmits a packet through CN FW 130 from IP:port 403 to IP:port 409, IP:port 405 should open up for the proper receipt of media packets by CN 108 at IP:port 406, if (i) IP:port numbers 403 and 406 are equal and (ii) IP:port numbers 310 and 409 are also equal. Note that IP:port 405 can be utilized as the destination IP:port in MS 5 309 as transmitted by media handover relay 305 (again, preferably where IP:port number 405 can be equal to IP:port number 125), but incoming packets in MS 5 309 from media handover relay 305 illustrated in FIGS. 3 and 4 may initially be dropped by CN FW 130 until an outbound packet traverses CN FW 130 with a destination IP address equal to an address of media handover relay 305 (perhaps a destination IP:port equal to IP:port 409 on media handover relay 305); this outbound packet may be the first media packet in MS 4 401. This outbound packet may also preferably be an authentication request transmitted by CN 108 to media handover relay 305, as described in FIG. 6 below (if CN 108 supports authentication with media handover relay 305, which is not required).

The behavior of CN FW 130 dropping incoming packets in MS 5 309 until an outbound packet traverses CN FW 130 can correspond to a partial cone or port-restricted cone NAT, or a firewall without NAT functionality. MS 5 309 media packets can typically be received by CN 108 within a few milliseconds from when the first media packet in MS 4 401 transmitted by CN 108 traverses CN FW 130 destined for media handover relay 305, especially if CN 108 is co-located on a LAN with CN FW 130. If CN FW 130 is a symmetric NAT router, media handover relay 305 may need to adjust the destination IP:port for packets transmitted in MS 5 309 to a different destination IP:port number than the IP:port number equal to 125, and this different destination IP:port number may be observed by media handover relay 305 when the first packet in MS 4 401 is received (and this case of adjusting the destination IP:port number in MS 5 309 will be described in FIG. 10 below). If CN FW 130 is (i) omitted, (ii) a full cone NAT router, or (iii) otherwise open to packets from media handover relay 305, then packets in MS 5 309 can be received without CN 108 first transmitting a packet to media handover relay 305.

CN 108 can accept and process the duplicate media streams MS 1 109 and MS 5 309; that is, the various software routines operating on CN 108 may efficiently process duplicate media streams. In addition, if the media is transmitted as RTP then the RTP software stack within CN 108 can also drop duplicate media packets received. Software programs that implement RTP according to the IETF RFC 3550 standard can ignore the source IP address of RTP packets, and can reject or accept media from the synchronization source identifier (SSRC) within a packet containing RTP data. Thus, using both IP 103 and IP 301, MD 101 can transmit separate copies of the underlying media via MS 1 109 to CN 108 and MS 3 302 to media handover relay 305, which then can forward MS 3 302 to CN 108 via MS 5 309, and CN 108 can monitor IP:port 122 and IP:port 406 for both media streams. IP:port 122 and IP:port 406 can preferably be the same number as illustrated in FIG. 4. Transmitting MS 1 109 and MS 3 302 via RTP is not required, and other methods for media transmission and sequencing the media packets could be used, such as SRTP, IAX2, or the proprietary techniques implemented by Skype®. Other methods for handling duplicate media packets received are available as well for those skilled in the art. In addition, MD 101 is not required to transmit MS 1 109 and MS 3 302 concurrently, and MD 101 could stop transmitting MS 1 109 upon starting the transmission of MS 3 302 although concurrent transmission of the media streams can be preferred.

Media handover relay 305 can forward media received in MS 4 401 to MD 101 at IP 301, by transmitting a sixth media stream, MS 6 402. Media handover relay 305 can transmit the media received in MS 4 401 to IP:port number 407, and IP:port number 407 can preferably equal IP:port number 304, as illustrated in FIG. 4. Media handover relay 305 can determine IP:port number 304 by observing the source IP:port number for packets received in MS 3 302. AN FW 119 can receive packets at IP:port 407 and forward them to IP:port 303b for receipt at MD 101. MD 101 can accept and process the duplicate media streams MS 2 110 and MS 6 402. IP:port numbers 303a and 303b can preferably be the same port number, as illustrated in FIG. 4. Consequently, a software program 204 operating on MD 101 can transmit packets on IP:port 303a and receive packets on IP:port 303b. As illustrated in FIG. 4, IP:port number 308 (receive IP:port for MS 3 302 by media handover relay 305) and IP:port number 408 (transmit IP:port for MS 6 402 by media handover relay 305) can also preferably be the same port number. Although IP:port numbers 308 and 408 are illustrated as being different numbers than IP:port numbers 310 and 409, IP:port numbers 308 and 408 could be equal to IP:port numbers 310 and 409.

Preferably, the handover for media from CN 108 to MD 101 via media handover relay 305 can be implemented via "make before break" methods, whereby MS 4 401 and MS 2 110 can be transmitted concurrently for a period of time until the handover is complete, or possibly until the entire media session is terminated (such as when a user "hangs up"). Equivalent media packets transmitted by CN 108 in both MS 2 110 and MS 4 401 may also contain equal sequence numbers. Similarly, CN 108 could begin transmitting MS 4 401 before CN 108 stops transmitting MS 2 110. If CN 108 implements software functionality which (i) does not support "make before break" methods and (ii) only supports the equivalent of call-transfer or media-redirect methods, then MS 4 401 can be set up effectively at the same time that MS 2 110 is torn down, representing a "break before make" handover for media from CN 108 to MD 101. For example, if a version of the SIP protocol is used on a legacy gateway to the PSTN at CN 108, the call-control signal 307 from MD 101 could be a SIP Re-Invite, SIP UPDATE, or SIP REFER message indicating a change in the destination IP:port for media transmitted from CN 108 in MS 4 401, illustrated as IP:port 409 in FIG. 4. Even if "break before make" methods are used for the setup of MS 4 401 by this exemplary legacy gateway, media packets should not be dropped because MD 101 can, preferrably concurrently, monitor both IP:port 114 and IP:port 303b for the receipt of media (i.e. packets) transmitted by CN 108 and routed through media handover relay 305 for MS 4 401, which converts MS 4 401 to MS 6 402 for receipt at IP:port 303b by MD 101.

"Monitoring concurrently" may refer to (i) a software program 204 or a software routine within MD 101, (ii) the operating system 203, (iii) a device driver 202, and/or (iv) hardware within MD 101 operating with sufficient speed such that both IP:port 114 and IP:port 303b are each polled for receipt of a media packet on a sufficiently short time scale, such as less than every 200 ms. Thus, although IP:port 114 and IP:port 303b may be polled at separate points in time on the timescale of a computing device's operating system, such as an amount of time on the order of microseconds, the net effect of the rapid switching time is that the ports are monitored concurrently and packets are not dropped.

For example, if several packets in a row are dropped in MS 6 402 due to poor network conditions, but not dropped in MS 2 110, a process operating on MD 101 can switch between IP:port 114 and IP:port 303b with sufficient speed such that all or substantially all packets are acquired and media is played out to a user without significant gaps or delay. One objective of monitoring, perhaps concurrently, both IP:port 114 and IP:port 303b could be to reduce possible distortions or gaps in audio or video observed by a user. Although a single corresponding node 108 is shown in system 400, the handover procedures illustrated can also be applied if MD 101 communicates with more than one CN 108, such as if MD 101 participates in a three-way call or a conference call.

A media handover relay 305 may also utilize a relay packet filter 410 in order to enhance security, since media handover relay 305 can preferably have a publicly routable IP address 306 which can receive packets from any host or client connected to the public Internet 106. Relay packet filter 410 can filter media and other packets from a CN 108, a MD 101, or any other host or client that does not support authentication with media handover relay 305 or a communications service 214. Exemplary authentication messages are described in FIG. 6 and elsewhere below. In addition to filtering packets based upon requiring a successful authentication from a node, a relay packet filter 410 can filter packets from a CN 108 according to (i) an expected range of sequence numbers for media transmitted by CN 108 in MS 4 401, (ii) a codec and/or media format for media transmitted by CN 108 in MS 4 401, (iii) a timestamp within media transmitted by CN 108, (iv) a synchronization source identifier within media transmitted by CN 108, and/or (v) a similar token within media packets transmitted by CN 108, possibly within packet headers. Together, these exemplary values of media from CN 108 such as source IP address, source IP:port, range of media sequence numbers, codec and/or media format including frames per packet, timestamps, SSIDs, and/or similar tokens, can independently or in conjunction represent "conforming media" from CN 108. A relay packet filter 410 may apply the same or similar filtering rules in order to accept and/or subsequently process packets received from an MD 101.

In addition, the use of specific UDP checksum values can identify conforming media as filtered by a relay packet filter 410. UDP checksums media packets transmitted from or received by a mobile device may be disabled since wireless links may contain bit errors and a codec utilized for a media session may preferably be bit-error robust. Thus, nodes may normally ignore the UDP checksum values for media received, when utilizing the techniques described herein. However, according to an exemplary preferred embodiment, specific values for UDP checksums may be implemented by either MD 101 or CN 108 for media transmitted to a media handover relay 305 (if UDP checksums are otherwise ignored or disabled) in order to increase security. A value or sequence of values within UDP checksums could also be utilized by media handover relay 305 to evaluate if media received is conforming media.

FIG. 5

FIG. 5 is a graphical illustration of an exemplary system, where a media handover relay transmits and receives media and media-control-channel messages with a mobile device and a corresponding node upon completion of a handover, in accordance with exemplary embodiments. In system 500 illustrated in FIG. 5, CN 108 transmits MS 4 401 to media handover relay 305 using IP:port 409 as the destination port in the packets transmitted. IP:port 409 may preferably be the same number as the number for IP:port 310, as illustrated in FIG. 5. Media handover relay 305 can receive the media packets in MS 4 401 and reroute them to MD 101 by transmitting the media packets in MS 6 402 to IP:port 407 on AN FW 119.

IP:port 407 number may preferably be the same number as IP:port 304 as illustrated in FIG. 5, and media handover relay 305 may determine the proper IP:port 407 number to implement since IP:port 304 can be observed by media handover relay 305 as the source IP:port for packets received in MS 3 302. The use of IP:port 407 (when equal to IP:port 304) can facilitate the media packets being properly forwarded to MD 101 listening on the IP:port 303b, since the AN FW 119 would generally otherwise drop packets on ports not previously opened by MD 101 and properly bound by AN FW 119. Alternative techniques to establish a different IP:port than an IP:port number equal to IP:port number 304 on AN FW 119 (e.g. IP:port number 407 does not equal IP:port number 304) for media handover relay 305 to transmit media to MD 101 at IP 301 may both take time and also may not be readily discernable in any case, such as if AN FW 119 is a symmetric NAT router, or otherwise a NAT router which does not consistently bind active internal and external port numbers. However, there are scenarios where IP:ports numbers 407 and 304 could be different, such as (i) if AN FW 119 operates as an application-layer gateway, (ii) AN FW 119 type is "null", and other possibilities exist as well.

Voice activity detection (VAD) may preferably be disabled within MS 3 302 in order to keep IP:port 407 open and bound, and likewise VAD may be disabled within MS 4 401 in order to keep IP:port 405 open and bound. For example, if the G.729a codec is implemented by MD 101 and the user is silent for an extended period such as 75 seconds (with no resulting media packets transmitted), AN FW 119 may close IP:port 407 to inbound packets from the external interface since a timeout on the port bindings may expire. Consequently if VAD is enabled, MD 101 should periodically send packets from IP:port 303b in order to keep IP:port 407 open and bound, even if media is not present, such as by (i) sending a packet from IP:port 303b at an interval of every 30 seconds or (ii) sending media packets with silence descriptor frames or similar silence information, as examples. Packets may also need to be sent periodically from IP:port 403 in order to keep IP:port 405 open and bound even if, for example, a user at CN 108 is silent for an extended period such as a minute or longer during a voice call.

MD 101 may also wish to establish a new media-control channel with a CN 108 either (i) after MS 5 and MS 6 are established or (ii) during the process of establishing MS 5 and MS 6. As discussed previously, a media-control channel allows a transmitting endpoint to evaluate the quality of media received at the receiving endpoint and subsequently make adjustments for transmitted media in attempt to improve the quality received. A media-control channel can be useful for both MD 101 and CN 108 to determine that the handover is complete and successful before terminating MS 1 or MS 2, respectively. For example, during a handover period where MD 101 transmits MS 1 and MS 3 concurrently and CN 108 transmits MS 2 and MS 4 concurrently, both MD 101 and CN 108 may prefer to receive feedback from the receiving node that the new media streams MS 3 and MS 4 are properly being received with sufficient quality, and the new media streams would represent MS 5 and MS 6 after passing through media handover relay 305, respectively According to an exemplary embodiment, media handover relay 305 may route media packets without additional processing of the media, such as implementing a codec, transcoding, or otherwise changing the media content (i.e. packetized codec data within sequencing headers such as an RTP header) of media packets. For example, if MD 101 and CN 108 had established a secure communications channel with encrypted media, using SRTP or similar ciphering methods as one example, media handover relay 305 may not be readily able to decrypt or process media packets. However, as described in FIG. 3, media handover relay 305 could preferably implement forward error correction techniques, such as transmitting duplicate packets for media packets received, which should not be computationally intensive compared to (i) decoding or encoding media. In addition, in order to speed the routing of packets and handover, efficiently utilizing the processing resources of media handover relay 305 may be preferred. Rerouting media packets and transmitting duplicate media packets can be more efficient than both (i) rerouting media packets and (ii) processing media packets on media handover relay 305 with a codec or performing similar computationally intensive analysis or changes on media packets at media handover relay 305. Note that implementing forward error correction techniques such as simply duplicating packets in media received at media handover relay 305 may preferred, and would be computationally less intensive than processing a codec such as G.729a. Also, there may be situations where processing a codec on media handover relay 305 may be more efficient, such as if MD 101 evaluates that a different codec when transmitting through AN 117 is preferred, but if CN 108 does not support the codec, and in this case media handover relay 305 may optionally transcode media.

Since media handover relay 305 may route packets without otherwise processing the media (e.g. decode or encode media with a codec), a media-control channel may be implemented directly between MD 101 and CN 108, as opposed to implementing two separate media-control channels consisting of (i) between MD 101 and media handover relay 305 and (ii) between CN 108 and media handover relay 305. The media-control channel is illustrated in FIG. 5 as established between MD 101 and CN 108. If media handover relay 305 performs more advanced processing on the media packets, such as decoding and encoding media with a codec, evaluating bit errors in the media, implementing a jitter buffer, then two separate media-control channels (i.e. between MD 101 and media handover relay 305 and between CN 108 and media handover relay 305) could optionally be implemented in system 500 (not shown).

Without a media-control channel, there may not be a feedback mechanism to message a transmitting node about the quality of media received. For example, MD 101 may have projected that IP 301 would be preferred for communication, but the underlying network performance could suddenly change, perhaps due to unexpected congestion on the internal LAN within alternate network 117, immediately after handover had been initiated. In general, MD 101 and CN 108 could programmatically decide to terminate MS 1 and MS 2 and complete the handover based on feedback from a media-control channel such as RTCP, SCTP, or proprietary methods, among other options. MS 1 109 and MS 2 110 may be terminated after quality data in a media-control channel confirms that the quality of MS 3 302 (received as MS 5 309) and MS 4 401 (received as MS 6 402) meets acceptable thresholds. Further, decisions on terminating MS 1 109 and MS 2 110 could be made independently, such that either MS 1 109 or MS 2 110 can be terminated, while the other media stream may continue.

System 500 of FIG. 5 illustrates the transmission of the media-control channel as RTCP, although other techniques such as SRTCP or proprietary protocols could be implemented. In addition, a media-control channel could optionally be included as periodic messages transmitted within the media stream, which is implemented in the IAX2 protocol, for example. The benefit of mixing media and media control within the same UDP stream is that fewer NAT ports have to remain bound and open for communication. Further, the implementation of a media-control channel could optionally be omitted. A media-control channel could also optionally be implemented through a call-control channel such as illustrated in FIG. 2b, using call-control messages such as SIP NOTIFY. However, the speed of processing a media-control-channel message through a call-control channel may be slower and less efficient (by traversing a series of proxy servers 213a and 213b and also potentially a series of gateway proxy servers) than transmitting media-control-channel messages between the nodes via a media handover relay 305.

If a media-control channel is implemented on a separate port pair than media, according to IETF specification RFC 3550 or similar standards illustrated in system 500, the proper ports for communication through the firewalls will need to be properly identified, bound, and communicated. A sequence of steps to properly open and negotiate the ports for a media-control channel may be similar to the steps for opening and negotiating the ports for the media streams in the presence of NATs, or firewalls with packet filtering rules with or without network address translation.

Upon receipt of MS 6 402, representing the media contained in MS 4 401 but transmitted by media handover relay 305, MD 101 may begin evaluating the quality of the media and prepare an RTCP receiver report or similar quality feedback message for transmission to CN 108. MD 101 can transmit RTCP messages or packets to media handover relay 305 at IP:port 508b. IP:port 508b could be specified for MD 101 in many possible ways, such as during the establishment of the first media session with CN 108, querying MN 102 or a communications service upon observing AN 117 as physical interface 201a, or during the setup of MS 3 302, among other possibilities. An exemplary illustration of efficiently communicating IP:port 508b to MD 101 is described in FIG. 6 below.

The series of media-control-channel messages or packets associated with MS 4 401 (received by MD 101 as MS 6 402) is illustrated in FIG. 5 as RTCP Stream 4 504. Media handover relay 305 can receive RTCP messages or packets at IP:port 508b and can transmit the RTCP messages or packets from MD 101 to CN 108 at IP:port 134b via the IP:port 133b (on the external interface of CN FW 130), which may be bound to IP:port 134b, since that IP:port was implemented by CN 108 to receive media-control-channel messages for media stream 2 110 as illustrated in system 100a. If CN FW 130 is a standard partial cone or full cone NAT, or a firewall with partial cone packet filtering rules but without network address translation functionality, then inbound media-control-channel packets received at IP:port 133b from media handover relay 305 (at IP address 306) should automatically be passed by CN FW 130, since packets in MS 4 may have already traversed the NAT or firewall and opened up CN FW 130 for the receipt of packets from media handover relay 305. Note that if media-control-channel messages are inserted within a media stream, then IP:ports 303a and 501a could be the same number, and also IP:ports 508b and 308 could also be the same number, with a similar matching of port numbers between media handover relay 305 and CN 108. Also, if CN FW 130 is "null" or a full-cone NAT, then media-control-channel messages transmitted by media handover relay 305 to IP:port 133b should be automatically forwarded to IP:port 134b before CN 108 transmits a packet to media handover relay 305 using the source IP:port number equal to 134b.

If CN FW 130 is a standard port-restricted cone NAT router or symmetric firewall, then CN 108 may need to first transmit a packet from IP:port 134a to IP:port 506b in order for inbound packets in RTCP Stream 4 504 (as transmitted by media handover relay 305) to be properly received by CN 108, which could be the first packet transmitted in RTCP stream 3 503, for example. CN 108 may also preferably transmit a port-binding packet 508 from IP:port 134a to IP:port 506b before media-control-channel messages in RTCP stream 3 503 are available. A port-binding packet 508 can open and bind IP:port 133b on CN FW 130 to IP:ports 134b on CN 108 for the receipt of RTCP stream 4 504 packets with a source IP:port of 506a. Consequently, MD 101 can establish a new media-control channel by sending RTCP reports or other media-control-channel messages for MS 4 401 (received by MD 101 as MS 6 402) from IP:port 501a to IP:port 134b via media handover relay 305.

The new media-control channel for media packets in MS 4 (received by MD 101 as MS 6 402) is illustrated as RTCP stream 4 504 in FIG. 5. Since MD 101 may be located behind AN FW 119, which could be a NAT router, media handover relay 305 may not be able to readily forward media-control-channel messages transmitted by CN 108 for MS 5 309 (representing media transmitted by MD 101 in MS 3 302) until media handover relay 305 can determine the proper external port on AN FW 119 that would forward packets to MD 101 at IP:port 501b. Upon receipt of either (i) the first packet in RTCP Stream 4 504 or (ii) a port-binding packet 505, media handover relay 305 can preferably begin transmitting media-control-channel messages such as packets received in RTCP Stream 3 503 from CN 108 to IP:port 502b. Media handover relay 305 can utilize IP:port number 508a as the source IP:port number for media-control-channel messages transmitted to MD 101 (via AN FW 119). As illustrated in FIG. 5, IP:port numbers 501a and 501b are preferably the same number, and IP:port numbers 502a and 502b are also preferably the same number. IP:port number 502a could be observed by media handover relay 305 as the source IP:port for packets received in RTCP Stream 4 504 or a port-binding packet 505.

Since (i) IP:ports 502a and 502b are preferably the same number (which can be the result of IP:ports 501a and 501b being the same number), and (ii) media handover relay 305 can observe IP:port number 502a in media-control packets received, media handover relay 305 can determine the IP:port number to use as the destination IP:port number in RTCP Stream 3 503, which is IP:port 502b. Other methods are available as well, where IP:ports 501a and 501b are not equal and/or 508a and 508b are not equal, but these other methods may be less efficient due to additional signaling overhead required to negotiate ports, such as sending a call-control signals between media handover relay 305 and MD 101. In addition, STUN or similar network probing techniques may commonly be required to determine IP:port mappings on AN FW 119. AN FW 119 can forward packets received at IP:port 502b (representing the media-control-channel messages transmitted by CN 108 in RTCP stream 3 503 and forwarded by media handover relay 305) to IP:port 501b on MD 101 at IP 301.

Thus, in order to effectively support a media-control channel through AN FW 119, MD 101 may implement the same IP:port number for both transmitting and receiving media-control packets on the alternate network 117, as shown by IP:ports 501a and 501b in system 500. In addition, CN 108 may implement the same IP:port number for receipt of media-control-channel packets both before and after handover, in order to reduce the time required to set up a media-control channel upon handover. CN 108's capability to implement the same IP:port number for receipt of media-control-channel packets before and after handover can also be included in a corresponding node handover function 229. The capabilities or functions of a corresponding node to support handover may also be included in an "allowed" or "denied" header field, and in this case the data in the header field could be used as a CN handover function 229.

Although the same IP:port 134*b* may preferably be utilized by CN 108 for the receipt of media-control-channel packets before and after handover, CN 108 can differentiate RTCP receiver reports for RTCP stream 2 and RTCP stream 4 (as forwarded by media handover relay 305) based on the source IP address, when implementing the same IP:port number for receipt of RTCP stream 2 112 and RTCP Stream 4 504 (as forwarded by media handover relay 305). Further, media handover relay 305 may implement the same IP:port number for transmission and receipt of media-control-channel packets with CN 108 (i.e. setting IP:port number 506*a* equal to 506*b*), and also the same IP:port number for transmission and receipt of media-control-channel packets with MD 101 (i.e. setting IP:port number 508*a* equal to 508*b*). Although illustrated in system 500 as different numbers, IP:port numbers 506*a* and 508*a* could be the same port number.

Other benefits can be achieved by implementing the same IP:port number on CN 108 for sending and receiving the media-control-channel messages, in addition to simplifying the NAT and/or firewall traversal for those messages. If (i) a separate port is used for transmitting and receiving media-control-channel messages at each node, or (ii) sender reports are not implemented or transmitted less frequently such as every 120 seconds, either or both of AN FW 119 IP:port 502*b* and CN FW 130 IP:port 133*b* may close for inbound traffic due to lack of outbound traffic from (a) MD 101 sent from IP:port 501*a* or (b) CN 108 sent from IP:port 134*a*, respectively. Consequently sender reports, or similar reports in a media-control channel protocol such as RTCP or SRTCP, are preferably implemented in order to keep firewall IP:ports open and bound. Sender reports can also be transmitted on intervals less than every 60 seconds in order to keep firewall IP:ports open and bound. If IP:ports 501*a* and 501*b* are equal, and IP:ports 134*a* and 134*b* are equal, then sender reports may optionally be omitted, since the transmission of receiver reports at intervals such as less than every 60 seconds should keep the firewall ports open and bound, as discussed in the next paragraph.

Through transmitting RTCP messages such as RTCP receiver reports as illustrated by system 500 in FIG. 5 on a periodic basis such as every 30 seconds or more frequently, the inbound IP:ports 502*b* and 133*b* should remain properly active and bound, thereby allowing both CN 108 and MD 101 to continue receiving media-control-channel messages for the duration of the media session after handover started. Although generally not standardized, many common firewalls with NAT routing functionality may close inbound UDP ports if outbound packets have not been transmitted in an interval, such as the previous 60 seconds. If the devices AN FW 119 and CN FW 130 act as firewalls and packet filters, but do not perform network address translation, the firewall rules may similarly apply, such that inbound UDP ports may close if outbound traffic has not been transmitted in an interval, such as the previous 60 seconds.

When MD 101 determines that handover is complete, it may send a call-control signal via a system such as that depicted in FIG. 2*b* to the CN 108 to terminate MS 2 and the associated media-control channel, if implemented. MD 101 may also then terminate MS 1 and a related media-control channel RTCP 1, if implemented. The completion of the handover could also be signaled by the corresponding node. In addition, the signal to stop transmitting MS 1 and/or MS 2 could be a logical signal as opposed to the transmission of an explicit call-control message. An example of a logical signal could be the transpiring of a period of time where a new media streams have been transmitted concurrently with sufficient quality, such as 45 seconds with an estimated Mean Opinion Score (MOS) of 3.75 or greater, and other measures of quality for a media stream could be utilized as well in determining if the quality of the media stream is sufficient. In addition, MD 101 and CN 108 could continue to transmit either MS 1 109 or MS 2 110 for the entire duration that MS 3 302 and MS 4 401 are transmitted, waiting until the user is finished with the entire media session before any individual media stream is terminated. Further, although a single corresponding node 108 is shown in system 500, the handover procedures illustrated can also be applied if MD 101 communicates with more than one CN 108, such as if MD 101 participates in a three-way call or a conference call.

Media handover relay 305 may be a computing device that includes computer components for the purposes of communicating media streams that include audio and video between nodes, as well as relaying media-control-channel messages. As described above and elsewhere herein, media handover relay 305 may also preferably be a computer capable communicating media streams with a plurality of mobile devices and corresponding nodes. Media handover relay 305 can include a network interface 507*a*, a central processing unit (CPU) 507*b*, a system bus 507*c*, a random access memory (RAM) 507*d*, and a software program 507*e*. The system bus 507*c* can couple various system components including the random access memory 507*d* to the processing unit 507*b* and the network interface 507*a*. The system bus 507*c* may be any of several types of bus structures including a memory bus or memory controller, a peripheral bus, and a local bus using any of a variety of bus architectures including a data bus. System bus 507*c* can preferably be a higher capacity bus than system bus 201*d* or 206*d* in order to support multiple media streams. The network interface 507*a* may comprise an interface to a wired network connection such as an Ethernet cable or a fiber-optic cable. The wired network connection could support a plurality of media streams and have an example capacity of Fast Ethernet (100 mbits/sec), Gigabit Ethernet, or faster or slower networking speeds. The network interface 507*a* may also comprise a local area network wireless connection such as WiFi, to communicate with another local computing device such as a router via wireless. The network interface 507*a* may also transmit and receive packets which are routed through the Public Internet 106

The central processing unit 507*b* may be comprised of a processor with sufficient capacity to manage a plurality of media streams and supporting messages such as optional media-control-channels, and may include multiple separate processors and/or a multi-core processor. CPU 507*b* may provide more processing power than CPU 201*b* since the media handover relay 305 may have fewer power constraints, such as not being limited to battery power. The plurality of media streams can comprise a separate MS 3 302, MS 4 401, MS 5 309, and MS 6 402 for each concurrent media session supported, and the media-control-channels can comprise separately sending and receiving RTCP Stream 3 and sending and receiving RTCP stream 4 for each concurrent media session supported.

The software program 507*e* can provide computer executable instructions to the central processing unit 507*b* in order to manage a plurality of media streams and media-control-channel messages, in addition to providing other functionality described herein such as processing a plurality of authentication messages such as MD relay authenticate 621 described below. During operation of the media handover relay 305, the software program 507e may reside within RAM 507d. The software program 507e may also be stored in a disk drive (not shown), flash memory (not shown), or a similar non-volatile medium locally on media handover relay or on remote servers such as a communications service network 603. The software program 507e may be programmed in a computer language such as C or C++. Although not shown, media handover relay 305 may also include an operating system such as Linux, Windows, or IOS in order to manage available computer resources such as memory or access to the CPU 507b. The operating system can preferably support server functionality, since media handover relay may communicate concurrently with many different nodes.

Although the exemplary environment described herein employs RAM 507e, it should be appreciated by those skilled in the art that other types of computer readable media which can store data that is accessible by a media handover relay 305, such as memory cards, local hard disks, optical storage, and the like, may also be used in the exemplary operating environment without departing from the scope of the invention. The memory illustrated in FIG. 5 can also provide non-volatile storage of computer-executable instructions, data structures, program modules, software program 507e, and other data for a media handover relay 305. The computer executable instructions such as software program 507e could be transferred to media handover relay 305 through the network interface 507a from a communications service network 603 illustrated in FIG. 6. The computer executable instructions such as software program 507e could be stored remotely on a disk drive or optical disk (both not shown) associated with communications service network 603. Media handover relay 305 can preferably function as a server, in which case user interfaces can optionally be omitted during normal operations, and a systems administrator could remotely log in via network interface 507a using standard techniques secure shell.

The media handover relay 305, comprising a computer, may operate in a networked environment using logical connections to one or more remote computers, such as the communications service network 603 illustrated in FIG. 6 below. The communications service network 603 can also function as a general purpose server to provide files, programs, disk storage, remote memory, and other resources to media handover relay 305 through a network connection such as through the Public Internet 106 or a private network. Additional remote computers with which media handover relay 305 communicates may include another media handover relay, a personal computer, a server, a client, a router, a network PC, a peer device, or other common network node.

When media handover relay 305 is described as performing various actions such as monitoring a port, transmitting a packet or a media stream, or similar tasks, specifying that media handover relay 305 performs an action can refer to (i) software, hardware, and/or firmware operating within media handover relay 305 performing the action, or also (ii) software, hardware, and/or firmware operating with media handover relay 305 in conjunction with software, hardware, and/or firmware operating on external servers for performing the action. Further, the software program 507e can perform the various actions described in the present invention for the media handover relay 305 through instructions the software program 507e provides to the CPU 507b. In addition, the software program 507e can send and receive media streams using the steps described in connection with FIG. 2a.

FIG. 6

FIG. 6 is a graphical illustration of an exemplary system, where a communications service configures a mobile device and a media handover relay for handover, and where a mobile device authenticates with a media handover relay, in accordance with exemplary embodiments. A mobile network operator or a communications service can operate a media handover relay 305 with connectivity to the Public Internet 106 in order to facilitate a handover for MD 101 from an initial network 601 to an alternate network 117. The initial network 601 and alternate network 117 can be any networks that provide Internet access to a mobile device, and generally would be different subnets of the Public Internet 106. For example, the initial network 601 could be a wireless LAN such as an 802.11 network and the alternate network 117 could be a wireless WAN such as an LTE network provided by a mobile network operator such as MN 102, and other combinations of handover between networks and network technologies are possible as well.

A handover of a media session between the two networks can be managed at the application level of the traditional OSI stack, using a media handover relay 305 and the exemplary systems illustrated in FIGS. 1 through 5 above, and media handover relay 305 may also preferably be secured for communication with MD 101 and CN 108. Exemplary steps for configuring and securing a media handover relay 305 in an efficient and rapid manner are illustrated in FIG. 6, and other variations exist as well without departing from the scope of the present invention. Efficient and rapid procedures for secure authentication with media handover relay 305 may be particularly important during handover, since a complex system involving generating and communicating new session keys, creation of IPsec tunnels, or establishment of TLS or SSL (or similar) connections may significantly slow down a handover. In other words, desired objectives of security and speed of handover may conflict, and the system illustrated in FIG. 6 can represent an efficient solution given the conflicting objectives. Since media handover relay 305 can preferably have a publicly routable Internet address 306 and also receive packets from any globally routable IP address, for increased security, media handover relay 305 may authenticate a node or filter packets before further processing media streams or providing other services such as supporting a handover.

After establishment of a first media session with a CN 108, MD 101 can submit a MD relay request 602 to a communications service (CS) network 603. A communications service network 603 may be equivalent or similar to a communications service 214, and may consist of a collection of servers or computing devices to establish and/or manage media sessions for a MD 101. CS network 603 may also be a subset of a communications service 214 or an affiliate of a communications service 214. CS network 603 can manage a network of servers or distributed computers in order to support data and/or media sessions for MD 101 (or a plurality of mobile devices). A mobile network operator, illustrated as MN 102 in FIG. 1a, can be one example of a communications service network 603. If a CS network 603 and a communications service 214 are functionally equivalent, then a "CS network 603" and a "communications service 214" can also be essentially interchangeable terms or language of the present invention. A user associated with MD 101 may obtain service from a communications service network 603 or a communications service 214 by (i) signing or clicking or agreeing to a "terms of use" agreement for the services provided by or associated with CS network 603, (ii) purchasing services according to monthly, per-minute, per megabyte, or similar usage plans, and/or (iii) viewing advertising displayed within a user interface 205 on MD 101 in order to access media services such as telephone calls.

As described previously in FIG. 2b and elsewhere herein, some examples of a CS network 603 (i) Google Talk®, Skype®, or Microsoft's Messenger®, and these services may be generally associated with fixed-line broadband Internet access in 2008, or (ii) traditional mobile network operators such as AT&T® or T-Mobile®. The CS network 603 may manage media sessions through application software operating on MD 101, such as a software program 204. The communications service can include a mobile device (MD) proxy server 213a, for example, which MD 101 periodically registers with in order to support inbound or outbound calling or other data flows, and MD 101 may generally communicate call control including a MD relay request 602 with an MD proxy 213a. Messages between MD 101 and CS network 603 illustrated in FIG. 6 could be transmitted over the same or similar channel as the call-control channel 2b and could optionally be secured via standard techniques such as TLS or SSL or similar methods.

A MD relay request 602 can include the IP address of CN 108 communicating with MD 101 and additional data useful for a CS network 603 and/or media handover relay 305 to manage a handover, such as a call identity token, codec implemented for the media between MD 101 and CN 108, a set of codecs supported by either MD 101 or CN 108, and/or a globally unique identifier for MD 101. Other examples of data useful for a handover through media handover relay 305 are possible as well, and could be included within an MD relay request 602. In order to speed handover, MD Relay Request 602 can be submitted by MD 101 before an alternate network 117 is determined to be preferred for handover, such as when an initial media session consisting of MS 1 109 and MS 2 110 is established, or possibly when MD 101 observes a viable beacon signal from AN 117, but before acquiring IP 301.

A CS network 603 can include a communications service database 604 in order to (i) authenticate various devices receiving services from a communications service 214 and (ii) generally manage services delivered to a plurality of mobile devices, including devices such as MD 101, or also CN 108 if CN 108 is managed by CS network 603. Note that CN 108 is not required to be managed by CS network 603 in order to utilize the efficient handover techniques described herein, and CN 108 may be managed by a third party, such as another communications service that is different from CS network 603. Communications service database 604 can include various functions, such as a security token generator 605, a MD security key database 606, a hash calculator 608, a LAN profiles DB 624, a handover procedure rules 227, a CN software handover database 233, and also a handover performance database 626. Token generator 605 can create strings such as a nonce ("number used once") or a pseudo-random number or string, and the output of a token generator 605 can be a security token 614. MD key database 606 can include security keys, such as a collection of MD security keys 607, for a plurality of mobile devices connected to the network. The MD security key 607 can be similar to a key utilized in other key systems for securing wireless or data networks including (i) a session key such as Kc in the 3GPP specifications, (ii) a pre-shared key such as Ki in the 3GPP specifications, or (iii) a device certificate, such as X.509 certificate based, or (iv) an authentication key in WiMax specifications. The various possible forms of a MD security key 607 are included herein for illustration and not for limitation, and other possible forms for a MD security key 607 exist as well.

Further, a MD 101 may have a plurality of MD security keys 607, where one key can be for encryption and a second key can be to check integrity and a third key can be for authentication.

The communications service database (CSDB) 604 may also contain a hash calculator 608, which can generate a secured hash combination of a security token 614 from token generator 605 and MD security key 607 contained in a MD key database 606 for MD 101. Hash calculator 608 could perform hash calculations such as an MD5, SHA, a combination of MD5 and SHA via XOR, or similar techniques. The output of hash calculator 608 can be a security hash 609 (or equivalently a message digest), which is illustrated with fewer bits in system 600 than an actual MD5 or SHA hash for simplicity, and security hash 609 could be of any practical and preferably secure length. By using the data architecture illustrated in system 600, a MD security key 607 does not need to be transmitted across the public Internet 106, while a hash function of a MD security key 607 and a string such as security token 614 can be used to authenticate MD 101 at AN 117 with media handover relay 305. The hash function of MD security key 607 and a security token 614, illustrated as security hash 609, can be transmitted across the public Internet 106 without compromising a MD security key 607, and the security hash 609 may also be transmitted to media handover relay 305 and stored in a relay database 610. In order to increase security, MD key database 606 may preferably not be stored within media handover relay 305 since media handover relay 305 can have a globally routable IP address and thus can be contacted from any IP address, in order to support media from MD 101 at an AN 117, and the IP address of AN 117 may not be known before an attempted handover.

The communications service database (CSDB) 604 may also contain a LAN profiles database 624 ("LAN profiles DB"). The LAN profiles DB 624 may contain a plurality of LAN profiles 226 for mobile devices that are associated with CS network 603. An individual LAN profile 226 may also preferably be stored within a mobile device 101, in order to facilitate rapid handover, such as allowing MD 101 to evaluate a handover procedure locally in order to minimize the time required to conduct handover. However, MD 101 could both update a locally stored LAN profile 226 and periodically transmit data within a LAN profile 226 to a CS network 603, where CS network 603 can store the data for a LAN profile 226 within a LAN profiles DB 624. LAN profiles DB 624 can associate data for an individual LAN profile 226 with a mobile device 101 and/or a subscriber. An MD 101 can also query CSDB 604 for information in a LAN profiles DB 624. For example, if MD 101 is "reset" and/or a locally stored LAN profile 226 is not available within memory of MD 101, MD 101 can obtain the appropriate LAN profile 226 for the mobile device by querying CSDB 604, which in turn can obtain the appropriate LAN profile 226 from a LAN profiles DB 624. Also, if a subscriber obtains an entirely new mobile device 101, the new mobile device 101 could query CSDB 604 for a LAN profile 226 associated with the subscriber, such as the exemplary LAN profile 226 illustrated in FIG. 2e.

In addition, and as described in FIG. 2e, if MD 101 observes an alternate network 117 for handover that does not have an entry in a local LAN profile 226, MD 101 could query CSDB 604 for the appropriate entry within a LAN profile 226 in a LAN profiles DB 624 for the alternate network 117, such as the row in a LAN profile 226 matching an identity token 224c of the alternate network 117 (e.g. MAC address, base station identity code, or other preferably unique identifier or set of identifiers). The appropriate entry for the alternate network 117 may be stored in LAN profiles DB 624, if a different MD 101 associated with CS network 603 had (i) connected to the target network before, (ii) scanned the network to evaluate a firewall type and other network parameters, and (iii) updated CSDB 604 (and CSDB 604 could update LAN profiles DB 624). If CSDB 604 has data for AN 117, possibly obtained from a different MD 101, CSDB 604 could respond to the query from MD 101 with the appropriate entry for AN 117. MD 101 could then also update its locally stored LAN profile 226. Note the time required for MD 101 to obtain an entry or data from a LAN profiles DB 624, where the entry or data possibly was acquired by a different MD 101, can be significantly less than the time required to scan the alternate network and determine a firewall type and/or ports allowed or blocked. For example, by querying CSDB 604 before obtaining IP address 301 (such as when a specific, new AN 117 is first observed), MD 101 can acquire information pertaining to the new AN 117 (such as firewall type, ports open, etc.) before MD 101 has ever transmitted or received a packet through the new AN 117. Consequently, the efficiency of handover to a new AN 117 for a media session with MD 101 can be significantly increased.

In addition, since a CS network 603 can preferably record LAN profile 226 data for a plurality of mobile devices in a LAN profiles DB 624, data for an alternate network 117 such as a set of network parameters 224 can be averaged or aggregated across multiple possible entries from multiple devices. For example, measures of network quality 224*i*, connection setup delay 224*h*, and other data could be averaged across accesses from either (i) multiple different mobile devices, (ii) multiple accesses by the same mobile device, and/or (iii) otherwise processed in order to obtain superior quality data for a LAN profile 226. The superior quality data could subsequently be input into a handover procedure rules 227 via a set of handover parameters 228 in order to select and efficient handover procedure 232.

A communications service database 604 may also contain a handover procedure rules 227, which could correspond to the handover procedure rules 227 within software program 204 in FIG. 2*a*. As described in FIG. 2*g*, a CS network 603 may periodically update either (i) handover procedures 232, such as if a new handover procedure is created to account for new capabilities by either MD 101 or CN 108, (ii) handover procedure rules 227 such as if a different handover procedure 232 should be selected given data for a set of handover parameters 228, (iii) update a set of handover parameters 228, such as including a new firewall type or changing a timing value. Other changes to a handover procedure rules 227 can be implemented as well. After updating a handover procedure rules 227, a CS network 603 could store the updated information within CSDB 604, and data for the handover procedure rules 227 within CS network 603 could be formatted according to a file. MD 101 could periodically query CSDB 604 to acquire updated information within a handover procedure rules 227 from CS network 603 in order to update a local copy of handover procedure rules 227 stored within MD 101. Alternatively, a CS network 603 could "push" an updated handover procedure rules 227 to MD 101 that may be stored within CSDB 604. Updated handover procedure rules 227 could also be stored in other locations besides CSDB 604, such as a MD proxy server 213*a* or another server associated with CS network 603.

In addition, a CS network 603 may support a plurality of different device types and software programs 204. Software programs 204 can have a version number, and a specific handover procedure rules 227 can be associated with the version number of a software program 204. For example, different software versions may have different capabilities, and different handover procedure rules 227 could be used with different software versions. One software program version (such as an exemplary version 1.0) could utilize a first version of a handover procedure rules, such as the exemplary handover procedure rules 227 illustrated in FIG. 2*h*. A second software program version (such as an exemplary version 2.0) could utilize a second version of a handover procedure rules, such as the exemplary handover procedure rules 227 illustrated in FIG. 2*g*. In general, updated software program 204 versions can be associated with updated handover procedure rules. Consequently, a CS network 603 may contain a plurality of handover procedure rules 227, which could be stored in a communications service database 604, as illustrated in FIG. 6. Although not shown in FIG. 6, a CS network 603 may also contain a database of handover procedure rules, which could contain plurality of handover procedure rules such as different versions of handover procedure rules 227 associated with different software programs 204 versions, and other combinations of handover procedure rules contained in a database of handover procedure rules are possible as well.

A media handover relay 305 may include a relay database 610 in order to facilitate management of communications between MD 101 and CN 108 during handover. Relay database 610 can be useful when secured communications are desired and also if media handover relay 305 participates in a plurality of handover media sessions concurrently, in order to ensure media streams can be properly mapped between mobile devices and corresponding nodes. Relay database 610 can include a table or set of tables with data for parameters such as a MD port 308 and a CN port 409 for media, a CN IP address 131 (representing the public IP address on an external interface of a CN FW 130, such as IP address 131), a handover procedure 232, a security token 614, a token time-to-live (TTL) value 615, and a security hash 609.

As illustrated in FIG. 6, each row or entry within relay database 610 can correspond to a different active media session between a mobile device and a corresponding node prior to a potential handover utilizing media handover relay 305, and a relay database 610 can also contain data for media sessions during or after handover, such as when media is being routed through media handover relay 305. The exemplary data illustrated in FIG. 6 for relay database 610 can be associated with other figures in the present invention. The first entry in relay database 610 (with handover procedure 232 of "Relay A") can represent an exemplary relay database 610 entry supporting the handover illustrated in FIGS. 3-5. The second entry with a handover procedure "Relay C" can represent an entry according to the handover illustrated in FIGS. 12-14. The third entry with a handover procedure "Relay D" can represent an entry according to the handover illustrated in FIGS. 15-16.

Relay database 610 can also include additional fields not shown in FIG. 6 but illustrated in FIG. 9 below, such as a long-term, generally public identification token for MD 101 (e.g. a telephone number or a mobile subscriber identity number such as a temporary mobile subscriber identity number or TMSI), a call sequence number for tracking existing media sessions, a Call-ID such as the Call-ID field specified for SIP in IETF RFC 3261 and subsequent versions. Relay database 610 could also optionally omit some parameters illustrated in system 600, such as (i) not including a security hash 609 or security token 614, or (ii) omitting the field for CN IP address 131, as examples. Entries can be inserted in relay database 610 as the first media sessions are established between mobile devices and corresponding nodes (i.e. before handover). Entries in a relay database 610 can also be removed if no handover is required, such that if a first media session between an MD 101 and CN 108 is terminated before MD 101 evaluates that handover may be preferred to an alternate network 117, or if a TTL value expires, etc.

Although relay database 610 is illustrated as contained within media handover relay 305 in system 600, relay database 610 could be operated separately from media handover relay 305, such as media handover relay 305 querying a local or remote server or process (i) containing relay database 610 or (ii) communicating with relay database 610. Further, relay database 610 can be maintained within CS network 603 or communications service database 604, and other possibilities exist as well without departing from the scope of the present invention. In addition, media handover relay 305 could be combined with the communications service database 604 or media handover relay 305 could be combined with MD proxy 213*a*, and other variations exist as well for the logical location of elements illustrated in FIG. 6 and related exemplary embodiments. Similarly, although a single communications service database 604 and a single media handover relay 305 are illustrated within system 600, a CS network 603 may operate a plurality of communications service databases 604 and/or relays 305. Logic within a CS network 603 could properly manage and distribute both calls and data across the multiple elements. Media handover relay 305 may also belong to a communications service network 603.

Within relay database 610, MD port 308 and CN port 409 can be a TCP or UDP port media handover relay 305 utilizes for receipt of media from either MD 101 or CN 108, respectively, during handover. Although a different local port on media handover relay 305 is illustrated for the receipt and transmission of media between (i) media handover relay 305 and MD 101, and also (ii) media handover relay 305 and CN 108 in FIGS. 4 and 5 and in relay database 610, the same port number could also be utilized. Note that additional port numbers could be recorded in additional columns or fields for media-control channels within a relay database 610 such as recording IP:ports 506*b* and 508*b*. Further, a media handover relay 305 may use different port numbers for the receipt and transmission of media with each node, and consequently relay database 610 could include multiple local ports associated with each node to support communication during handover. A separate local port could also be used for authentication requests from MD 101 or CN 108, where a port number for authentication is different from a port number for media.

Other variations for a media handover relay 305 to utilize or local ports such as IP:ports 308 and 409 are possible as well, such as implementing the same IP:port as the receive and transmit port on media handover relay 305 for all media streams, which is common for Asterisk servers implementing the IAX2 protocol for example (often port 4569 according to the IAX2 specifications), and in this case MD port 308 or CN port 409 may be optionally omitted from relay database 610. If the same port on media handover relay 305 is used to communicate with multiple mobile devices and corresponding nodes, then each media packet may contain an identifier or token associated with a media session, such as a call ID, to assist media handover relay 305 in demultiplexing multiple media streams on the same port. Once a media stream such as MS 3 302 or MS 5 309 is established with media handover relay 305, additional port numbers can be stored within relay database 610 such as the destination port for a media stream transmitted by media handover relay 305, or also ports associated with media-control channels. MD port 308 and CN port 409 can also be combined with an IP address, such that IP:port numbers are stored in relay database 610.

CN IP address 131 can be the public IP address associated with CN 108, such as the IP address MD 101 observes as the source IP for MS 2 110, illustrated as IP address 131 in FIG. 1*a*. Consequently, media handover relay 305 can also reasonably predict packets received by media handover relay 305 from CN 108 during a handover should also have a source IP address 131, even before packets are received from CN 108, and IP address 131 can be stored in relay database 610. CN IP address 131 can also be utilized in conjunction with CN port 409, in order to filter packets from unknown addresses received at IP:port 409. In other words, media handover relay 305 can drop packets received at IP:port 409 if they do not originate from IP address 131 in order to enhance the security of media handover relay 305. A relay database 610 may have additional row or entries than those illustrated in FIG. 6 as well, which can correspond to additional media sessions between mobile devices and corresponding nodes.

Handover procedure 232 within relay database 610 can provide information to media handover relay 305 regarding the steps for media handover relay 305 to conduct during handover. As illustrated in FIG. 6 and throughout the present invention, there may be multiple variations of a handover procedure that utilize a relay. Each procedure could utilize different steps and/or sequence of steps, and media handover relay 305 can perform the proper series of steps for a handover by following a handover procedure 232. Media handover relay 305 could obtain the handover procedure 232 from CS network 603, and CS network 603 could utilize a handover procedure rules 227 to select handover procedure 232. Alternatively, if MD 101 operates a handover procedure rules 227, then MD 101 could include the selected handover procedure 232 within a packet transmitted to media handover relay 305 upon the start of handover (which could be a MD relay authenticate 621 or a MD relay update 622, as described below). If no handover procedure 232 is available or specified, the procedure could be designated as "unknown", and media handover relay 305 could implement a default "relay" handover procedure (such as potentially "Relay B" for all attempted handovers).

Relay database 610 can also contain a security token 614 which may be a nonce, pseudo-random number, or other token that can be used to authenticate a mobile device and/or corresponding node with media handover relay 305. The security token 614 may be created by a security token generator 605, which could include a pseudo-random number generator. Security token 614 could also be a token generated during the creation of the first media session, such as a SIP Call-ID for MD 101, or similar session or call identifiers in other protocols. Security token 614 could also be a session key, associated with either the first media session between MD 101 and CN 108 or a second media session that can be routed through media handover relay 305. A token TTL 615 value can specify the duration of validity of a security token 614, in order to enhance security such that a pair consisting of a security token 614 and a security hash 609 can remain valid for a finite time interval. If a security hash 609 is not utilized, then a token TTL 615 value can correspond to a time interval that security token 614 may be valid or utilized by MD 101, media handover relay 305, or CN 108.

A token TTL 615 value can assist with preventing unauthorized clients or software programs with connectivity to the public Internet 106 from gaining access to services or communication with media handover relay 305 by repeated and extended attempts to "guess" a valid combination of security token 614 and/or security hash 609 within a relay database 610. If only a security token 614 is stored in a relay database 610 (i.e. the security hash is omitted), then a token TTL 615 value could limit the time an unauthorized client could attempt to "guess" security token 614. The length of time an unauthorized client would have to guess a valid pair of security token 614 and security hash 609 could be limited to the token TTL 615 value, which is illustrated in FIG. 6 in seconds. Either longer or shorter values for exemplary token TTL 615 values than those illustrated in FIG. 6 may also be utilized. Note that a security token 614 and a security hash 609 may also remain valid (e.g. have a TTL value) for MD 101 for more than a single media session and also possibly multiple media sessions which may include handover through a media handover relay 305. Further, token TTL value 615 can be omitted, and the combination of security token 614 and security hash 609 can remain valid for the duration of a media session between MD 101 and CN 108, or until a CS network 603 signals media handover relay 305 a security token 614 is no longer valid.

Although not illustrated in FIG. 6, other methods of securing the combination of an entry within a relay database 610 for security token 614 and a security hash 609 are available as well, such as implementing an "number of retries" remaining value for the pair in relay database 610. If the number of retries is exceeded (or equivalently the "number of retries" remaining value goes to zero), then a security token 614 and/or security hash 609 can become no longer valid, and a new security token 614 and/or security hash 609 may be generated for an existing media session between a mobile device and a corresponding node. In addition, a remote client or host IP address that exceeds the "number of retries" could be blocked from further access to media handover relay 305, preferably for an interval of time.

A security hash 609 illustrated in relay database 610 can be generated using a secure hash function such as a MD5 or SHA1 message digest or similar methods via a hash calculator 608. Inputs into the hash calculator can include a security token 614 and a MD security key 607. Although not illustrated in FIG. 6, MD 101 can also contain a hash calculator 608 in order to locally obtain the same security hash 609 for a given security token 614 (by using the equivalent MD security key 607 in generation of the security hash 609). Additional inputs into a hash calculator 608 besides security token 614 and MD security key 607 could also be utilized, such as including an identity token for MD 101, a session ID or call-ID for the first media session between MD 101 and CN 108, an IP address, a date or time value, a port number, or similar data associated with MD 101, CN 108, or a first media session illustrated in FIG. 1a. In general, the same (i) inputs utilized by a CS network 603 and (ii) logic utilized by a hash calculator 608 should preferably be utilized by both the CS network 603 and MD 101 in order to obtain the same security hash 609 (a) stored within a relay database 610 and (b) calculated by MD 101.

Although illustrated as a series of numbers in relay database 610, the language "security token 614", "security token TTL 615", and "security hash 609", etc. used herein and in descriptions of subsequent drawings can refer to a single entry within each respective series of numbers illustrated in FIG. 6. For example, "security token 614" can refer to the value of the appropriate entry for a MD 101 within the "security token" column, as opposed to the entire series or column. Note that a security hash 609 and token TTL 615 may optionally be omitted in relay database 610 and various messages illustrated in FIG. 6 and subsequent figures, and media handover relay 305 could authenticate MD 101 or CN 108 with a security token 614 or through other means.

After MD 101 can submit MD relay request 602 to a CS network 603, relay database 610 can be updated with a network relay request 616. Network relay request 616 can contain several parameters for media handover relay 305 to securely and efficiently manage a handover, including a public CN IP address 131, a security token 614, a security hash 609, and a security token TTL value 615. A handover procedure 232 may also optionally be included in a network relay request 616 if it is available. Other variations on network relay request and similar messages illustrated in FIG. 6 are possible within the scope of the present invention, such as dividing the information transmitted from a CS network 603 into multiple smaller requests, or transmitting additional information such as a media session ID, a mobile device identity token, or other data that can be useful for media handover relay 305 to manage handover. Data transmitted between a media handover relay 305 and a CS network 603 can be preferably transmitted over a secure connection such as TLS, HTTPS, or IPsec, as examples. Communication between a CS network 603 and a media handover relay 305 can be further secured, since IP addresses associated with each server or process within the CS network 603 can be relatively static and media handover relay 305 may also be controlled or managed by a CS network 603.

Upon receipt of network relay request 616, media handover relay 305 can update relay database 610 by (i) inserting an additional row or entry with information contained in relay request 616 and (ii) assigning local port numbers MD 308 and CN 409. Port number "MD 308" can be equivalent to the port number within IP:port 308 illustrated in FIG. 3 and port number "CN 409" can be equivalent to the port number within IP:port 409 illustrated in FIG. 4. Note that according to a preferred exemplary embodiment, local port numbers on media handover relay 305 for the receipt of media or media-control packets are randomly or pseudo-randomly assigned (possibly within a range such as >1024 to avoid conflicts with standard ports like DNS). The use of pseudo-random port numbers can increase security on media handover relay 305, since remote unauthorized hosts or clients could be less likely to "guess" valid port numbers, especially in combination with other data such as a security token 614.

Media handover relay 305 can then respond to network relay request 616 with a network relay response 617 to indicate the successful processing of relay request 616 and also provide an appropriate IP:port allocated on media handover relay 305 for receipt of communication from MD 101 at AN 117 and/or CN 108. For example, media handover relay 305 can append a local IP address 306 to MD 308 and respond with an IP:port 308 in a network relay response 617. Network relay response 617 could also provide information if media handover relay 305 cannot properly process network relay request 616, such as if resources are not available, network relay request 616 was improperly formatted, or other error conditions. In general, responses to requests illustrated in FIG. 6 could also provide information if the request cannot be accepted or processed, and exemplary successful responses are illustrated in FIG. 6.

Upon receipt of network relay response 617, a CS network 603 can respond to MD 101 with a MD relay response 618, which can represent a response to a MD relay request 602 that may have previously been issued by MD 101. MD relay response 618 can contain a security token 614, a security token TTL 615 value, and an IP:port on media handover relay 305 which could be the combination of MD port 308 and IP address 306, such as media handover relay 305 IP:port number 308. MD port 308 and CN port 409 in FIG. 6 are illustrated with just the port number, which can be combined with an IP address in order for MD 101 or CN 108 to transmit packets to media handover relay 305. An MD relay response 618 can take many forms in addition to those illustrated in FIG. 6. As an another example, MD relay response 618 can include a relay domain name or other identity token instead of an IP address 306, and MD 101 could resolve the name to an IP address using DNS. MD relay response 618 may also preferably contain a port number CN 409 for CN 108 to utilize as the destination port within IP:port 409 in MS 4 401. MD 101 can transmit IP:port number 409 to CN 108 in a call-control signal 307, as described in connection with FIG. 3 and also elsewhere herein.

Other possibilities for the sequence, timing, and information contained in the transmission of a MD relay response 618 are possible as well. Additional examples of the possible timing and/or sequence include CS network 603 or MD proxy 213a (i) automatically sending the equivalent or similar information illustrated in MD relay response 618 when MD 101 and CN 108 establish a media session (even without receiving a MD relay request 602), (ii) periodically transmitting the data when a TTL value such as security token TTL 615 expires, or (iii) when a entry associated with MD 101 within a relay database 610 becomes invalid, such as if an entry has exceeded a maximum number of invalid retries. Upon receipt of information contained in a MD relay response 618, MD 101 can calculate a security hash 609 for a given security token 614 using MD security key 607. MD 101 can calculate security hash 609 using a hash calculator 608 associated with MD 101 (not shown).

MD 101 may have established a first media session with CN 108 as illustrated in FIG. 1a, and subsequently may also have a call control channel established, such as the call-control channel illustrated in FIG. 2b. Upon receipt of the information contained in a MD relay response 618, MD 101 can inform CN 108 with relevant parameters for CN 108 to establish communication with media handover relay 305 by issuing a CN relay update 619 request. As illustrated in system 600, CN relay update request 619 could include (i) a relay IP:port 409 for CN 108 to implement as the destination port in MS 4 401, (ii) a security token 614 associated with the media session through media handover relay 305 during handover, and (iii) a security token TTL value 615. CN relay update 619 could be transmitted as a SIP INFO or SIP NOTIFY message, as two examples. Note that CN relay update 619 can be preferably transmitted before a call control signal 307 is transmitted to CN 108, where a call control signal 307 can signal the start of handover (i.e. the initiation of the transmission of new media streams via media handover relay 305, such as a signal for CN 108 to begin transmitting MS 4 401). As one example, MD 101 can transmit relay update 619 through IP 103 via a call control channel 2b before MD 101 connects to AN 117.

In this manner, by MD 101 transmitting CN relay update 619 before call control signal 307, CN 108 can take steps in preparation of a handover, such as authenticating with media handover relay 305 via a CN relay authenticate 620 request, if CN 108 supports the feature. Before transmitting a CN relay update 619 request, MD 101 could evaluate if CN 108 supports (i) CN relay update 619 request and/or (ii) CN relay authenticate 620. If CN 108 does not support these two messages or the feature is otherwise not utilized for a handover, MD 101 could optionally omit the transmission of CN relay update 619. MD 101 could evaluate if CN 108 supports (i) CN relay update 619 and/or (ii) CN relay authenticate 620 according to a value for CN handover function 229 associated with CN 108. MD 101 could also transmit a CN relay update 619 message through a call-control channel using a message such as SIP INFO, and observe the response, which could include a response similar to "OK" if accepted or an error or failure response if CN 108 does not support CN relay update 619 or CN relay authenticate 620.

CN 108 can accept CN relay update 619, process the message, and transmit a CN relay authenticate 620 to media handover relay 305. CN relay authenticate 620 can include a security token 614, which may be (i) an equivalent security token 614 implemented by MD 101 in the calculation of a security hash 609, or (ii) security token 614 could be different such as a second nonce, pseudo-random number, or string utilized by CN 108 and media handover relay 305 for authentication of CN 108 with media handover relay 305. Although not illustrated in FIG. 6, CN relay authenticate 620 can also include an IP:port associated with CN 108, such as IP:port 405 on the external interface of a CN FW 130, which media handover relay 305 can utilize as the destination IP:port for MS 5 309. IP:port 405 could be obtained by CN 108 via techniques such as STUN illustrated in FIG. 2c. The IP:port number for IP:port 405 can also be equal to the IP:port number for IP:port 125 which MD 101 can implement as the destination IP:port for MS 1 109 (if CN FW 130 is not a symmetric NAT router).

Thus, by CN 108 receiving a CN relay update 619 before receiving a call control signal 307, preferably even before MD 101 connects to AN 117, the time to establish communication between MD 101 at AN 117 and CN 108 through media handover relay 305 can be reduced. Although illustrated in system 600 as MD 101 transmitting CN relay update 619, another appropriate element could initiate or transmit CN relay update 619, such as originating from CS network 603 or possibly CN proxy server 213b. If CN 108 does not support a message such as CN relay update 619, the message can be omitted and information such as the relay IP:port 409 for CN 108 to conduct handover can be included in a call-control signal 307.

Information contained in a CN relay update 619 or a CN relay authenticate 620 can depend on the client software implemented within CN 108, such as a software program 209. For example, if CN 108 is also managed by the same CS network 603, informing CN 108 with the parameters in a CN relay update 619, could be completed through separate security steps than those illustrated in system 600 for MD 101. In this case, if CN 108 operates the same software program or fully compatible protocol as MD 101, a CS network 603 could update and authenticate CN 108 with media handover relay 305 using methods similar to those for MD 101 as illustrated in system 600. As one example if CN 108 is managed by the same communications service 214, a CS network 603 could also generate a security hash 609 for CN 108, since a CS network database 604 may also contain a CN security key similar to MD security key 607. If MD 101 and CN 108 operate compatible software programs such as the same or similar versions of the Skype® protocol, Google Talk®, MSN Messenger®, and/or are managed by the same CS network 603, a CS network 603 may also maintain a security key for CN 108 and could create a second security hash 609 for CN 108, and the second security hash could be stored in a relay database 610. Further, CN 108 may also be a mobile device equivalent to MD 101, and in this case CN 108 can have similar capabilities and functions of a MD 101 illustrated in FIG. 6.

Alternatively, a CN relay update 619 could optionally be modified and combined with a call-control signal 307 to initiate handover. CN 108 could be capable of transmitting and receiving media from MD 101, but may belong to a separate network than CS network 603 or operate (i) a software program 209 or (ii) operating system 208 that may not support preferred fields or parameters in a CN relay update 619 or CN relay authenticate 620. For example, if CN 108 is a session border controller, a gateway to the PSTN, or a device managed by a third-party (i.e. network other than MN 102 or a communications service 214), or does not support a CN relay update 619 compatible with MD 101, CN 108 may not be able to readily accept or process a security token 614 or a security token TTL 615 as transmitted by MD 101 in a CN relay update 619 request.

However, CN 108 should preferably be able to support a call-control signal 307 to redirect outbound media from CN 108 to a new IP address and port (i.e. to IP:port 409 on or associated with a media handover relay 305), such as through a SIP Re-Invite request or similar call-control signals in other protocols implemented by CN 108. Even if CN 108 cannot authenticate with media handover relay 305 as illustrated in FIG. 6, CN 108 can preferably also specify a local receive port number to receive inbound media for a redirected media session equal to the source port number used to transmit outbound media (i.e. set IP:ports 403 and 406 to be equal) upon processing a call-control signal 307, preferably using "make before brake" techniques. Further, CN 108 can preferably specify the receive port number after processing a call-control signal 307 to be the same port number before handover (i.e. set IP:port numbers 406 and 122 to be equal).

MD 101 can preferably transmit a MD relay authenticate 621 request to media handover relay 305 illustrated in FIG. 6 after connectivity with alternate network 117 is established. MD relay authenticate 621 can contain a security token 614, a security hash 609, and IP:port number 405. IP:port number 405 can represent the IP:port number for media handover relay 305 to utilize as the destination IP:port number for packets transmitted in MS 5 309, which may also be equal to the IP:port number MD 101 utilizes for the destination IP:port number for MS 1 109. Note the IP address in IP:port number 405 can be IP address 131. Media handover relay 305 can compare a security hash 609 and/or a security token 614 received in a MD relay authenticate 621 with a security hash 609 and/or a security token 614 within a relay database 610 in order to authenticate MD 101. MD 101 can transmit MD relay authenticate 621 from AN 117, and data within the authenticate message could be generated from a calculation using a security token 614. If authentication fails, media handover relay 305 can reject subsequent packets from MD 101 and also transmit an authentication failure message. If authentication is successful, media handover relay 305 can (i) begin processing received packets from MD 101 and/or CN 108 and also (ii) transmit an authentication successful response (not shown).

A security token 614 within a MD relay authenticate could optionally be omitted, and media handover relay 305 could authenticate MD 101 with a security hash 609. Alternatively, MD 101 could omit a security hash 609, and media handover relay 305 could authenticate MD 101 with a security token 614. MD relay authenticate 621 can be transmitted before MD 101 calculates that handover is preferred, in order to further reduce the number of steps required once handover is calculated to be preferred. Alternatively, a MD relay authenticate 621 can be transmitted after handover is calculated to be preferred, such as concurrently when MD 101 begins transmitting MS 3 302. Although not shown in FIG. 6, a MD relay authenticate 621 may also contain a selected handover procedure 232, in order to inform media handover relay 305 of a potential expected sequence of steps or other information media handover relay 305 can utilize in order to conduct a handover.

MD 101 can preferably transmit MD relay authenticate via a UDP datagram from IP:port 303a to IP:port 308. A MD relay authenticate could alternatively be transmitted via TCP, TLS, or similar connection-oriented or secure protocol to a different IP:port than IP:port 308, but establishing the TCP, TLS, or similar connection may require additional steps and more time than transmitting MD relay authenticate 621 via a UDP datagram. In order to increase reliability of the proper receipt, MD 101 could transmit multiple copies such as three separate MD relay authenticate 621 requests. MD relay authenticate 621 could also preferably be the first UDP datagram transmitted within the series of UDP datagrams representing MS 3 302. MD 101 can also utilize security token 614 to encrypt or cipher packets transmitted to media handover relay 305, and thus security token 614 could also function as a session cipher key. Media handover relay 305 can decipher the media packets received in MS 3 302 using the locally stored security token 614. Although not illustrated in FIG. 6, media handover relay 305 can preferably respond to a MD relay authenticate 621 request, also transmitted as UDP from IP:port number 408 (equal to IP:port number 308) to IP:port 407 (equal to IP:port 304). The response can inform MD 101 that the authentication request has been accepted or rejected, and MD 101 could then take further appropriate steps for authentication or handover, as necessary.

In order to enhance security, media handover relay 305 can implement packet filtering rules, which may depend on (i) if different local port numbers are assigned for the receipt of media from MD 101 and CN 108, and (ii) if CN 108 supports a CN relay authenticate 620 message. Media handover relay 305 can preferably assign different local port numbers for MD port 308 and CN port 409, and as noted previously MD port 308 and CN port 409 can be pseudo-randomly assigned within a range of port numbers. If MD port number 308 and CN port number 409 are not equal, media handover relay 305 may preferably require a successful MD relay authenticate 621 message before accepting media packets on MD port 308 for subsequent processing (e.g. transmitting to CN 108). If media packets are received by media handover relay 305 before a successful MD relay authenticate on IP:port 308, media handover relay 305 can preferably buffer media within the stream (for a reasonable duration such as media received during the previous second), and upon processing a successful MD relay authenticate 621 message then forward the buffered media to CN 108.

Media handover relay 305 may also preferably implement a relay packet filter 410 before otherwise processing or buffering media from MD 101, CN 108, or any other host or client transmitting packets through the public Internet 106. A relay packet filter 410 is further depicted and described in connection with FIG. 4 above. The buffering of media by media handover relay 305 without a successful authentication request may also preferably be screened by a relay packet filter 410 to be "conforming media", as described in FIG. 4 above. In other words, if the media is not conforming, then media handover relay 305 would not buffer the media without a successful authentication request such as MD relay authenticate 621.

Likewise, if CN 108 supports a CN relay authenticate message 620, then media handover relay 305 may preferably require a successful CN relay authenticate 620 message before accepting media packets on CN port 409, which could be included in filtering rules within a relay packet filter 410. Packets received on CN port 409 could also be buffered before the receipt of a valid authentication by CN 108, and upon authentication media handover relay 305 can forward the buffered media to MD 101. CN 108 could also be authenticated by CN 108 transmitting a valid security token 614, which could be a SIP call-ID utilized in the first media session and stored in relay database 610. Note that MD relay authenticate 621 message could also include a field to notify media handover relay 305 if CN 108 supports a CN relay authenticate 620 message (such as if MD 101 received an "OK" or similar message to a CN relay update 619 request transmitted to CN 108).

If (i) MD port number 308 and CN port number 409 are not equal and (ii) CN 108 does not transmit a failed CN relay authenticate 620 message (e.g. the feature is not supported by CN 108), then media handover relay 305 may utilize a relay packet filter 410 to reject, drop, or otherwise filter packets received on CN port number 409 which do not originate from IP address 131 associated with CN 108. In addition, media handover relay 305 could reject, drop, or filter packets that do not originate from an IP:port number equal to IP:port number 404, which could represent the same IP:port number for the destination of MS 5 309, received in a MD relay authenticate 621 message. This filtering rule within a relay packet filter 410, of requiring in-bound packets on relay IP:port 409 to have a source IP:port number equal to port number 405 or IP:port number 404, may be primarily useful if CN FW 130 is not a symmetric NAT router since a symmetric NAT router can use different external source port numbers for packets transmitted to media handover relay 305 and MD 101.

Thus, media handover relay 305 can also filter packets with a relay packet filter 410 from the public Internet 108 that do not originate from a CN 108 even if CN 108 does not transmit a CN relay authenticate message 620 message. Note that a token TTL 615 value may also be used by media handover relay 305 in filtering packets, such that if a token TTL value expires, then a time interval where media handover relay 305 may accept packets on a local port may also expire (and the local port numbers could subsequently be reused). Further, if media handover relay 305 utilizes a single local port number for the receipt of media from MD 101 and CN 108 (e.g. MD port 308 and CN port 409 are equal), media handover relay 305 may filter packets on the local port such that media packets should originate either from (i) an authenticated MD 101 or (ii) a CN 108 where the received packets are "conforming media". A MD relay authenticate 621 request could also optionally be omitted, and media handover relay 305 could accept packet from either MD 101 or CN 108 which represents "conforming media", and a CS network 603 could update media handover relay 305 with values for "conforming media" through a network relay request 616. Packets received by media handover relay 305 and processed by a relay packet filter 410 which are not conforming media could be dropped or otherwise filtered. Other methods of filtering packets or securing media handover relay 305 for communication with MD 101 at AN 117 and CN 108 are also possible within the scope of the present invention.

MD 101 may transmit MD relay request 602 before AN 117 becomes available through a physical interface 201a, possibly when a first media session between MD 101 and CN 108 was established and AN 117 was out of range. When MD 101 evaluates that AN 117 may be a target network for handover, which could be before or after IP 301 is acquired, MD 101 may update media handover relay 305 with an MD relay update request 622. MD 101 could obtain information regarding AN FW 130 and/or the network within AN 117, by (i) looking up information in a LAN profile 226 or (ii) probing an AN FW 130 and/or AN 117 after acquiring IP 301 as examples, where changes to ports and/or protocols implemented by media handover relay 305 may be required in order to efficiently complete handover.

Thus, a proper or efficient configuration of media handover relay 305 for communicating media with MD 101 at AN 117 may not be known when an initial MD relay request 602 was transmitted and/or a MD relay response 618 was received. As one example, media handover relay 305 could specify a UDP IP:port 308 (stored as a MD port 308 in a relay database 610) as the IP:port to receive media from MD 101 upon handover in a MD relay response 618. MD 101 could subsequently (i) observe an AN 117 such as "Office" illustrated in a LAN profile 226 in FIG. 2e and (ii) evaluate that handover may be preferred to the "Office" network 224a. As noted in the exemplary LAN profile 226 in FIG. 2e, a AN FW 130 may restrict packets such that only remote TCP ports 80 and 443 are supported (representing HTTP and HTTPS), and subsequently handover with a media handover relay 305 receiving media via UDP at IP:port 308 may not be possible. In this example, MD 101 could transmit a MD relay update 622 request, and a CS network 603 could transmit a network relay update 623 request in order for media handover relay 305 to change its configuration (such as receiving IP port or protocol) in order to support communication from MD 101 at AN 117. Note that a media handover relay 305 can preferably also receive media on TCP port 80, which may function as a "backup" local port and transport protocol in case AN FW 119 blocks UDP and/or other TCP ports.

Other examples of changes in configuration of media handover relay 305 for communicating media with MD 101 at AN 117 are possible as well. MD 101 can transmit a MD relay update 622 to increase efficiency of handover based upon MD 101's evaluation of an AN 117 network through either (i) a LAN profile 226 or (ii) scanning or probing AN 117. As illustrated in the exemplary LAN profile 226 in FIG. 2e, an alternate network "Coffee Shop" may support streaming control transmission protocol (SCTP) through IPv6. Media handover relay 305 could have initially specified a UDP port and an IPv6 address for the receipt of media from MD 101 at AN 117 (which could be the location "Coffee Shop" in this example). SCTP may be preferred to UDP, but SCTP may not be universally or even commonly supported through firewalls, and in this example MD 101 could transmit a MD relay update request 622 in order to request media handover relay 305 support media from MD 101 at AN 117 transmitted via the SCTP protocol.

In general, MD 101 can preferably transmit a MD relay update 622 to change or update a configuration of media handover relay 305, with data or confirmation for a MD relay update 622 possibly received in a MD relay response 618 message, in order to more efficiently conduct handover. MD 101 may utilize information from a (i) a LAN profile 226 (ii) scanning or probing AN 117, or (iii) network quality values in order to adjust the parameters for transmitting media to or receiving media from media handover relay 305 via a MD relay update 622 request. MD 101 may also transmit a MD relay update 622 to include a current value for time t 241, network quality values such as AN SNR 237, data within a handover parameters 228, a media sequence number for an expected packet within a MS 3 302 or a MS 4 401 for media handover relay 305 to receive, and/or a session key for media transmitted through media handover relay 305, possibly before MD 101 can transmit packets from IP 301.

A media handover relay 305 could receive a network relay update 623 and process the message in order to more efficiently and securely utilize a handover procedure 232. As one example, a media handover relay 305 could utilize a media sequence number in a MD relay update 622 in order to filter packets in a relay packet filter 410. Note that data within a MD relay update 622 could optionally be combined with a MD relay request 602, such that a MD relay request 602 could include data within a handover parameters 228, media sequence numbers for media received by media handover relay 305, or a session key. Note that a MD relay update 622 may include an IP address 120 or an IP:port associated with the external interface of AN FW 119, an MD 101 could obtain the IP address or IP:port using techniques such as STUN. Media handover relay 305 could use the IP address or IP:port associated with the external interface of AN FW 119 in a relay packet filter 410 or for transmitting MS 6 402 to MD 101 at AN 117.

Multiple media handover relay 305 IP:ports could be included in a MD relay response 618 and a CN relay update 619 and similar messages. As one example, MD relay response 618 and similar messages could contain four media handover relay 305 IP:port numbers: a first IP:port number for receipt of media packets from MD 101, and a second IP:port number for receipt of media-control-channel messages from MD 101, a third IP:port for receipt of media from a CN 108, and fourth IP:port for receipt of media-control-channel messages from CN 108. Further, an optional fifth IP:port within the messages would represent a separate IP:port for media handover relay 305 to receive authentication requests, although authentication messages could be received on the same ports as media and/or media-control packets. In this example, two separate port numbers for media handover relay 305 are illustrated in FIG. 5 as IP:port 308 for the receipt of media packets and IP:port 508*a* for the receipt of media-control-channel packets from MD 101 and also two separate port numbers for media handover relay 305 for the receipt of packets from CN 108 can be IP:port numbers 409 and 506*b*. Further, media handover relay 305 can preferably support communication with both IPv4 and IPv6 addresses, and exemplary messages such as (i) network relay response 617 and (ii) MD relay response 618 could include both IPv4 and IPv6 addresses and ports, and MD 101 could select the appropriate IP protocol version and address to use, based upon the IP protocol implemented at AN 117. Media handover relay 305 may preferably implement a "dual stack" in order to communicate with other nodes that have either IPv4 or IPv6 addresses. Media handover relay 305 may also preferably translate between to two routing protocols, as required.

As illustrated in FIG. 6, a communications service database 604 may also contain a CN software handover DB 233. A CS network 603 could update CN software handover database 233 as additional information regarding the handover functions and capabilities of corresponding nodes is acquired. MD 101 can record a local copy of CN software handover database 233 in memory, and MD 101 could periodically update the local copy by querying CS database 604. Alternatively, MD 101 could query CS database 604 for information on the capabilities of a CN 108 relevant for conducting a handover. As one example, the CN software version 234 or user agent that MD 101 may observe upon setup of the first media session could be included in a MD relay request 602. MD relay response 618 can include information or an entry within a CN software handover database 233 associated with the CN software version 234, such as a CN handover function 229 as one example. CN software handover database 233 could also contain additional data associated with CN 108's software version, such as identifying CN 108's functions for (i) keeping the same transmit and receive port number upon handover, (ii) capacity to transmit media (for the same call) to two different IP addresses concurrently, or (iii) the format or type of format of a proper call-control signal 307 for MD 101 to transmit to CN 108 in order for CN 108 to properly conduct handover. The exemplary additional data associated with CN 108's software version could also be additional values for a CN handover function 229, such that a CN software database 233 may have a plurality of CN handover functions 229 in addition to those illustrated in FIG. 2*f*. The data identifying CN 108's functions during handover, such as a CN handover function 229, could also be transmitted in a MD relay response 618. The data identifying CN 108's function during handover within a CN software handover database 233 could be utilized by either MD 101 or CS network 603 to select a handover procedure 232 by calculating a handover procedure rules 227.

In addition, a CS network 603 could also utilize a local copy of a CN software handover database 233, a handover procedure rules 227, and a LAN profile 226 (possibly within LAN profiles DB 624) in order to select a handover procedure 232. After observing an AN 117 as a potential candidate network to handover a media session, and preferably even before obtaining IP address 301, MD 101 could transmit a handover procedure request 625 to CS network 603 (and in this case MD 101 may not know the "relay" class of handover procedures is preferred or selected since a CS network 603 may select the procedure). Handover procedure request 625 may include an AN 117 identity token 224*c*, estimated time t 241 until handover, a firewall type 231 for CN FW 130, and data on the quality of physical or data-link layer connections such as IN SNR 235, IN SNR trend 236, AN SNR 237, and AN SNR trend 238. In addition, a handover procedure request 625 could include a measure of the power required to transmit via the AN 117, which may be obtained from a LAN profile 226. Some fields or values may be omitted and others included as well in a handover procedure request 625.

As one example, MD 101 could include CN 108's software version 234 in a handover procedure request 625. Further, MD 101 could transmit handover parameters 228 to CS network 603 in a handover procedure request 625. CS network 603 could access a communications service database 604 and select a handover procedure 232 by conducting exemplary steps illustrated within FIG. 2*j* such as Steps 254, 255, and 257. Although not illustrated in FIG. 6, CS network 603 could transmit a selected handover procedure 232 within a handover procedure response. If a handover procedure "wait" is selected, MD 101 could wait according to Step 259 in FIG. 2*j*, and then (i) recalculate time t and (ii) update handover parameters 228 at Step 256 of FIG. 2*j*, and then retransmit a handover procedure request 625 to CS network 603.

In addition, both MD 101 and a CS network 603 may be operable to select a handover procedure 232 using a handover procedure rules 227 and a LAN profile 226. For example, MD 101 may not have sufficient time, or a sufficient quality network through an initial network such as MN 102 to query a CS network 603 by transmitting a handover procedure request 625 and wait for a response. In this case, MD 101 can select the handover procedure 232 utilizing calculations performed locally within a software program 204 and/or operating system 203, utilizing exemplary techniques illustrated in FIG. 2*j* and elsewhere herein. Alternatively, if MD 101 maintains a sufficient quality connection with an initial network, MD 101 could query a CS network 603 to select a handover procedure 232.

A CS network 603, possibly representing a set of servers and other packet processing equipment within a communications service 214, could also contain a handover performance database 626, which may also be associated with a communications service database 604. Handover performance database 626 could record performance data regarding handovers conducted by mobile devices associated with a communications service 214, such as an exemplary MD 101. MD 101 could transmit handover performance data after handover to CS network 603, where CS network 603 can log the data within a handover performance database 626, and data transmitted by MD 101 may include a selected handover procedure 232, handover parameters 228, and information on AN 117 and/or an initial network such as MN 102. Performance data could also include time values such as (i) the time between transmitting a call-control signal 307 and receiving MS 6 402, (ii) time between transmitting MS 3 302 and receiving MS 6 402, (iii) round-trip delay between MD 101 at AN 117 and a media handover relay 305, (iv) time to receive media-control-channel messages, and other time values as well. Absolute time values as opposed to relative time values illustrated in the previous sentence could also be recorded in a handover performance database 626. Other time values illustrated within the present invention could also be recorded or calculated using absolute time values, in addition to the relative time values illustrated herein (e.g. time t 241 could be "12:05:30:055" as opposed to "4.3 seconds").

A handover performance database 622 could also record performance data regarding the quality of network parameters at AN 117 and/or media transmitted through a media handover relay 305 such as (i) packets lost within a MS 6 402, (ii) transmitted packets not received by CN 108 (possibly acquired through a media-control channel such as RTCP receiver reports), (iii) bit errors, (iv) jitter, (v) delay in media packets received such as end-to-end delay to CN 108 through media handover relay 305, (vi) SNR values, (vii) data within a handover parameters 228 at the time a handover procedure was selected, (viii) an overall average of media quality such as a calculated mean opinion score, and other measures of quality as well.

A communications service 214 could access a handover performance database 626 in order to analyze the historical performance of various handover procedures 232 with measured network conditions and/or handover parameters 228, including data on firewall types and also data within a LAN profile 226 associated with each handover. Based upon an analysis of performance recorded in a handover performance database 626, changes to (i) a handover procedure rules 227 or (ii) data input through a handover parameters 228 could be made in order to subsequently increase the efficiency of a handover procedure 232 or a plurality of handover procedures. As one example, using the data contained in the results of a plurality of handovers within a handover performance database 626, steps within a handover procedure 232 could be modified or adjusted with a given set of handover parameters 228. In addition, a different handover procedure 232 could be specified for a given set of handover parameters 228, in order to increase the efficiency of handovers between heterogeneous IP networks.

FIG. 7

FIG. 7 is a simplified flowchart for a mobile device to conduct exemplary handover procedures with a media handover relay, in accordance with exemplary embodiments. In FIG. 7, at Step 701, MD 101 can establish a media session such as a voice call with a CN 108, utilizing a first IP address such as an IP address provided by a mobile network operator. The first IP address could also be obtained from any network with Internet connectivity, such as not restricted to a mobile WAN, and the mobile device may be transmitting and receiving media packets through an initial network in Step 701. The media session could be established through call-control channel via messages such as SIP INVITE, IAX2 NEW, XMPP Request, or other similar messages according to a protocol implemented by MD 101. In addition, MD 101 and CN 108 may not implement the same call-control protocol, and an intermediate server may translate the call-control messages between the two nodes, such as translating a version of the XMPP protocol implemented on MD 101 into a version of the SIP protocol implemented on CN 108. Although a request for a media session is described as originating from MD 101, a request to initialize a session could be originated from the corresponding node, representing an incoming call to the mobile device.

As shown in Step 702, upon establishment of the media session, a first media stream MS 1 109 is transmitted from MD 101 to CN 108, and a second media stream MS 2 110 transmitted from CN 108 to MD 101. The media session may optionally include a separate media-control channel or protocol, such as RTCP or SRTCP as examples, or the media-control channel could possibly be imbedded directly into the media streams (i.e. UDP ports implemented for the media streams), as with the IAX2 protocol or similar techniques. Preferably, quality feedback is provided by RTCP, SRTCP, similar protocols, or media-control packets inserted into the media stream in order to: (i) monitor the quality of received media received at another node and (ii) allow adjustments such as changing a codec, implementing forward error correction, or taking other steps to attempt to improve, manage, and/or monitor call quality.

At Step 703, MD 101 can acquire (i) an IP:port on media handover relay 305, such as IP:port 308 in FIG. 3, which could include a MD port 308 in a relay database 610, and (ii) a security token for media handover relay 305, such as security token 614. IP:port 308 and/or the security token 614 can be provided to MD 101 by MN 102 or a communications service 214, and may be dynamically assigned. A security token 614 may also be associated with MD 101 or the first media session. IP:port 308 and a security token 614 could be acquired by MD 101 in a MD relay response 618, and note that a MD relay response is not required and the data could also be acquired via other means. Also at Step 703, media handover relay 305 may begin monitoring IP:port 308 for receipt of (i) a MD relay authenticate 621 request and (ii) media packets from MD 101 at AN 117, even though the source IP address and port for media from MD 101 at AN 117 may not yet be available. Step 703 may optionally be performed before or during Step 702, such as before or during the time when media streams were established, or also before or during Step 701, such as before or during the time when the initial call request to set up a media session was processed. Through MD 101 acquiring a security token 614 and IP:port 308 at Step 703, secure communications between MD 101 at AN 117 and media handover relay 305 can be more rapidly established in subsequent steps. In addition, acquiring a security token for communication with media handover relay 305 may optionally be omitted, although omitting a security token 614 may not be preferred.

A security token 614 for the media handover relay 305 illustrated in Step 703 can be a number used once ("nonce"), a public encryption key, a session key, a challenge for MD 101 to process and create a response, there the response can allow MD 101 to communicate with media handover relay 305 via AN 117, and security token 614 may also be a session key for ciphering media transmitted between MD 101 and media handover relay 305, and MD 101 could also acquire a plurality of security tokens 614 at Step 703. A security token 614 may be transmitted to MD 101 through an encrypted or ciphered call-control channel 2b. The security token may have a "time to live" value, security token TTL 615, such that if handover is not performed within a specified time, such as an exemplary value of three hours, MD 101 could be required to obtain another security token 614 due to the expiration of the previous security token.

According to a preferred exemplary embodiment, MD 101 can calculate a security hash 609, such as a MD5 or SHA1 message digest, or similar hash technique, using at least (i) a security token 614 and (ii) a MD security key 607, and media handover relay 305 may be informed by MN 102 or a communications service 214 of the same, calculated security hash 609. The calculated security hash 609 recorded by a media handover relay 305 can then be used by media handover relay 305 to accept and process packets from MD 101 at AN 117, even though (i) MD 101 may not have communicated call-control with media handover relay 305 from AN 117 and (ii) media handover relay 305 may not know the MD security key 607 used to calculate the security hash 609 value. Alternatively, a relay database 610 may include both (i) the security token 614 and (ii) a MD security key 607 and media handover relay 305 or a relay database 610 could subsequently calculate the hash value directly. In this case, MD security key 607 can preferably be a session key, as opposed to an authentication key or a pre-distributed key similar to Ki within 3GPP standards.

At Step 704, the mobile device can acquire a second IP address, such as IP 301, can authenticate with media handover relay 305 via a MD relay authenticate 621 or similar request, and may determine that handover of the active media session to the new IP address is preferred. One of many example possible parameters to determine if handover is preferred include whether handover will reduce consumption of network resources for the mobile network 102, or alternatively if call quality will be improved. In addition, at Step 704, MD 101 may determine that establishing a second, redundant communications channel through a second IP address is desirable, and may later determine that handover from one network to the next is preferred. Upon acquiring IP 301 at Step 704, MD 101 can also authenticate with media handover relay 305 from IP 301. The authentication procedure can utilize a security token 614 acquired in Step 703 and a security hash 609 depicted and described in FIG. 6.

A MD relay authenticate 612 request can be transmitted as a UDP packet (or series of packets) from IP:port 303a on MD 101 at IP 301 to IP:port 308 on media handover relay 305, before media packets in MS 3 302 are transmitted to IP:port 308 on media handover relay 305. Other procedures to authenticate MD 101 at Step 704 can alternatively be implemented as well. MD relay authenticate 612 could also be transmitted according to TCP or another transport protocol besides UDP from IP 301, which may require more time for handover than transmitting a UDP packet. In addition, MD relay authenticate 612 may be transmitted to another port associated with media handover relay 305 besides IP:port 308.

Also at Step 704 according to a preferred exemplary embodiment, media handover relay 305 can compare the security hash 609 transmitted by MD 101 with a security hash 609 value in relay database 610. Media handover relay 305 can also respond to the authentication request, and transmit the response as a UDP packet from IP:port 308 to the IP:port observed as the source IP:port in an MD relay authenticate 621 request, which could be equal to IP:port number 304 on the external interface of an AN FW 119. MD 101 can also evaluate if handover to AN 117 is preferred at Step 704, using techniques such as those outlined in FIG. 15 of U.S. patent application Ser. No. 12/163,472, the contents of which are hereby incorporated by reference in their entirety, and other techniques for calculating if handover is preferred could be implemented as well. In addition, MD 101 can evaluate or calculate that establishing a duplicate media session with media handover relay 305 from IP 301 is preferred in Step 704, and later evaluate or calculate that handover of the first media session is preferred. In addition, MD 101 may calculate handover is preferred before Step 704, such as during Step 703.

At Step 705, the mobile device 101 can begin transmitting MS 3 302 from IP 301 to media handover relay 305 at IP:port 308, after handover is evaluated or calculated to be preferred (i) in Step 704 or (ii) earlier. MD 101 can acquire IP:port 308 via a MD relay response 618 or a similar message in Step 703. MS 3 302 can preferably be transmitted concurrently with MS 1 109, representing a "make before break" handover. MD 101 may also use security token 614 to cipher or encrypt packets transmitted in MS 3 302, and media handover relay 305 may also utilize security token 614 to decipher or decrypt packets received in MS 3 302. If both MD 101 and CN 108 utilize the same ciphering key, then media handover relay 305 can pass media through without deciphering. Since MD 101 can be previously authenticated with media handover relay 305 in Step 703, possibly before handover is calculated to be preferred, media handover relay 305 can accept media packets in MS 3 302 and begin transmitting MS 5 309 to CN 108 at IP:port 405. IP:port 405 could be transmitted to media handover relay 305 via a MD relay authenticate 621 request in Step 704, as one example. As a second example, MD 101 could have included IP:port number 125 in a MD relay request 602 or a similar message transmitted to a CS network 603, and CS network 603 can inform media handover relay 305 of IP:port 405. As illustrated in FIGS. 4 and 5, IP:port number 405 can equal IP:port number 125, which could be preferred if CN FW 130 is a port-restricted cone NAT router or a standard firewall such as a symmetric firewall, or also another type of firewall that is not a symmetric NAT router.

If MD 101 is not authenticated in Step 704, then at Step 705 media handover relay 305 can drop or discard media packets or other data received at IP:port 308 until authentication from MD 101 is successfully completed or a TTL timer such as security token TTL has expired (and the port could be closed if the TTL timer expires). If media received at IP:port 308 is conforming media, as described in connection with a relay packet filter 410 in FIG. 4, before receiving a valid MD relay request 621, media handover relay 305 could buffer the media. Although Step 705 is illustrated as being performed by MD 101 before Step 706, Step 705 could take place either after Step 706 or essentially concurrently with Step 706.

At Step 706 and referring to FIG. 3, MD 101 can transmit a call-control signal 307 to CN 108 to initiate handover (e.g. signal CN 108 to start transmission of a new media stream). A call-control signal 307 (i) can include IP:port 409 for media handover relay 305 to receive media from CN 108, and (ii) could be transmitted via a call-control channel such as illustrated in FIG. 2b. Preferably, a call-control signal 307 could be transmitted from MD 101 to CN 108 by inserting a non-media call-control packet in the stream of datagrams consisting of either MS 1 109 or a media-control channel such as RTCP Stream 2 112, likely providing a more direct and rapid signaling path than transmitting via a call-control channel 2b. In addition, call-control signal 307 could be transmitted in both a call-control channel 2b and by inserting a signaling packet within the datagrams (i.e. using the same port pairs) consisting of either MS 1 109 or a media-control channel such as RTCP Stream 2 112. Call-control signal 307 can be transmitted after MD 101 transmits an optional CN relay update 619 request, or information within a CN relay update 619 request could be combined with a call-control signal 307.

If CN 108 can accept and process a CN relay update 619 request, then call-control signal 307 may also be transmitted via a change in a UDP checksum values for media within MS 1 109, as described in FIG. 3 of U.S. patent application Ser.

No. 12/120,940, the contents of which are hereby incorporated by reference in their entirety. Further, call-control signal 307 can preferably be transmitted from IP 103 without requiring MD 101 to register with MD proxy server 213b at IP 301. Also, call-control signal 307 can preferably be received and processed by CN 108 as a single packet, where CN 108 can begin transmitting a new media stream MS 4 401 upon receipt of the single packet (e.g. not requiring additional signaling back and forth between MD 101 and CN 108).

In addition, although a call-control signal 307 can preferably be processed as a single packet, MD 101 can preferably transmit multiple copies of the single packet to increase likelihood of receipt by CN 108, such as MD 101 transmitting three copies of a packet consisting of call-control signal 307. If call-control signal 307 is transmitted as a single packet, possibly within MS 1 109 or a media-control channel, it may preferably contain a digital signature for CN 108 to authenticate the call-control signal 307 originated from MD 101. The digital signature could be a hash message digest from a session key or other information previously shared between MD 101 and CN 108, and other possibilities exist as well to ensure call-control signal 307 received by CN 108 is valid. As another example, if MD 101 and CN 108 had established a ciphered channel between the nodes, which may include media, MD 101 could transmit the call-control signal 307 within the ciphered channel.

Continuing at Step 706 and also continuing to refer to FIG. 3, a call-control signal 307 may be received by CN 108 as a logical signal as opposed to an explicit message or packet such as a SIP INVITE or IAX2 NEW. For example, CN 108 may be capable of receiving media packets from media handover relay 305 in MS 5 309 before receiving an explicit call-control signal 307 or packet under several scenarios (i.e. packets transmitted from media handover relay 305 with a destination IP:port equal to IP:port 125 can be received by CN 108 before a separate call-control signal 307). A logical call-control signal 307 for CN 108 to initiate handover and begin transmitting MS 4 401 could consist of the receipt of essentially duplicate media from MS 5 309 and MS 1 109. Some example scenarios where CN 108 could receive media in MS 5 309 to signal handover before CN 108 can receive an "explicit" call-control message or packet via a call-control channel 2b can include (i) if CN 108 has a publicly routable IP address (with a corresponding CN FW 130 firewall type of "null"), (ii) CN FW 130 is a full cone NAT router, or (iii) CN 108 has transmitted a packet such as a CN relay authenticate 620 illustrated in FIG. 6 to a media handover relay 305 before receipt of an "explicit" call-control message.

If CN 108 supports and utilizes a CN relay authenticate 620 message, CN 108 can preferably transmit CN relay authenticate 620 with (i) source IP:port number 403 equal to IP:port number 406 and (ii) destination IP:port number 409 equal to IP:port number 310. Other possibilities exist as well for CN 108 to be capable of receiving media packets from media handover relay 305 before receiving a call-control signal 307 as a separate packet or message, which could thereby allow a call-control signal 307 to be received by CN 108 as a logical signal, and subsequently handover can be processed more quickly. The receipt of a logical call-control signal 307 (such as receiving duplicate media from two different IP addresses) could be secured through the use of ciphering for MS 5 309, where (i) CN 108 and (ii) MD 101 and/or media handover relay 305 share a security key. Thus, only hosts such as MD 101 or a media handover relay 305 would have the capability to transmit duplicate copies of properly ciphered media.

Continuing in Step 706 and also continuing to refer to FIG. 3, in general, CN 108 may be able to receive packets transmitted by media handover relay 305 in MS 5 309 if (i) CN FW 130 is either the type "null" or a full-cone NAT, or (ii) CN FW 130 is a partial-cone NAT and CN 108 had transmitted a packet to media handover relay 305, or (iii.a) CN FW 130 is a port-restricted cone NAT and (iii.b) CN 108 had transmitted a packet to a port number equal to IP:port number 310 using IP:port number equal to IP:port 406 as the source IP:port in the packet transmitted. In this case of any of the three conditions above being met, a logical call-control signal 307 received by CN 108 could consist of the receipt of essentially duplicate media streams MS 1 109 and MS 5 309. As illustrated in FIG. 3, CN 108 can observe the received duplicate media streams, where substantially similar media is received from MD 101 via two separate IP addresses, IP 103 and IP 306 (i.e. the media handover relay 305 IP address). The receipt of at least two packets, each packet containing redundant media with the other packet but from different source IP addresses, may signal to CN 108 that MD 101 is initiating handover, and IP address 306 can be the new, preferred IP address for CN 108 to communicate media with. The content of the two packets does not have to be identical (e.g. the media payload could be formatted to a different codec, have different levels of bit errors, have different framing, and/or possibly could utilize a different ciphering or encryption key).

Continuing at Step 706 and also continuing to refer to FIG. 3, this logical call-control signal consisting of duplicate media may be received by CN 108 before a separate call-control message such as a SIP Re-INVITE or similar message is sent via a call-control channel illustrated in FIG. 2b. A benefit of automatically sending duplicate media streams MS 1 109 and MS 5 309 to CN 108 is that the time needed for conducting the handover can be reduced. For example, a SIP Re-Invite or another SIP message such as SIP REFER in IETF RFC 3515 or similar messages in other protocol may normally be passed through a call-control channel such as illustrated in FIG. 2b, which may require processing on multiple intermediate servers (i.e. an MD proxy, a CN proxy, and possibly additional higher-level proxies) and subsequently slow the handover process. Further, call-control between intermediate proxies may implement transport protocols such as TCP, TLS, and/or SSL which may likely require additional time to transmit and process packets compared to transmitting a call-control signal 307 as a logical signal.

In addition, the essentially duplicate or redundant media streams MS 5 309 and MS 1 109 which may be received by CN 108 at Step 705 should not degrade quality or cause other problems. Receipt of duplicate media could enhance call quality. The duplicate media streams MS 1 and MS 5 may be useful for CN 108 to maintain audio quality if the quality of MS 1 degrades while the mobile device moves away from a base station 104 or into a location of reduced coverage or lower signal-to-noise ratios, such as movement into a building. If packets in MS 1 are dropped or contain errors, CN 108 may compensate for the errors by substituting/combining the equivalent packets in MS 5.

Continuing in Step 706 and referring to FIG. 4, upon receipt of a call-control signal 307, CN 108 can begin transmitting MS 4 401 to media handover relay 305 at IP:port 409. Media handover relay 305 can receive packets from CN 108 and transmit them to MD 101 in MS 6 402. At Step 706, media handover relay 305 could also implement security steps, such that if CN 108 is not authenticated, then packets in MS 4 401 or other data from CN 108 could be discarded. If CN 108 is not capable of transmitting a CN relay authenticate 620 request or implementing similar authentication functionality, media handover relay 305 could secure communications with CN 108 by verifying received media matches a valid pair of CN port 409 and IP 131 in a relay database 610, and possibly further verify media from CN 108 is conforming media and/or originates from IP:port equal to IP:port 124 (which may also be equal to both IP:port 125 and 405). Continuing at Step 706 and also referring to FIG. 4, if CN FW 130 has not forwarded media received at IP:port 405 to CN 108, such as if (i) CN FW 130 is a port-restricted cone NAT router or a symmetric firewall and (ii) CN 108 has not transmitted a packet from (x) a IP:port number equal to IP:port number 406 to (y) a IP:port number equal to IP:port number 310, then the first packet transmitted in MS 4 401 may open and bind IP:port 405 on CN FW 130 allowing CN 108 to begin receiving media at IP:port 406 (assuming MS 4 401 is transmitted with transmit IP:port number 403 equal to receive IP:port 406).

In Step 707 and also continuing to refer to FIG. 4, MD 101 can begin receiving MS 6 402, preferably at IP:port 303$b$, which can use the same IP:port number as IP:port 303$a$, as IP:port 303$a$ can be utilized as the source IP:port for the transmission of MS 3 302. Other ports could be used as the destination IP:port for MS 6 as received by MD 101 in Step 707, but using a different port than an IP:port number equal to IP:port 303$a$ to receive media may require (i) opening the ports on the AN FW 119, if present, (ii) negotiating the change in ports between MD 101 and media handover relay 305, and (iii) maintaining a binding on the external port for the remaining duration of a media session. MD 101 may monitor IP:port 303$b$ for the receipt of MS 6 402, preferably while continuing to receive MS 2 110 on IP:port 114.

At Step 708 and referring to FIG. 5, MD 101 can establish a media-control channel associated with MS 3 302 and MS 4 401. A media-control protocol such as RTCP or similar or related protocols may be used, in which case MD 101 may send a port-binding packet 505 to IP:port 508$b$ on media handover relay 305 from IP:port 501$a$ to open and set IP:port 502$b$ on AN FW 119.

As depicted and described in FIG. 5 (i) a packet can be sent simply to open the port (i.e., an actual complete RTCP receiver or sender report or similar media-control message is not required) and (ii) actual media-control messages can be transmitted later in the handover. A packet sent from IP:port 501$a$ to IP:port 508$b$ in order to open and bind IP:port 502$b$ on AN FW 119 may be referred to as a port-binding packet, such as port-binding packet 505. Opening AN FW 119 port 502$b$ early in the handover process may be preferred, such as within a few seconds of the start of transmission of media stream 3, since utilizing a media-control channel to evaluate quality could be helpful for determining when the handover is successful. In other words, rapidly establishing a media-control-channel allows MD 101 to monitor progress of the handover including the quality of media received by CN 108.

Also, opening AN FW 119 IP:port 502$b$ early in the handover process, such as before an RTCP receiver report within RTCP stream 4 504 is available for MS 6 402 (containing media from MS 4 401) allows CN 108 to transmit a RTCP receiver report for MS 5 (transmitted as MS 3 by MD 101) to IP:port 506$b$ on media handover relay 305, which is forwarded to IP:port 502$b$ on AN FW 119, which is then forwarded to IP:port 501$b$ by AN FW 119. A media-control channel message transmitted by CN 108 can provide MD 101 feedback on the quality of MS 3 302 as received by CN 108 (in MS 5 309). Note that IP:port 508$b$ on media handover relay 305 could be acquired by MD 101 in an MD relay response 618 or similar message from a CS network 603.

Continuing at Step 708 and also referring to FIG. 5, when both MD 101 and CN 108 acquire sufficient data for reporting the quality of media streams 6 and media streams 5 (which is MS 3 as transmitted by MD 101), respectively, report messages on quality such as RTCP or SRTCP receiver report messages may be transmitted and received by MD 101 at IP:port numbers 501$a$ and 501$b$, respectively, and IP:port numbers 501$a$ and 501$b$ may preferably be the same number. MD 101 may also transmit media-control-channel packets to IP:port 508$b$ associated with media handover relay 305 and receive media-control-channel packets from IP:port 508$a$ associated with media handover relay 305, and IP:port numbers 508$a$ and 508$b$ may also preferably be the same number. An exemplary media-control channel using a media handover relay 305 is illustrated in FIG. 5. Other media-control-channel ports may be used, which would require proper negotiation between (i) MD 101 and media handover relay 305 and also (ii) media handover relay 305 and CN 108, as well as properly binding ports on AN FW 119 or CN FW 130, if present. The media-control channel process illustrated in Step 708 may be omitted, although it could be useful for MD 101 and CN 108 to monitor quality of the new media streams and efficiently manage handover.

At Step 709, the handover can be completed and MD 101 may stop transmitting MS 1, CN 108 may stop transmitting MS 2, and the associated media-control channels, if implemented, may be closed. The signaling to terminate MS 1 and MS 2 could be sent through the call-control channel illustrated in FIG. 2$b$, or via a call-control packet inserted in the media streams, as examples. Step 709 may be optionally omitted, in that MS 1 and MS 2 could continue for the duration of the users' media session.

FIG. 8

FIG. 8 is a simplified message flow diagram illustrating exemplary handover call-control messages, media flow, and media-control-channel messages between a mobile device, a corresponding node, and a media handover relay, in accordance with exemplary embodiments. The call-control protocol to establish the first media session between a mobile device and corresponding node illustrated in message flow 800 is according to common, current implementations of the SIP protocol. Other protocols that can establish media sessions between endpoints on the Internet could be used, and variations within the SIP protocol are possible as well.

At Step 801, the mobile device and corresponding node establish a media session according to methods that are well known in the art. Although the media is shown as RTP in Step 801, the media could be transmitted according to other protocols which properly sequence media packets, including STRP. A media-control channel in the form of RTCP or similar messages can optionally be used. MD 101 can issue a MD relay request 602 to a CS network 603 via MD proxy 213$a$ or other connections into CS network 603. The timing for when MD 101 can transmit MD relay request 602 can occur (i) automatically after each first media session is established or (ii) after an available AN 117 becomes observed through physical interface 201$a$, possibly after the first media session has been established. Further, MD relay request 602 can be entirely bypassed, and a CS network 603 could transmit information in MD relay response 618, such as relay IP:port 308, without receiving an MD relay request 602.

Continuing at Step 801, MD 101 could observe an alternate network 117 as a candidate for a potential handover of the media session, possibly before IP 301 within AN 117 is acquired for MD 101. MD 101 can obtain an identity token 224$c$ transmitted in a beacon signal by AN 117, such as SSID for a WiFi network or a CGI in a mobile network as examples. MD 101 can access a LAN profile 226 and obtain a firewall type and other data within a network parameters 224 for an AN FW 119 associated with AN 117. MD 101 may also have acquired information regarding a firewall type for a CN FW 130 associated with the corresponding node, such as when the first media session was established or by querying CN 101 or a CS network 603. If no useful information on a firewall type for either AN FW 119 or CN FW 130 is available, MD 101 may evaluate the a firewall type as "unknown".

MD 101 or a CS network 603 could update a handover parameters 228 and calculate a handover procedure rules 227 to select an efficient handover procedure 232, possibly including a firewall type for AN FW 119 and/or CN FW 130 within handover parameters 228. An efficient handover procedure selected by a handover procedure rules 227 can be a procedure "relay", or a procedure within the class "relay". MD 101 can transmit a MD relay request 602 to CS network 603 and monitor for a MD relay response 618. Alternatively, if secure communication between MD 101 at IP 103 and media handover relay 305 is supported, MD 101 at IP 103 could transmit MD relay request 602 to media handover relay 305, and also monitor for a MD relay response 618 from media handover relay 305 (not shown).

At Step 802 and referring to FIG. 6, CS network 603 can update media handover relay 305 in preparation of a possible handover by MD 101 to AN 117. Using information in MD relay request 602, CS network 603 can calculate authentication parameters such as a security token 614 and/or a security hash 609 for MD 101. Note that MD relay request 602 can also include a unique identifier associated with MD 101 in order for a CS network 603 to access an appropriate MD security key 607 in a communications service database 604. In addition, at Step 802 CS network 603 may transmit a network relay request 616 to a media handover relay 305 with parameters or data that media handover relay 305 can store in a relay database 610 in order to process a handover by MD 101. Media handover relay 305 can transmit a network relay response 617 to confirm receipt of the parameters or data and also inform CS network 603 of proper IP:ports 308 and 409 on media handover relay 305 to receive media from MD 101 and CN 108, respectively. A network relay response 617 may also contain IP:ports 506b and 508b for the receipt of media-control-channel messages from MD 101 and CN 108, respectively.

Continuing at Step 802 and also continuing to refer to FIG. 6, CS network 603 can also transmit a MD relay response 618 to MD 101 with information for MD 101 to utilize in a handover through media handover relay 305, such as a security token 614, a security token TTL value 615, and media handover relay 305 IP:port numbers 308 and 409. Although not illustrated in message flow 800, CS network 603 could communicate with multiple relays 305 in Step 802, and subsequently MD 101 could receive data, such as an IP:port number 308, for multiple relays 305 in MD relay response 618 in order to increase redundancy and/or speed. MD 101 could also receive multiple MD relay response messages, where each message may represent a different media handover relay 305 for conducting handover. If a first media handover relay 305 is not reachable from AN 117, or packet routing delays or packet loss through the public Internet 106 is unacceptable for a first media handover relay 305 but acceptable for a second media handover relay 305, then MD 101 could utilize the second relay during handover.

At Step 803, MD 101 at IP 103 can transmit a CN relay update 619 request, in order to prepare CN 108 for a possible handover. CN relay update 619 could be transmitted through a call-control channel 2b, which may be through one or a series of proxy servers including proxy servers 213a and/or 213b, or potentially a call-control channel 2b has been transferred directly between MD 101 and CN 108, including potentially mixing media and call-control on the same ports. Information in CN relay update 619 can include (i) a media handover relay 305 IP:port for CN 108 to communicate with, such as IP:port 409 which can preferably be a different number than IP:port 308 but equal to IP:port number media handover relay 305 may use for IP:port 310, (ii) a security token 614 that CN 108 can utilize when communicating with media handover relay 305 in order to enhance security between media handover relay 305 and CN 108, (iii) a token TTL 615 value for the security token, and/or (iv) other data relevant for CN 108 to conduct a handover utilizing a media handover relay 305.

CN 108 could also optionally utilize a security token 614 in a CN relay update 619 request to generate a session key to cipher or encrypt media transmitted to media handover relay 305. CN relay update 619 may optionally be (i) omitted, if CN 108 does not support the feature, (ii) transmitted by CS network 603 if CN 108 supports the CN relay update 619 feature and also supports communication from CS network 603 (such as if CS network 603 also manages CN 108), or (iii) be combined with a call-control signal 307 to signal handover. If CN 108 does not support a CN relay update 619, then CN 108 can respond appropriately with an error message. CN relay update 619 and similar messages may be transmitted as a SIP NOTIFY or similar message via a call-control channel 2b, if a version of the SIP protocol is implemented and supported between MD 101 and CN 108. Other call-control and message formats for CN relay update 619 and similar messages in other protocols, including XML, are possible as well within the scope of the present invention.

Continuing at Step 803, MD 101 may acquire a second IP address before (i) calculating that handover is preferred and/or (ii) before transmitting MS 3 302. Acquiring a new IP address such as IP 301 and observing a sufficient quality connection to the public Internet 106 at IP 301 may be completed before determining or calculating if handover is preferred. A calculation to determine if handover is preferred could be included in a handover procedure rules 227, such that if "wait" is selected then handover is not preferred and if another handover procedure 232 is selected then handover is preferred. For example, AN 117 may provide a valid local IP address, with superior signal-to-noise ratios at the data-link layer than MN 102 or a similar initial network, but network connectivity to the public Internet 106 at AN 117 could be either unavailable or of unacceptable quality. Alternatively, AN 117 may be acceptable, but quality through an initial network is superior and thus a handover procedure rules 227 could select "wait" based on evaluating a handover parameters 228.

Before determining if handover is preferred, MD 101 may simply determine that establishing a duplicate media session is preferred and may later determine that handover is preferred. MD 101 could be programmed to (x) automatically attempt to establish a duplicate media session including transmitting MS 3 302 when communication through an alternate network either (i) becomes available and/or (ii) meets minimum quality levels that can include calculation of bit error rates, power requirements, or SNR, and then (y) subsequently determine if handover is preferred using measured quality levels achieved in the duplicate media session. In general, if a new media session is established and a first media session is terminated, the termination of the first media session may confirm that MD 101 or a communication service 214 evaluated that handover was preferred. Other conditions may also indicate handover is preferred, such as the initiation of media streams through an alternate network.

Continuing at Step 803, MD 101 at IP 301 can transmits a MD relay authenticate 621 request, which could contain a security token 614 and/or a security hash 609. MD 101 preferably transmits MD relay authenticate 621 as a UDP datagram using a source IP:port 303*a*, which is also the same source IP:port number MD 101 can implement for transmitting and receiving media with media handover relay 305. The benefits include (i) UDP is generally faster than other protocols such as TCP or TLS, SSL, or similar more secure and connection-oriented protocols, and (ii) transmitting MD relay authenticate 621 with a source IP:port 303*a* can establish port bindings on AN FW 119, such that media handover relay 305 can more quickly transmit media back to MD 101 at IP 301 via the opened and bound IP:port number 407 on AN FW 119 (where IP:port number 407 can equal IP:port number 304 when IP:ports 303*a* and 303*b* are preferably set to be equal). In one embodiment, MD relay authenticate 621 can preferably be transmitted as the first UDP datagram in a series of datagrams consisting of the third media stream (MS 3 302). Note that a relay packet filter 410 can be utilized by a media handover relay 305 in order to enhance security and compensate for potential security drawbacks of transmitting a MD relay authenticate 621 message as UDP.

MD 101 can also implement a timer to monitor the time between transmission of a MD relay authenticate 621 message to media handover relay 305 and an expected timeout of port-bindings on AN FW 119, which could be an exemplary 60 seconds if transmitted as UDP and an exemplary 300 seconds if transmitted as TCP, as two examples. If the timer expires and MD 101 has not started receiving MS 6 402, MD 101 can transmit a port-binding packet similar to port-binding packet 505 to media handover relay 305 from IP:port 303*a* in order to keep the port bindings on AN FW 119 active, and then MD 101 can subsequently reset the timer. A port-binding packet 505 could also be a STUN query 217 or similar network probing packet. A port-binding packet may be preferred if MD 101 authenticates with media handover relay 305 for a period of time, such as 30 seconds or longer as one example, before transmitting MS 3 302. Thus, a MD relay authenticate 621 message could be transmitted before MD 101 calculates that handover is preferred, which could be calculated in a handover procedure rules 227 described in FIGS. 2*g*, 2*h*, 2*i*, and elsewhere herein.

Also at Step 803, CN 108 can transmit a CN relay authenticate 620 request to media handover relay 305, if CN 108 supports the feature. Similar to MD 101 in the paragraph above, CN 108 preferably transmits message CN relay authenticate 620 as a UDP datagram from the same source IP:port utilized to transmit MS 4 401, which can also be the same IP:port number used to transmit MS 2 110 and receive MS 1 109. CN relay authenticate can also be transmitted to IP:port 409 on media handover relay 305. Other transport protocols and port numbers could be utilized as well, although using different port numbers or protocols may require additional steps. Although not illustrated in message flow 800, media handover relay 305 could respond to authentications requests with appropriate values such as "OK" or "not OK" with a reason or a reason code (i.e. TTL expired, invalid security token, invalid security hash, insufficient relay resources, etc.). Either MD relay authenticate 621 or CN relay authenticate 620 may optionally be omitted, or security procedures could be implemented through different message flows and data transfers without departing from the scope of the present invention. If authentication requests are omitted, media handover relay 305 can preferably utilize a relay packet filter 410 as described in FIG. 4 above in order to enhance security of media handover relay 305, and further a relay packet filter 410 may filter packets such that only "conforming media" is accepted and processed (e.g. forwarded).

At Step 804, after selecting a handover procedure 232 or calculating that a duplicate media session with CN 108 from IP 301 is preferred, MD 101 can transmit a call-control signal 307 to CN 108, where the call-control signal may contain the IP:port number 409 that CN 108 may implement as the destination IP:port number in MS 4 401. A call-control signal 307 may also contain a media-control channel port that CN 108 may implement as the destination IP:port number for RTCP stream 3 503 or a similar media-control channel. MD 101 or a communications service 214 may calculate if handover is preferred according to a handover procedure rules 227, and handover may be deemed preferred if a selected handover procedure is not "wait" or a similar results that delays handover (possibly including an indeterminate handover procedure 232). MD 101 may also send a call-control signal to CN 108 to indicate that handover is requested, such as through a SIP Re-INVITE or REFER message possibly including SDP, as examples, and other messages in different call-control protocols are possible as well, via a call-control channel illustrated in FIG. 2*b* or a packet transmitted directly from MD 101 to CN FW 130 (i.e. a packet transmitted with a destination IP:port number associated with CN 108).

Also in Step 804 and as illustrated in FIG. 4, MD 101 can begin transmitting MS 3 302 from IP:port 303*a* to IP:port 308 on media handover relay 305, and media handover relay 305 can forward the media contained in MS 3 302 to CN 108 via MS 5 309. Media handover relay 305 can transmit packets in MS 5 309 using a destination IP:port number equal to IP:port number 405, which could preferably be equal to IP:port number 125. Media handover relay 305 can obtain the correct IP:port number 405 for MS 5 309 through several means, including (i) a MD relay authenticate 621 request as shown in FIG. 6, (ii) a CN relay authenticate 620 request, including observing the source IP:port for a CN relay authenticate 620 request, (iii) from CS network 603, or (iv) the source IP:port in a media packet from CN 108 received at IP:port 409.

After receipt of a call-control signal 307, CN 108 can begin transmitting MS 4 401 to media handover relay 305, preferably to the IP:port 409 number contained in either (i) a call-control signal 307 or (ii) CN relay update 619. As depicted and described in connection with Step 706 in FIG. 7, CN 108 could preferably begin transmitting MS 4 401 based upon the receipt of a packet with essentially duplicate media in MS 5 309 and MS 1 109 (i.e. with duplicate media packets received from different source IP:port numbers and not just a duplicate media packet in MS 1 109 since duplicate packets are possible on the public Internet 106). The essentially duplicate media could be received before an explicit call-control message such as a packet that traverses a call-control channel illustrated in FIG. 2*b*. In addition, either MD 101 or CN 108 could filter packets received, by applying a packet filter similar to relay packet filter 410, and packets could be accepted or rejected based upon an evaluation of media received is conforming media as described in FIG. 4. CN 108 can transmit MS 4 401 using IP:port 403, which preferably is the same IP:port number used to transmit MS 2 110 and receive MS 1 109, as illustrated in FIG. 4. A benefit of using the same IP:port number on CN 108 is the same external port mappings can be utilized on the external interface of CN FW 130 that are implemented in the first media session as illustrated in FIG. 4, assuming CN FW is not either (i) a symmetric NAT or (ii) another type of firewall or NAT router that does not maintain consistent bindings between internal and external port numbers for actively used ports (i.e. port bindings have not timed out).

Continuing at Step 804, in one example, where IP:port numbers 122, 123, 403, and 406 are equal, if CN FW 130 is a standard port-restricted cone or partial cone NAT router or symmetric firewall, the first packet transmitted from IP:port 403 to IP:port 409 would open IP:port 405 to incoming packets from MS 5 309, and this first packet transmitted by CN 108 could be (i) a CN relay authenticate 620 request as described in Step 803 and also FIG. 6, (ii) the first packet in MS 4 401, or (iii) a port-binding packet. In another example, if CN FW 130 is a full cone NAT router or has a type "null" (i.e. not present), then CN 108 can automatically receive MS 5 309 at IP:port 406 without previously transmitting a single packet to media handover relay 305.

In this manner (of CN 108 utilizing the same IP:port number for IP:ports 122, 123, 403, and 406), media handover relay 305 can rapidly and efficiently implement the correct IP:port number as the destination IP:port number for packets transmitted from media handover relay 305 to CN 108, and CN 108 can preferably receive media in MS 5 309 before media handover relay 305 receives a media packet from CN 108 (which may likely happen if CN FW 130 is not a symmetric NAT router by using the methods and systems described herein). One reason is the time for a packet to travel from CN FW 130 to CN 108 is likely less than the time for a packet to travel from CN FW 130 to media handover relay 305. Note that this configuration and capability can represent a valuable increase in efficiency, where a corresponding node can receive a packet in a media stream transmitted by a media handover relay before the media handover relay receives a packet from the corresponding node (with the primary exception being if CN FW 130 is a symmetric NAT or a similar NAT that does not consistently maintain internal and external port bindings for actively used ports, which is addressed below in FIGS. 10 and 11). Different port numbers could also be utilized for each of IP:ports 122, 123, 403, and 406, at CN 108, which may require additional steps or time during handover to properly discover, communicate and/or negotiate the ports and possible changes in the external port mappings on CN FW 130.

Continuing with Step 804, media handover relay 305 can forward the media contained in MS 4 401 to MD 101 at IP 301 by transmitting MS 6 402, preferably implementing IP:port 407 as the destination IP:port number, and also with destination IP:port number 407 equal to observed source IP:port number 304, as illustrated in FIG. 4. AN FW 119, if present, can properly forward packets to MD 101 at IP 301. Thus, media handover relay 305 can both (i) utilize the destination IP:port number in MS 6 that media handover relay 305 observes as the originating IP:port number in MS 3 302 and (ii) utilize the same IP:port number for receiving MS 3 and transmitting MS 6. Further, MD 101 can preferably utilize the same IP:port number for IP:port 303*a* and 303*b*, which are the port numbers for transmitting media to and receiving media from media handover relay 305. In this manner, media handover relay 305 can efficiently communicate with MD 101 through AN FW 119.

At Step 805 and referring to FIG. 5, a media-control protocol such as RTCP or SRTCP, as two examples, may be implemented, and in this case CN 108 may send one or more media-control-channel packets (perhaps according to RTCP) in RTCP stream 3 503 to destination IP:port 506*b* that could be communicated to CN 108 via a call-control signal 307 or a CN relay update 619. As noted in the description of FIG. 6, messages such as MD relay response 618 and CN relay update 619 can include a media handover relay 305 IP:port pair representing a first receive IP:port for media and a second receive IP:port for media-control messages associated with media handover relay 305. In addition, messages such as MD relay response 618 and CN relay update 619 may contain two IP:port pairs for a media handover relay 305, such as one IP:port pair for MD 101 and another IP:port pair for CN 108. Media handover relay 305 can receive packets in RTCP stream 3 503 transmitted from CN 108 and transmit them to IP:port 502*b* on AN FW 119, which can forward the packets to MD 101 at IP:port 501*b*.

As noted by the port binding packet 505 illustrated in FIG. 5 and at Step 805 in FIG. 8, MD 101 may transmit a packet from IP:port 501*a* to IP:port 508*b* on media handover relay 305 in order to open and bind IP:port 502*b* on AN FW 119 to IP:port 501*b* before a media-control channel message such as a receiver report at MD 101 is transmitted by MD 101, in order to more quickly receive media-control-channel messages from CN 108 (as retransmitted through media handover relay 305) for MS 3 302. In addition, MD 101 may transmit a MD relay authenticate 621 or similar message as a port-binding packet 505, which may be preferred in order to enhance security on media handover relay 305. In other words, MD 101 could transmit two MD relay authenticate 621 messages to a media handover relay 305: a first authenticate message from an IP:port number equal to the IP:port number 303*b* for the receipt of MS 6 402 (as described in Step 803) and also a second authenticate message from an IP:port number equal to the IP:port number 501*b* for the receipt of RTCP stream 3 503. The two MD relay authenticate 621 messages could be transmitted on different ports concurrently, and the two messages could be distinguished by media handover relay 305 via a flag in the message (such as "source=media" or "source=media control" or similar indicators, as two examples). MD 101 IP:port numbers for transmitting and receiving media-control-channel packets, or equivalently packets containing media-control messages, can be preferably equal. Media handover relay 305 IP:port numbers for transmitting and receiving media-control-channel packets with MD 101 can also preferably be equal, as illustrated in FIG. 5.

Continuing at Step 805 and also referring to FIG. 5, MD 101 can transmit packets for a medial-control channel such as RTCP stream 4 504 from IP:port 501*a* to IP:port 508*b* on a media handover relay 305. Media handover relay 305 can forward these media-control-channel packets received from MD 101 at IP:port 508*b* to CN 108. Media handover relay 305 can transmit the media-control-channel packets received from MD 101 using IP:port number 506*a* as the source IP:port, which can preferably can be a number equal to destination IP:port number 506*b*. Media handover relay 305 can observe source IP:port number 133*a* as the source port number for packets received from CN 108 in either (i) packets for RTCP Stream 3 503 or (ii) a port-binding packet 508, and consequently media handover relay 305 can set destination IP:port number 133*b* equal to an observed source IP:port number 133*a* for media-control messages transmitted to CN 108. CN FW 130 can forward the packets received on IP:port 133*b* to CN 108 destination IP:port 134*b*. IP:port number 133*b* could have been opened and bound to IP:port number 134*b* by either (i) the first media-control channel packet transmitted by CN 108 using IP:port number 134*a* as the source IP:port where IP:port numbers 134*a* and 134*b* are the same number or (ii) port-binding packet 508.

CN 108 IP:port numbers for transmitting and receiving media-control-channel packets with media handover relay 305 (or packets containing media-control messages) can be preferably equal, and media handover relay 305 IP:port numbers for transmitting and receiving media-control-channel packets with CN 108 can also preferably be equal. If a media-control channel is optionally implemented within media streams, then Step 805 can be bypassed. Further, the media-control channel could be entirely omitted, or implemented via "out of band" signaling techniques such as transmitting SIP NOTIFY or SIP OPTIONS messages through a call-control channel such as in FIG. 2*b* or through a call-control channel implemented in another call-control protocol. Other SIP messages, possibly including extensions to the SIP protocol as defined in IETF RFC 3261 and related standards may be utilized as well, including subsequent versions thereof.

In Step 805, after the handover can be completed and the users can finish the media session, MD 101 or CN 108 may terminate the call and end MS 3, MS 4, MS 5, and MS 6 via standard methods such as a "BYE" with SIP or similar messages in related protocols. Although not illustrated in FIG. 8, a separate call-control message could be implemented to terminate MS 1 109 and MS 2 110, and corresponding media-control channels, before terminating MS 3 and MS 4. As illustrated in message flow 800, MD 101 may also transfer the call-control channel so that in-bound and out-bound call-control messages are communicated through IP 301, instead of through IP 103 prior to handover. Note that media handover relay 305 is not required to transmit or receive call-control messages between MD 101 and CN 108, and media handover relay 305 may operate primarily with media and media-control-channel packets or messages between MD 101 and CN 108. According to an exemplary preferred embodiment, media handover relay 305 does not communicate call-control messages such as those illustrated in FIG. 2*b* between the nodes during handover, which may continue to be handled by proxy servers such as proxies 213*a* and 213*b*.

FIG. 9

FIG. 9 is simplified tabular summary illustrating exemplary data within a relay database, in accordance with exemplary embodiments. A relay database 610 within a media handover relay 305 may preferably include a plurality of values and/or data regarding a media session between MD 101 and CN 108, in order to efficiently conduct a handover. The exemplary data within FIG. 9 illustrates possible fields and associated values for the handover illustrated in FIGS. 3-5, in addition to the exemplary data within a relay database 610 illustrated in FIG. 6. In addition, data within a relay database 610 as illustrated in FIG. 9 may be used in conjunction with a relay packet filter 410, such that packets are filtered according to data within a relay database 610, Media handover relay ID 901 can be a preferably unique identification token for a media handover relay 305, and could be used by nodes or servers to locate and contact a media handover relay 305. As one example, media handover relay ID 901 could be used in a domain name in order to obtain an IP address 306 associated with media handover relay 305. Mobile identity token 902 can be an identifier for MD 101 that can be publicly shared, which could be a temporary mobile subscriber identity number (TMSI) as one example. Mobile identity token 902 could be included within messages received from MD 101 such as a MD relay authenticate 621, in order for media handover relay 305 to obtain further data. In other words, a mobile identity token 902 could function as an index within a relay database 610. Call ID 903 may be a unique identifier for the media session between MD 101 and CN 108, such as a SIP Call ID, and Call ID 903 may also be used as an index within relay database 610. The next seven entries in FIG. 9 (308, 409, . . . 609) are depicted and described in connection with FIG. 6.

MD authentication retries 904 can track the number of valid authentication retries remaining, also as described in FIG. 6. Note that numerous values within an exemplary relay database 610 illustrated in FIG. 9, including a retries counter, can be useful to enhance the security of a media handover relay 305, since (i) authentication requests can be received as UDP packets, (ii) any host or client on the public Internet 106 can transmit a packet to media handover relay 305, and (iii) source IP addresses and ports within UDP packets may potentially be "forged" by malignant hosts or clients. If a number for MD authentication retries 904 reaches zero, then media handover relay 305 could stop monitoring MD port 308 and/or MD authenticate port 919, and media handover relay 305 could subsequently assign new port numbers (which could be transmitted to a MD 101 via an additional MD relay response 618).

MS 3 codec 905 and MS 4 codec 906 may be the expected media format, or codec utilized, in MS 3 302 and MS 4 401, respectively. The value for the codec for media in both directions is illustrated to be AMR wideband, although other codecs could be utilized as well. Note that a wideband codec may be preferred for communication between MD 101 and CN 108, since the call may not traverse the PSTN which generally limits audio fidelity to G.711 at 64 kbps. Channel coding values for variations of a codec such as AMR wideband or AMR may be included in a MS 3 codec 905 or a MS 4 codec 906 as well. MS 5 FEC 907 and MS 6 FEC 908 can identify the forward error correction techniques a media handover relay 305 may utilize in transmitting MS 5 309 and MS 6 402, respectively. As illustrated, media handover relay could implement a Reed Solomon code such as "(2,1)", which can represent media handover relay 305 transmitting duplicate packets for media received in MS 3 302 and MS 4 401, respectively. Other forward error correction techniques are possible as well, including other Reed Solomon codes as described in "Comparisons of FEC and Codec Robustness on VOIP Quality and Bandwidth Efficiency" by Wenya Jiang and Henning Schulzrinne submitted to World Scientific on Jun. 2, 2002. Media handover relay 305 can preferably transmit media using forward error correction such as packet duplication, and the forward error correction applied by media handover relay 305 can preferably be in addition to any channel coding utilized by MD 101 and/or CN 108 in transmitting media.

MS 3 sequence number 909 and MS 4 sequence number 910 can be expected sequence numbers within MS 3 302 and MS 4 401 at a point in time, such as (i) expected values for when MD 101 and CN 108 begin transmitting media to media handover relay 305, or (ii) current values when MD 101 transmits a message to a CS network 603 or a media handover relay 305. The sequence numbers need not exactly match the sequence numbers in media packets received by a media handover relay 305, but could represent an expected value, and may be calculated based upon (i) an estimated time until handover and (ii) existing sequence numbers utilized within MS 1 109 and MS 2 110, respectively. MD 101 could update a relay database 610 with values pertaining to media such as sequence numbers or synchronization source identifiers for media in a MD relay authenticate 621, MD relay request 602, MD relay update 622, or similar messages either transmitted to a CS network 603 or to a media handover relay 305.

For example, with an exemplary sequence number in MS 1 109 of "25001", and 50 media packets per second transmitted, and also 2 seconds estimated until handover (i.e. time t 241 could equal 2.0 seconds), an exemplary value for MS 3 sequence number 909 can be "25101", or 100 more media packets. MD 101 could include a MS 3 sequence number 909 in a MD relay authenticate 621. If media handover relay 305 received a packet upon the start of receipt of MS 3 302 with a sequence number of "25119", the media could be conforming media while a sequence number of "19999" may not be evaluated to be conforming media. MS 3 SSID 911 and MS 4 SSID 912 can be expected synchronization source identifiers within MS 3 302 and MS 4 401, respectively. Note that MD 101 and CN 108 can preferably transmit MS 3 302 and MS 4 401, respectively, with the same SSIDs and sequence numbers as MS 1 109 and MS 2 110, respectively.

Further, values such as MS 3 SSID 911 and MS 3 sequence number 909 can be used in conjunction to evaluate if received media is conforming media, as described in FIG. 4 and elsewhere herein. Although expected timestamps are not illustrated in FIG. 9, they could be included within a relay database 610 and also used in a relay packet filter 410 to evaluate if media received is conforming media.

MS 3 frames/packet 913 and MS 4 frames/packet 914 can be values for the expected number of codec frames per media packet in MS 3 302 and MS 4 401, respectively. MS 3 DSCP Value 915 and MS 4 DSCP Value 916 can be the expected values for a differentiated services code point (DSCP), which can represent the requested priority within IP headers of media transmitted by MD 101 and CN 108, respectively. MS 3 UDP checksum 917 and MS 4 UDP checksum 918 can be an expected checksum value for UDP packets in media received, and note that UDP checksums may preferably be disabled for bit-error robust codecs such as AMR-WB. Consequently, specific checksum values could be (i) implemented UDP headers for packets containing media formatted with a bit-error robust codec, and (ii) recorded within a relay database 610. As noted elsewhere herein, changes to checksum values (when normally otherwise disabled or ignored) can be used for signaling. Note that frames/packet, DSCP values, UDP checksums, SSID, and/or sequence numbers can be used by a relay packet filter 410 to evaluate if received media is conforming media. A MD authentication port 919 and a MD authentication transport 920 can represent the local port number and transport protocol for a media handover relay 305 to receive a MD relay authenticate 621 request, respectively.

A CN security token 921, CN security hash 922, and CN token TTL 923 can be similar or equivalent to a MD security token 614, MD security hash 609, and token TTL 615 and utilized in the authentication of CN 108 with a media handover relay 305, if CN 108 supports authentication with a media handover relay. Likewise, a CN authentication retries 924 can be similar or equivalent to a MD authentication retries 904, except used with a CN relay authenticate 620 request. MS 5,6 DSCP Value 925 can be the differentiated services code point for a media handover relay 305 to utilize in the transmission of MS 5 309 and MS 6 401, and separate values for the two media streams could also be stored and utilized. CN media cipher key 926 and MD media cipher key 927 can be cipher keys used for the encryption of media between (i) CN 108 and MD 101 and (ii) media handover relay 305, respectively. Cipher keys 926 and 927 could also be utilized for the transmission and receipt of SRTP. The exemplary data within FIG. 9 is included for illustration and not for limitation, and other values could be utilized as well within a relay database 610, and also some illustrated values could be omitted. A relay database 610 may have a plurality of entries similar to the entry illustrated in FIG. 9, associated with multiple mobile devices and/or existing media sessions. Further, not all data may be available for all fields illustrated in FIG. 9, such as a time t 241 value being "unknown", or "N/A".

FIG. 10

FIG. 10 is a graphical illustration of an exemplary system, where a mobile device utilizes a media handover relay to conduct handover of a media session, and where a transmit port on the external interface of a firewall associated with the corresponding node changes during handover, in accordance with exemplary embodiments. FIG. 10 illustrates CN 108 changing the transmit IP:port number from the source IP:port 192.168.2.2:44886 in MS 2 110 (i.e. source IP:port 123) to the source IP:port number 192.168.2.2:51112 in MS 4 401 (i.e. source IP:port 403), with the result that source IP:port 404 on CN FW 130 does not equal source IP:port 124. In this case, CN FW 130 may function as any standard type of NAT router. Alternatively and not shown in FIG. 10, CN 108 could also keep source IP:port number 123 equal to source IP:port number 403, but as illustrated in FIG. 10, CN FW 130 could change an external IP:port number from source IP:port 68.25.213.4:30051 (i.e. source IP:port 124) to the source IP:port number 68.25.11.2:44444 (i.e. source IP:port 404). In this alternative case, CN FW 130 may function as a symmetric NAT router. Consequently, the handover procedure illustrated in FIG. 10 and associated FIG. 11 below may be preferred in the case that (i) a corresponding node changes a source port for transmitting media upon handover and/or (ii) CN FW 130 is a symmetric NAT. Further, if (i) the capabilities of CN 108 for keeping the same local source port number for packets transmitted upon handover is "unknown" or (ii) a firewall type for CN FW 130 is "unknown" or "other", then the handover procedure illustrated in FIG. 10 and FIG. 11 may be utilized. In other words, the handover procedure illustrated in FIG. 10 can be efficient given highly restrictive constraints for conducting handover.

For the system 1000 illustrated in FIG. 10, the alternate network 117 is shown as a mobile operator's WAN, representing the target network for the handover. The initial network 1003 can be a network where a first media session with CN 108 has been established. Alternatively, the initial network 1003 could be a network to which a previously-established call has already been handed over, such as if the user was moving through several different networks during a call. In order to obtain connectivity to the Internet through the alternate network 117, the mobile device 101 can acquire a new IP address (IP) 301 that is provided by the alternate network 117. System 100a and system 1000 illustrate that the alternate network (i.e. the network that is the target of a potential or actual handover) can be of any one of a variety of network types, and in general is any network from which an endpoint—such as MD 101—would obtain a new IP address for communicating over the public Internet 106.

For example, even though the mobile network operator may refer to the mobile network 102 as the "home network", for the purposes of the efficient handover techniques of the present invention, a mobile network 102 may also be an alternate network 117, representing a target network to which a mobile device may prefer to transfer an existing media session such as a telephone call or a "peer-to-peer" voice or video communication. The example IP addresses shown in FIG. 10 within AN 117 and an initial network 1003 are for illustration purposes and are shown as similar to the IP addresses illustrated in systems 100a and 300, although the IP addresses within AN 117 and an initial network 1003 in system 1000 could be different, and any appropriate packet switching may be implemented, including IPv6 addresses.

The corresponding node 108 may have a private IP address (CN IP) 107. The corresponding node 108 may be connected to the public Internet 106 via a firewall or NAT router of any standard type, including the types "unknown" and "other". Further, CN FW 130 does not need any firewall type in order to utilize the handover procedures illustrated in FIGS. 10 and 11. In other words, a firewall type for a corresponding node may be optionally omitted.

A media session between MD 101 and CN 108 has previously been established through protocols and a system such as the system shown in FIG. 2b and illustrated in FIG. 1a. The media session includes a first media stream MS 1 109 transmitted from MD 101 to CN 108 and a second media stream MS 2 110 transmitted by CN 108 to MD 101. As illustrated in FIG. 10, a media-control channel such as RTCP or STRCP may optionally be implemented, but is not required, and other quality feedback mechanisms could be utilized as well, such as transmitting media-control-channel messages via "out of band" signaling with SIP NOTIFY messages through a call-control channel that may utilize MD proxy 213b.

MD 101 may acquire IP 301 in part due to movement. Alternatively, both IP 103 and IP 301 may be present and active on MD 101 when the media session with CN 108 was established, and MD 101 may have previously calculated or determined that IP 103 was preferred for communication for one or a combination of multiple reasons previously illustrated, such as superior quality, lower costs, higher bandwidth, etc. In other words, physical movement of MD 101 is not a necessary trigger to leveraging the advantages of implementing the present invention. MD 101 could be stationary and either (i) acquire a new IP address IP 301 as the signal from AN 117 improves, or (ii) have multiple IP addresses assigned and active, whereby MD 101 monitors the multiple IP addresses for quality and calculates that a handover is preferred as the multiple network-quality profiles change. The network-quality profiles could be recorded within a handover parameters 228.

These two cases represent a situation where the signal strength at a particular physical location is dynamic, such as due to periodic interference or other sources of variation in network quality. One possible example is if a user is located in a residence at the initial network 1003 and MD 101 communicates through a local WiFi access point 118 for an existing media session, and then a family member turns on a microwave oven nearby, which could interfere heavily with 802.11 signals near 2.4 GHz. Microwave ovens typically operate at power levels of hundreds of watts close to 2.4 GHz. With (i) an active media session established and (ii) both IP 103 and IP 301 assigned and active on MD 101, MD 101 may calculate that handover from IP 103 to IP 301 is preferred even though the mobile device is stationary in this example involving high, unexpected interference. This example also illustrates that rapid handover techniques are preferred and that the need for a handover may not be readily predictable by MD 101. The efficient handover techniques outlined herein can provide rapid handover of media sessions to minimize the impact on voice or video quality for the user.

Before calculating or evaluating if handover of the existing media session from IP 103 to IP 301 is preferred, MD 101 can preferably complete Steps 801 though 803 as illustrated in FIG. 8, including steps such as MD 101 receiving a MD relay response 618 and MD 101 transmitting a MD relay authenticate 621. One benefit of conducting these steps prior to calculating handover is preferred is that handover can subsequently be completed more rapidly once MD 101 or a CS network 603 evaluate or calculate that handover is preferred. MD 101 or a CS network 603 could also calculate a handover procedure 232 based upon a handover procedure rules 227, possibly using data from a LAN profile 226, before calculating or evaluating if handover is preferred. Based upon data within a handover parameters 228, MD 101 or a CS network 603 could have initially selected a first handover procedure 232 of "wait" (or equivalently not selecting a handover procedure 232), and subsequently selected a second handover procedure 232 that utilizes a media handover relay 305 as illustrated in FIG. 10.

After receiving a MD relay authenticate 621, or a network relay request 616 or a similar message, media handover relay 305 can begin monitoring for media streams from MD 101 and CN 108. Media handover relay 305 can monitor IP:port 308 for receipt of MS 3 302 and IP:port 409 for receipt of MS 4 401. Media handover relay 305 could optionally implement a time-to-live value such as token TTL value 615, and if data is not received from MD 101 or CN 108 within the specified interval, the resources on media handover relay 305 allocated to monitor IP:ports 308 and 409 could be cleared, with a corresponding entry in relay database 610 cleared, in order to conserve resources on media handover relay 305.

Once MD 101 or CS network 603 evaluate or calculate that handover is preferred, or establishing a duplicate media session through AN 117 is desirable, MD 101 can transmit a call-control signal 307 to CN 108, and call-control signal 307 can include IP:port 409 for CN 108 to utilize as the destination IP:port in MS 4 401. MD 101 can begin transmitting MS 3 302 from source IP:port 303a to destination IP:port 308. Media handover relay 305 can receive MS 3 302 and preferably, (i) implement a relay media buffer 1002 to temporarily store media contained in MS 3 302 and (ii) transmit the media contained in MS 3 to CN 108 via an initial fifth media stream (MS 5a) 1001, using the destination IP:port number that MD 101 implemented as the destination IP:port number for MS 1 109, which is IP:port 125, as illustrated in FIG. 10. Media handover relay 305 could obtain IP:port number 125 via a MD relay authenticate 621 or similar message from MD 101, or from CS network 603. In addition, a packet transmitted in MS 3 302 could include two IP:port numbers, where the packet is transmitted with a destination IP:port of 308, but within the packet is a second IP:port number representing IP:port number 125 for media handover relay 305 to utilize as the destination IP:port number in transmitting MS 5a 1001. As one example, media within MS 3 302 could be encapsulated within a tunneling protocol such as Generic Routing Encapsulation (GRE), wherein GRE headers could specify the ultimate destination of a media packet, which could be destination IP:port 125. Although not shown in FIG. 10, media handover relay 305 may also preferably utilize a relay packet filter 410 in order to enhance security.

Note that MS 5a 1001 can be transmitted before media handover relay 305 receives a packet from CN 108 at IP 107. MS 5a 1001 could be equivalent to MS 5 309, if CN FW 130 forwards the packets in MS 5a to CN 108, such as if CN FW 130 is a full cone NAT router or another type of firewall that will properly forward MS 5a 1001 without CN 108 first transmitting a packet to media handover relay 305. However, as illustrated in FIG. 10, CN FW 130 can utilize a different receive IP:port number than the IP:port number utilized to receive MS 1 109 (i.e. IP:port 125), and consequently packets in MS 5a at IP:port number 125 may likely be dropped, since destination IP:port number 125 may be uniquely bound to IP:port number source 116 on an initial network firewall 105 (which could be a firewall associated with an initial network). Destination IP:port number 125 could be uniquely bound to IP:port number 116 if CN FW 130 operates as a port-restricted cone NAT router, for example.

CN 108 can receive a call-control signal 307 via a call-control channel 2b, or as a packet or signal transmitted directly from MD 101 in MS 1 109 or RTCP stream 1 111. Upon receipt of a call-control signal 307, CN 108 can begin transmitting MS 4 401 to media handover relay 305 at IP:port 409. CN 108 could utilize IP:port number 403 as the source port for MS 4 401, and IP:port number 403 could be equal to IP:port number 123 and/or IP:port number 122 (not shown). As illustrated in FIG. 10, CN 108 could utilize a different port number as the source port for packets transmitted in MS 4 401, and CN FW 130 could be a firewall of any type, including a NAT router which does not consistently bind internal and external port numbers. Consequently, any valid port number that CN 108 selects for the source IP:port number in MS 4 401 may result in a different port number being opened and bound on the external interface of CN FW 130. As one example, even if CN 108 utilizes the same number for IP:port 403 and IP:port 123 (not shown), CN FW 130, functioning possibly as a symmetric NAT router, could utilize a different number for IP:port 404 and IP:port 124 as illustrated in FIG. 10.

Since (i) CN FW 130 may be a symmetric NAT, or another type of NAT or firewall which does not consistently map external to internal port bindings or (ii) CN 108 may utilize a different IP:port number 403 for the transmission of MS 4 401, MS 5a 1001 could be transmitted to the incorrect port, as illustrated in FIG. 10. However, media handover relay 305 can still prefer to transmit MS 5a 1001 since CN FW 130 could be a type that is "unknown" or "other" but function as a port-restricted cone, partial cone, firewall that does not translate ports, etc. In addition, the capabilities of CN 108 may be unknown and CN 108 could utilize the same source IP:port numbers for IP:port 403 and 123. By automatically transmitting MS 5a 1001 upon receipt of MS 3 302 as illustrated in FIG. 10, media handover relay 305 can attempt to estimate the correct port for CN 108 to receive MS 5a 1001 in order to reduce the time for CN 108 to receive media packets, if (i) CN FW 130 is not a symmetric NAT and (ii) CN 108 uses the same IP:port number to transmit media before and after processing a call-control signal 307. Media handover relay 305 can transmit packets such as MS 5a 1001 before receiving a packet from the external interface of CN FW 130, which is illustrated as IP address 131 in FIG. 1a.

Media handover relay 305 can evaluate if MS 5a 1001 is being transmitted to the correct IP:port number on CN FW 130 upon receiving a packet from CN 108 such as (i) a packet in MS 4 401, (ii) a CN relay authenticate 620, if CN relay authenticate 620 is (ii.a) transmitted as a UDP datagram from an IP:port number equal to IP:port 123 and (ii.b) received at IP:port 409, or (iii) a port-binding packet similar to port-binding packet 508, except transmitted from an IP:port number equal to IP:port number 123 and received at IP:port 409. If (i) CN FW 130 does maintain consistent port bindings between internal and external ports, and (ii) CN 108 utilizes the same IP:port number to transmit MS 4 401 and MS 2 110, then media handover relay 305 can likely properly estimate the correct destination IP:port for packets transmitted in MS 5a 1001. The handover procedure can then be equivalent to the handover method illustrated in FIG. 4, since MS 5a 1001 is equivalent to MS 5 309, as MS 5a could properly traverse CN FW 130. If source IP:port number 404 does not equal destination IP:port number 125 utilized in the transmission of MS 5a 1001, then media handover relay 305's estimation of the proper IP:port to utilize as the destination IP:port in MS 5a 1001 could likely be incorrect, as illustrated in FIG. 10.

If media handover relay 305 receives a packet (i) transmitted from a source IP:port number equal to IP:port number 123 and (ii) received at destination IP:port number 409, where IP:port number 409 equals IP:port number 310, then media handover relay 305 can evaluate if MS 5a 1001 is being transmitted to the correct destination IP:port number. Media handover relay can observe the source IP:port number 404 in a packet received at IP:port 409, and if the source IP:port number 404 does not equal the destination IP:port number 125 transmitted in MS 5a, then media handover relay 305 can evaluate that MS 5a 1001 utilizes an incorrect destination IP:port number, as illustrated in FIG. 10, which can also represent an estimation or a "best guess" of the proper destination port by media handover relay 305. As illustrated in FIG. 10, media handover relay 305 can observe the source IP:port number 404 for CN relay authenticate 620 is not equal to IP:port number 125 (which is the IP:port number estimated by media handover relay 305 and implemented in MS 5a 1001). IP:port number 125 could be communicated to media handover relay 305 via an MD relay authenticate 621 request or from CS network 603.

Similarly, media handover relay 305 can observe the source IP:port number 404 for packets received in MS 4 401, and then also determine if MS 5a 1001 is transmitted to the correct IP:port number on CN FW 130. As illustrated in the exemplary system in FIG. 10, when media handover relay 305 receives a packet from CN 108, such as (i) a packet in MS 4 401, (ii) a port-binding packet, or (iii) a CN relay authenticate 620 (with IP:port number 404 not equal to IP:port number 125), media handover relay 305 can (i) observe source IP:port number 404 and (ii) begin transmitting MS 5 309 to the correct IP:port (i.e. IP:port 405, where IP:port 405 is set equal to IP:port 404), and (iii) also concurrently retransmit the media packets from MS 3 302 stored in relay media buffer 1002. Upon receiving MS 4 401, media handover relay 305 can forward the media packets to MD 101 via MS 6 402.

If media handover relay 305 cannot estimate the correct destination IP:port on AN FW 119 for the transmission of MS 6 402, media handover relay 305 could also temporarily store media from MS 4 401 in relay media buffer 1002. This could happen after receipt of MS 3 302 if IP:ports 303a and 303b are not the same number. After receipt of a packet with a source IP:port equal to IP:port number 303b and a destination IP:port equal to IP:port number 408, media handover relay 305 can evaluate the correct IP:port on AN FW 119 to transmit MS 6 402, which could be the source IP:port for a packet received. Media handover relay 305 can then forward media packets received in MS 4 401 as MS 6 402 and also concurrently transmit media packets from MS 4 401 stored in relay media buffer 1002.

Upon receipt of a call-control signal 307 or a CN relay update 619, CN 108 can utilize a handover-predicting jitter buffer 222, such that a jitter buffer size is increased before receipt of the first media packet from MD 101 at IP 301 (via MS 5). As an example, a jitter buffer may typically operate in the range of 50-150 ms on an exemplary wireless network, although other values are possible as well. The receipt of a call-control signal 307 can indicate CN 108 should expect media for an existing call from a new IP address such as IP address 306 associated with media handover relay 305. In addition, the time between arrival of two equivalent media frames in MS 1 109 and MS 5 309 may likely be higher than the average delay between media frames in MS 1 109, since packets may have not yet arrived from media handover relay 305 (possibly due to a symmetric NAT blocking a MS 5a 1001 or a change in receive ports on CN 108, as illustrated in FIG. 10). Note that two separate call-control signals 307 could be transmitted by MD 101. A first call-control signal 307 could signal CN 108 to increase the size of a handover-predicting jitter buffer 222 and a second call-control signal 307 could signal CN 108 to begin transmitting MS 4 401. A call-control signal 307 may also signal CN 108 to begin transmitting MS 4 401 as a future point in time, such as after a specified delay.

By utilizing a handover-predicting jitter buffer 222 at CN 108 and increasing, preferably gradually, the size of a jitter buffer processing MS 1 109, the playback of media to a user associated with CN 108 may not be significantly distorted while the jitter buffer size increases, especially relative to the potential distortion of dropped media packets. As one example, the jitter buffer could be increased by 2-5 ms for every 20 ms frame of audio received, and a jitter buffer window size operating on MS 1 109 could be temporarily increased from an exemplary range of 50-150 ms to an exemplary range of 200-600 ms. Once MS 5 is properly received by CN 108, packets from MS 1 109 and MS 5 309 could be combined in order to increase the quality of audio received. In this example, a packet could be lost or contains bit errors in MS 1 109 (i.e. a "missing" or "faulty" packet), but a "superior" packet in MS 5 309, containing equivalent media as a "faulty" packet but with fewer errors, may be received an exemplary 175 ms later than the equivalent "faulty" packet (due to the time to either initially process the packet on media handover relay 305 or initially traverse CN FW 130, as examples). Note the exemplary time values for a jitter buffer window and/or packet delay described herein are for illustration and not for limitation, and other exemplary time values could be possible as well within the scope of the invention.

By increasing a handover-predicting jitter buffer 222 from an initial exemplary value of 100 ms, which could also be similar to the size of a standard jitter buffer, to an exemplary value of 300 ms upon receipt of a call-control signal 307, then the "superior" packet in MS 5 309 (arriving 175 ms later than the exemplary "faulty" packet) could be received within a handover-predicting jitter buffer 222 window. By receiving the "superior" packet in MS 5 309 within the increased jitter buffer window provided by a handover-predicting jitter buffer 222, the "superior" packet can subsequently be processed by CN 108 (i.e. substituted or combined with the "faulty" packet from MS 1 109) in order to obtain an improved representation of the media transmitted by MD 101.

If a handover-predicting jitter buffer 222 is not implemented by CN 108 and the standard exemplary jitter buffer size of 100 ms is maintained by CN 108 during handover, then a "superior" packet in MS 5 309 (arriving 175 ms after the "faulty" packet in MS 1 109) could likely be received by CN 108 outside a standard jitter buffer window (with an example size of ~100 ms) and subsequently "dropped" or not included in the playback of media for a user associated with CN 108. Consequently, media quality could be reduced without a handover-predicting jitter buffer 222. An exemplary transient increase in jitter due to the change in routing of media packets during handover is illustrated in FIG. 8*a* of U.S. patent application Ser. No. 12/120,940 (the contents of which are hereby incorporated by reference in their entirety), and a handover predicting jitter buffer 222 should be superior to a standard jitter buffer in order to properly buffer media during handover. After the successful establishment of MS 5 309, such as a period of several seconds when media received in MS 5 309 has jitter within an exemplary "normal" range such as 50-150 ms, a handover-predicting jitter buffer 222 could subsequently be decreased gradually to the normal range, such that the decrease of the jitter buffer size does not significantly impair media quality played out for a user associated with CN 108. As one example, the window for a handover predicting jitter buffer 222 could be decreased by 2-5 milliseconds for every 20 milliseconds of media received within MS 5 309. Other values are possible as well, such as increasing or decreasing a jitter buffer window by 1 millisecond for every 30 milliseconds of audio received.

Although not illustrated in FIG. 10, media handover relay 305 can also receive and transmit media-control-channel packets utilizing the techniques illustrated in FIG. 5 and Step 805 of FIG. 8, upon establishment of the new media streams through media handover relay 305. If CN FW 130 is a symmetric NAT router or CN 108 changes IP:port numbers for receiving and transmitting media-control messages upon handover, then a source IP:port number for RTCP stream 3 503 for packets received by media handover relay 305 would likely be a different port number than source IP:port number 133*a* for RTCP stream 1 111. Referring to FIG. 5, media handover relay 305 can observe the source IP:port number 133*a* in either RTCP stream 3 503 or port binding packet 508, and utilize the observed source IP:port as the destination IP:port for media-control-channel packets transmitted to CN FW 130 by media handover relay 305, which could be data received by media handover relay 305 in RTCP stream 4 504. Similarly, media handover relay 305 can observe the source IP:port number 502*a* in either RTCP stream 4 504 or port binding packet 505, and utilize the observed source IP:port as the destination IP:port for media-control-channel packets transmitted to AN FW 119 by media handover relay 305, which could be data received by media handover relay 305 in RTCP stream 3 503. The local port numbers 506*b* and 508*b* on media handover relay 305 could be communicated to MD 101 in a MD relay response 618 or similar message. MD 101 could inform CN 108 of proper port number 506*b* to transmit media-control-channel packets within a call-control signal 307 or a CN relay update 619, as examples.

Note that a relay media buffer 1002 on media handover relay 305 could have additional uses such as supporting retransmit request from CN 108 or MD 101. As one example, if a packet is lost or contains errors in MS 5 309, CN 108 could transmit a request for media handover relay 305 to retransmit the packet, and media handover relay 305 could access media stored in a relay media buffer 1002 in order to obtain the media and retransmit the packet to CN 108. Similarly, if a packet is lost or contains errors in MS 6 402, MD 101 could transmit a request for media handover relay 305 to retransmit the packet, and media handover relay 305 could access media stored in a relay media buffer 1002 in order to obtain the media and retransmit the packet to MD 101. Thus, media handover relay 305 could buffer packets received in either MS 4 401 from CN 108 or MS 3 302 from MD 101 in a relay media buffer 1002, possibly for the entire duration of a media session through media handover relay 305 after handover has begun (e.g. after media handover relay 305 begins to receive either MS 3 302 or MS 4 401).

MD 101 may preferably process the duplicate or redundant media streams MS 2 110 and MS 6 402 in order to obtain a superior representation of media. The two streams of media received by MD 101 may not be identical copies, as each stream may have different levels of packet loss, bit errors, or jitter, as examples. In addition, MS 6 402 and MS 2 110 could be transmitted according to a different codec. For example, if MD 101 determines that a particular packet in MS 2 likely has bit errors, but the equivalent packet in MS 6 is received without errors, then MD 101 may utilize the packet in MS 6 for media playback. In addition, if two packets representing an equivalent frame in both MS 2 and MS 6 both have bit errors, MD 101 can combine information in the two packets in order to minimize the bit errors for an aggregate, enhanced representation of the frame. Similarly, if MD 101 calculates that a packet in MS 6 was lost but that the equivalent packet in MS 2 was received for a particular frame, then MD 101 may utilize the equivalent packet from MS 2 for media playback. Consequently, a receiving node may combine information received in two separate media streams containing substantially similar media to reduce errors and enhance voice quality during handover or as long as redundant media streams are received.

Further, MD 101 may implement different codecs for transmitting MS 1 and MS 3, and likewise CN 108 may implement different codecs for transmitting MS 2 and MS 4. MD 101, CN 108, or a server associated with a communications service 214 may have calculated that a higher-bandwidth codec such as G.711 is preferred for MS 1 when MS 1 was established, perhaps due to high bandwidth availability or lower cost bandwidth at IP 103, as one example. However, a different codec such as AMR may be preferred for communication through the alternate network 117, perhaps due to lower bandwidth, more expensive bandwidth, or higher bit errors, as examples, and consequently a traditional mobile network codec such as GSM-EFR or AMR may be preferred for MS 3 over the previously selected codec utilized for MS 1.

MD 101 and CN 108 may have shared supported codec lists when establishing the first media session using a system similar to FIG. 2b, and the code lists may have more than one match. Consequently, upon handover, MD 101 may begin transmitting MS 3 formatted in a different codec to media handover relay 305 IP:port 308 than the codec MD 101 implemented in the transmission of MS 1 109 to IP:port 125. In this case, CN 108 preferably supports the different codec for MS 3 (received as MS 6 402) and processes the duplicate media streams in order to minimize potential gaps or errors in media received during handover. The media in FIG. 10 may be sent as RTP or SRTP, although other methods of sequencing the transmitted media packets could also be implemented.

FIG. 11

FIG. 11 is a simplified flowchart for exemplary handover procedures using a media handover relay, where a media handover relay estimates a destination port for media transmitted to a corresponding node, in accordance with exemplary embodiments. FIG. 11 illustrates exemplary logic and steps utilized by media handover relay 305 in the establishment of a media session illustrated in FIG. 10. Prior to Step 1101, MD 101 may have (i) established a first media session with CN 108, (ii) observed an alternate network 117 as a potential target network for handover of the first media session, and (iii) transmitted a MD network relay request 602, wherein a CS network 603 can prepare a media handover relay 305 for a potential handover. At Step 1101, media handover relay 305 can receive a network relay request 616, update relay database 610, and begin monitoring an IP:port such as IP:port 308 for the receipt of data from MD 101 at AN 117. Note that media handover relay 305 may not know the source IP address for data transmitted by MD 101, or an expected source IP:port for packets received at IP:port 308, since MD 101 may communicate through a AN FW 119 which could function as a NAT. Either before or after step 1101, MD 101 may acquire a new IP address at AN 117, such as IP 301.

At Step 1102, media handover relay 305 can receive a MD relay authenticate 621, in order to authenticate MD 101 at AN 117, although MD relay authenticate 621 could optionally be bypassed or security implemented via other means, including a relay packet filter 410. After receiving an authentication message, media handover relay 305 can begin receiving and/or processing MS 3 302 from MD 101, which can represent a redundant copy of data transmitted by MD 101 in MS 1 109. Media handover relay 305 can store media received in MS 3 302 in a buffer such as a relay media buffer 1002 and begin transmitting MS 5a 1001 to CN 108 with a destination IP:port number equal to IP:port number 125. Media handover relay 305 could obtain IP:port number 125 from a MD relay authenticate 621, a network relay request 616, a separate call-control message from MD 101 or CS network 603, and other possibilities exist as well, including media packets within MS 3 302 containing IP:port 125 within the body of the packet (e.g. below standard UDP headers).

At Step 1103, media handover relay 305 can optionally receive CN relay authenticate 619, if a software program 209 associated with the corresponding node supports authentication with a media handover relay 305. Note that CN relay authenticate 619 is not required in order for media handover relay 305 to filter packets between media handover relay 305 and CN 108, as media handover relay 305 can monitor IP:port 409 specifically for communication from CN 108 (i.e. from a source IP address 131). In addition, media handover relay 305 could filter packets received at IP:port 409 with a relay packet filter 410 by evaluating if the media received is "conforming media" as described in connection with FIG. 4 above. Media handover relay 305 can also filter packets received on IP:port 409 which are not originated from an associated entry CN IP 131 within relay database 610, which can correspond to (i) an IP address 131 on the external interface of CN FW 130, if present, or (ii) alternatively a publicly routable IP address 107 of CN 108. Also at Step 1103, media handover relay 305 can begin receiving packets transmitted by CN 108 in MS 4 401 at IP:port 409.

Continuing at Step 1103 and referring to FIG. 10, media handover relay 305 can begin transmitting MS 6 402 to MD 101 via AN FW 119, where media handover relay 305 can use a source IP:port 408 for packets transmitted, which preferably can be the same IP:port number as IP:port 308. MS 6 402 can represent a redundant copy of media transmitted by CN 108 in MS 2 110. Media handover relay 305 can use IP:port number 407 as the destination of MS 6 402, which preferably can represent the source IP:port number observed by media handover relay 305 for packets received in MS 3 302, which is illustrated as IP:port 304 in FIG. 10. IP:port number 407 could be different from IP:port number 304, and/or IP:port number 408 could be different from IP:port number 308, but utilizing different port numbers may slow handover and the establishment of the new media streams, as the different port numbers would require both opening and binding on AN FW 119 as well as call-control signaling to communicate the different port numbers between MD 101 and media handover relay 305. Thus, media handover relay 305 can preferably utilize the same IP:port number for receipt of MS 3 302 and transmission of MS 6 402, and media handover relay 305 can also transmit MS 6 402 with a destination IP:port number equal to the source IP:port number for packets received in MS 3 302.

At Step 1104 and also referring to FIG. 10, media handover relay 305 can evaluate if MS 5a 1001 is transmitted to the proper port on CN FW 130. As noted previously in the description of FIG. 10, (i) media handover relay 305 may not have information pertaining to the type of firewall for CN FW 130, if present, and/or (ii) CN 108 may utilize a different source IP:port number for transmitting MS 4 401, and subsequently media handover relay 305 may implement an estimate of the proper port to utilize as the destination IP:port in MS 5a 1001, when MS 5a 1001 is first transmitted. Note that media handover relay 305 may not have received a packet from CN 108 when MS 5a 1001 is first transmitted in Step 1102. One purpose of utilizing an estimate of a destination IP:port number equal to IP:port 125 for the transmission of MS 5a 1001 is to reduce the time required for CN 108 to receive packets transmitted by MD 101 at AN 117, for many types of firewalls for CN FW 130. MS 5a 1001 may be properly estimated and transmitted to the correct IP:port on CN FW 130, if (i) CN FW 130 is not a symmetric NAT or similar firewall, and (ii) CN 108 utilizes the same IP:port number for IP:ports 122, 403, and 406.

At Step 1104 and also referring to FIG. 10, media handover relay 305 can evaluate if MS 5a 1001 utilizes the correct destination IP:port number 125 by observing either (i) the source IP:port for packets received in MS 4 401 or (ii) the source IP:port for a CN relay authenticate 620 or a port-binding packet, if (ii.a) CN relay authenticate 620 or a port-binding packet is implemented and received before packets in MS 4 401 and (ii.b) CN relay authenticate 620 or a port-binding packet is transmitted from IP:port 403 to IP:port 409 by CN 108 (where IP:ports 122, 403, and 406 are equal, and IP:ports 310 and 409 are also equal). "CN RA" in FIG. 11 is an abbreviation for "CN relay authenticate" 620. If the source IP:port number observed in for either conditions (i) or (ii) above is equal to the IP:port number 125 implemented by media handover relay 305 as the estimate of the proper IP:port for the destination of MS 5a 1001, then media handover relay 305 can properly estimate the correct port for MS 5a 1001, which is illustrated as MS 5 309 in FIGS. 3, 4, and 5, and MS 5a 1001 can be considered equivalent to MS 5 309. In this case, media handover relay 305 can proceed to Step 1105 and may not re-transmit media contained in relay media buffer 1002 associated with media packets received in MS 3 302, such as those packets buffered before media handover relay 305 receives a packet from IP:port 404 (e.g. buffered packets need not be retransmitted, as MS 5a 1001 can be evaluated to use the correct estimated destination IP:port number)

If the source IP:port number observed for either conditions (i) or (ii) in the paragraph above is not equal to the IP:port number 125 implemented by media handover relay 305 as the destination of IP:port MS 5a 1001, then media handover relay 305 can determine that IP:port 125 is incorrect and MS 5a 1001 is not likely received by CN 108, since CN FW 130 could be a symmetric NAT router or another kind of NAT router that does not maintain consistent port bindings between actively used ports on internal and external interfaces. As another example, CN 108 may not keep consistent transmit and/or receive media port numbers before and after handover, and in this case CN FW 130 can be a firewall of any type, including "null". Media handover relay 305 can proceed to Step 1106, and media handover relay 305 can change the destination IP:port number for media packets transmitted to CN 108 via CN FW 130 to the correct destination IP:port number, representing MS 5 302 illustrated in FIG. 10. The correct IP:port number for MS 5 302 can be the source IP:port in a packet received by media handover relay 305 for either (i) MS 4 401, or (ii) a CN relay authenticate 620 or a port-binding packet 508, if CN relay authenticate or a port-binding packet 508 is transmitted by CN 108 and received at media handover relay 305 on the same IP:ports as MS 4 401, as illustrated in FIG. 10. Media handover relay 305 can stop transmitting MS 5a 1001, since the estimated destination IP:port for the media stream likely could not properly traverse CN FW 130 and may likely be dropped by CN FW 130.

At Step 1107, media handover relay 305 can also retransmit media packets from MS 3 302 that were stored in a relay media buffer 1002 during the time interval that media handover relay 305 transmitted MS 5a 1001, via the newly established MS 5 309 with the correct destination IP:port number to traverse CN FW 130. CN 108 could preferably utilize a handover-predicting jitter buffer 222, such that a substantial fraction of the packets transmitted in MS 5a 1001, but dropped by CN FW 130, could be recovered by CN 108 in MS 5 309 for combination with any media packets received in MS 1 109 in order to play out a superior representation of media at CN 108. As exemplary values, media handover relay 305 may have transmitted 200 ms of data in MS 5a which were not received by CN 108 (due to transmission to an incorrect estimated IP:port on CN FW 130), and the "missing" 200 ms could be retransmitted by media handover relay 305 along with the first media packet in MS 5 302 to IP:port 404. If CN 108 implements a handover-predicting jitter buffer 222, where the jitter buffer is gradually increased to an exemplary value such as 350 ms during handover, the "missing" 200 ms could be substantially recovered. If a handover-predicting jitter buffer 222 is not implemented by CN 108, some packets or media from a relay media buffer 1002 retransmitted by media handover relay 305 along with the first packet in MS 5 302 may also be properly received and recovered by CN 108 (i.e. within the buffer window of a non handover-predicting jitter buffer, which may be smaller than the buffer window of a handover-predicting jitter buffer 222 during handover). However, fewer packets may be recovered with a standard jitter buffer in comparison to a handover-predicting jitter buffer 222.

MD 101 could also preferably utilize a handover-predicting jitter buffer 222 and media handover relay 305 could buffer media received in MS 4 401. Note that a relay media buffer 1002 used in conjunction with a handover-predicting jitter buffer 222 can increase the number of packets or media frames properly received (i.e. within a jitter buffer window), subsequently improving the quality of media played out for a user associated with a node. Upon retransmission of media from MS 3 302 stored in relay media buffer 1002, which may be transmitted along with the first packet in MS 5 309, media handover relay 305 can subsequently clear the buffered media which has been retransmitted. Further, media handover relay 305 may also continue buffering packets for other purposes in addition to handover, such as supporting "retransmit" requests for specific media frames or packets from either node.

FIG. 12

Figure 12:
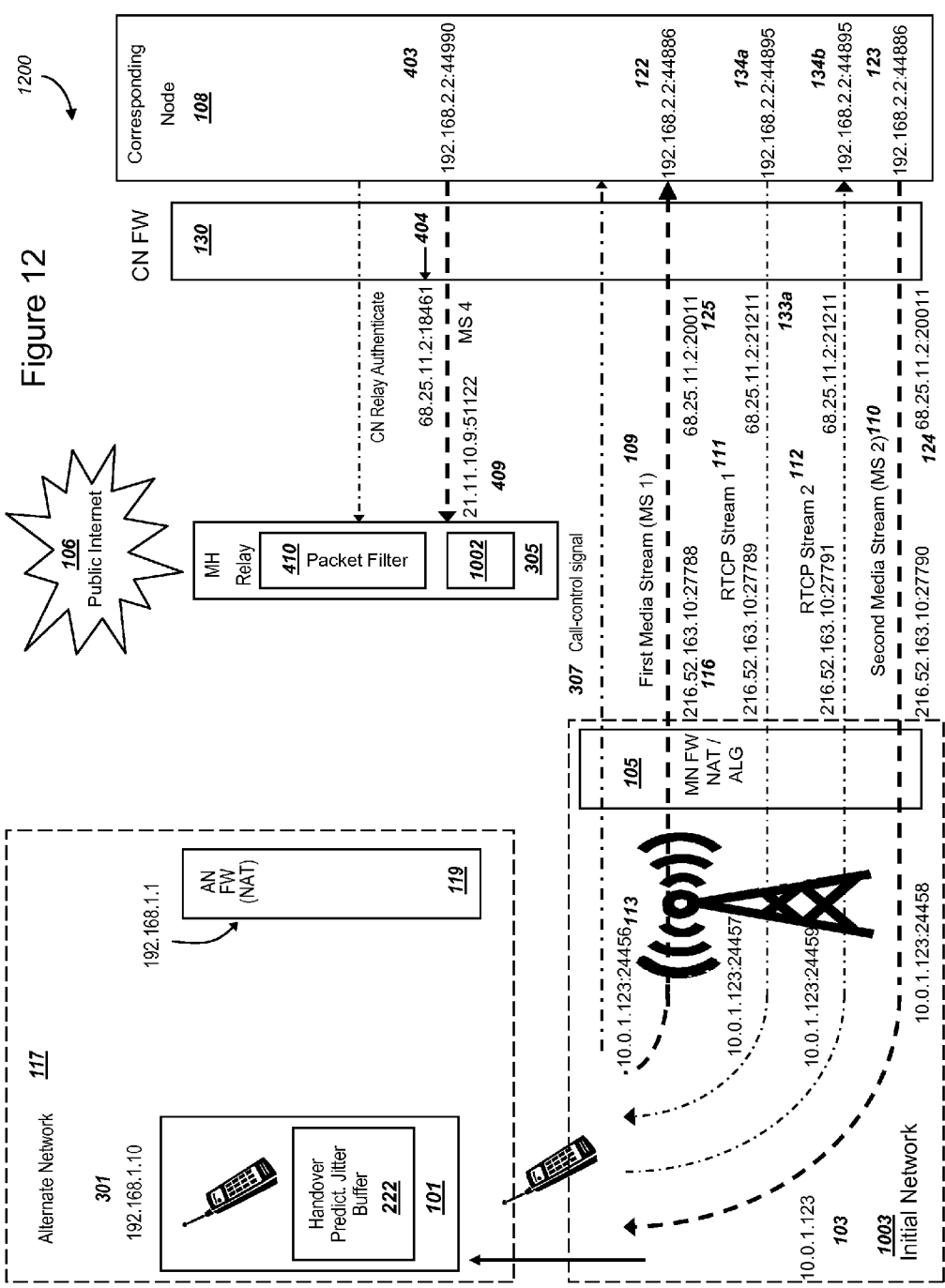
FIG. 12 is a graphical illustration of an exemplary system, where a mobile device utilizes a media handover relay to conduct handover, and where a corresponding node transmits media to the media handover relay before the mobile device transmits media, in accordance with exemplary embodiments.

FIG. 12 is a graphical illustration of an exemplary system, where a mobile device utilizes a media handover relay to conduct handover, and where a corresponding node transmits media to the media handover relay before the mobile device transmits media, in accordance with exemplary embodiments. MD 101 located at an initial network 1003 can establish a media session with CN 108, as illustrated in FIG. 12. Before acquiring a new IP address 301, or possibly before observing AN 117 is available through a physical interface 201a, MD 101 in conjunction with a CS network 603 and media handover relay 305, can complete Steps 801 though 802 as illustrated in FIG. 8, in order to prepare MD 101, media handover relay 305, and possibly CN 108 for handover. In addition to these Steps 801 and 802, CN 108 could have optionally received a CN relay update 619 message and also transmitted a CN relay authenticate 620 message illustrated in Step 803, if CN 108 supports these features. One objective of completing these steps before evaluating or calculating that handover is preferred is to reduce the time and number of steps required upon either (i) the start of handover (e.g. the start of transmission of media packets by MD 101 at an alternate network) or (ii) when MD 101 or a CS network 603 evaluate that handover is preferred.

In order to reduce the time required to establish a new media session between a mobile device and a corresponding node through an alternate network and a media handover relay, CN 108 may begin transmitting MS 4 401 to a media handover relay 305 before MD 101 can begin transmitting MS 3 302. In one example, MD 101 may observe the quality of the physical layer or link-layer communications through AN 117 is improving rapidly relative to an initial network 1003, or alternatively the quality of communication via the initial network 1003 may be declining rapidly. As another example, before acquiring IP 301, MD 101 or a communications service 214 may evaluate that higher bandwidth, lower-cost bandwidth, reduced radio-frequency interference, and/or reduced power consumption for MD 101 within AN 117 could provide a preferred communications channel, and other possibilities exist as well. However, there can be an interval of time, such as typically a few seconds, or possibly longer depending on the network technology implemented at AN 117, before MD 101 at AN 117 may be able transmit and receive packets with media handover relay 305 or another host connected to the public Internet 106. For example, before MD 101 can obtain an IP address 301 or transmit and receive packets at AN 117, numerous steps may be required to connect MD 101 to AN 117 possibly including (i) authentication of MD 101 with AN 117, (ii) security key exchange, and/or (iii) allocation of an IP address through techniques such as DHCP. MD 101 can preferably communicate with CN 108 via an initial network 1003 before and/or during the time required to establish a connection with AN 117, and MD 101 or a CS network 603 could begin steps to implement efficient handover procedures through a media handover relay before MD 101 is able to transmit or receive packets at a new IP address 301.

MD 101 or a CS network 603 may evaluate or calculate handover may be preferred, or similarly that establishing a duplicate media session via AN 117 may be preferred, before MD 101 is able to transmit or receive datagrams at a new IP address. Upon evaluating or calculating that handover may be preferred, MD 101 can transmit a call-control signal 307 to CN 108 through techniques previously described, such (i) as a message within a call-control channel 2b, (ii) inserting a non-media packet or non-media data within MS 1 109 or within a media-control channel such as RTCP Stream 2 112, and/or (iii) adjusting UDP checksums for packets transmitted (since they generally would be disabled for bit-error robust mobile codes).

A call-control signal 307 could also be transmitted to CN 108 by a CS network 603. For example a CS network 603 could monitor the quality of communications with MD 101 via the initial network 1003, and if the quality deteriorates sufficiently rapidly, CS network 603 could initiate handover by transmitting a call-control signal 307. A CS network 603 could also initiate handover in other scenarios where a rapid handover is desired but MD 101 may not yet be able to transmit packets from AN 117. In addition, a call-control signal 307 transmitted by CS network 603 could be combined with data from a CN relay update 619 message. A call-control signal 307 can preferably contain the IP:port 409 on media handover relay 305 for CN 108 to use as the destination IP:port in MS 4 401. If a call-control signal 307 is transmitted as a change in UDP checksum values, CN 108 may receive IP:port 409 in a CN relay update 619 or similar message.

CN 108 can begin transmitting MS 4 401 upon receipt of a call-control signal 307, and MS 4 401 can preferably be transmitted concurrently with MS 2 110. CN 108 can transmit MS 4 401 before CN 108 stops transmitting MS 2 110. CN 108 can transmit MS 4 401 to destination IP:port 409 on media handover relay 305. Media handover relay 305 can filter packets received on IP:port 409 with a relay packet filter 410 such that media which is not "conforming media" is dropped in order to enhance the security of media handover relay 305, as described in FIG. 4 above. Media handover relay 305 can receive MS 4 401 and store media received in a relay media buffer 1002. Media handover relay 305 can also observe the source IP:port 404 for packets received in MS 4 401. CN 108 can utilize a IP:port number 403 as the source port for packets transmitted in MS 4 401, and source IP:port number 403 may be different than source IP:port number 123 as illustrated in FIG. 12, although IP:port number 403 could also be equal to IP:port number 123. In addition, CN FW 130 may be a firewall of any type and IP:port number 404 does not need to equal IP:port number 124 using the handover procedure illustrated in FIG. 12.

After transmitting a call-control signal 307 (by either MD 101 or a CS network 603), MD 101 may complete the steps to connect with AN 117 and acquire IP address 301. MD 101 can preferably utilize a handover-predicting jitter buffer 222, such that the size of the jitter buffer for receipt of MS 2 110 is increased, preferably gradually to minimize distortion of media, in preparation to receive media packets from media handover relay 305 through the expected receipt of MS 6 402. The size of the jitter buffer within a handover-predicting jitter buffer 222 could be increased before or during the steps MD 101 takes to connect with AN 117. Media transmitted by CN 108 may be stored in relay media buffer 1002 until media handover relay 305 receives a packet from MD 101 at IP 301. Through the use of a handover-predicting jitter buffer 222, MD 101 can properly receive additional packets from relay media buffer 1002, and media within relay media buffer 1002 can be transmitted upon media handover relay 305's receipt of packets from MD 101 at IP 301 (described in FIG. 13 below). Also during handover and through the use of a handover-predicting jitter buffer 222, MD 101 can potentially combine the media packets from media handover relay 305 in the anticipated receipt of MS 6 402 with MS 2 110 in order to obtain a superior representation of media transmitted by CN 108. After MD 101's receipt of packets from a relay media buffer 1002, MD 101 can decrease the size of the handover-predicting jitter buffer 222.

FIG. 13

FIG. 13 is a graphical illustration of an exemplary system, where a mobile device utilizes a media handover relay to conduct handover, and where a media handover relay receives media from a corresponding node before receiving media from the mobile device, in accordance with exemplary embodiments. In FIG. 13, before MD 101 may acquire the capability to transmit or receive packets from the new IP address 301, MD 101, CN 108, and media handover relay 305 can preferably previously complete the steps described in FIG. 12. These steps can include CN 108 receiving a call-control signal 307 and transmitting MS 4 401. Media handover relay 305 may buffer media received in MS 4 401 in a relay media buffer 1002. Upon acquiring IP 301 at AN 117, MD 101 can begin transmitting and receiving data with media handover relay 305. MD 101 may preferably transmit a MD relay authenticate 621 message to media handover relay 305 in order to authenticate and subsequently be allocated resources from media handover relay 305. Concurrently with the transmission of MD relay authenticate 621, if implemented, MD 101 can begin transmitting MS 3 302 to media handover relay 305 at IP:port 308. MD 101 can begin transmitting MS 3 302 before stopping the transmission of MS 1 109.

Optionally, the transmission of MD relay authenticate 621 could omitted, and media handover relay 305 could filter packets on IP:port 308 with a relay packet filter 410 such that packets received which are not "conforming media" are dropped in order to enhance the security according to this option. Parameters specifying conforming media, such as media sequence numbers, encryption or ciphering key, codec or media format, and/or specific UDP checksum values could be transmitted to media handover relay 305 by a CS network 603 in a network relay request 616. Specific UDP checksum values to evaluate if media received by media handover relay 305 is conforming media could be utilized if UDP checksums on media are otherwise disabled, possibly due to the use of bit-error robust codecs.

Media handover relay 305 can receive MS 3 302 and observe the source IP:port for packets received in the media stream, which may represent the external IP:port on AN FW 119, or IP:port 304. In addition, if (i) MD relay authenticate 621 or a port-binding packet is transmitted and (ii) MD relay request 621 or a port-binding packet is transmitted by MD 101 as a datagram from IP:port 303*a* to IP:port 308, then media handover relay 305 could obtain the proper source IP:port number (IP:port number 304 in FIG. 13) for the destination IP:port number of MS 6 402 via a MD relay authenticate 621 or a port-binding packet. Media handover relay 305 could use the source IP:port in the MD relay authenticate 621 message or a port-binding packet as the destination IP:port for MS 6 402. Media handover relay 305 can then begin transmitting media received in MS 4 401 to MD 101 at IP 301 via MS 6 402, where the destination IP:port in MS 6 402 can preferably be IP:port 407, and media handover relay 305 can set IP:port 407 equal to observed IP:port 304.

Setting the destination IP:port of MS 6 402 to a number that is not equal to the source IP:port of MS 3 302 is optional, but in this case, MD 101 may need to periodically transmit a port-binding packet. In other words, if the receive IP:port 303*b* on MD 101 is not equal to IP:port number 303*a*, MD 101 may need to periodically transmit a port-binding packet from the receive IP:port 303*b* to media handover relay 305 in order to keep port bindings on AN FW 119 active (i.e. allow MD 101 to continuously receive MS 6 402, and prevent AN FW 119 from dropping inbound packets after a port-binding timeout value of 60 or 120 seconds, as examples).

When media handover relay 305 starts the transmission of MS 6 402, media handover relay 305 can also concurrently transmit media packets containing media data stored in a relay media buffer 1002, where the contents of a relay media buffer 1002 can include media received in MS 4 401. Relay media buffer 1002 can contain media from MS 4 401 (i) received by media handover relay 305 before media handover relay 305 acquires the proper IP:port 407 for the destination IP:port of MS 6, and/or (ii) not previously transmitted to MD 101 at IP 301 since media handover relay 305 may not have known the proper IP:port to forward the MS 4 401 media stored in a relay media buffer 1002. Media stored in a relay media buffer 1002 from MS 4 401 may also be limited to a reasonable duration, such as the most recent 1000 ms of media in MS 4 401, since the subsequent transmission or re-transmission of media with a delay longer than 1000 ms would likely be dropped by MD 101 for being outside a jitter buffer window.

MD 101 can preferably implement a handover-predicting jitter buffer 222 as illustrated in FIG. 13, and the jitter buffer processing incoming media packets can be gradually increased before handover, such as before or during the time MD 101 completes the steps to connect with AN 117. A handover-predicting jitter buffer 222 can increase the jitter buffer size independently of the measured jitter in MS 2 110. As one example, if (i) a jitter buffer size on MD 101 increases after MD 101 observes an AN 117 but before receiving MS 6 402 and (ii) the measured jitter within MS 2 110 is either constant or declining, then MD 101 may utilize a handover-predicting jitter buffer 222. In this example, the window of a standard or non-handover-predicting jitter buffer likely would either remain relatively constant or decrease in size.

Continuing with this example, if (i) a jitter buffer size on MD 101 decreases after receiving MS 6 402 and (ii) the measured jitter within MS 2 110 and MS 6 402 is either constant or increasing, then MD 101 may also utilize a handover-predicting jitter buffer 222. In this example, the window of a standard or non-handover-predicting jitter buffer could likely either remain constant or increase in size.

With a handover-predicting jitter buffer 222, MD 101 can (i) receive packets in MS 6 402 that include contents from relay media buffer 1002 and (ii) combine media from both MS 2 110 and MS 6 402 (within the "look back" duration of the increased jitter buffer window) in order to obtain a superior representation of media transmitted by CN 108. One measure for jitter is the standard deviation in packet arrival times for packets received in a media stream.

If MD 101 does not increase the jitter buffer before handover (e.g. does not operate a handover-predicting jitter buffer 222), then an increased number of media packets received in MS 6 402 from the relay media buffer 1002 may be lost for playback or combination with MS 2 110, reducing the quality of media rendered by MD 101 during handover. Upon successful handover, such as a period of a several seconds where MS 6 402 is received with sufficient quality, MD 101 can reduce the size of the handover-predicting jitter buffer to a size that is appropriate for the jitter in MS 6 402 and/or MS 2 110 if MS 2 110 continues to be received. Although not illustrated in FIG. 13, CN 108 may also preferably implement a handover-predicting jitter buffer 222, such that a jitter buffer window size in CN 108 is increased prior to the receipt of MS 5 309, and subsequently decreased after MS 5 309 has been either properly received or received with sufficient quality.

Media handover relay 305 can begin transmitting MS 5 309 to CN 108 upon receiving MS 3 302 from MD 101, where media transmitted in MS 5 309 contains media received in MS 3 302. Media handover relay 305 can use IP:port 405 as the destination IP:port for packets transmitted in MS 5 309, and set IP:port number 405 equal to the observed IP:port 404, which represents the source IP:port number for packets received in MS 4 401, as illustrated in FIG. 13. In this manner, MS 5 309 may be more quickly received by CN 108, since utilizing other ports in MS 5 309 could require additional steps to open and determine the proper external port on CN FW 130. CN 108 may preferably set IP:ports 403 and 406 to be equal, which may be not equal to IP:port 122, but could also be equal to IP:port 122. Alternatively, if destination IP:port 405 does not equal source IP:port 404 (representing IP:ports 403 and 406 not being equal), a binding timeout such as 60 seconds may expire the external IP:port 405 unless CN 108 periodically transmits a packet such as a port-binding packet from IP:port 406 to media handover relay 305. Consequently, if IP:port numbers 404 and 405 are not equal, CN 108 may preferably transmit a port-binding packet from IP:port 406 (i.e. the receive IP:port for MS 5 309) to media handover relay 305. These port-binding packets could be transmitted periodically, such as more frequently than every 60 seconds as one example. Although not illustrated in FIG. 13, MD 101 and CN 108 can (i) transmit media-control-channel packets to media handover relay 305 and (ii) receive media-control-channel packets from media handover relay 305, using the exemplary procedures for handover of a media-control channel described in FIG. 5 and also Step 805 of FIG. 8.

FIG. 14

Figure 14:
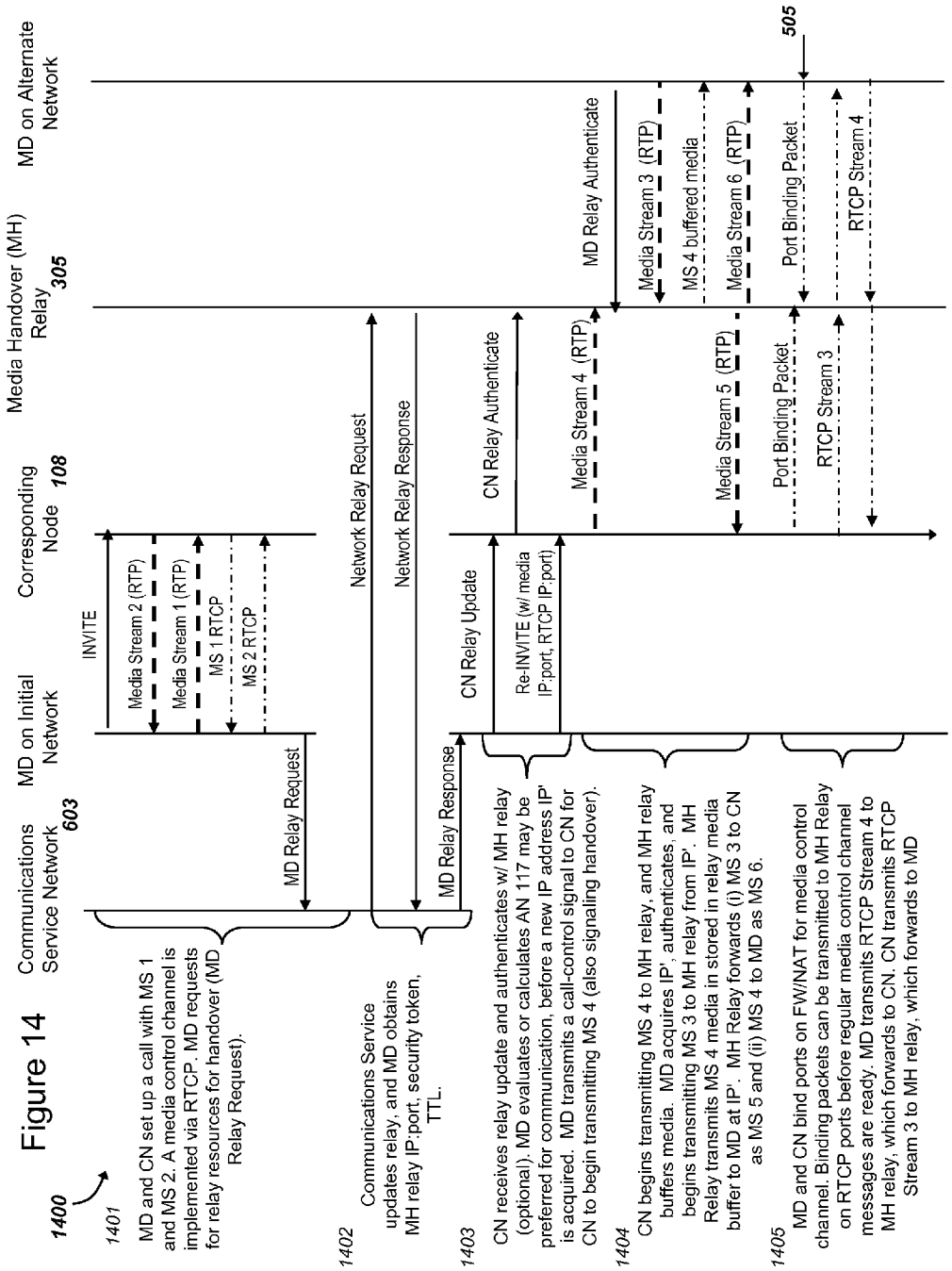
FIG. 14 is a simplified message flow diagram illustrating handover call-control messages and media flow between a mobile device, a corresponding node, and a media handover relay, where the media handover relay receives media from the corresponding node before receiving media from the mobile device, in accordance with exemplary embodiments.

FIG. 14 is a simplified message flow diagram illustrating handover call-control messages and media flow between a mobile device, a corresponding node, and a media handover relay, where the media handover relay receives media from the corresponding node before receiving media from the mobile device, in accordance with exemplary embodiments. As noted in FIG. 13, a mobile device or a communications service may prefer for a corresponding node to begin transmitting MS 4 401 to a media handover relay before MD 101 can begin transmitting or receiving packets through IP address 301 associated with an alternate network. One of many possible examples includes a scenario where the link quality from an initial network 1003 has relatively poor quality or deteriorating quality, and MD 101 observes an AN 117 on a physical interface 201a where AN 117 can be expected to provide a superior quality connection, but MD 101 may not have acquired an IP address 301. In order to reduce the time required to establish new media streams through AN 117, MD 101 or a CS network 603 could initiate handover procedures, such as the start of transmission of a media stream MS 4 401 from CN 108, before MD 101 can transmit or receive packets through IP 301. Handover procedures, such as the start of transmission of MS 4 401, could begin before or during the time MD 101 completes steps to connect to AN 117, thereby increasing the efficiency of handover for a mobile device between heterogeneous IP networks. Also note the use of a media handover relay 305 may be particularly helpful for CN 108 to effectively transmit MS 4 401 before MD 101 acquires IP 301, because otherwise the proper IP:port number for CN 108 to utilize as the destination IP:port number in MS 4 401 would likely not be known. In other words, a proper IP:port on the external interface of an AN FW 119 for the receipt of media packets from CN 108 could very likely be unknown before MD 101 has acquired IP address 301.

The call-control protocol to establish the first media session between a mobile device and corresponding node illustrated in message flow 1400 is according to common, current implementations of the SIP protocol, but other protocols that can establish and manage media sessions between endpoints on the Internet could be used. At Step 1401, the mobile device and corresponding node establish a first media session according to methods that are well known in the art. Not all messages within the protocol are illustrated, and additional messages such as registration requests, "trying", "ack", "OK", etc. would likely be transmitted by MD 101 and/or received by CN 108 in order to establish a first media session. Although the media is shown as formatted according to RTP in Step 1401, the media could be transmitted according to other protocols that properly sequence packetized media data, which may be formatted according to a codec. A media-control channel in the form of RTCP messages or other protocols can optionally be used.

MD 101 at IP 103 can issue an MD relay request 602 or similar message to a CS network 603, via an MD proxy 213a, as one example. The timing for when MD 101 may transmit MD relay request 602 can be a several different points in time, such as (i) automatically after each first media session is established or (ii) if a newly available AN 117 becomes observed through physical interface 201a after the first media session has been established, as examples. Further, MD relay request 602 can be entirely bypassed, and CS network 603 could transmit information in MD relay response 618, including information such as a media handover relay 305 IP:port 308, without receiving an MD relay request 602. Step 1401 shows MD 101 transmitting a MD relay request 602 to a CS network 603, but alternatively MD 101 at IP 103 could transmit MD relay request 602 to media handover relay 305 before handover, and media handover relay 305 could subsequently respond with MD relay response 618, if communication between MD 101 at IP 103 and a media handover relay 305 is supported.

At Step 1402 and referring to FIG. 6, CS network 603 can update a media handover relay 305 or a plurality of relays 305 in preparation of a possible handover for MD 101. CS network 603 may transmit a network relay request 616 to a media handover relay 305 with parameters or data that a media handover relay 305 can store in a relay database 610 in order to process a handover with MD 101 and CN 108. A network relay request 616 can include a security token 614, which could be a session key for an existing media session for MD 101 and/or a pseudo-random number used to authenticate MD 101 at AN 117. Note that a pseudo-random number could also be a number or string with a non-pseudo-random component and a pseudo-random component. Further, note that a network relay request 616 could include multiple security tokens 614. A media handover relay 305 can transmit a network relay response 617 to confirm receipt of the parameters or data and also inform CS network 603 of proper IP:port numbers 308 and 409 on media handover relay 305 to receive data from MD 101 and CN 108, respectively, during handover. A network relay response 617 could also include IP:port numbers 506b and 508b for a media handover relay 305 to receive media-control-channel messages from CN 108 and MD 101, respectively. CS network 603 can also transmit a MD relay response 618 to MD 101 at IP 103 with information for MD 101 to utilize in a handover through a media handover relay 305, including a security token 614, a security token TTL value 615, and/or media handover relay 305 IP:ports number 308 and 409.

At Step 1403, MD 101 at IP 103 can transmit a CN relay update 619 request, in order to prepare CN 108 for a possible handover. Information in CN update 619 can include (i) a media handover relay 305 IP:port 409 for CN 108 to transmit packets to, (ii) a security token that CN 108 can utilize when communicating with media handover relay 305 in order to enhance security between media handover relay 305 and CN 108, which could also be a security token 614, (iii) a TTL value for a security token, and/or (iv) UDP checksum value or values to implement on media packets transmitted to media handover relay 305 in order to pass through a relay packet filter 410 associated with a media handover relay 305 (e.g. make the media packets transmitted "conforming media" as described in FIG. 4). As noted in Step 1403 on FIG. 14, MD 101's transmission of CN relay update 619 may be omitted, such as if (i) CN 108 does not support the feature or (ii) is transmitted by MD 101 and then not utilized by CN 108. Information for CN 108 to conduct a handover could instead be included within a call-control signal 307. In addition, CN relay update 619 could be transmitted by CS network 603 to CN 108 instead of being transmitted by MD 101. If CN 108 can process a CN relay update 619 request or similar data to prepare CN 108 for a handover via media handover relay 305, then CN 108 can also optionally authenticate with media handover relay 305 before handover, possibly through transmitting a CN relay authenticate 620 message.

Continuing at Step 1403, MD 101 may evaluate or calculate that transmitting or receiving media with CN 108 through AN 117 may be preferred, possibly before acquiring the ability to transmit or receive packets at IP 301. As examples, MD 101 could observe that a beacon signal for a base station within AN 117 has high signal-to-noise ratios, reduced bit errors, or reduced power requirements compared to other options for transmitting and/or receiving media, possibly including an initial network 1003. MD 101 may also observe a trend of increasing quality of signals from AN 117. Upon evaluating that transmitting and receiving media with CN 108 through AN 117 may be preferred, MD 101 can (i) transmit a call control signal 307 to CN 108 from IP 103 and (ii) begin increasing the size of a handover-predicting jitter buffer 222, preferably gradually to avoid significant distortion of audio. The call-control signal can contain the IP:port number 409 that CN 108 may implement as the destination IP:port number in MS 4 401. MD 101 may transmit the call-control signal 307 to CN 108 through a SIP Re-INVITE message, or message with equivalent functionality in SIP or another call-control protocol, via an exemplary call-control channel illustrated in FIG. 2b which may have been utilized to establish the first media session. MD 101 can transmit a call-control signal 307 via IP 103 either concurrently with or before (i) conducting a sequence of steps to connect MD 101 with AN 117 and/or (ii) obtaining the capability transmit and receive packets from a new IP address 301.

At Step 1404, CN 108 can receive a call control signal 307 and begin transmitting MS 4 401 to media handover relay 305 at IP:port 409. MS 4 401 can preferably be transmitted concurrently with MS 2 110. If CN 108 does not support a CN relay authenticate 620 request, media handover relay 305 may preferably utilize a relay packet filter 410 to filter packets received such that accepted packets can be conforming media described in FIG. 4 and elsewhere herein. In this manner packets from MD 101 or CN 108 may be dropped if IP:ports 308 and/or 409 do not receive either a valid authenticate message and/or conforming media. Media handover relay 305 can receive MS 4 401 and store media temporarily in a relay media buffer 1002, for subsequent forwarding to MD 101. MD 101 can complete the steps to acquire an IP address associated with AN 117, such as authentication and/or authorization with AN 117, key exchange, DHCP, or other steps that may depend upon the networking technology of AN 117 (i.e. WiFi, mobile WiMax, LTE, UMTS, etc.). Note that communication between MD 101 and CN 108 can preferably continue through the first media session established in Step 1401, while MD 101 connects to AN 117 and CN 108 transmits MS 4 401.

After acquiring IP 301, MD 101 can transmit a MD relay authenticate 621 request, preferably concurrently with transmitting MS 3 302 to media handover relay 305, using IP:port 308 as the destination for packets transmitted. Media handover relay 305 can authenticate MD 101, such as by using the procedures outlined in FIG. 6, and subsequently receive and process packets in MS 3 302. Although FIG. 14 illustrates media handover relay 305 receiving MS 4 401 before MS 3 302, it could be possible that media handover relay 305 receives MS 3 302 before MS 4 401 such as if (i) MD 101 can rapidly begin transmitting packets from AN 117 and (i) the packet routing delays between media handover relay 305 and CN 108 are significantly longer than between media handover relay 305 and MD 101. In this case, where MS 3 arrives at media handover relay 305 before MS 4, media handover relay 305 could store media from MS 3 302 in a relay media buffer 1002. In general, media handover relay 305 can preferably buffer media received from either MS 3 or MS 4 in a relay media buffer 1002, depending on which media stream arrives first. Contents of a relay media buffer 1002 can then be transmitted within MS 5 or MS 6 by media handover relay 305, when media handover relay 305 can evaluate a proper IP:port to use as the destination IP:port for media transmitted by media handover relay 305. The destination IP:port for media transmitted by media handover relay 305 in MS 5 and MS 6 can be the source IP:port of media received in MS 4 and MS 3, respectively.

Continuing with Step 1404 as illustrated in FIG. 14, upon receipt of (i) MD relay authenticate 621, if transmitted as a UDP datagram from IP:port 303a to IP:port 308, or (ii) a packet in MS 3 302, media handover relay 305 can begin transmitting packets to MD 101 through AN FW 119. Media handover relay 305 could observe IP:port 304 as the source IP:port for packets received from MD 101, which could be the source IP:port on the external interface of AN FW 119. Media handover relay 305 could preferably use IP:port number 304 as the destination IP:port number for packets transmitted to MD 101. Media handover really 305 can forward media from MS 4 401 stored in relay media buffer 1002 and concurrently begin transmitting MS 6 402, which can contain media received by media handover relay 305 in MS 4 401. As discussed previously, media from MS 4 401 stored in a relay media buffer 1002 could represent an exemplary value of 500 ms of the most recent media received, although other sizes of the buffer are possible as well.

Media handover relay 305 can also forward media received in MS 3 302 to CN 108 by transmitting MS 5 309 to IP:port 405, with destination IP:port number 405 equal to the source IP:port number 404 for packets transmitted in MS 5 in order to readily traverse CN FW 130. Media handover relay 305 can observe IP:port number 404 as the source IP:port number for packets received in MS 4 401. If media handover relay 305 receives MS 3 302 before MS 4 401 (not shown in FIG. 14), then media handover relay 305 could store media in MS 3 302 in relay media buffer 1002, and subsequently transmit the media stored in relay media buffer 1002 upon obtaining the proper destination IP:port number 405 (which may be equal to the observed source IP:port number 404).

As depicted and described in connection with FIG. 3, media handover relay 305 may also preferably enhance channel coding for media transmitted in MS 5 309 and/or MS 6 402. Media handover relay 305 could implement forward error correction in transmitted media such as transmitting duplicate copies of media packets received in MS 3 302 and/or MS 4 401, respectively. The forward error correction that media handover relay 305 could add to a media stream can be in addition to channel coding implemented by MD 101 or CN 108. Other methods of implementing forward error correction in order to increase the probability of the proper receipt of media are possible as well. In this manner, the quality of media received by MD 101 or CN 108 may be enhanced.

At Step 1405 and referring to FIG. 5, a media-control channel may optionally be implemented, using a protocol such as RTCP or SRTCP as two examples, and a media-control channel may be implemented on different ports at MD 101 and/or CN 108 than the port or ports used for media. MD 101 could determine the proper IP:port number on media handover relay 305 to receive media-control-channel packets from MD 101, such as IP:port 508b, from data within a MD relay response 618 or similar message. CN 108 could determine the proper IP:port number on media handover relay 305 to receive media-control-channel packets from CN 108, such as IP:port 506b, from data within a call-control signal 307, CN relay update 619, or a similar message. Note that media handover relay 305 could also utilize a relay packet filter 410 on media-control-channel receive ports, such that only (i) properly formatted media-control-channel messages and/or (ii) from IP addresses within the source of an associated media stream are allowed pass through the filter. In other words, media handover relay 305 may drop packets received at IP:port 506b which do not originate from IP address 131, representing the publicly routable IP address associated with CN 108. A relay packet filter 410 could also filter media-control-channel messages based on the source port number as well.

As illustrated in FIG. 14 and continuing to refer to FIG. 5, in order to open and bind ports on AN FW 119 to allow receipt of media-control packets from CN 108 (via media handover relay 305), MD 101 could transmit a port-binding packet 505 from IP:port 501*a* to IP:port 508*b* on media handover relay 305 before MD 101 transmits a media-control channel message. Media handover relay 305 can observe IP:port number 502*a* as the source IP:port number for the port-binding packet 505 from MD 101. The port-binding packet 505 could also be a second MD relay authenticate 621 or similar message, such that media-control-channel messages may not be processed by media handover relay 305 until a second authentication similar to MD relay authenticate 621 is received on a media-control-channel IP:port 508*b*. Media handover relay 305 can then transmit messages received in RTCP Stream 3 503 to IP:port number 502*b*, where IP:port number 502*b* can be equal to IP:port number 502*a*. A port-binding packet could optionally be omitted, and media handover relay 305 can observe IP:port number 502*a* as the source IP:port number for media-control-channel packets from MD 101.

Also as illustrated in FIG. 14 and also continuing to refer to FIG. 5, in order to open and bind ports on CN FW 130 to allow receipt of media-control packets from MD 101 (via media handover relay 305), CN 108 could transmit a port-binding packet 508 from IP:port 134*a* to IP:port 506*b* on media handover relay 305. A port-binding packet 508 could also be a second CN relay authenticate message similar to a first CN relay authenticate 620 described in FIG. 6 and also Step 1403, with the difference for the second CN relay authenticate message being the message is transmitted from CN 108's media-control-channel receive IP:port to media handover relay 305's media-control-channel source IP:port. Media handover relay 305 could observe IP:port number 133*a* as the source IP:port for the port-binding packet 508 from CN 108. Media handover relay 305 can then transmit messages received in RTCP Stream 4 504 to IP:port number 133*b*, where IP:port number 133*b* can be equal to IP:port number 133*a*. A port-binding packet could optionally be omitted, and media handover relay 305 can observe IP:port number 133*a* as the source IP:port number for media-control-channel packets from CN 108.

Continuing at Step 1405 and also continuing to refer to FIG. 5, upon receipt of MS 6 402, representing MS 4 401 as transmitted by CN 108, MD 101 can create media-control messages such as RTCP receiver reports and transmit them as RTCP Stream 4 504 to IP:port 508*b* on media handover relay 305. As illustrated in FIG. 5, media handover relay 305 can receive packets in RTCP stream 4 504 and transmit them to IP:port 133*b* on CN FW 130, which can forward the packets to CN 108 at IP:port 134*b*. IP:port number 133*b* could have been opened and bound to IP:port 134*b* by either (i) port-binding packet 508 which could be a CN relay authenticate 620 message or (ii) the first media-control-channel packet transmitted by CN 108 using IP:port 134*a* as the source IP:port and IP:port 506*b* as the destination IP:port, and where IP:port numbers 134*a* and 134*b* are equal. IP:port numbers 134*a* (transmit for CN 108 media-control packets or messages) and 134*b* (receive for CN 108 media-control packets or messages) can preferably be the same number in order to facilitate traversal of media-control-channel messages through CN FW 130. CN 108 can utilize different numbers for IP:port 134*a* and 134*b*, if CN 108 transmits port-binding packets periodically from IP:port number 134*b* to the transmit source IP:port on media handover relay 305 for media-control messages, which could be IP:port 506*a* on media handover relay 305. If CN FW 130 is a firewall without NAT functionality or port translation, then IP:port 133*b* and IP:port 134*b* could be the same number.

Upon receipt of MS 5 309, representing MS 3 302 as transmitted by MD 101, CN 108 can create media-control messages such as RTCP receiver reports and transmit them as RTCP Stream 3 503 to IP:port 506*b* on media handover relay 305. Media handover relay 305 can receive packets in RTCP stream 3 503 and transmit them to IP:port 502*b* on AN FW 119, which can forward the packets to MD 101 at IP:port 501*b*. IP:port number 502*b* could have been opened and bound to IP:port 501*b* by either (i) port-binding packet 505 which could also be a MD relay authenticate 621 message or (ii) the first media-control-channel packet transmitted by MD 101 to media handover relay 305 using IP:port 501*a* as the source IP:port and IP:port 508*b* as the destination IP:port, and where IP:port numbers 501*a* and 501*b* are equal. IP:port numbers 501*b* (transmit for MD 101 media-control packets or messages) and 501*a* (receive for MD 101 media-control packets or messages) can preferably be the same number in order to facilitate traversal of media-control-channel messages through AN FW 119. MD 101 can utilize different numbers for IP:port 501*a* and 501*b*, if MD 101 transmits port-binding packets periodically from IP:port number 501*b* to the transmit source IP:port on media handover relay 305 for media-control messages, which could be IP:port 508*a* on media handover relay 305. If AN FW 119 is a firewall without NAT functionality or port translation, then IP:port 501*a* and IP:port 502*a* could be the same number.

Continuing at Step 1405 and also referring to FIG. 13 and FIG. 5, if media handover relay 305 has not obtained IP:port number 502*b* on AN FW 119, which can be the proper destination IP:port for packets transmitted by media handover relay 305 in RTCP stream 3 503, but media handover relay 305 has received media-control packets from CN 108, media handover relay 305 could store the media-control data in a relay media control buffer 1301 until the proper source IP:port 502*a* for media handover relay 305's transmission of media-control packets is observed (where IP:ports 502*a* and 502*b* are preferably equal). Media handover relay 305 can subsequently transmit media-control data recorded in a relay media-control buffer 1301, when the proper destination IP:port number associated with a firewall can be observed as a source IP:port in packets received. Similarly, the media-control packets or messages from MD 101 could be stored in a relay media control buffer 1301 and subsequently transmitted to CN 108 when the proper IP:port 133*b* on CN FW 130 is acquired by media handover relay 305. If a media-control channel is optionally implemented within media streams, then binding and negotiating separate IP:ports as described in Step 1405 can be bypassed and a relay media-control buffer 1301 may be optionally omitted.

In addition, a media-control-channel could be entirely omitted, or implemented via "out of band" signaling techniques such as transmitting SIP NOTIFY or SIP OPTIONS messages, or extensions to the SIP protocol, through an exemplary call control channel such as illustrated in FIG. 2*b*. Note that transmitting media-control-channel messages via a call-control channel may likely result in additional unwanted delay between transmission and receipt of the media-control messages, since call control messages may need to be passed through several proxy servers, and also a high volume of media-control messages (e.g. frequent SIP NOTIFYs during active media sessions) could interfere with other signaling (e.g. SIP INVITES and similar messages). Thus, according to a preferred exemplary embodiment, media-control-channel messages between a mobile device and a corresponding node may be passed through a media handover relay 305 when media is passed through a media handover relay 305.

Although not illustrated in FIG. 14, additional call-control messages could be transmitted between MD 101 and CN 108 after the new media session is established with associated media-control channels. For example, MD 101 could transmit a SIP BYE or similar messages in order to (i) terminate MS 1 109 and/or MS 2 110, and corresponding media-control channels, or (ii) terminate MS 3 302 and MS 4 401 when the user completes the media session. MD 101 may also transfer the call-control channel so that in-bound and out-bound call-control messages are communicated through IP 301, instead of through IP 103 prior to communicating media through media handover relay 305. Note that media handover relay 305 does not need to participate in a call-control channel illustrated in FIG. 2*b*, such as not receiving or transmitting a call-control channel message before or after a handover of media streams. It could be possible within the scope of the invention that media handover relay 305 can be combined with a MD proxy server 213*b*, where MD proxy server 213*b* receives and transmits messages within a call-control channel illustrated in FIG. 2*b*, but in this case the media handover function of a media handover relay 305 may be considered separate from the call-control function of a MD proxy server 213*b*.

In addition, or MD 101 could conduct a second handover to another alternate network, if handover is evaluated or calculated as being preferred after the new media session via media handover relay 305 illustrated in FIGS. 13 and 14 is established, and also generally using the handover procedures with a media handover relay described in this invention. In this case (where a second handover can occur after media handover relay 305 transmits and receives media), MS 5 309 and/or MS 3 302 could be considered MS 1 109 and MS 6 402 and/or MS 4 401 could be considered MS 2 110, and media handover relay 305 may be considered a corresponding node for the efficient handover techniques described herein. The "alternate network" from the first handover would become the "initial network" for the second handover. Since media handover relay 305 can preferably have a publicly routable IP address 306, the firewall type associated with media handover relay 305 (functioning as the corresponding node for a subsequent handover) could be "null". MD 101 may preferably conduct a second handover to another alternate network utilizing handover procedure "A" as described in FIG. 2*d* above an also within FIGS. 3-5 of U.S. patent application Ser. No. 12/120,940, the contents of which are hereby incorporated by reference in their entirety.

For the purposes of conducting a second handover, MS 3 302 within the present invention can be considered MS 1 109 within FIG. 3 of U.S. patent application Ser. No. 12/120,940, the contents of which are hereby incorporated by reference in their entirety. Media handover relay 305 could function as the corresponding node within FIG. 3 of U.S. patent application Ser. No. 12/120,940. Media handover relay 305 can preferably receive packets at IP:port 308 from MD 101 when MD 101 begins transmitting from a second alternate network, which would represent MS 3 302 in FIG. 3 of U.S. patent application Ser. No. 12/120,940. Media handover relay 305 can monitor a IP:port 308 for packets from MD 101 at the second alternate network and for packets from MD 101 at the first alternate network. MD 101 may transmit media from two different IP addresses to a media handover relay 305. Media handover relay 305 can receive essentially duplicate media at IP:port number 308 from two different addresses, which could also signal a second handover, and forward the duplicate media streams to CN 108 within a single stream of datagrams MS 5 309. Alternatively, media handover relay could utilize two different IP:port numbers 308, one each for a different media stream from MD 101 at each of the two alternate networks. Further, media handover relay 305 could receive a second MD relay authenticate 621 request from the second alternate network while media handover relay continues to receive MS 3 302 from MD 101 at the first alternate network 117 illustrated in FIG. 4.

MD 101 at the second alternate network could also transmit a call-control signal 307 and/or a MD relay authenticate 621 message to media handover relay 305. Media handover relay 305 can then begin transmitting MS 6 402 to two different addresses concurrently, one to MD 101 at the first AN 117 as illustrated in FIG. 4 within the present invention and a second copy of MS 6 402 to MD 101 at the second AN 117. The second copy of MS 6 402 can preferably be transmitted to the source IP:port number observed in media packets received from the second alternate network. The second copy of MS 6 402 can also preferably be transmitted by media handover relay using IP:port number 308 as the local source port for packets transmitted, and could also be transmitted with forward error correction techniques such as duplicating media packets transmitted. Subsequent steps within FIGS. 4 and 5 of U.S. patent application Ser. No. 12/120,940, the contents of which are hereby incorporated by reference in their entirety, could be followed in order to complete handover to a second alternate network, and media handover relay 305 could subsequently continue to monitor a IP:port number 308 for another handover. Thus, the efficient handover techniques described herein can support a plurality of handovers in sequence for a mobile device.

FIG. 15

Figure 15:
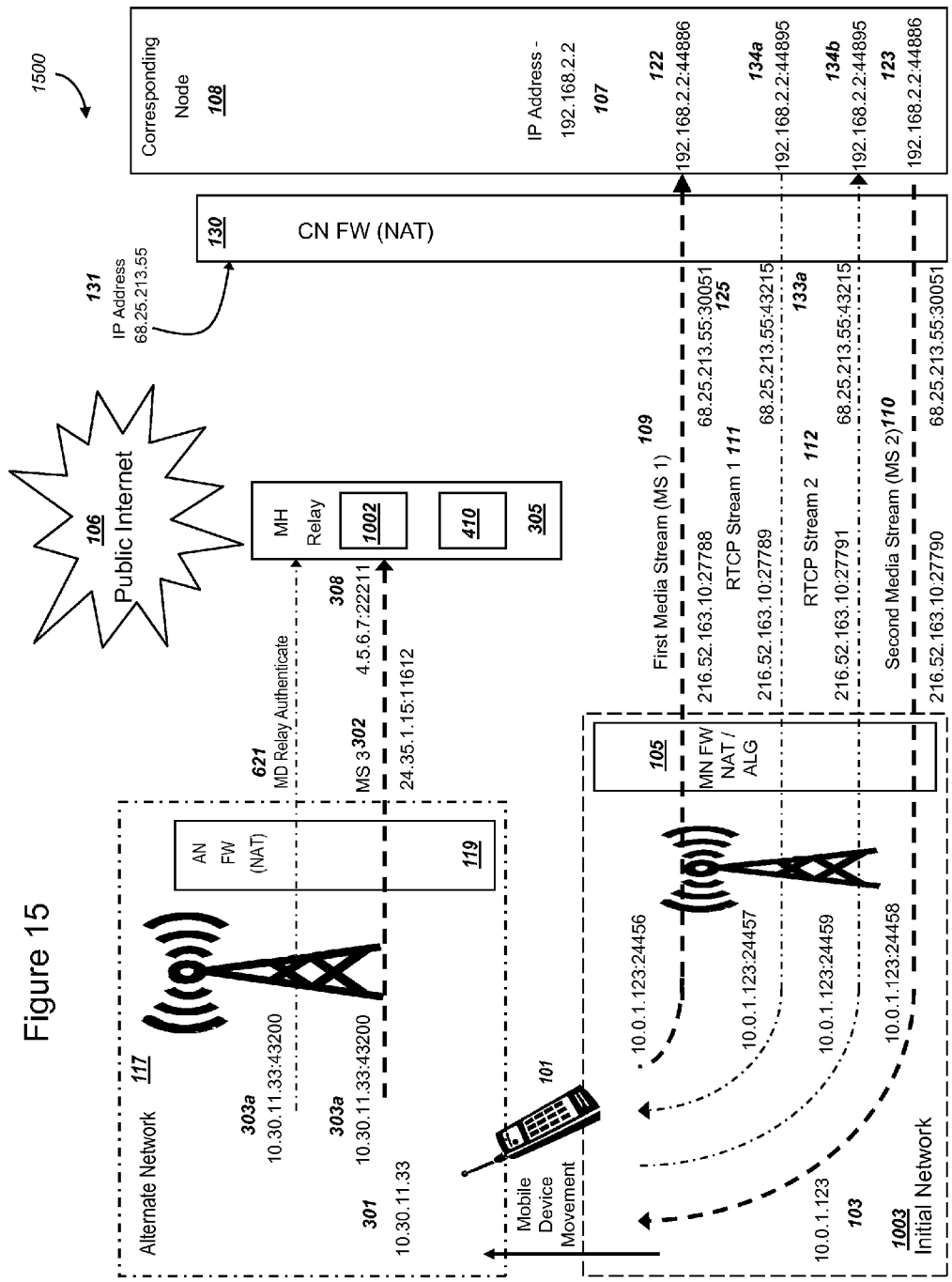
FIG. 15 is a graphical illustration of an exemplary system, where a mobile device utilizes a media handover relay to conduct handover, and where a corresponding node operates software with restricted functionality, in accordance with exemplary embodiments.

FIG. 15 is a graphical illustration of an exemplary system, where a mobile device utilizes a media handover relay to conduct handover, and where a corresponding node operates software with restricted functionality, in accordance with exemplary embodiments. The systems for efficient handover utilizing a relay illustrated above in FIG. 4 illustrate a corresponding node with the capability of preferably transmitting two media streams concurrently to separate IP addresses (i.e. essentially the same media content to both a media handover relay 305 and MD 101 concurrently during handover). In addition, these and related figures above illustrate CN 108 as preferably maintaining the same local IP:port number for transmission and receipt of media before and after handover (illustrated as IP:port number 192.168.2.2:44886 for CN 108 to transmit MS 2 110 and MS 4 401 and also receive MS 3 302 and MS 5 309 in FIG. 4, as one example). A communications service 214 or mobile network managing MD 101 may not have control over the functionality of CN 108, and a software program 209 operating on CN 108 may not support the preferred functionality illustrated above, which could occur if CN 108 operates legacy software or a legacy user agent. Further, CN 108 may not support STUN or similar network-probing techniques to discover ports and/or transport protocols allowed, and CN 108 also may not be able to evaluate the presence and type of firewall for a CN FW 130.

As one example, a software program 209 or operating system 208 on CN 108 may change the local port for transmitting and receiving media upon processing a call-control signal 307, such as a SIP Re-INVITE, SIP REFER, or a similar re-direct message in another protocol or extensions to the SIP protocol as currently defined in IETF RFC 3261. Even with legacy software with the functionality illustrated above, CN 108 should support a change in IP address of the node it corresponds with (in this case from the mobile device to a handover media relay) for an active media session. In general, a CN 108 can be expected to support at least this basic functionality in order to conduct a handover, and in other words support at least changing the destination IP address in media packets transmitted by CN 108. It could also be possible, but not necessarily preferred, that CN 108 also changes a transmit and receive port upon handover (i.e. upon processing a call-control signal 307 and starting the transmission of MS 4 401).

FIGS. 15 and 16 illustrate exemplary handover procedures using a media handover relay 305 when MD 101 communicates with a CN 108 with the restricted functionality of (i) changing a transmit and receive IP:port upon processing a call-control signal 307, (ii) ending the transmission of MS 2 110 upon starting the transmission of MS 4 401, and/or (iii) not being able to evaluate the presence or type of firewall for CN FW 130 using techniques such as transmitting a STUN probing packet to a STUN server, or similar network-probing functionality. Further, the exemplary handover procedures illustrated in FIGS. 15 and 16 could be utilized if the capabilities of CN 108 are either unknown or reasonably expected to have the restricted functionality identified above. If a CS network 603 managing MD 101 does not control CN 108, information about the potential functionality of CN 108 could be acquired based upon the CN 108 user agent identity observed during setup of a first media session, as depicted and described in connection with FIG. 2*f* herein. FIGS. 15 and 16 illustrate that handover procedures that utilize a media handover relay, such as media handover relay 305, may be efficient in conducting a handover with a CN 108 of restricted functionality, especially in the presence of firewalls such as AN FW 119 and CN FW 130.

As one example, an efficient handover procedure "B" may be identified in a handover procedure rules 227 if (i) the firewall type for CN FW 130 is a symmetric firewall, and (ii) AN FW 119 is a port-restricted cone NAT router, and (iii) CN 108 has standard functionality such as keeping the same local IP:port number for transmitting and receiving media during handover (same local IP:port for MS 1, MS 2, MS 4, and MS 5). However, if CN 108 does not support standard functionality and instead supports restricted functionality, such as changing a local transmit or receive IP:port upon handover, then MD 101 may prefer to utilize a media handover relay 305 to conduct handover instead of handover procedure "B". Other examples of conducting a handover via a media handover relay 305 being preferred with reduced functionality for CN 108 and/or MD 101 are possible as well.

Utilizing a media handover relay 305 to conduct handover may be preferred if CN 108 has restricted functionality since external port numbers on a CN FW 130 NAT may not be known before handover (and CN 108 may also not be able to determine the port numbers due to a lack of STUN or similar capabilities). As illustrated in FIG. 15, MD 101 and CN 108 have established a media session. Upon establishing the first media session with CN 108, MD 101 and a communications service 214 could complete steps illustrated in FIG. 6 to prepare a media handover relay 305 for handover and also provide MD 101 with data for handover, such as IP:port 308 on a media handover relay 305. MD 101 may evaluate or calculate that communicating with CN 108 from an alternate network 117 is preferred, such as after acquiring a second IP address 301. Upon evaluating or calculating handover is preferred, MD 101 can (i) transmit an MD relay authenticate 621 message and/or (ii) begin transmitting MS 3 302 to IP:port 308 on media handover relay 305.

Although CN 108 may not support the functionality to concurrently transmit media to two separate IP addresses (due to the restricted functionality of CN 108 described above), MD 101 can preferably support "make before break" handover for transmitted media, illustrated as MD 101 concurrently transmitting MS 3 302 and MS 1 109 in FIG. 15. Note that a communications service 214 managing MD 101 can more readily implement and support this functionality for MD 101 (i.e. concurrently transmitting essentially the same media in two different media streams), since the communications service 214 may control or configure a software program 204 operating on MD 101, and the software program can manage the media session and handover. In contrast, the communications service 214 may not control the software program 209 operating on CN 108. A communications service 214 could also be a mobile network operator, such as MN 102 illustrated in FIG. 1*a*.

A media handover relay 305 preferably utilizes a relay media buffer 1002 to temporarily store media received in MS 3 302. Although not illustrated in FIG. 15, media handover relay 305 could transmit a MS 5*a* 1001 to an estimated port number equal to IP:port number 125, in case (i) CN 108 does keep the same IP:port number for receipt of media before and after processing a call-control signal 307 and (ii) CN FW 130 is not a symmetric NAT, or a similar NAT that does not consistently maintain bindings between internal and external port numbers for actively used ports. Since the capabilities of CN 108 may be unknown and the type of firewall for CN FW 130 also may be unknown, transmitting an MS 5*a* 1001 to an estimated IP:port may not be received by CN 108. However, transmitting MS 5*a* 1001 may be preferred because MS 5*a* may be properly received in many cases and therefore speed handover (although MS 5*a* 1001 would not be received by CN 108 in the case illustrated in FIGS. 15 and 16).

FIG. 16

FIG. 16 is a graphical illustration of an exemplary system, where a mobile device utilizes a media handover relay to conduct handover, where a corresponding node operates software with restricted functionality, and where the corresponding node conducts a "break before make" handover, in accordance with exemplary embodiments. The potential restricted functionality of CN 108 is described in FIG. 15 above and also with FIG. 2*f*, which could include a legacy user agent that (i) cannot to transmit essentially duplicate media streams concurrently and/or (ii) changes the local transmit and receive IP:port number upon processing a call-control signal 307 to conduct handover. FIG. 16 illustrates the handover procedures MD 101, CN 108, and a media handover relay 305 can utilize after completing the steps described in FIG. 15 above. After transmitting MS 3 302 to media handover relay 305, MD 101 can transmit a call-control signal 307 to CN 108 such as a SIP Re-INVITE or similar messages in SIP, extensions to SIP, or other protocols as described in FIG. 3.

Upon receiving and processing a call-control signal 307, CN 108 may begin transmitting MS 4 401 to IP:port 409 on media handover relay 305, where MS 4 401 can include media acquired and processed by CN 108 after receiving call-control signal 307. CN 108 may use IP:port number 403 as the source IP:port number for media transmitted in MS 4 401, but as illustrated in FIG. 16, IP:port number 403 can be different than IP:port number 123 illustrated in FIG. 15. If CN 108 does not support transmitting MS 2 110 and MS 4 401 concurrently, then CN 108 may terminate MS 2 110 upon starting the transmission of MS 4 401, and the associated media-control channels, if any, with MD 101 at IP 103 may be stopped as well, as illustrated in FIG. 16. Although generally not preferred, possibly due to a restricted functionality, CN 108 may perform a "break before make" handover for the media CN 108 transmits.

Media handover relay 305 may preferably record media received in MS 3 302 within a relay media buffer 1002. The buffering of media by media handover relay 305 without a successful authentication request may also preferably be screened with a relay packet filter 410 including verifying media received is "conforming media", as described in FIG. 4 above. In other words, if the media is not conforming, then media handover relay 305 would not buffer the media without a successful authentication request such as a CN relay authenticate 620 (which would likely not be transmitted by CN 108 if it has restricted functionality).

Even if CN 108 cannot transmit two media streams concurrently, or utilize the same IP:port number for receipt of media before and after handover, MD 101 can preferably continue transmitting MS 1 109 after transmitting call-control signal 307. By MD 101 starting to transmit MS 3 302 before stopping the transmission of MS 1 109, MD 101 can perform a "make before break" handover for the media MD 101 transmits, even if CN 108 performs a "break before make" handover for the media CN 108 transmits. One benefit of MD 101 performing a "make before break" handover in media transmitted is the precise timing of handover by CN 108 may be unknown by MD 101 and media handover relay 305, where the timing represents when CN 108 may process a call-control signal 307 and possibly change receive IP:port numbers. By MD 101 continuing to transmit MS 1 109 after transmitting a call-control signal 307, CN 108 can continue receiving media packets on IP:port 122 until CN 108 changes a local port number to receive media upon processing a call-control signal 307. The packets in MS 1 109 that MD 101 transmits may simply be dropped by CN 108 after the receive port number is changed, upon processing a call-control signal 307.

Media handover relay 305 can receive MS 4 401 on IP:port 409. Although CN 108 may not support or transmit a CN relay authenticate 620 request message, media handover relay 305 can filter incoming media packets with a relay packet filter 1002. Media handover relay 305 could only accept packets on IP:port 409 that is conforming media, as described above, and additional methods of filtering packets and enhancing the security of media handover relay 305 are possible as well. Although not illustrated in FIG. 16 but illustrated in FIG. 4, upon receipt of MS 4 401, media handover relay 305 can (i) transmit media stored for MS 3 302 in relay media buffer 1002 to CN 108 in a MS 5 309 and (ii) also begin forwarding packets received in MS 3 302. Media handover relay 305 can transmit MS 5 309 to a IP:port number 405, which can equal the source IP:port number 404 for packets that media handover relay 305 receives in a MS 4 401. CN 108 can monitor IP:port 406 shown in FIG. 4 for the receipt of MS 5 309, including any data transmitted from a relay media buffer 1002. Even with restricted functionality for CN 108, IP:port numbers 406 and 403 are preferably the same, although IP:port number 403 and 123 may be different.

As illustrated in FIG. 4, media handover relay 305 can forward packets received in MS 4 401 to MD 101 in a MS 6 402, using the source IP:port number 304 for packets received in MS 3 302 as the destination IP:port number 407 for packets transmitted in MS 6 402. MD 101 can receive packets in MS 6 402, and assuming CN 108 can process a call-control signal 307 with sufficient speed upon receipt by CN 108, MD 101 could obtain all media transmitted by CN 108 both before and after handover. MD 101 could monitor both IP:port 114 and IP:port 303*b* for receiving media. In addition, MD 101 could implement a handover-predicting jitter buffer 222, such that a jitter buffer is increased preferably gradually before handover (i.e. possibly before transmitting a call-control signal 307), in order to better smooth out a possible transient spike in delay between the last packet received in MS 2 110 and the first packet received in MS 6 402. After MS 6 402 has been normally received, a handover-predicting jitter buffer 222 could be decreased, preferably gradually, to the size similar to a standard jitter buffer. Since CN 108 preferably utilizes a jitter buffer, packets (i) stored in relay media buffer 1002 and subsequently (ii) transmitted by media handover relay 305 upon receipt of MS 4 401 can subsequently be recovered and included in the playback of media to a user associated with CN 108.

Media handover relay 305's transmission of MS 5 309 and MS 6 402 is also described in FIGS. 4, 10, and 13, and can also apply when CN 108 has restricted functionality as described in FIGS. 15 and 16. Even though CN 108 may have restricted functionality, the efficient handover techniques illustrated in FIGS. 15 and 16 utilizing a media handover relay can both provide a rapid handover and minimize packet loss or delay given the constraints of restricted functionality for CN 108. MD 101 and CN 108 can subsequently also optionally establish a media-control channel via media handover relay 305, using procedures described previously.

CONCLUSION

Various exemplary embodiments have been described above. Those skilled in the art will understand, however, that changes and modifications may be made to those examples without departing from the scope of the claims.

What is claimed is:

1. A method for supporting a handover of a media session using a server, the method comprising the server:
   receiving a message that includes a first Internet Protocol address and port (IP:port) number, wherein the first IP:port number includes an IP address, wherein the message is received after the media session begins, and wherein media in the media session does not route through the server before the handover;
   using a second IP:port number to receive a first media stream;
   sending a second media stream from a third IP:port number to the first IP:port port number, which second media stream includes at least a portion of the first media stream;
   receiving at the third IP:port number a third media stream from the IP address, wherein the server starts receiving the third media stream after the server starts sending the second media stream;
   sending a fourth media stream from the second IP:port number, which fourth media stream includes at least a portion of the third media stream; and,
   receiving an authentication message, and, after receiving the authentication message, sending at least one packet in the second media stream.

2. The method of claim 1, wherein receiving the message, the first media stream and the authentication message occurs in any order.

3. The method of claim 1, wherein the server comprises at least one of the following: a computer, a session border controller, a back-to-back user agent, a proxy server, a media relay, a software program, and a supernode.

4. The method of claim 1, the second IP:port number and the third IP:port number are a same number.

5. The method of claim 1, wherein each of the first, second, and third media streams comprises a separate series of packets, wherein each series of packets contains a separate set of digitized media, wherein each set of digitized media comprises at least one of voice and video, and wherein each series of packets is routed through a public Internet and contains a header including a packet source IP address, a packet source port number, a packet destination IP address, and a packet destination port number.

6. The method of claim 1, wherein the authentication message comprises at least one non-media packet that the server receives in the first media stream, and wherein said at least one non-media packet includes data associated with a security token associated with the server.

7. The method of claim 1, wherein the authentication message comprises at least one media packet received in the first media stream, and wherein the server determines that the at least one media packet comprises conforming media.

8. The method of claim 7, wherein the server determines that the at least one media packet comprises conforming media at least in part using at least one of the following: a sequence number, a codec, a channel-coding parameter, a timestamp value, a frame count, a checksum, a synchronization source identifier, a real-time protocol value, a secure real-time protocol value, a call-ID number associated with the first media stream, a cipher key, a session key, a differentiated services code point value, a source IP address for the at least one media packet, a port number, an IP address, and a header value.

9. The method of claim 1, further comprising the server receiving a relay request message and sending a relay response message, and wherein the relay response message includes at least one of the following: an IP address for the relay server, a domain name for the server, a destination port number for the first media stream, a security token, and a security token time-to-live value.

10. The method of claim 1, further comprising the server (i) recording at least a portion of the first media stream in a buffer, (ii) determining that a source port number in the third media stream is different than the destination port number, (iii) changing the destination port number for the second media stream to the source port number, and (iv) sending the portion of the first media stream recorded in the buffer via the second media stream after changing the destination port number.

11. A method for supporting a handover of a media session using a server, the method comprising the server:
storing a first value, wherein the first value is associated with a media packet, and wherein the server stores the first value before the server receives media in the media session, and wherein media in the media session does not route through the server before handover;
using a first Internet Protocol address and port (IP:port) number to receive a first media stream from a second IP:port number,
determining a second value at least in part using the first media stream;
comparing the first value with the second value;
using a third IP:port number to receive a second media stream from a fourth IP:port number;
sending from the third IP:port number a third media stream to number the fourth IP:port number, wherein the server sends at least one packet in the third media stream after comparing the fast and second values, and wherein the third media stream includes at least a portion of the first media stream; and,
sending from the first IP:port number a fourth media stream to the second IP:port number, wherein the fourth media stream includes at least a portion of the second media stream, and wherein the server begins sending the fourth media stream after receiving at least one packet from the second IP:port number.

12. The method of claim 11, wherein the server comprises at least one of the following: a computer, a session border controller, a back-to-back user agent, a proxy server, a media relay, a software program, and a supernode.

13. The method of claim 11, wherein the server comprises more than one server and wherein a first server receives the first media stream and a second server sends the second media stream.

14. The method of claim 11, wherein server determines the first media stream includes conforming media, and wherein the first value and the second value comprise at least one of the following: a sequence number, a codec, a channel-coding parameter, a timestamp value, a frame count, a checksum, a synchronization source identifier, a real-time protocol value, a secure real-time protocol value, a call-ID number associated with the first media stream, a cipher key, a session key, a differentiated services code point value, the first IP address, a port number, and a header value.

15. The method of claim 11, further comprising the server receiving the first media stream from one of a mobile device and a corresponding node, wherein the mobile device and the corresponding node communicate via the media session before the server receives the first media stream, and wherein the first value is determined during the media session before the server receives the first media stream.

16. The method of claim 11, further comprising the server (i) recording at least a portion of the first media stream in a buffer, and (ii) sending the portion of the first media stream via the third media stream after the server starts receiving the second media stream.

17. The method of claim 11, wherein each of the first, second, and third media streams comprises a separate series of packets, wherein each series of packets contains a separate set of digitized media, wherein each set of digitized media comprises at least one of voice and video, and wherein each series of packets is routed through a public Internet and contains a header including a packet source IP address, a packet source port number, a packet destination IP address, and a packet destination port number.

18. A system for supporting a handover of a media session, the system comprising:
a first Internet protocol address and port (IP:port) number for a first destination IP:port number in a first media stream, and for a first source IP:port number in a second media stream, wherein media in the media session both (i) begins before the first media stream starts to be received and (ii) does not route through the first IP:port number before handover;
a second IP:port number for a second destination IP:port number in a third media stream and for a second source IP:port number in a fourth media stream;
a message comprising at least one of the first IP:port number and the second IP:port number, wherein the message is recorded before the first media stream starts to be received;
a buffer for at least one of:
recording a first portion of the first media stream, wherein the first portion is included in the fourth media stream after receiving at least one packet in the third media stream, and wherein the first portion is sent to a third source IP:port number in the third media stream;
recording a second portion of the third media stream, wherein the second portion is included in the second media stream after receiving at least one packet in the first media stream, and wherein the second portion is sent to a fourth source IP:port number in the first media stream; and a database for storing a value before the first media stream starts to be sent, wherein the value is used at least in part to determine that an authentication message is valid, wherein at least one packet in one of the second media stream and the fourth media stream is sent after determining the authentication message is valid.

19. The system of claim 18, wherein the first IP:port number, the second IP:port number, the buffer, and the database are associated with a media handover relay, wherein the media handover relay comprises at least one of a server, a computer, a session border controller, a back-to-back user agent, a proxy server, a media relay, a software program, and a supernode, and wherein the media handover relay receives the first media stream and the third media stream.

20. The system of claim 19, wherein the media handover relay comprises more than one server and wherein a first server receives the first media stream and a second server receives the third media stream.

21. The system of claim 19, wherein the authentication message comprises at least one media packet received in one of the first media stream and the third media stream, and wherein the media handover relay determines that the at least one media packet comprises conforming media at least in part by using the value.

22. The system of claim 21, wherein the value comprises at least one of the following: a sequence number, a codec, a channel-coding parameter, a timestamp value, a frame count, a checksum, a synchronization source identifier, a real-time protocol value, a secure real-time protocol value, a call-ID number associated with the first media stream, a cipher key, a session key, a differentiated services code point value, a source IP address for the at least one media packet, a port number, and a header value.

23. The system of claim 18, wherein the first media stream is received from a third IP:port number, wherein the second media stream is sent to the third IP:port number, wherein the third media stream is received from a fourth IP:port number, and wherein the fourth media stream is sent to the fourth IP:port number.

24. The system of claim 18, wherein the authentication message comprises at least one non-media packet included in one of the first media stream and the third media stream, and wherein the non-media packet includes data associated with the value.

25. The system of claim 18, wherein a mobile device transmits one of the first media stream and the third media stream, and wherein the value is transmitted between the mobile device and the database before the first media stream starts to be sent.

26. The system of claim 18, wherein the value comprises at least one of the following: a number used once (nonce), a pseudo-random number, a pseudo-random string, an alphanumeric challenge, a value generated during the creation of the media session, a Call-ID value, a session identifier, a call identifier, a session key, an authentication key, a mobile subscriber identity number, a telephone number, and a call sequence number.

27. The system of claim 18, wherein the value comprises a first string, wherein the authentication message includes a second string associated with the value, and wherein the second string is determined at least in part using one of a message digest algorithm, a hash algorithm, and an encryption algorithm.

28. The method of claim 18, wherein each of the first, second, and third media streams comprises a separate series of packets, wherein each series of packets contains a separate set of digitized media, wherein each set of digitized media comprises at least one of voice and video, and wherein each series of packets is routed through a public Internet and contains a header including a packet source IP address, a packet source port number, a packet destination IP address, and a packet destination port number.

* * * * *